(12) United States Patent
Alexander et al.

(10) Patent No.: US 10,556,260 B2
(45) Date of Patent: Feb. 11, 2020

(54) ENVIRONMENTAL REMEDIATION SYSTEMS, DEVICES, AND METHODS

(71) Applicant: Ai-Remedial Systems, LLC, Chapel Hill, NC (US)

(72) Inventors: W. Joseph Alexander, Chapel Hill, NC (US); Gregory W. Lucier, Chapel Hill, NC (US)

(73) Assignee: Ai-Remedial Systems, LLC, Chapel Hill, NC (US)

( * ) Notice: Subject to any disclaimer, the term of this patent is extended or adjusted under 35 U.S.C. 154(b) by 0 days.

(21) Appl. No.: 15/950,022

(22) Filed: Apr. 10, 2018

(65) Prior Publication Data

US 2018/0229281 A1 Aug. 16, 2018

Related U.S. Application Data

(63) Continuation-in-part of application No. 15/582,760, filed on Apr. 30, 2017, now Pat. No. 9,937,537, which is a continuation of application No. PCT/US2016/027878, filed on Apr. 15, 2016.

(60) Provisional application No. 62/550,718, filed on Aug. 28, 2017, provisional application No. 62/525,519, filed on Jun. 27, 2017, provisional application No. 62/255,528, filed on Jun. 27, 2017, provisional application No. 62/525,502, filed on Jun. 27, 2017, provisional application No. 62/147,970, filed on Apr. 15, 2015.

(51) Int. Cl.
| | |
|---|---|
| *B09C 1/00* | (2006.01) |
| *E03F 1/00* | (2006.01) |
| *C02F 1/28* | (2006.01) |
| *B09C 1/06* | (2006.01) |
| *C02F 103/06* | (2006.01) |

(52) U.S. Cl.
CPC ............... *B09C 1/002* (2013.01); *C02F 1/28* (2013.01); *E03F 1/002* (2013.01); *C02F 2103/06* (2013.01)

(58) Field of Classification Search
CPC .. B09C 1/002; E03F 1/002; C02F 1/28; C02F 2103/06
See application file for complete search history.

(56) References Cited

U.S. PATENT DOCUMENTS 5,577,558 A * 11/1996 Abdul .................... B09C 1/002
166/106

FOREIGN PATENT DOCUMENTS

| JP | 2000210655 A | * | 8/2000 |
|---|---|---|---|
| JP | 2001131955 A | * | 5/2001 |

\* cited by examiner

*Primary Examiner* — Krishnan S Menon
*Assistant Examiner* — Waqaas Ali
(74) *Attorney, Agent, or Firm* — NK Patent Law

(57) ABSTRACT

A liquid treatment system includes: a filter casing including a structural wall, a first screen formed though the structural wall, and a second screen formed though the structural wall; and a liquid treatment cartridge configured for placement in the filter casing between the first and second screens. The liquid treatment cartridge includes a cartridge casing having an upper end and a lower end, and an inflatable seal surrounding the cartridge casing at an intermediary position between the upper end and lower end. A method of servicing a groundwater treatment installation includes: vertically displacing a liquid treatment cartridge within a filter casing having a structural wall, a first screen formed though the structural wall, and a second screen formed though the structural wall.

7 Claims, 94 Drawing Sheets

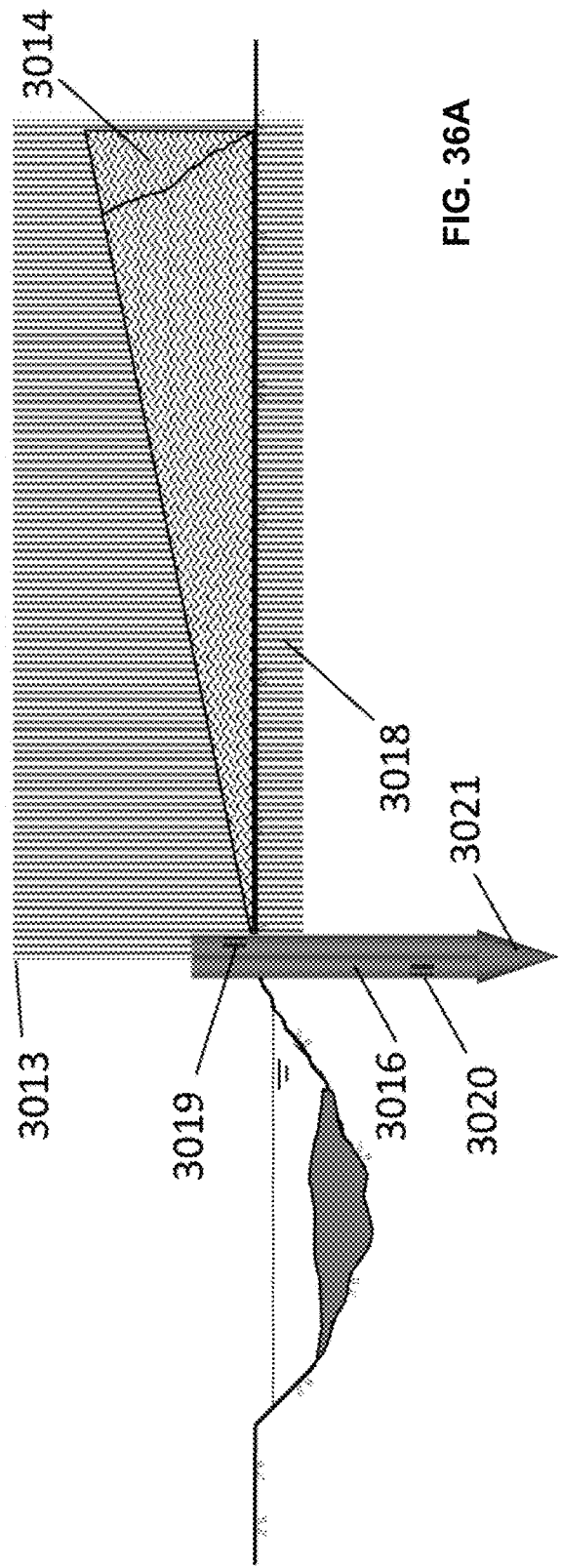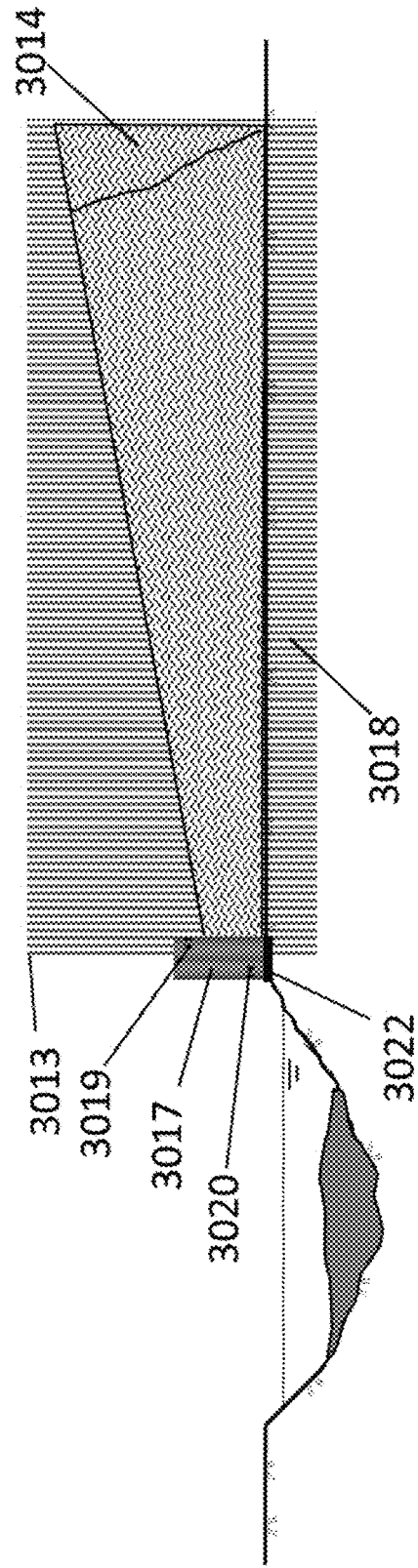

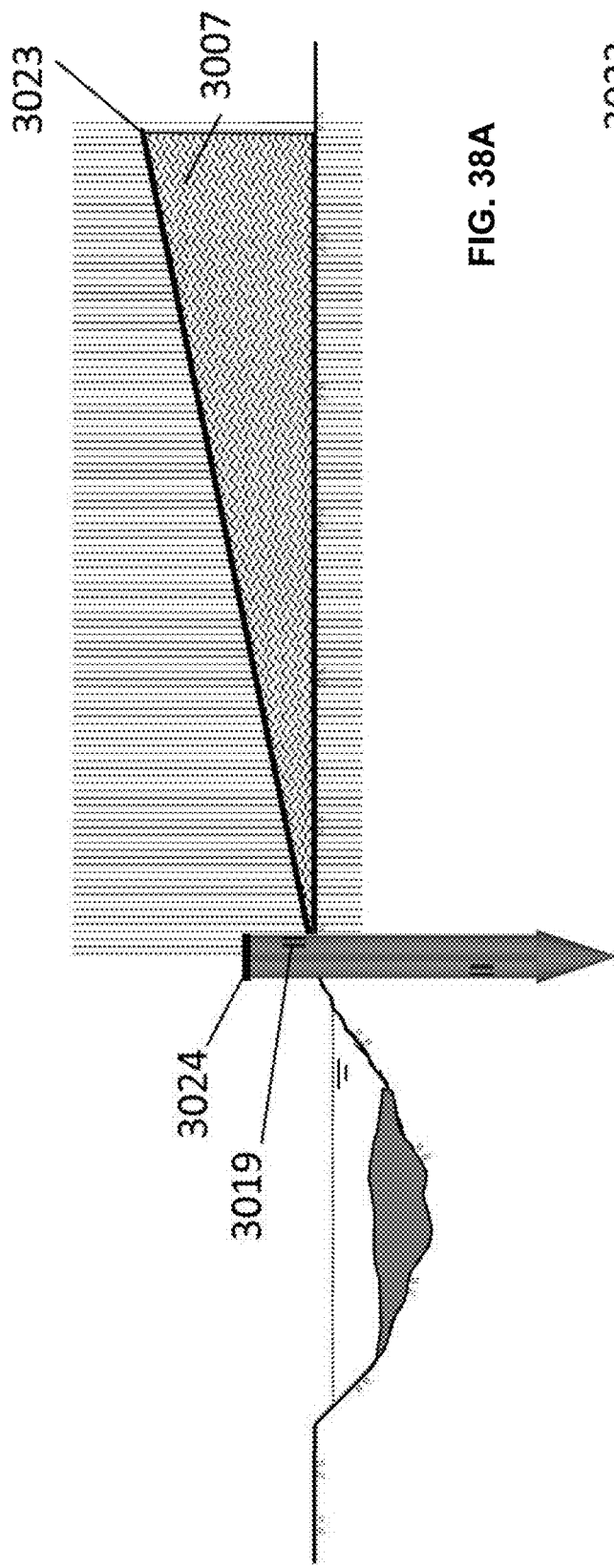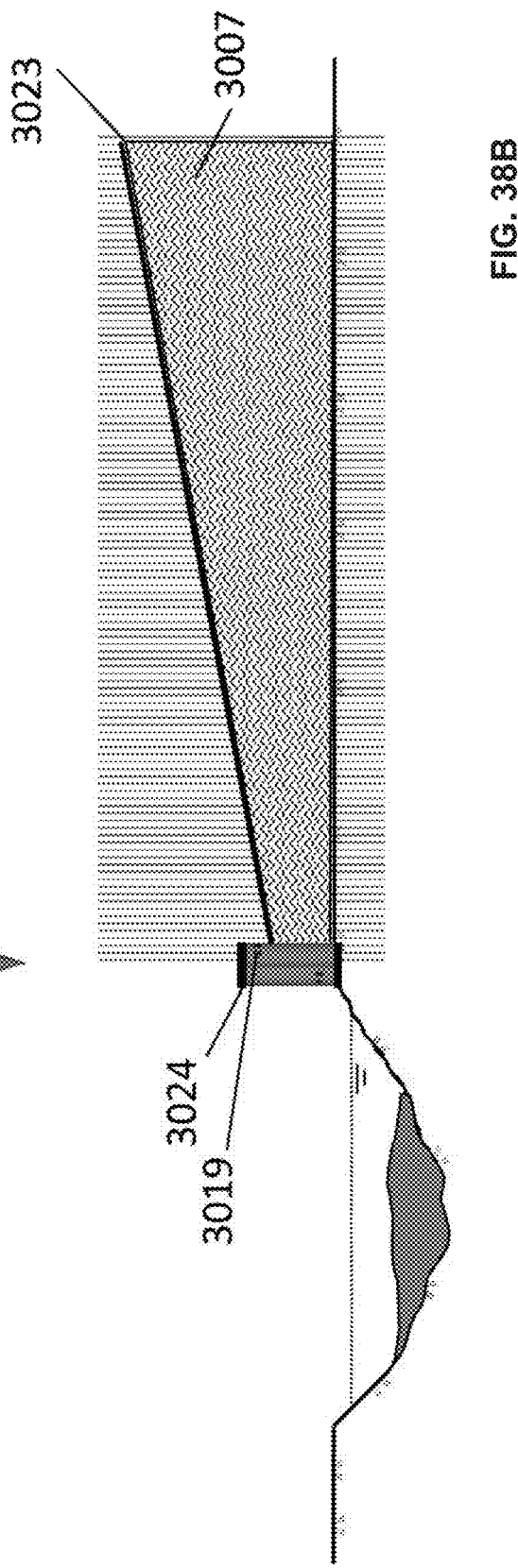

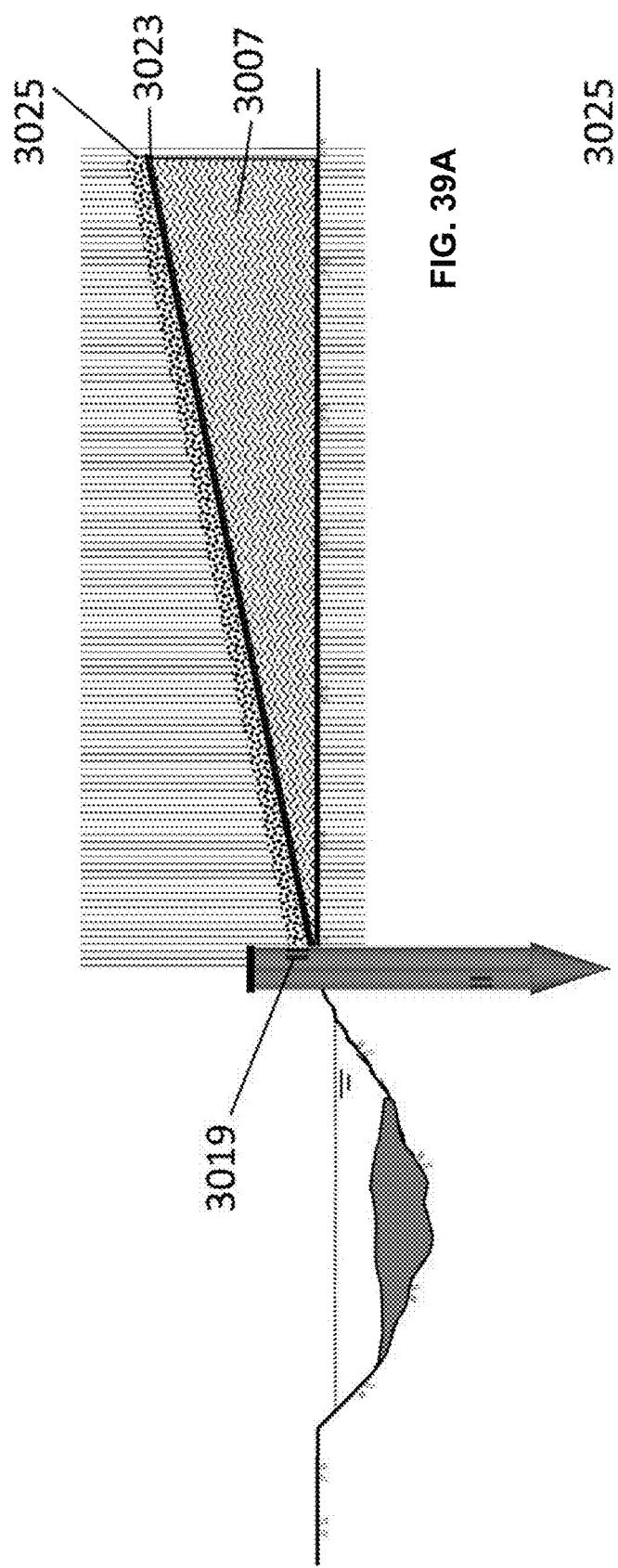
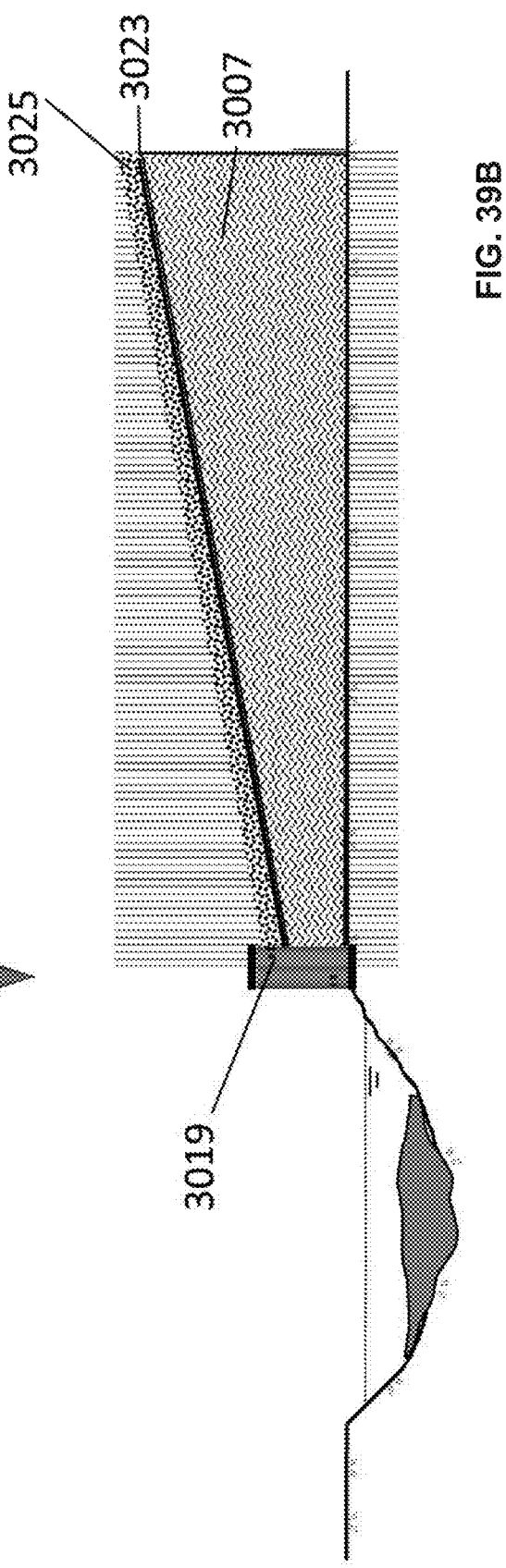

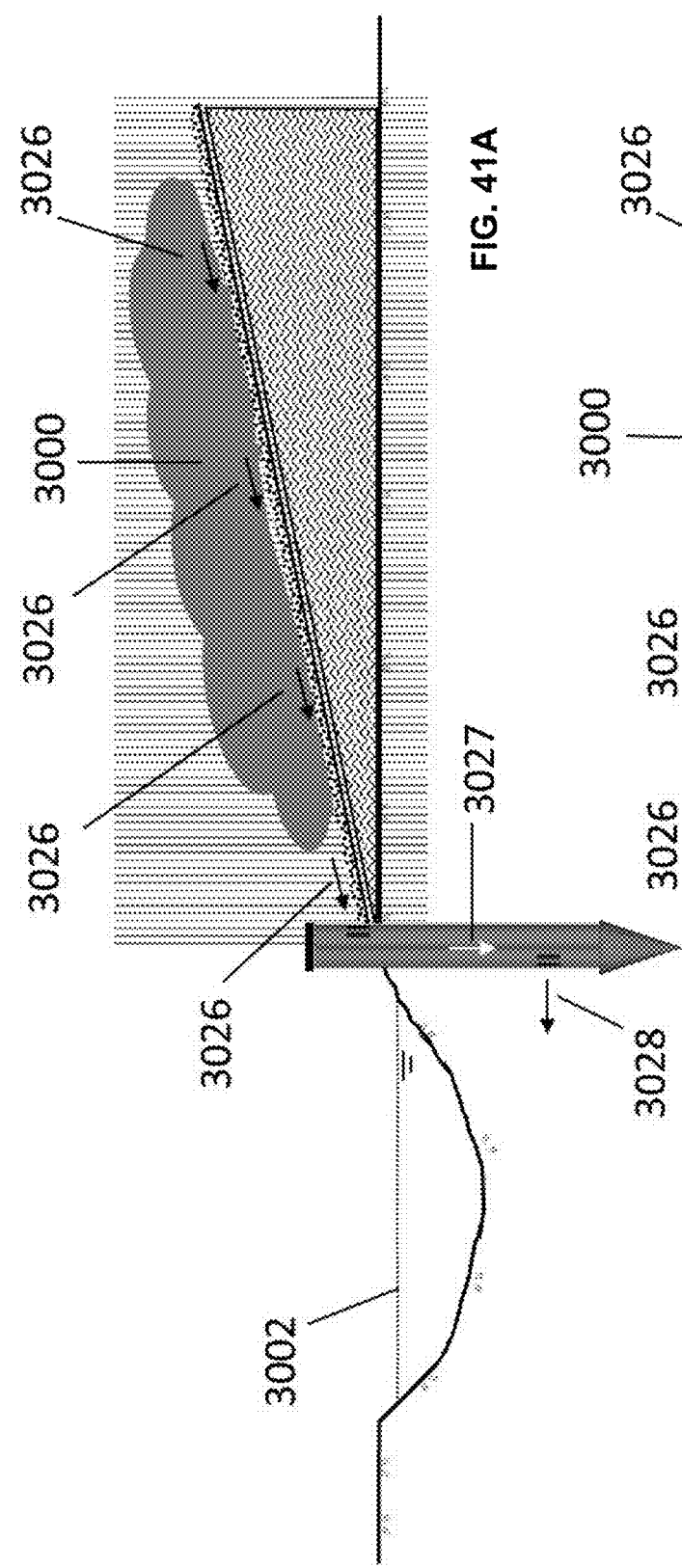
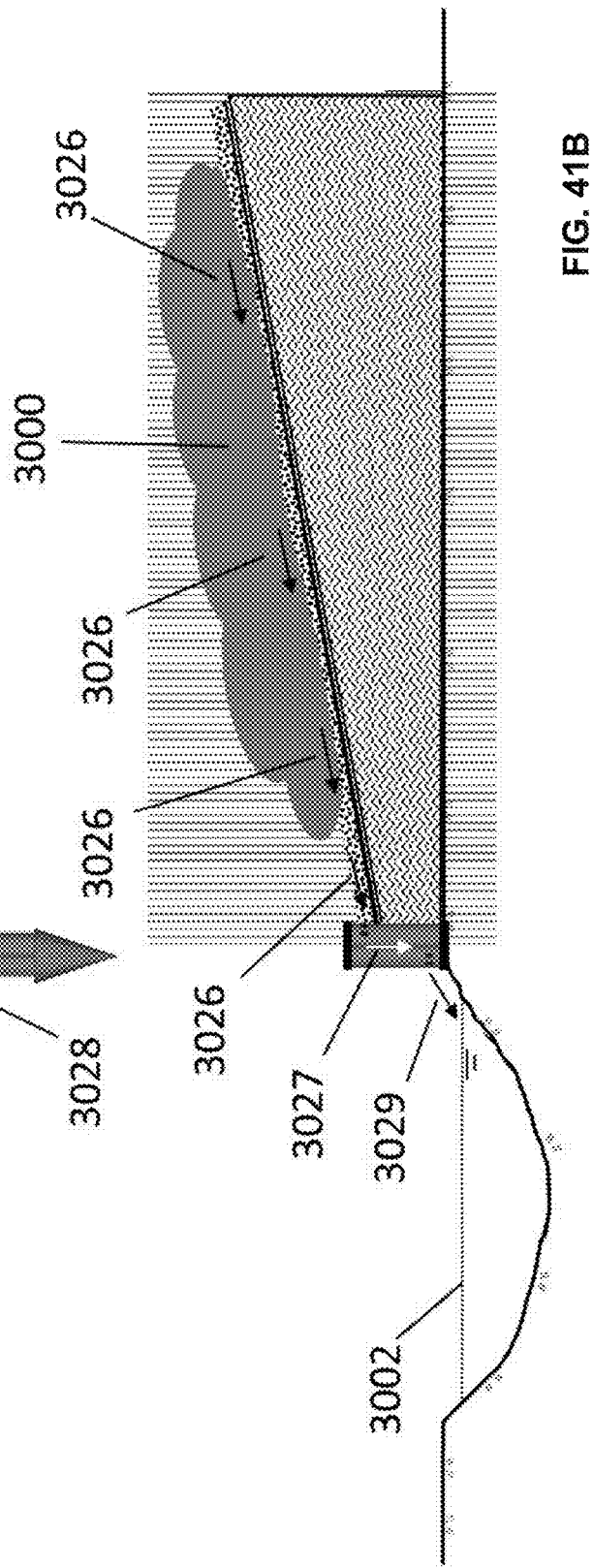

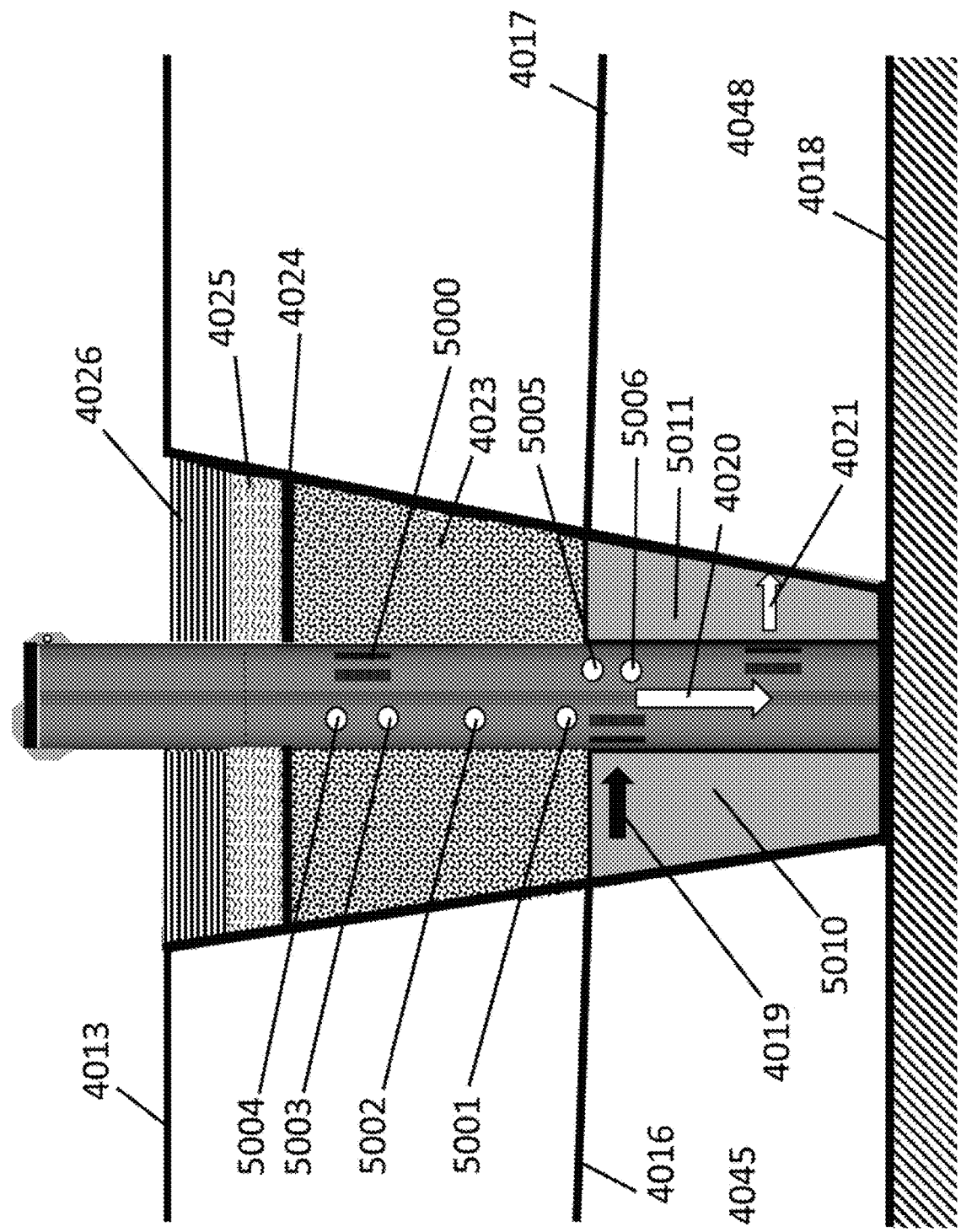

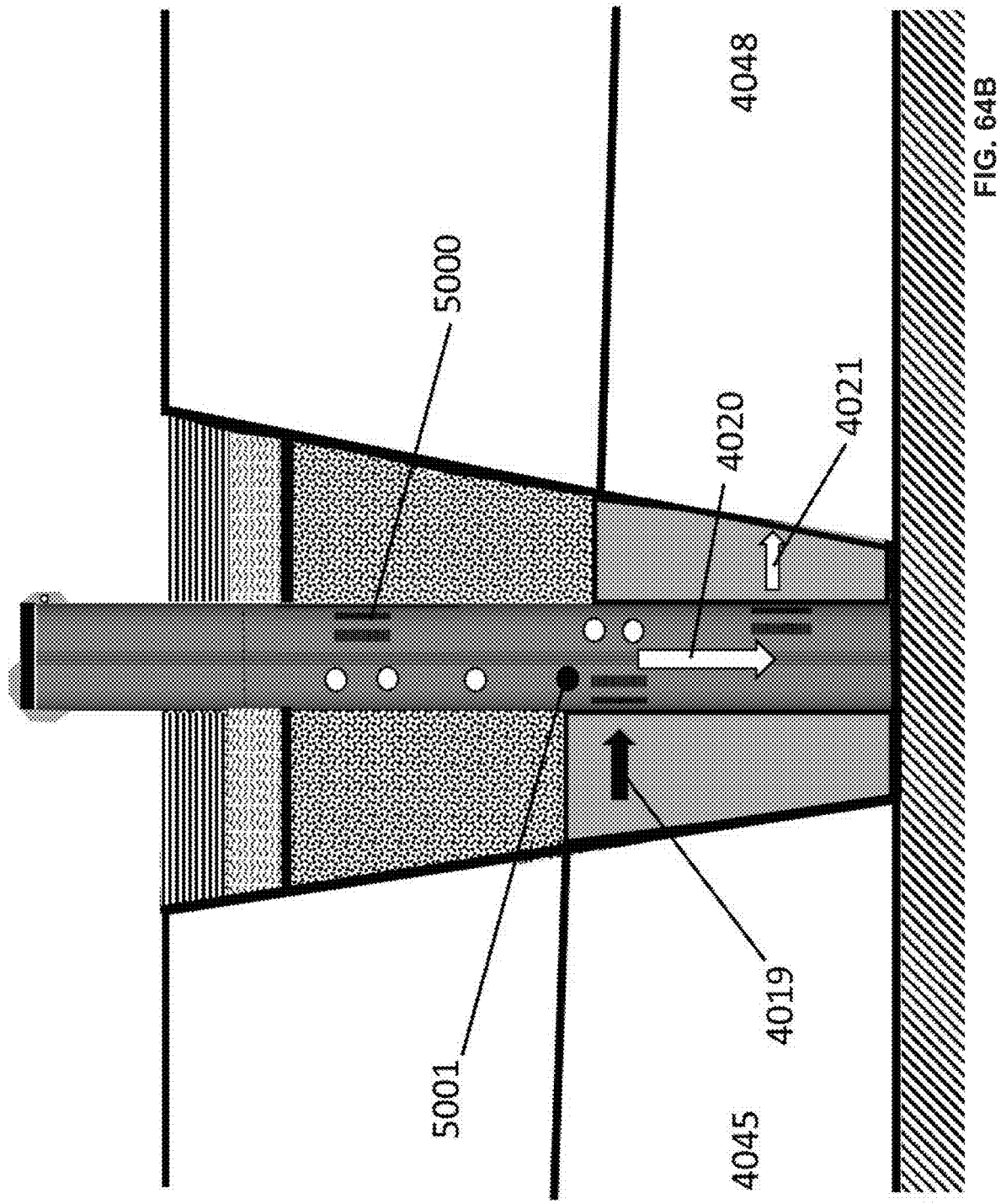

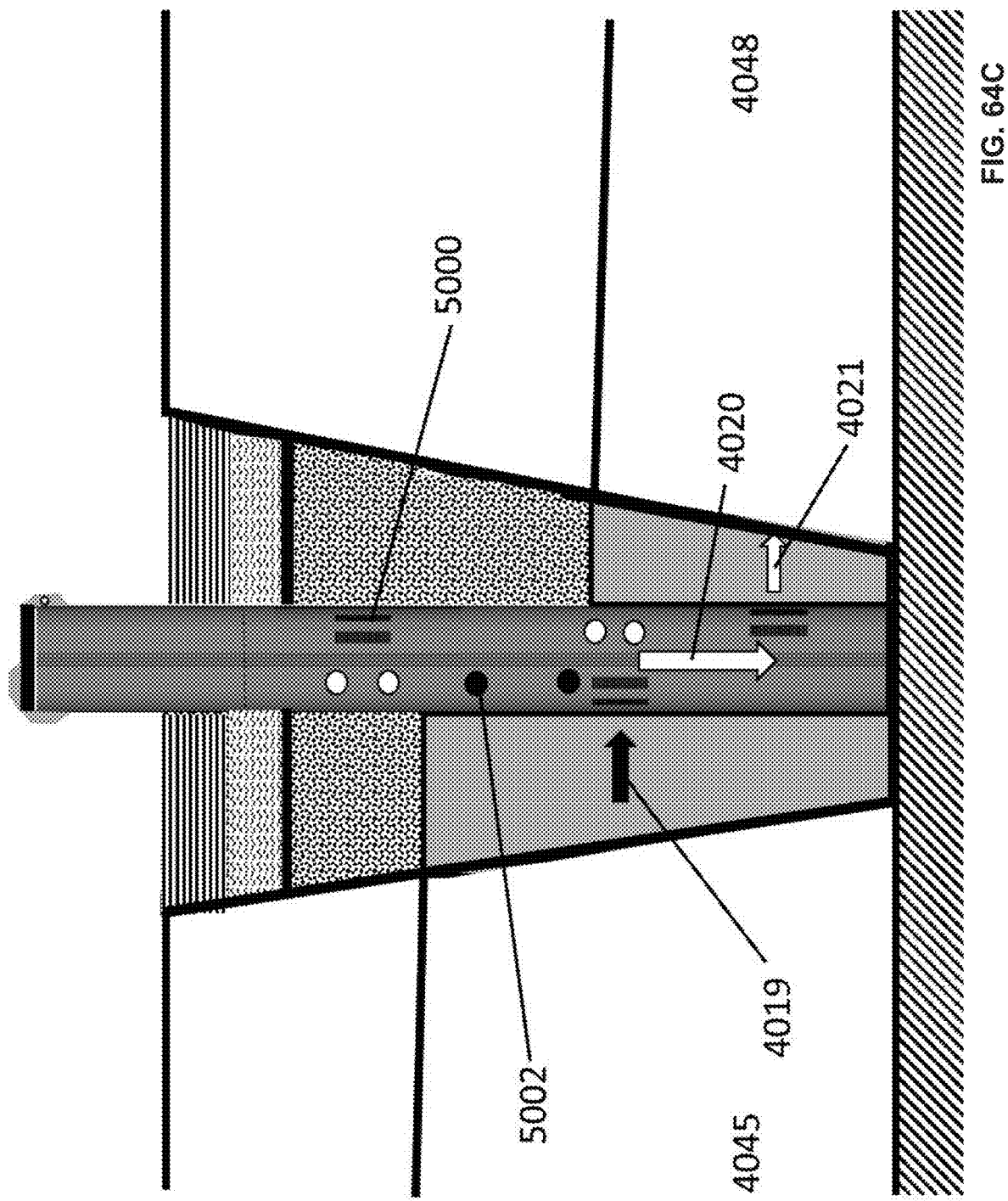

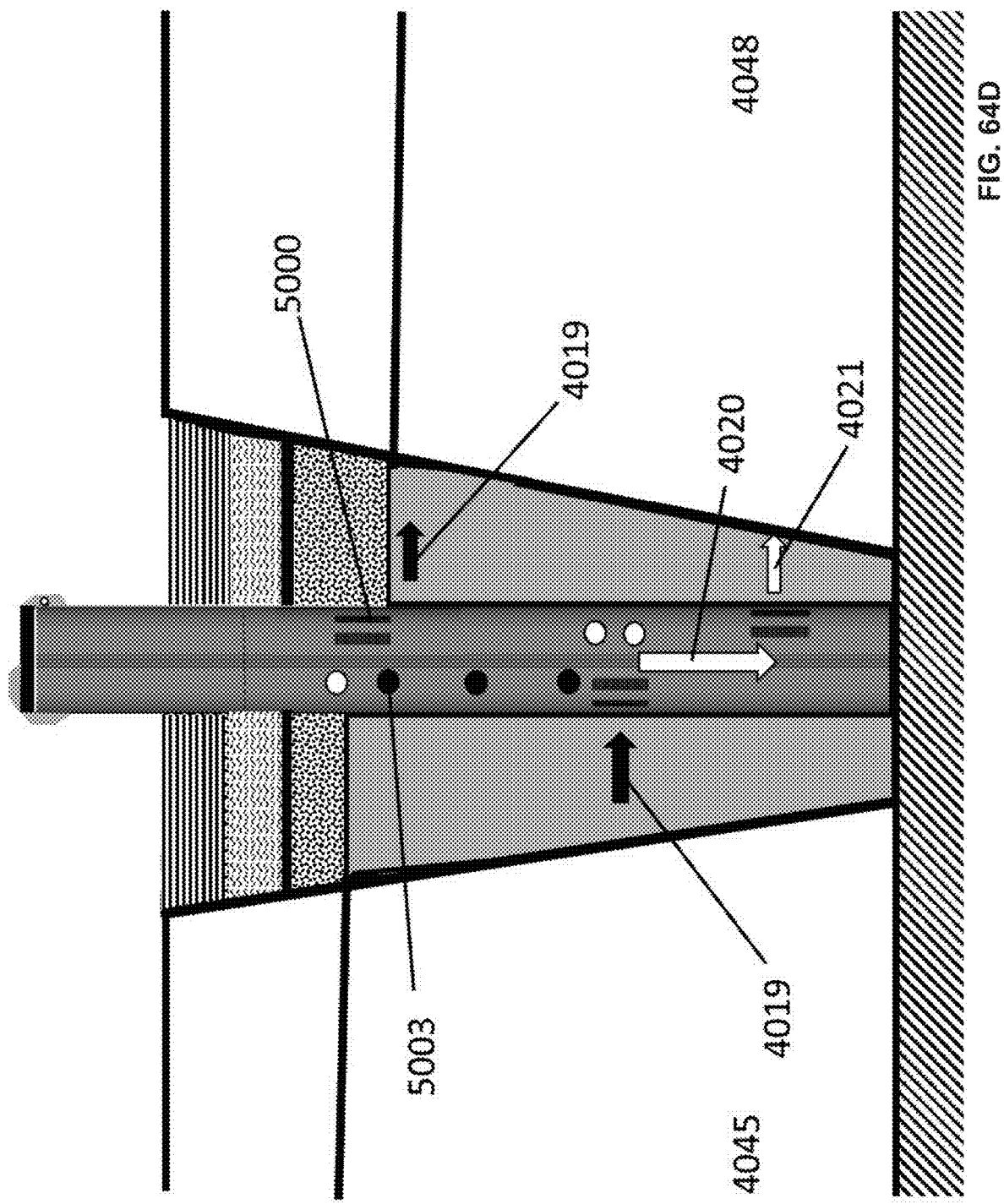

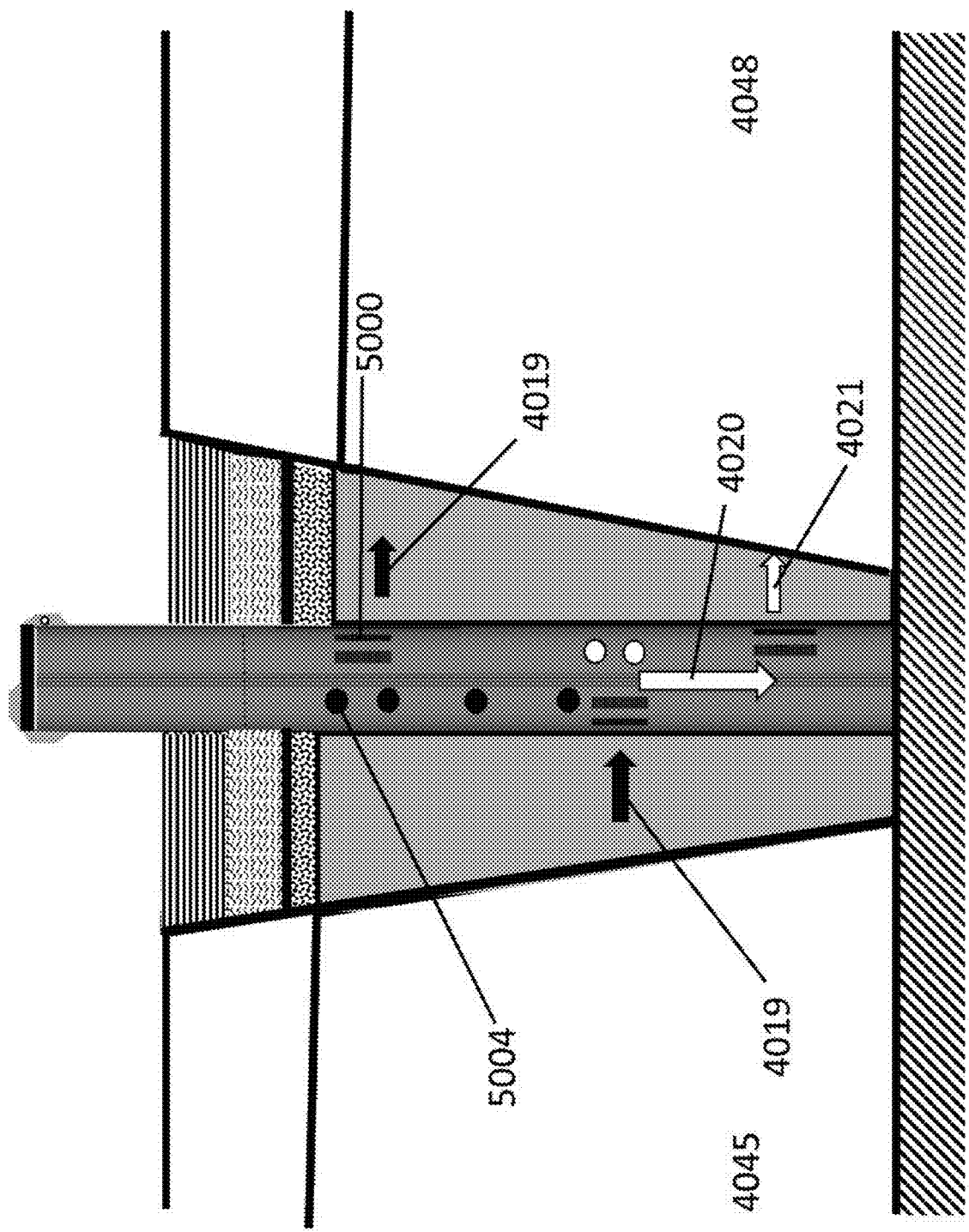

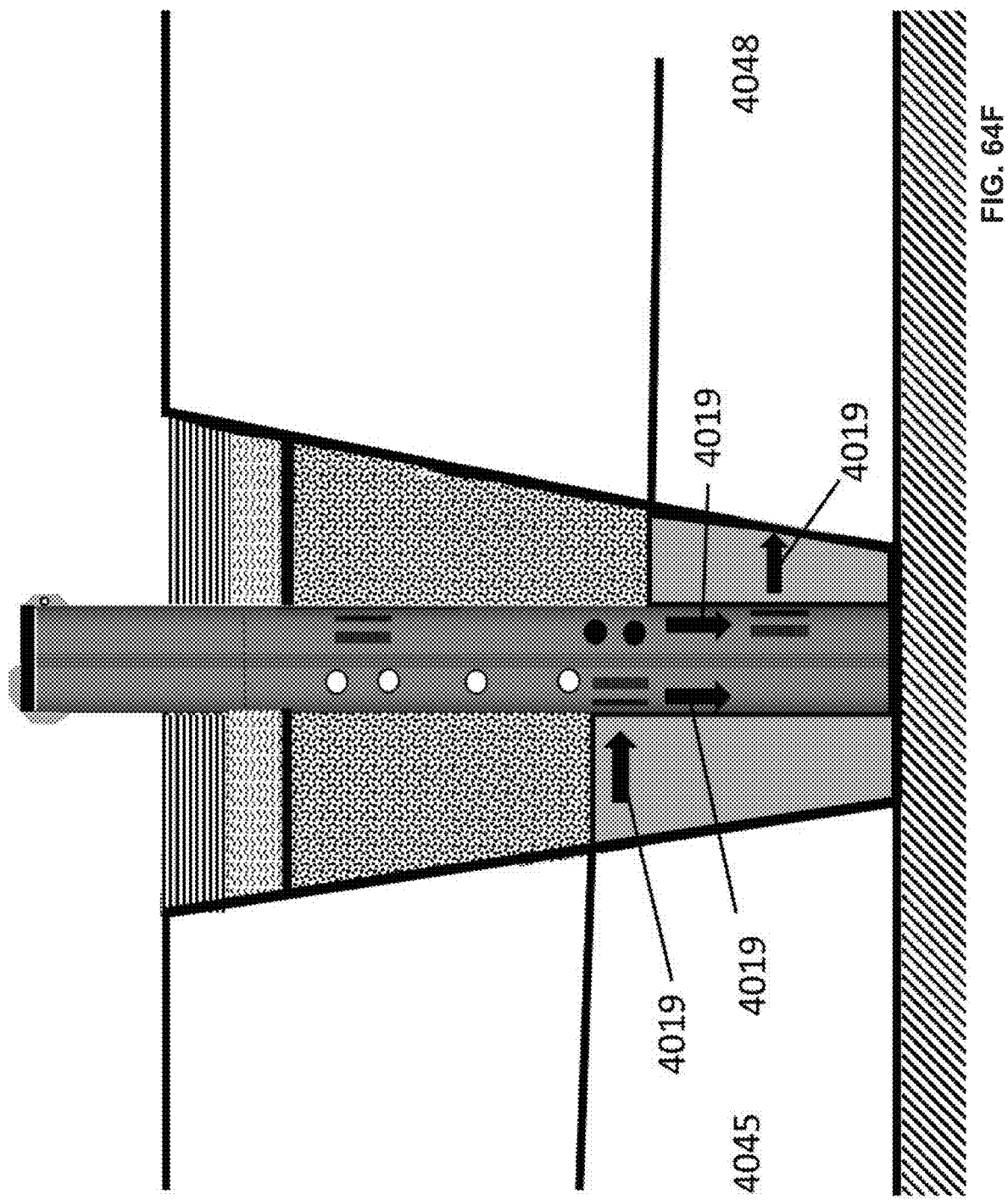

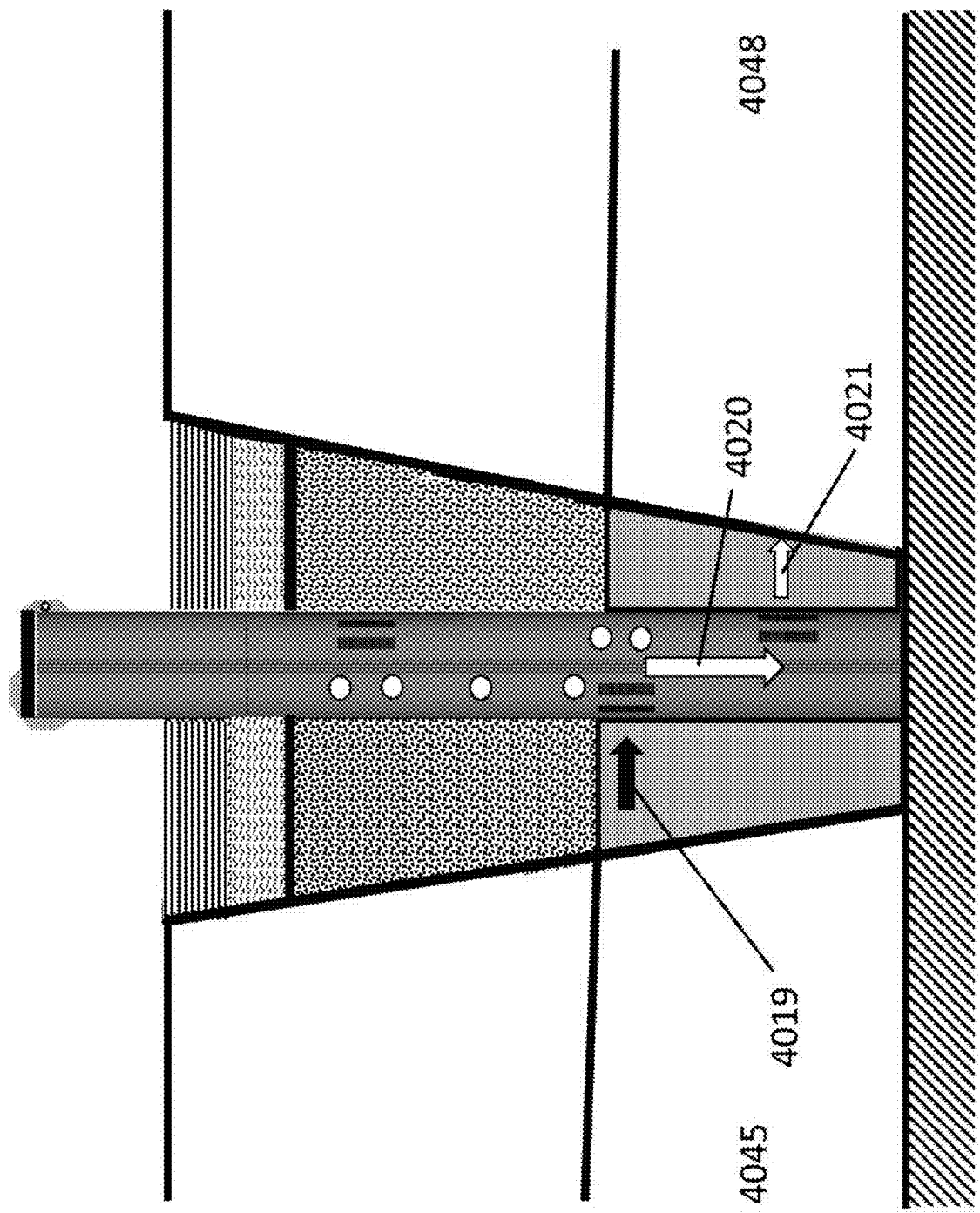

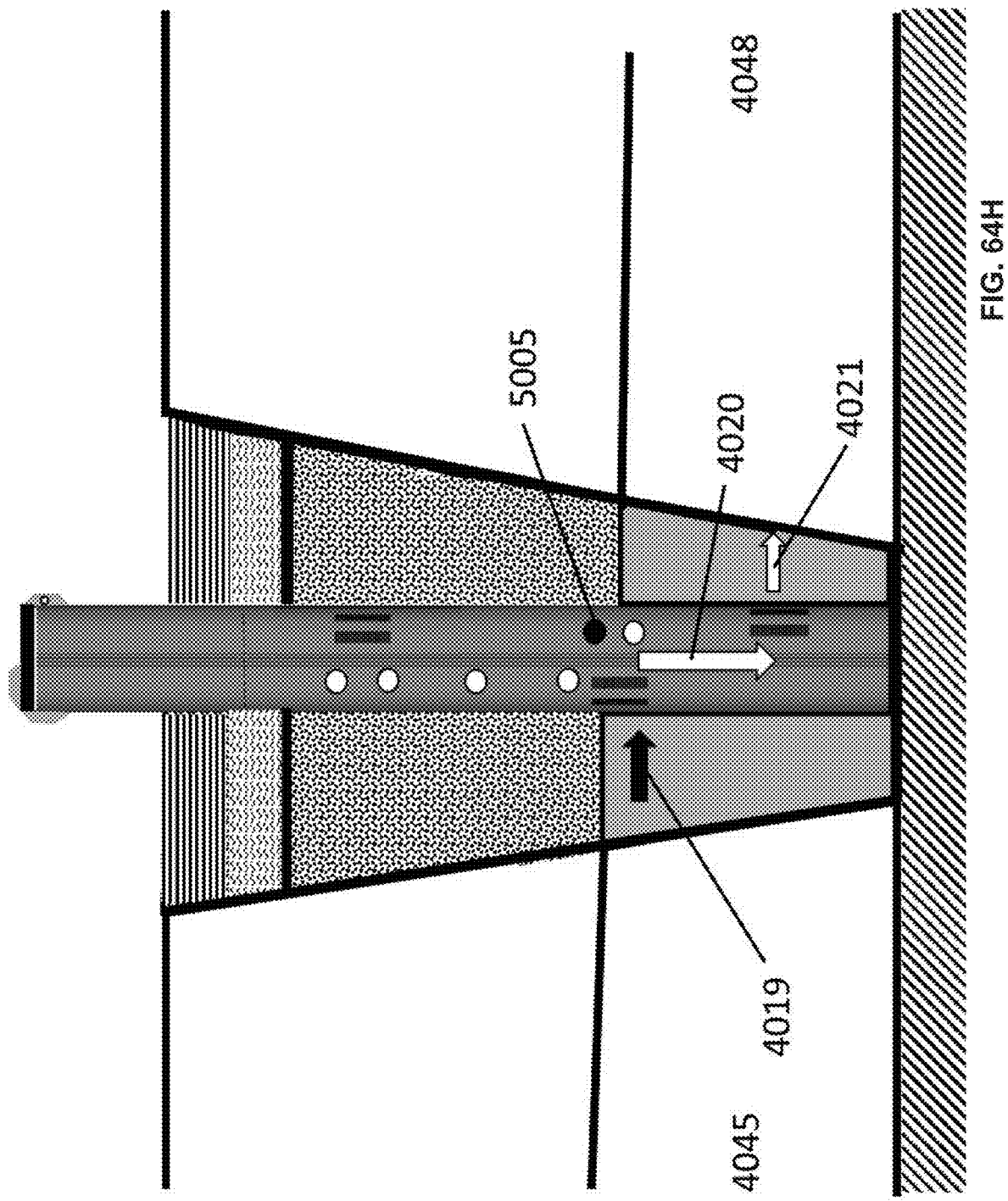

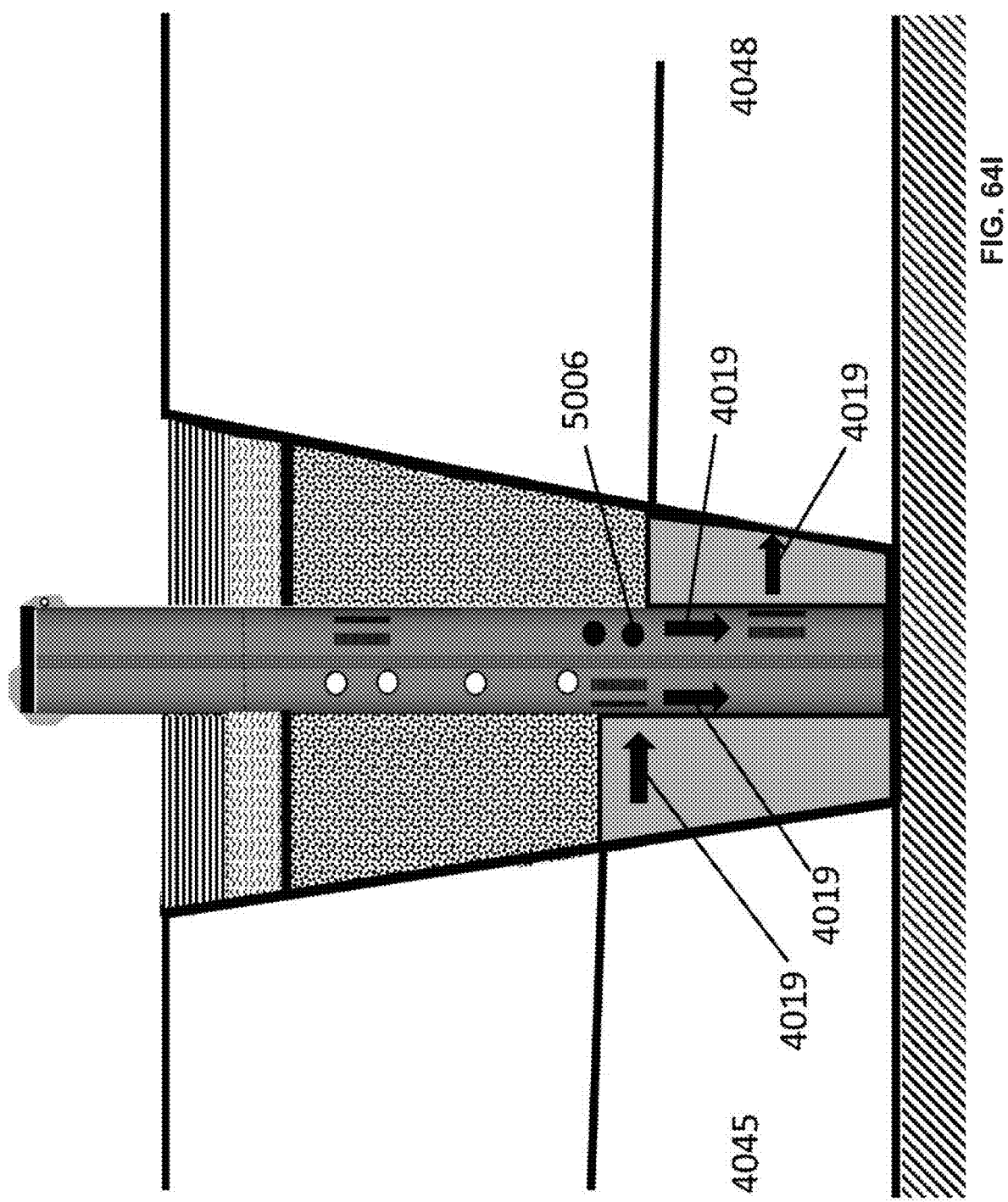

ENVIRONMENTAL REMEDIATION SYSTEMS, DEVICES, AND METHODS

CROSS-REFERENCE TO RELATED APPLICATIONS

This application is a Continuation-In-Part of U.S. patent application Ser. No. 15/582,760, entitled "GROUNDWATER REMEDIATION SYSTEMS, DEVICES, AND METHODS", filed on Apr. 30, 2017 and being issued on Apr. 10, 2018 as U.S. Pat. No. 9,937,537, which is a continuation of PCT Patent Application No. PCT/US16/27878, entitled "GROUNDWATER REMEDIATION SYSTEMS, DEVICES, AND METHODS", filed on Apr. 15, 2016, which claims the benefit of U.S. Provisional Patent Application No. 61/147,970, entitled "Subsurface Groundwater Remediation System", filed on Apr. 15, 2015, which are all incorporated herein in their entirety by this reference.

This application further claims the benefit of U.S. Provisional Patent Applications No. 62/525,519, entitled "Apparatus and Methods for Driving Large-Diameter Pipe Piles in the Subsurface and the Installation of Artificial Gravel Packs", filed on Jun. 27, 2017, No. 62/525,528, entitled "Apparatus and Methods for Capturing Non-Aqueous Phase Liquids in an In-Situ Groundwater Treatment System", filed on Jun. 27, 2017, No. 62/525,502, entitled "Apparatus and Methods for Storing, Containing, Dewatering, and Treating Contaminated Water Draining from Sediment Removed from Surface Water Bodies", filed on Jun. 27, 2017, and No. 62/550,718, entitled "Apparatus and Methods for Containing and Treating Contaminated Groundwater, Contaminated Surface Water, or Both Contaminated Groundwater and Surface Water Simultaneously in a Trench-Based Remedial System", filed on Aug. 28, 2017, which are all incorporated herein in their entirety by this reference.

TECHNICAL FIELD

The present disclosure relates to groundwater remediation, sediment remediation, surface water remediation, and combined treatment of these environmental media. More particularly, the present disclosure relates to versatile systems, devices, and methods for site-specific remediation and sampling.

The present disclosure relates to devices used to drive large-diameter pipe piles in the subsurface and methods used to install artificial gravel packs in the annular space created between the device and the external wall of the pile. More particularly, the present disclosure relates to apparatus and methods for driving large-diameter pipe piles that have inlet and outlet screens (filter casings) in the subsurface, while installing an artificial gravel pack in the resulting annular space created between the internal wall of the drive device and the external wall of the filter casing to protect the screens and promote the flow of contaminated groundwater toward the filter casing for containment and treatment.

The present disclosure relates to the capture of Non-Aqueous Phase Liquids (NAPLs) in the subsurface at contaminated sites. More specifically, NAPLs can be captured from groundwater using removable skimmer cartridges containing super absorbent polymers or equivalent. The skimmer cartridges are emplaced in filter casings, positioned to capture NAPLs either less dense than water and residing on the water table, or NAPLs denser than water and residing on low permeability lenses within the aquifer or on the base of the aquifer.

The present disclosure relates to the treatment of contaminants found within sediment at the bottom of certain rivers, bays, harbors, ponds, mine drainage areas, or other surface water bodies. More particularly, the present disclosure relates to apparatus and methods for the ex-situ storage, containment, dewatering, and treatment of contaminated liquids draining from sediment dredged or excavated from surface water bodies.

The present disclosure relates to the treatment of contaminants found within groundwater, surface-water, or combinations of these water resources. More particularly, the present disclosure relates to apparatus and methods for containing and treating contaminated groundwater, surface water, or combined groundwater and surface water in a trench-based remedial system.

BACKGROUND

Among current remedial options, the permeable reactive barrier (PRB) market segment is evolving and gaining popularity as a promising technology in terms of cost and stability of performance. However, several problems are prevalent with conventional PRB systems. Typically, there is no ability to exchange permeable reactive materials (PRMs) emplaced in subsurface trenches should laboratory treatability tests and remedial planning efforts fail to accurately predict the geochemical reactions that occur in the subsurface environment, resulting in a reduction in the system's longevity. Also, disposing of large excavated volumes of contaminated material from trenches required for the installation of conventional PRB systems is not well addressed.

Another problem is the restricted placement of conventional PRB systems at distal portions of plumes due to limitations on the ability to effectively treat contaminant mass flux. Finally, there is typically an inability to rehabilitate areas where mineral precipitation may occur within the PRMs or adjacent formations. These problems affect remediation contractors because conventional PRB remedial systems may not last as long as predicted and may require injections, or in the worst case, expensive re-excavation, which can involve remobilization of construction equipment and handling and disposal of hazardous waste generated from the re-excavation and the PRB re-emplacement processes.

A technically viable and cost-effective solution is therefore needed due to current PRB design, performance, and longevity concerns. Improvements are needed in PRB construction methods and installations to increase performance and allow flexibility in treating multiple and mixed groundwater contaminants.

Current methods for driving conventional large-diameter pipe piles (i.e., 10-inches in diameter or greater) into the ground rely on vibratory hammers. In most conventional construction applications, the pipe piles are open on the bottom making it easier to drive the pile to the target depth. In typical construction applications pipe piles do not have well screens embedded in their walls that require protection during installation.

This disclosure describes the devices for driving large-diameter pipe piles with well screens (filter casings) into the subsurface for use in remediating contaminated groundwater. Methods are described for installing an artificial gravel pack in the resulting annular space created between the internal wall of the drive device and the external wall of the filter casing for promoting contaminant flow to the inlet screen area and minimizing the quantity of fine particles that could otherwise impede the flow of contaminants into the inlet screen area or treated water from flowing out the outlet screen area. In addition, the methods described for installation provide protection for the screen areas while the filter casing and its related components are driven into a potentially resistive subsurface environment.

NAPLs typically occur in separate, immiscible phases with varying degrees of solubility. In the subsurface environment NAPLs are generally distinguished by two types based on their density relative to groundwater. Light non-aqueous phase liquids (LNAPLs) are groundwater contaminants such as petroleum-based products that are less dense than water. The LNAPL constituents can occur in four physical states and may partition or move from one phase to another depending on the conditions in the subsurface environment.

Once LNAPLs have migrated from a source area downward under the force of gravity through the unsaturated zone and approach the water table, the LNAPLs may temporarily depress the water table and move laterally in several directions along the upper boundary of the zone of saturation. However, once the source has been removed, and given time, the water table will rebound and the LNAPLs will migrate generally in a downgradient direction on the top of the water table. Soluble components of the LNAPLs will dissolve and form an aqueous-phase groundwater contaminant plume. Other phases of the LNAPL constituents in the subsurface may include a gaseous phase (where volatilization may spread the contaminant upward toward the land surface) or in a solid phase (where the constituents adsorb on a solid surface, such as soil particles or the aquifer matrix).

Dense non-aqueous phase liquids (DNAPLs) are groundwater contaminants that are denser than water (specific gravity [SG] greater than 1.0). Some NAPLs such as No. 6 fuel oil may exist as an LNAPL with an SG less than 1.0, or as a DNAPL with an SG of 1.05. Other common DNAPLs include a variety of chlorinated solvents used for degreasing such as trichloroethylene (TCE) and tetrachloroethene (PCE), coal tar associated with manufactured gas plants, carbon tetrachloride ($CCl_4$) used as a grain fumigant, transformer and insulating oils containing polychlorinated biphenyls (PCBs), and timber-treating oils such as creosote. Unlike LNAPLs, the DNAPLs can migrate to considerable depths below the ground surface and reside upon low permeability clay lenses within the aquifer or on the base of aquifer where the DNAPLs can then slowly dissolve and form aqueous phase plumes in groundwater.

NAPLs create unique challenges for site characterization and groundwater remediation. Should a conceptual site model (CSM) indicate that NAPLs are known or suspected in an aquifer, then investigative approaches based on the CSM can be used to avoid vertical cross contamination while promoting the effective capture of NAPLs. It is important to consider the NAPL properties, physical states, distribution, degradation, interactions with aquifer media, and expected behavior in the subsurface environment as part of the CSM.

The present disclosure relates to the capture of NAPLs in the groundwater using removable skimmer cartridges containing super absorbent polymers or equivalent and emplaced in filter casings. The specifications of the filter casing can be based on the CSM. The filter casings can serve two other remedial purposes, as appropriate: 1) collection of the gaseous phase of NAPLs, and 2) housing separate removable cartridges for the treatment of the dissolved phases of NAPLs.

Current methods for remediating contaminated sediments in surface water bodies generally include in-situ approaches (e.g., capping, institutional controls, monitored natural recovery, and treatment) and ex-situ approaches (e.g., dredging [conducted under water] and excavation [typically conducted after water has been diverted or drained from the water body]). This disclosure describes a technology for treating contaminated water in sediment once it has been dredged, excavated, or otherwise removed from water bodies and placed in an above ground containment system for drainage and evaporation.

The above ground containment system stores sediment that has been removed from water bodies for the dewatering and treatment process, and in some situations, potentially serves as a long-term sediment storage option.

Many shallow aquifers are directly connected to, and in continuing interaction with, surface water, which is why groundwater and surface water are viewed as a single resource by the U.S. Geological Survey. Contaminated surface water can negatively impact the groundwater quality in an aquifer for long periods of time. Similarly, contaminated aquifers that discharge into surface water can impair the quality of the surface water. Human activities that have impacted water resources are usually described by either discrete and localized point sources, or by diffuse nonpoint sources that occur over broader geographic areas.

Examples of point sources include, but are not limited to: 1) leaking storage tanks or pipelines, accidental spills at manufacturing facilities or on roadways, landfills, graveyards, septic fields; 2) runoff from waste disposal sites, mines, oil fields, industrial sites, military bases, construction sites, and animal feedlots; 3) industrial wastewater effluents, for example, steel plants, pulp and paper mills, food-processing plants; and 4) overflow from combined storm and sanitary sewer systems. Examples of nonpoint sources that can impact water resources over a broad geographic area include agricultural runoff, stormwater and urban runoff, runoff from large construction sites, and atmospheric deposition of contaminants.

The present disclosure offers apparatus and methods for containing and treating contaminated groundwater, surface water, or combined groundwater and surface water primarily originating from discrete point sources of limited geographic extent using a trench-based remedial system. The invention could also be used for spill prevention, control, and countermeasure (SPCC) efforts near facilities that store or transmit hazardous materials; for example, downhill of above ground storage tanks that are located near sensitive environmental areas.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a liquid treatment system includes: a filter casing (filter casing) including a structural wall, a first screen formed though the structural wall, and a second screen formed though the structural wall; and a liquid treatment cartridge configured for placement in the structural wall of the filter casing between the first screen and the second screen, the liquid treatment cartridge including a cartridge casing having an upper end and a lower end, and an inflatable seal surrounding the cartridge casing at an intermediary position along the cartridge casing between the upper end and lower end.

In at least one example, when the liquid treatment cartridge is placed in the filter casing, an annular space is defined between an exterior of the cartridge casing and an interior of the structural wall of the filter casing.

In at least one example, the inflatable seal has an inflated condition in which an annular space is filled by the inflatable seal such that the liquid treatment cartridge is engaged with the interior of the structural wall of the filter casing.

In at least one example, the inflatable seal has a deflated condition in which the liquid treatment cartridge is disengaged from the interior of the structural wall of the filter casing permitting the liquid treatment cartridge to be placed within and removed from the structural wall of the filter casing.

In at least one example, engagement elements are connected to an exterior of the structural wall.

In at least one example, the engagement elements include a first connector having a channel and a second connector having a ridge with a widened end.

In at least one example, at least a first wall section is engaged with the first connector and a second wall section is engaged with the second connector such that the filter casing, first wall section, and second wall section define a barrier wall.

In at least one example, the engagement elements comprise fins jutting radially outward from the structural wall.

In at least one example, the filter casing is installed in a ground area with the first screen and second screen positioned below a ground level of the ground area.

In at least one example: the ground area has a water table upgradient direction and a water table downgradient direction; the first screen faces the upgradient direction; and the second screen faces the downgradient direction.

In at least one embodiment, a liquid treatment cartridge includes: a cartridge casing having an upper end and a lower end; a perforated cap having an outer periphery connected to the upper end of the cartridge casing; and a perforated bottom plate having an outer periphery connected to the lower end of the filter casing; wherein the cartridge casing has an interior between the perforated cap and perforated bottom plate for containing at least one permeable reactive material.

In at least one example, the cartridge casing is shaped as a circular cylinder.

In at least one example, a loop is connected to the perforated cap for lifting the cartridge casing.

In at least one example, an inflatable seal surrounds the cartridge casing at an intermediary position along the cartridge casing between the upper end and lower end.

In at least one example, a fill tube extends from the inflatable seal for inflating and deflating the inflatable seal using a gas or liquid.

In at least one embodiment, a method of servicing a groundwater treatment installation includes: vertically displacing a liquid treatment cartridge within a filter casing, the filter casing including a structural wall, a first screen formed though the structural wall, and a second screen formed through the structural wall, the liquid treatment cartridge including a cartridge casing having an upper end and a lower end, and an inflatable seal surrounding the cartridge casing at an intermediary position along the cartridge casing between the upper end and lower end.

In at least one example, vertically displacing the liquid treatment cartridge within the filter casing comprises vertically displacing the liquid treatment cartridge within the filter casing when the inflatable seal is in a deflated condition in which the liquid treatment cartridge is disengaged from an interior of the structural wall of the filter casing.

In at least one example, vertically displacing the liquid treatment cartridge within the filter casing comprises lifting the liquid treatment cartridge from the filter casing after a period of time in which groundwater flowed through the liquid treatment cartridge.

In at least one example, vertically displacing the liquid treatment cartridge within the filter casing comprises lowering the liquid treatment cartridge into the filter casing.

In at least one example, the method further includes inflating the inflatable seal into an inflated condition in which the liquid treatment cartridge is engaged with the interior of the structural wall of the filter casing.

In at least one embodiment, a pipe pile including a structural wall where engagement elements are connected to an exterior of the structural wall, including a first connector having a channel and a second connector having a ridge with a widened end, where the pipe pile, and forms a riser casing.

In at least one embodiment, a pipe pile including a structural wall where engagement elements are connected to an exterior of the structural wall, including a first connector having a channel and a second connector having a ridge with a widened end, with well screen inserts in the structural wall and on opposite sides and at different elevations of the structural wall, and forms a filter casing.

In at least one example, screen inserts in the filter casing are created by wedge-shaped wire supported by vertical rods and used to create thin open areas or slots that can be varied to match the grain size of particles within the geologic formation in which the filter casing is installed to prevent a significant quantity of particles from entering the filter casing through the screen inserts.

In at least one example, engagement elements are connected in the top of the structural walls of the riser casing and the filter casing, the first connector having a narrow width and end forming a tab in the structural walls.

In at least one example, engagement elements are connected to the bottom of the structural walls of the riser casing and the filter casing, the second connector having a narrow width and wide opening forming a recess in the structural walls.

In at least one embodiment, a cone with a point at the bottom and flat surface at the top, where the outside diameter of the top of the cone is greater than the outside diameter of the riser casing or the filter casing and forms a drive shoe.

In at least one example, engagement elements connected to the top of the drive shoe having a narrow width and end forming a tab.

In at least one embodiment, a large-diameter pipe pile has an inside diameter that accommodates the outside diameter of the filter casing or the riser casing, including the external engagement elements on both sides of the filter casing or the riser casing, forming a drive sleeve or mandrel.

In at least one example, the outside diameter of the drive sleeve does not exceed the outside diameter of the top of the drive shoe, enabling the drive sleeve to seat on the top of the drive shoe and not interfere with driving the drive shoe into the subsurface.

In at least one example, where the top of the drive shoe is connected to the bottom of the filter casing by the tab and recess engagement elements on the inside of the structural wall, and the top of the filter casing is connected to the bottom of a riser casing by the tab and recess engagement elements on the inside of the structural wall, resulting in an alignment of the external engagement elements on the structural walls of the filter casing and riser casing, such that the channel of the filter casing aligns with the channel of the riser casing and that the ridge with a widened end of the filter casing aligns with the ridge with a widened end of the riser casing.

In at least one embodiment, a method of installing the interconnected assembly formed by the connection and securement of the drive shoe, the filter casing, and the riser casing, with alignment of the external engagement elements on the structural wall of the filter casing and riser casing, below the ground surface.

In at least one example of installation, the interconnected assembly of the drive shoe, the filter casing, and the riser casing is stood upright and held perpendicular to the ground surface such that the point of the drive shoe is resting on but not penetrating the ground surface.

In at least one example of installation, the interconnected assembly of the drive shoe, the filter casing, and the riser casing encased by the drive sleeve, is driven downward below the ground surface by force applied to the top of the drive sleeve.

In at least one example of installation, the annular space formed between the outer structural walls of the filter casing and the riser casing and the inner structural walls of the drive sleeve, is partially backfilled with gravel or a suitable porous media, from the top of the drive shoe, to a predetermined depth below the ground surface that is above the top of the screen inserts in the upper elevation of the filter casing, forming a gravel pack in the annular space surrounding the screen inserts.

In at least one example, the drive sleeve is partially extracted from the installation, and additional gravel packing is added to annular space, as needed.

In at least one example, the drive sleeve is partially extracted from the installation, and an expansive seal is added to the top of the gravel packing.

In at least one example, the drive sleeve is partially extracted from the installation, and a grout seal is added from the top of the expansive seal to the ground surface as the drive sleeve is fully removed from the installation.

In at least one example, a concrete pad and above-ground structure is added to protect the installation.

In at least one embodiment, a liquid capture cartridge includes: a casing including a structural wall having an upper end and a lower end, an inflatable seal surrounding the cartridge casing at an intermediary position along the cartridge casing between the upper end and lower end.

In at least one example, vertical slots in the circumference of the structural wall in the lower section of the casing are below the inflatable seal, defined for the capture of DNAPLs.

In at least one example, vertical slots in the circumference of the structural wall in the upper section of the casing are above the inflatable seal, defined for the capture of LNAPLs.

In at least one embodiment, a flexible fabric defines a permeable container inside the capture casing to hold super absorbent polymers or equivalent including a void near the top of the permeable container to allow for upward expansion of the polymers within the container and upon contact with NAPLs, flowing into the vertical slots of the capture casing.

In at least one embodiment, a flexible fabric defines a permeable container inside a treatment casing to hold permeable reactive materials for the treatment of the dissolved phases of NAPLs.

In at least one example, the dissolved phase NAPL treatment casing is installed in a filter casing below the water table, and the inflatable seal has an inflated condition in which the annular space between the treatment casing and the filter casing is engaged with the interior of the structural wall of the filter casing.

In at least one example, the LNAPL capture casing is installed in a filter casing such that the vertical slots of the capture casing transect the water table, rest directly on top of the dissolved phase NAPL treatment casing, and the inflatable seal has an inflated condition in which the annular space between the LNAPL capture casing and the filter casing is engaged with the interior of the structural wall of the filter casing.

In at least one example, the DNAPL capture casing is installed in the bottom of a filter casing, and the inflatable seal has an inflated condition in which the annular space between the DNAPL capture casing and the filter casing is engaged with the interior of the structural wall of the filter casing.

In at least one example, the dissolved phase NAPL treatment casing is installed in a filter casing directly on top of the DNAPL capture casing, and the inflatable seal has an inflated condition in which the annular space between the treatment casing and the filter casing is engaged with the interior of the structural wall of the filter casing.

The treatment technology for water contained in contaminated sediment is passive in that no external energy source is required to operate the system. Dewatering the sediment is accomplished by gravitational drainage. Treatment of the contaminated water draining from the sediment is accomplished by exposure to permeable reactive material or absorbent polymers contained within replaceable liquid treatment cartridges. Water flow through the cartridges is also accomplished by gravitational forces.

Commercially applicable treatment technologies are available as solid permeable reactive material and generally include in situ chemical oxidation; in situ chemical reduction; organic compound adsorption by granular activated carbon; aerobic and anaerobic bioremediation; and heavy metal stabilization via chemical reduction, precipitation, and adsorption. Super absorbent polymers are also commercially available that can be used in treatment cartridges should NAPLs be present in the sediment. The appropriate reactive or polymeric material is selected for the contaminants of concern for the particular water body undergoing remediation and used inside the liquid treatment cartridges.

In at least one embodiment, the invention is at least a partially above-ground containment area adjacent to or near the impacted water body with an inclined and compacted base surrounded by an above ground structural wall with sealed engagement elements to prevent drainage water from seeping out of the containment area. The base is sloped toward a relatively narrow area constituting a treatment gate.

In one example the inclined base of the containment area is covered with an impermeable liner such that contaminated water draining from the sediment does not migrate vertically into underlying soils, but instead is directed toward the treatment gate. In at least one example, the lined area is covered with gravel to promote the drainage toward the treatment area from the inclined compacted base.

The treatment gate consists of a liquid treatment system that includes a filter casing including a structural wall, a first screen formed though the structural wall, and a second screen formed though the structural wall; and a liquid treatment cartridge configured for placement in the structural wall of the filter casing between the first screen and the second screen, the liquid treatment cartridge including a cartridge casing having an upper end and a lower end, and an inflatable seal surrounding the cartridge casing at an intermediary position along the cartridge casing between the upper end and lower end.

In at least one example, when the liquid treatment cartridge is placed in the filter casing, an annular space is defined between an exterior of the cartridge casing and an interior of the structural wall of the filter casing.

In at least one example, the inflatable seal has an inflated condition in which an annular space is filled by the inflatable seal such that the liquid treatment cartridge is engaged with the interior of the structural wall of the filter casing.

In at least one example, the inflatable seal has a deflated condition in which the liquid treatment cartridge is disengaged from the interior of the structural wall of the filter casing permitting the liquid treatment cartridge to be placed within and removed from the structural wall of the filter casing.

In at least one example, engagement elements are connected to an exterior of the structural wall.

In at least one example, the engagement elements include a first connector having a channel and a second connector having a ridge with a widened end.

In at least one example, at least a first wall section is engaged with the first connector and a second wall section is engaged with the second connector such that the filter casing, first wall section, and second wall section define a barrier wall.

In at least one embodiment, the filter casing is installed in a ground area with the upper elevation screen inserts positioned above the tapered toe of the inclined and compacted containment area.

In at least one example, the lower elevation screen inserts are placed below the ground surface such that the treated seepage water discharges into the subsurface environment. In at least one example, the treated seepage water is discharged on the land surface and may return to the water body.

In at least one embodiment, a cover is placed over the top of the at least partially above-ground containment area. In at least one example, the cover is used to minimize rain water from entering the sediment.

In at least one example, the cover is used to promote additional dewatering of the sediment by solar heating and evaporation. In at least one example, the cover is used to secure the containment area as a long-term sediment storage option.

In at least one example, a containment and liquid treatment system includes a pair of generally opposing walls that extend towards a treatment area. The generally opposing walls being positioned above or below ground and configured for receiving a contaminated material. The treatment area includes a filter casing that defines an enclosure, the enclosure defining a first screen and a second screen. A liquid treatment cartridge is configured for placement in the enclosure of the filter casing between the first screen and the second screen, the liquid treatment cartridge having an upper end and a lower end, the cartridge defining a permeable treatment material therein for treating contaminated water. A related method of treating contaminated material is provided by placing the contaminated material into an interior defined by the generally opposing walls.

A trench-based remediation system can be used to contain and treat either contaminated groundwater or contaminated surface water or used to simultaneously treat both contaminated groundwater and contaminated surface water.

In at least one embodiment, the trench-based remedial system consists of an excavated trench below a ground surface; an integrated liquid treatment system installed in the trench as defined by a permeable treatment gate with impermeable diversion wings that project from both sides of the gate, together forming a barrier wall; and engineered backfill components installed in the unoccupied space between the liquid treatment system and the trench.

In at least one example, a trench is defined as an excavation below a ground surface that is narrower in width than it is in depth; wherein, in a sectional view a trench has a base and two opposing side walls that are either vertical or inclined from vertical (i.e., slope), the inclined angle of the trench walls from vertical depending largely on subsurface conditions, design objectives, and regulations governing local excavations.

In at least one example, the section of the trench excavated for the permeable treatment gate as seen in an overhead view, is approximately perpendicular to the flow of contaminated groundwater and/or the direction of contaminated surface water runoff. Also, from this example overhead view, the sections of the trench excavated for the impermeable diversion wings that project from both sides of the treatment gate are angled upgradient and/or uphill.

In at least one example a trench represents an optimal geometry for installing the remedial system in an excavation below a ground surface. A narrow trench typically involves a lower volume of potentially hazardous material removed from the subsurface compared to larger excavations, less volume of engineered backfill materials required for the completion of the treatment system, and therefore lower costs than larger excavations. However, other geometries can be envisioned, and the invention is therefore not limited to the geometry of a trench or the example installation methods described herein. For example, a trench could be used just for installation of the treatment gate and other methods could be used to install the diversion wings, such as driving sheet piling or the use of slurry walls.

In at least one example, the integrated liquid treatment system installed in the trench is defined by a permeable treatment gate and impermeable diversion wings that project from both sides of the treatment gate together forming a barrier wall.

In at least one embodiment, the treatment gate consists of one or more filter channels that define an enclosure, the enclosure defining at least a first screen and a second screen, wherein the first screen and second screen face in opposing directions, the first screen being defined on the filter casing at a different vertical elevation relative to the second screen and facing an upgradient/uphill direction, the second screen facing a downgradient/downhill direction.

In at least one embodiment, a liquid treatment cartridge is configured for placement in the enclosure of the filter casing between the first screen and the second screen in a space defined vertically between the first screen and the second screen, the liquid treatment cartridge having an upper end and a lower end, the cartridge defining a permeable treatment material therein for treating contaminated groundwater and/or surface water.

In at least one embodiment, a seal surrounds the cartridge at an intermediary position along the cartridge between the upper end and lower end and sealing the liquid treatment cartridge relative to the filter casing between the first screen and the second screen. The first screen, seal, and second screen do not occupy a same vertical displacement when the cartridge is sealed within the enclosure. The seal is selectively engageable between the cartridge and the filter casing to direct fluid vertically through the cartridge for treatment after passing through the first screen, through the cartridge, and through the second screen. The seal is further configured to allow selective removal of the cartridge when the seal is selectively disengaged relative to the casing.

In at least one embodiment, and in operation, the filter casing is positioned proximal to a barrier wall, the barrier wall defining a first wing extending from about a first portion of the filter casing and a second wing extending from about a second portion of the filter casing. A portion of the barrier wall is at least partially below grade of a ground surface, the first and second wings of the barrier wall generally extending at an angle relative to a hydraulic gradient of the aquifer and inclined land surface, dividing the filter casing into the upgradient/uphill direction and the downgradient/downhill direction, wherein the filter casing is oriented such that the first screen faces the upgradient/uphill direction.

In at least one embodiment and in operation, the first screen is positioned below a water level in the upgradient direction of the aquifer or positioned in the unsaturated zone beneath an inclined land surface, wherein, the second screen faces the downgradient/downhill direction and does not extend to the upgradient/uphill direction of the filter casing that is bound by the barrier wall.

In at least one example, site-specific and engineered backfill components are installed in the unoccupied space between the liquid-treatment system and the excavated trench. The site-specific backfill components vary with respect to: 1) elevation within the trench, 2) the side of the trench (i.e., upgradient/uphill side versus downgradient/downhill side), and 3) placement around the permeable treatment gate versus the impermeable diversion wings.

In at least one example, backfill components consist of commonly available construction materials such as, but not limited to, permeable filter fabric, impermeable synthetic membrane, bentonite, cement grout, concrete, and aggregate such as a uniformly graded coarse sand or gravel, or the equivalents of these example construction materials.

In at least one example, when specific combinations of permeable and impermeable backfill components are properly designed and installed in the unoccupied space between the liquid-treatment system and the excavated trench, the components work together to promote, limit, or divert the flow of contaminated fluids from an upgradient/uphill side of the remediation system through the first screen of a filter casing for vertical treatment within the cartridge inside a filter casing, resulting in the subsequent discharge out the second screen of treated groundwater and/or surface water into a saturated or unsaturated zone below a ground surface downgradient/downhill of the treatment gate.

In at least one embodiment, the treatment gate consists of one or more filter casings that define an enclosure, the enclosure defining a secondary third and fourth screen in addition to the primary first and second screen, wherein, the third and fourth screen face in opposing directions, at the same vertical elevation on the enclosure. The third screen faces an upgradient/uphill direction and the fourth screen faces a downgradient/downhill direction. The third and fourth screens are at a higher elevation than the first screen.

In at least one example, a second or more liquid treatment cartridge is configured for placement in the enclosure of a filter casing between the first screen and the third screen in a space defined vertically between the first screen and the third screen, the liquid treatment cartridges having an upper end and a lower end, the cartridges defining a permeable treatment material therein for treating contaminated groundwater and/or surface water.

In at least one example, a seal surrounds the second or more cartridge at an intermediary position along the cartridge between the upper end and lower end and sealing the liquid treatment cartridge relative to a filter casing between the first screen and the third screen. The first screen, the two or more seals, and the third screen do not occupy a same vertical displacement when the two or more cartridges are sealed within the enclosure.

In at least one example, the seals are selectively engageable between the cartridges and a filter casing to direct fluid vertically through the cartridges for treatment after passing through the at least the first screen and potentially through the third screen, through the cartridges, and discharging at least out the second screen. The seals are further configured to allow selective removal of the two or more cartridges when the seals are selectively disengaged relative to a casing.

In at least one example, the filter casing is positioned proximal to a barrier wall, the barrier wall defining a first wing extending from about a first portion of the filter casing and a second wing extending from about a second portion of the filter casing. A portion of the barrier wall is at least partially below grade of a ground surface, the first and second wings of the barrier wall generally extending at an angle relative to a hydraulic gradient of the aquifer and inclined land surface, dividing the filter casing into the upgradient/uphill direction and the downgradient/downhill direction, wherein the filter casing is oriented such that the first and third screens face the upgradient/uphill direction.

In at least one example, the first screen is positioned below a water level in the upgradient direction of the aquifer or positioned in the unsaturated zone beneath an inclined land surface. The third screen is positioned above a water level in the upgradient direction of the aquifer in the unsaturated zone beneath an inclined land surface. The second and fourth screens face the downgradient/downhill direction and do not extend to the upgradient/uphill direction of the filter casing that is bound by the barrier wall.

In at least one example, fluid is directed though at least the first screen, and should the water level on the upgradient/uphill side of the treatment gate rise to the elevation of the third screen, also flow through the third screen and vertically through the second or more treatment cartridge(s), and discharge at least through the second screen, and should the capacity of the cartridges be exceeded for the rate of water flow, also discharge through the fourth screen on the downgradient/downhill side of the treatment gate as untreated overflow.

In at least one embodiment, water-level sensors are incorporated in the filter casing as a means of remedial performance monitoring. In at least one example, water levels rising within the filter casing could represent a condition where the permeable reactive materials inside the liquid treatment cartridge are not performing as designed indicating that untreated water in the filter casing may rise to an overflow screen. In at least one example, water levels declining within the filter casing could represent a condition where the seal of the liquid treatment cartridge is not inflated to the design pressure, and untreated water is bypassing the liquid treatment cartridge.

In at least one embodiment, multiple liquid treatment cartridges containing different treatment media can be vertically stacked within a filter casing. In at least one example, a thick saturated thickness of an aquifer allows for appreciable vertical separation of the inlet and outlet screens of the filter casing thereby accommodating multiple liquid treatment cartridges to be vertically stacked between the inlet and outlet screens.

In at least one embodiment, a service tray is incorporated within the upper section of a filter casing for convenient storage of gages and tools. In at least one example, the design of the service tray enables filler tubes for seals and pipes for monitoring ports to extend above and below the service tray.

In at least one embodiment, a sturdy container is constructed for shipment of liquid treatment cartridges and associated seals, monitoring ports, parts, and gages. In at least one example, the shipping container for liquid treatment cartridges is constructed from lightweight synthetic sheet piling.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 36A is a side elevation view of FIG. 35, showing structural wall segments above and below ground, and showing the inlet screens of the filter casing at a tapered toe slope of the compacted base fill and the outlet screens set below the ground surface, according to at least one embodiment.

FIG. 36B is a side elevation view of FIG. 35, showing structural wall segments above and below ground, and showing the inlet screens of the filter casing at the elevated toe slope of the compacted base fill and the outlet screens set above the ground surface, according to at least one embodiment.

FIG. 38A is a side elevation view of FIG. 37, showing the impermeable liner on the top of the compacted base fill sloped toward the inlet screens of the filter casing at the tapered toe slope, according to at least one embodiment.

FIG. 38B is a side elevation view of FIG. 37, showing the impermeable liner on the top of the compacted base fill sloped toward the inlet screens of the filter casing at the elevated toe slope, according to at least one embodiment.

FIG. 39A is a side elevation view of FIG. 38A, with the addition of gravel on top of the impermeable liner on the top of the compacted base fill sloped toward the inlet screens of the filter casing at the tapered toe slope, according to at least one embodiment.

FIG. 39B is a side elevation view of FIG. 38B, with the addition of gravel on top of the impermeable liner on the top of the compacted base fill sloped toward the inlet screens of the filter casing at the elevated toe slope, according to at least one embodiment.

FIG. 41A is a side elevation view of FIG. 39A, showing contaminated sediment removed from the water body and emplaced in the containment area for dewatering, drainage into the filter casing for treatment, and discharge of treated water into the subsurface, according to at least one embodiment.

FIG. 41B is a side elevation view of FIG. 39B, showing contaminated sediment removed from the water body and emplaced in the containment area for dewatering, drainage into the filter casing for treatment, and discharge of treated water on the ground surface and into the water body, according to at least one embodiment.

FIG. 62A is a side elevational view showing an excavated trench located at the toe of an inclined slope. There is no adjacent surface water body and no groundwater present within the excavated depth of the trench. The adjacent land surface on the right side of the trench is level.

FIG. 62Z is a side elevational view of FIG. 62Y showing the treated surface water discharging from the surface water-treatment system into the unsaturated zone in the subsurface.

FIG. 64 (A-I) are side elevational views of FIG. 44 showing the instrumentation of four high water-level sensors and two low water-level sensors in the filter casing. FIG. 64A represents normal operating conditions when none of the sensors are activated. FIG. 64B shows the activation of the first high water-level sensor. FIG. 64C shows the activation of the second high water-level sensor.

FIG. 64D shows the activation of the third high water-level sensor, which is an issue because untreated groundwater is beginning to discharge through the overflow screens.

FIG. 64E shows the activation of the fourth high water-level sensor in which untreated groundwater is discharge through the entire thickness of the overflow screens. FIG. 64F shows contaminated groundwater bypassing the liquid treatment cartridge. FIG. 64G shows the treatment system at normal operating conditions.

FIG. 64H shows the activation of the first low water-level sensor. FIG. 64I shows the activation of the second low water-level sensor and by-pass of groundwater treatment.

DETAILED DESCRIPTIONS

Figure 1:
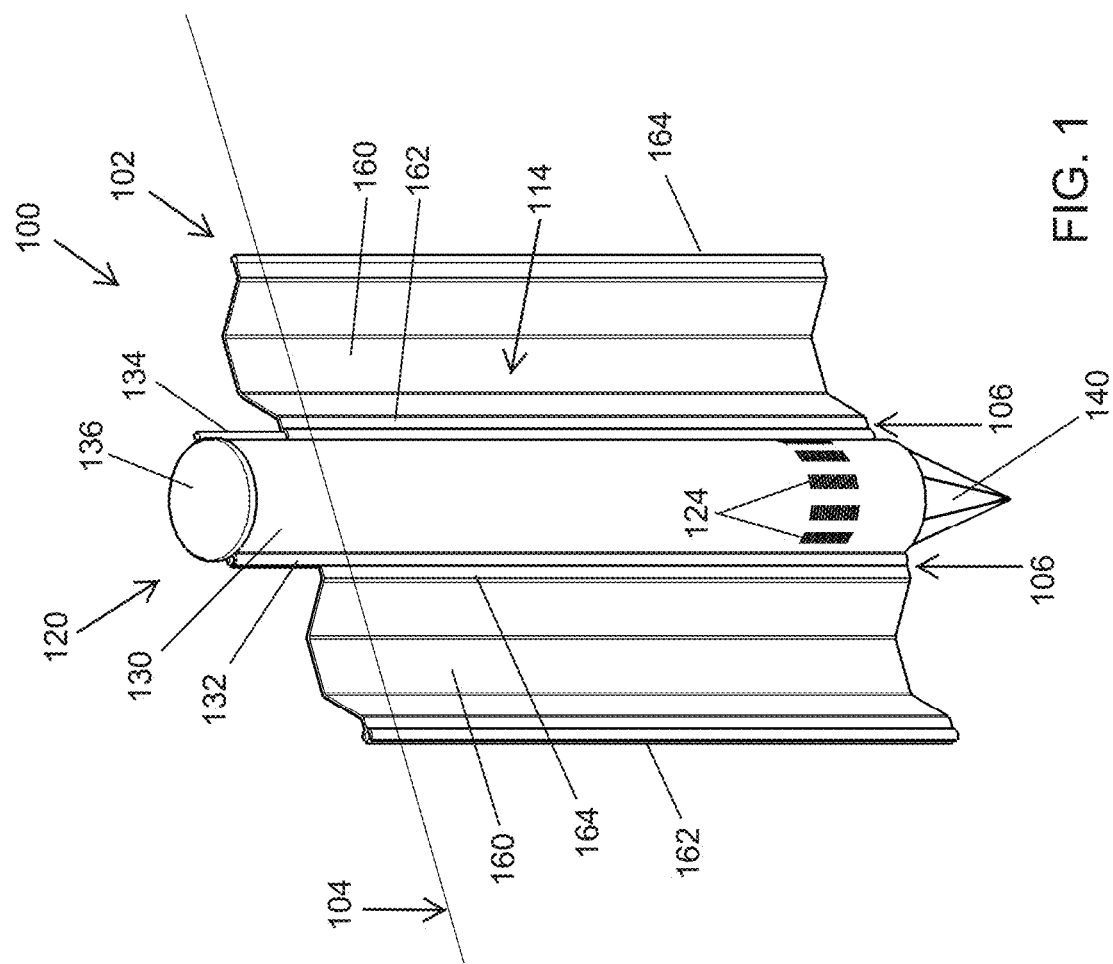
FIG. 1 is a remedial system in which a sectioned barrier wall includes a filter casing installed among multiple interlocking wall sections according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

These descriptions detail subsurface and above ground remedial systems, devices, and methods designed to treat multiple and mixed groundwater contaminants in a variety of hydrogeologic settings. In various embodiments, interlocking and customizable mechanical components are coupled with permeable reactive materials (PRMs) placed in replaceable filter cartridges to create a long-term, cost-effective, and energy efficient remedial system for contaminated water (i.e., groundwater, surface water, water draining from mines or sediment, or combinations of these media). Advantages include a mechanical design that can be installed into the ground in the form of a funnel and gate configuration, the ability to exchange filter cartridges and safely collect gases to extend the system's performance and life expectancy compared to existing methods, and the optimally combined, compacted, and configured PRMs installed within the replaceable filter cartridges.

FIG. 1 is a remedial system 100 according to at least one embodiment. The system 100 includes a sectioned barrier wall 102 that includes multiple interlocking wall sections 160. In installation, the wall sections 160 are placed in a ground area in a partially or entirely subsurface condition with reference to the ground surface 104. A filter casing 120 is shown as interlocked along vertical connections 106 with two wall sections 160. The illustrated arrangement can be repeated or varied such that a barrier wall of any size can be constructed with wall sections 160 and any number of filter casings 120 placed along the barrier wall engaged with adjacent wall sections 160 or other filter casings 120.

The wall sections 160 and vertical connections 106 among them are essentially water impermeable. Groundwater migrates across the wall via the filter casing 120, moving vertically within the interior of the filter casing 120 in either upward or downward flow direction according to its installation and site-specific arrangement. At least one upper screen 122 (FIG. 5) and at least one lower screen 124 (FIG. 1) are formed through the structural wall 130 of the filter casing 120, permitting groundwater to pass between the interior of the filter casing 120 and ground areas neighboring the upper screen 122 and lower screen 124, either of which may serve as inlet to the interior as the other serves as outlet to adjacent aquifer. That is, in one installation the upper screen 122 may serve as an inlet for downward flow along the interior of the filter casing 120 as the lower screen 124 serves as an outlet. In another installation the lower screen 124 may serve as an inlet for upward flow along the interior of the filter casing 120 as the upper screen 122 serves as an outlet.

The illustrated arrangement of FIG. 1 may be particularly advantageous in an installation in which the first side 112 (FIG. 5) of the barrier wall 102 faces the upgradient direction (upstream) with respect to native groundwater migration in the installation ground area, whereas the second side 114 (FIGS. 1 and 5) of the barrier wall 102 faces the downgradient direction (downstream). In such an installation, the upper screen 122 serves as an inlet for downward flow (FIG. 5) along the interior of the filter casing 120 as the lower screen 124 serves as an outlet. Also, the filter casing 120 is placed in a downstream position interlocked with downstream ends of the adjacent wall sections 160 (FIG. 1), such that the wall sections 160 funnel downgradient direction migrating groundwater toward the filter casing 120 when arranged in a configuration such as that shown in FIG. 7.

Figure 2:
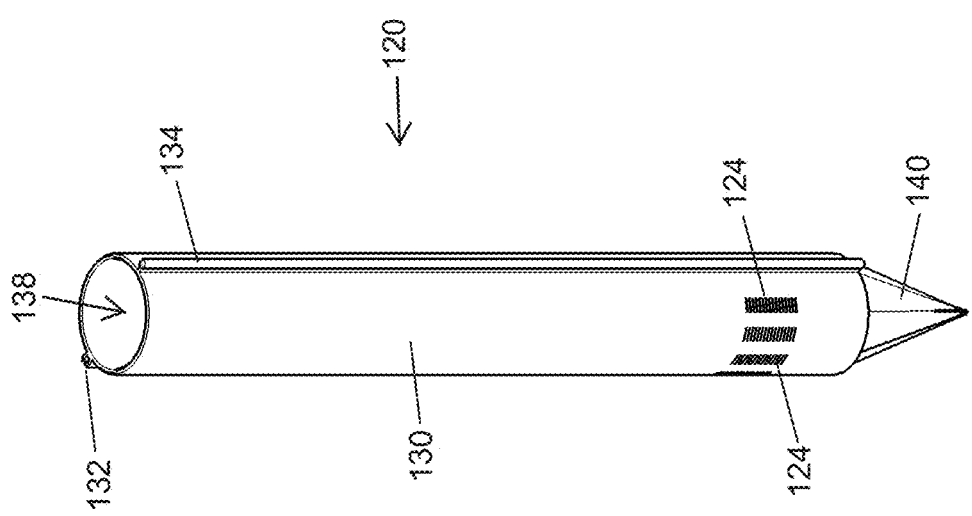
FIG. 2 is a perspective view of the filter casing of FIG. 1 showing its upper-end opening without a cover.

The structural wall 130 of the filter casing 120 in at least one embodiment is shaped as a circular cylinder as shown in FIGS. 1 and 2. Other shapes are within the scope of these descriptions. For example, in one embodiment, a structural wall of a filter casing is shaped as a hexagonal tube, with similarity to the half-hexagon form of the wall sections 160. In another embodiment, a structural wall of a filter casing is shaped as a rectangular shaft. The structural wall 130 generally has a generally uniform interior along its vertical length to permit vertical loading and unloading of a treatment cartridge within the interior and a generally uniform exterior form to facilitate its installation, which may involve vertical driving by force, but could also be installed in an open excavation below the ground surface. The upper and lower screens 122 and 124 may be formed as horizontal slots. In other embodiments they may be wedge shaped and/or have other geometries. "Upper" and "lower" are relative descriptive terms, denoting that the upper screen 122 is placed vertically higher than the lower screen 124 along the length of filter casing 120.

A cover 136 is engaged with the upper end of the structural wall 130 preventing unintended entry of debris and unauthorized access to the interior of the filter casing 120. A bottom assembly 140 is engaged with the lower end of the structural wall 130 and seals the interior of the filter casing 120 from below. In the illustrated embodiment, the bottom assembly 140 is shown as a tapered drive shoe shaped as a faceted cone for driving through earth when the filter casing 120 is to be installed by hammering or vibrating. In some installations however, the filter casing 120 is lowered into an open excavation without hammering or other driving force. At its upper end, the filter casing 120 is FIG. 1 is shown extending vertically beyond the upper edges of the wall sections 160. This arrangement may be advantageous for accessing the cover 136 and interior of the filter casing 120 whereas the upper ends of the wall sections 160 may be at or near ground level with reference to the ground surface 104.

Figure 3:
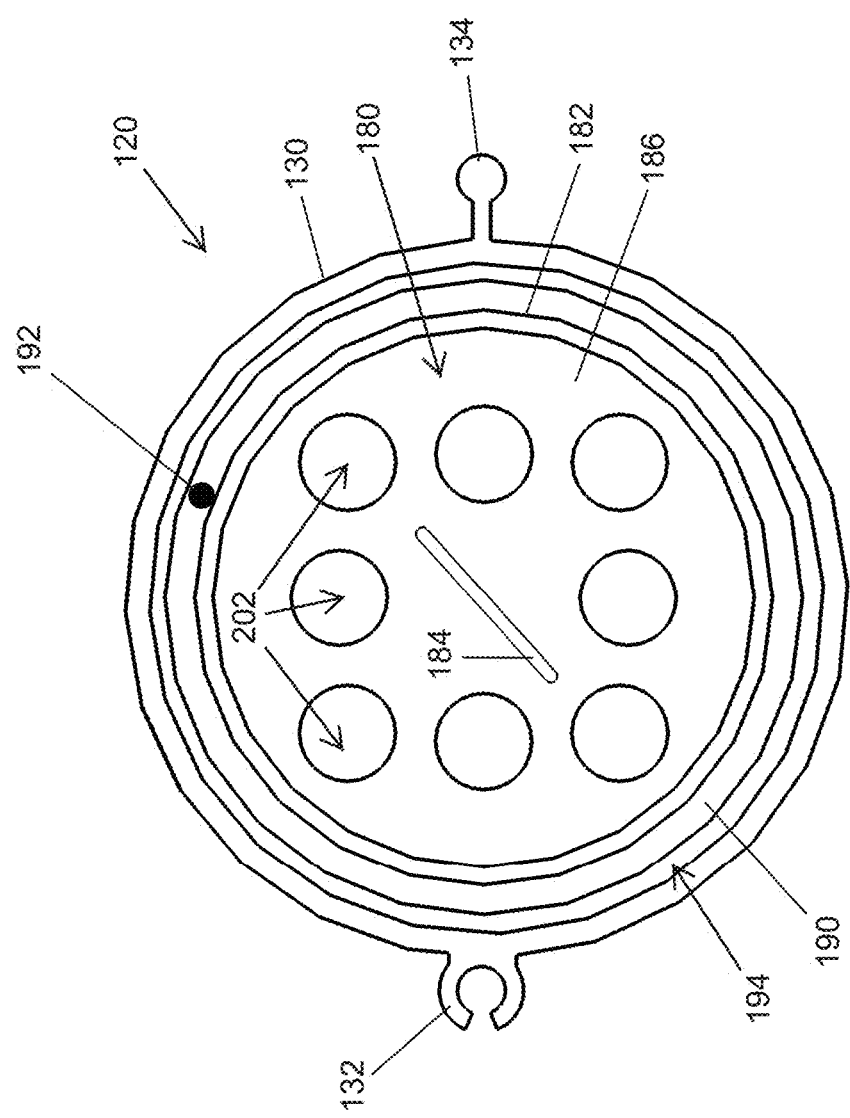
FIG. 3 is a downward view along the vertical length of the filter casing of FIG. 2.

FIG. 2 is a perspective view of the filter casing 120, showing the upper-end opening 138 without the cover 136 (FIG. 1). As shown in FIG. 2, the filter casing 120 has a first connector 132 and a second connector 134 extending parallel to each other along opposite lateral sides of the exterior of the structural wall 130. In the illustrated embodiment, the first connector 132 is shown as a channel and the second connector 134 is shown as a ridge with a widened lateral end (FIG. 3). Opposing lateral edges of the wall sections 160 have corresponding first and second connectors 162 and 164 to form male-female coupling connections 106 (FIG. 1) as the barrier wall 102 is constructed by sliding engagements of adjacent oppositely functioned connectors along the barrier wall 102.

FIG. 3 is a downward view along the vertical length of the filter casing 120 of FIG. 2, showing the interior of the filter casing 120 and the profiles of first and second connectors 132 and 134. In FIG. 3, a replaceable treatment cartridge 180 is shown as installed in the filter casing 120. The treatment cartridge 180 can be lowered into and raised from the interior of the filter casing 120 through the upper-end opening 138 (FIG. 2) when the cover 136 is removed and the treatment cartridge 180 is disengaged from the interior surface of the structural wall 130.

Figure 4:
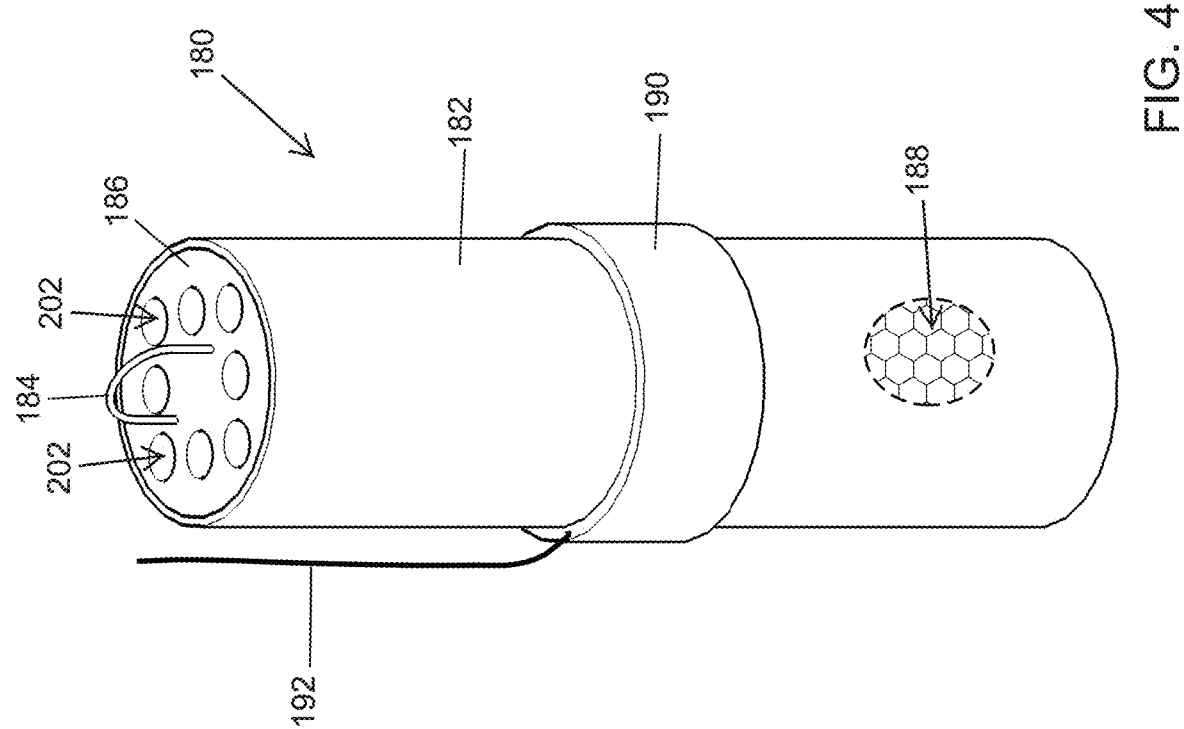
FIG. 4 is a perspective view of a treatment cartridge, according to at least one embodiment, removed from the filter casing of FIG. 3.

FIG. 4 is a perspective view of a treatment cartridge 180, according to at least one embodiment, removed from the filter casing 120 of FIG. 3. The treatment cartridge 180 includes a cartridge casing 182. In at least one embodiment, the cartridge casing 182 is shaped as a circular cylinder as shown in FIGS. 3 and 4. Other shapes are within the scope of these descriptions. For example, in other embodiments, cartridge casings of other treatment cartridges have hexagonal and rectangular outer profiles when viewed along their vertical lengths, for example corresponding to various embodiments of filter casings.

Figure 5:
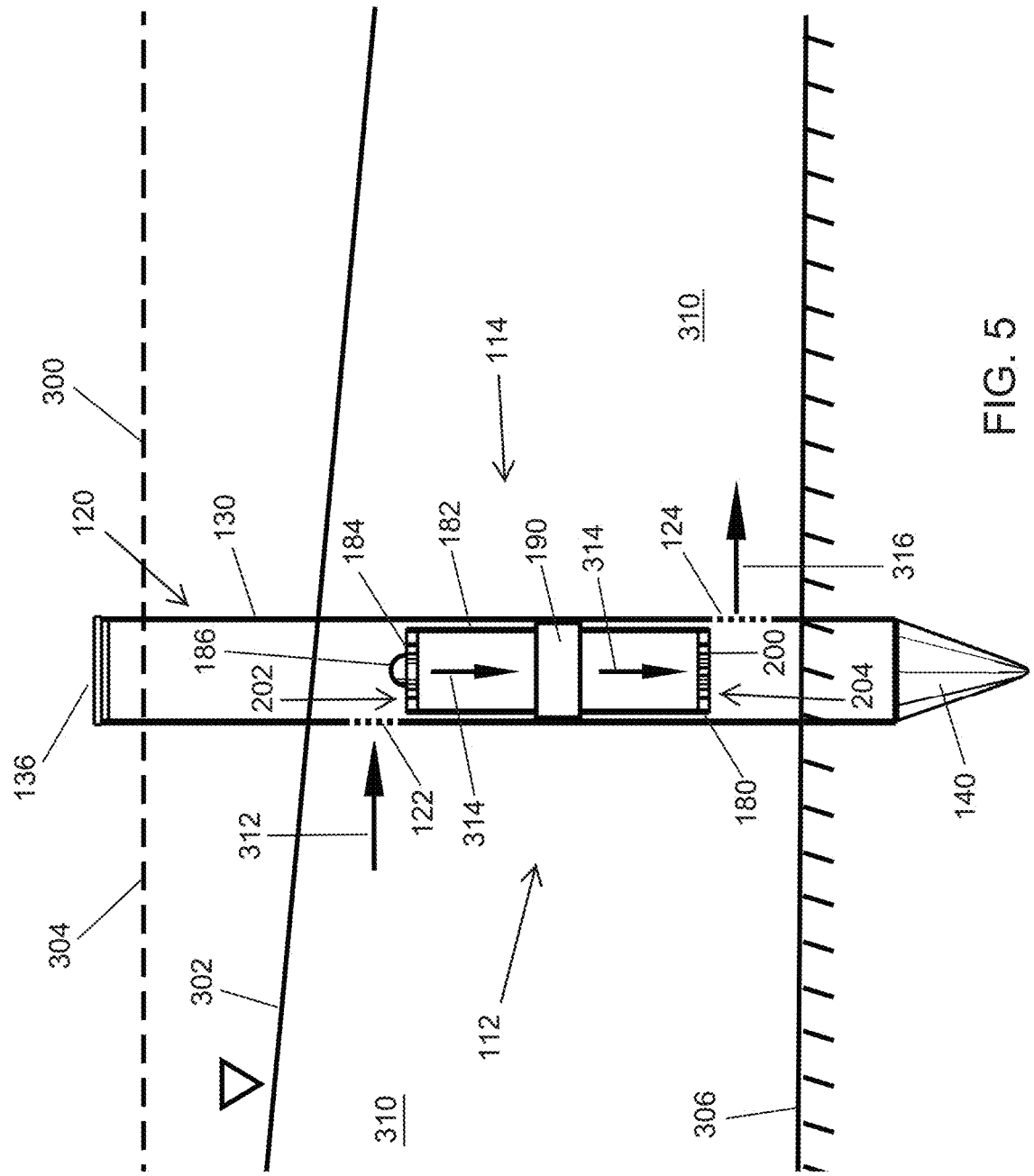
FIG. 5 is a side elevational view showing the filter casing of FIG. 1 in an installation ground area in which a water table line is shown below the ground surface.

As shown in FIGS. 3-4, at the upper end of the treatment cartridge 180, a lifting loop 184 or hook extends upward from a perforated cap 186, which is connected along its outer periphery to the cartridge casing 182. At the lower end of the treatment cartridge 180, a perforated bottom plate 200 (FIG. 5) is connected along its outer periphery to the cartridge casing 182. An inflatable seal 190 (FIG. 4) surrounds the filter casing 120 at an intermediary longitudinal position along the vertical length of the filter casing 120 between the upper and lower ends of the treatment cartridge 180. A fill tube 192 extends from the inflatable seal 190 for inflating and deflating the seal 190. As shown in FIGS. 3-4, upper openings 202 are formed through the perforated cap 186 of the treatment cartridge 180. Similarly, lower openings 204 are formed though the perforated bottom plate 200 (FIG. 5).

The cartridge casing 182 is undersized relative to the interior of the structural wall 130 of the filter casing 120, thus defining an annular space 194 (FIG. 3) between the cartridge casing 182 and structural wall 130 within the interior of the filter casing 120 as shown in FIG. 3, in which the inflatable seal 190 is shown in a deflated condition. In the illustrated embodiments, the outer diameter of the circularly cylindrical cartridge casing 182 is less than the inner diameter of the circularly cylindrical structural wall 130, thus defining an approximately circular annular space 194.

The inflatable seal 190 resides in the annular space 194. When the inflatable seal 190 is in a deflated condition (FIG. 3), the treatment cartridge 180 is disengaged from the interior surface of the structural wall 130 and can be lowered into and raised from the interior of the filter casing 120 through the upper-end opening 138 (FIG. 2). When the inflatable seal 190 is in an inflated condition as shown in (FIG. 5), it closes the annular space 194 (FIG. 3) at its longitudinal position by sealing against both the casing 182 of the treatment cartridge 180 and the interior surface of the structural wall 130. This engages and seals the treatment cartridge 180 with the interior surface of the structural wall 130.

Furthermore, with the inflatable seal 190 in an inflated condition, groundwater flow along the interior of the filter casing 120 is restricted to passing through the treatment cartridge 180. The upper openings 202 in the perforated cap 186 of the treatment cartridge 180 and lower openings 204 in the perforated bottom plate 200 permit groundwater to flow through the treatment cartridge 180. In one installation the upper openings 202 may serve as an inlet for downward flow along the interior of the treatment cartridge 180 as the lower openings 204 serve as an outlet. In another installation the lower openings 204 may serve as an inlet for upward flow along the interior of the treatment cartridge 180 as the upper openings 202 serve as an outlet. In at least one embodiment, the interior of the treatment cartridge 180 contains at least one PRM 188 that is designed to treat the liquid that passes therethrough. For an example, and in no way limiting, multiple bags of different (or the same) PRMs could be compacted within a treatment cartridge 180. The selection of the PRM can be site or contaminant specific.

FIG. 5 is a side elevational view showing the filter casing 120 of FIG. 1 in an installation ground area 300. In each side elevation view referenced in these descriptions, both above ground and below ground portions of a remediation example is shown. In. FIG. 5, a water table line 302 is shown below the ground surface 304. Earth above the water table line 302 is generally considered as unsaturated, whereas earth below the water table line 302 and above a lower-permeability earth layer 306 defines an aquifer 310 in which groundwater migration in the installation ground area 300 is generally directed to the right of the drawing by natural conditions or is caused by human intervention.

It is assumed in FIG. 5 that the barrier wall 102 is installed with the filter casing 120. The second side 114 of the barrier wall 102 (FIG. 1) faces the downgradient direction such that groundwater flow 312 (FIG. 5) from the upgradient direction enters the filter casing 120 through the upper screen 122, which serves as an inlet for downward flow 314 (FIG. 5) along the interior of the filter casing 120. In FIG. 5, the inflatable seal 190 is inflated and the downward flow 314 along the interior of the filter casing 120 is thereby restricted to passing through the treatment cartridge 180 and is thus treated by PRM contained therein. The upper openings 202 permit the downward flow 314 along the interior of the treatment cartridge 180 as the lower openings 204 permit the downward flow 314 to exit the treatment cartridge 180 toward the lower screen 124, which serves as an outlet from the filter casing 120 for treated groundwater flow 316 in the downgradient direction. FIG. 5 shows that the bottom assembly 140 is driven or otherwise installed in the lower-permeability earth layer 306 at the bottom of the aquifer 310.

Figure 6:
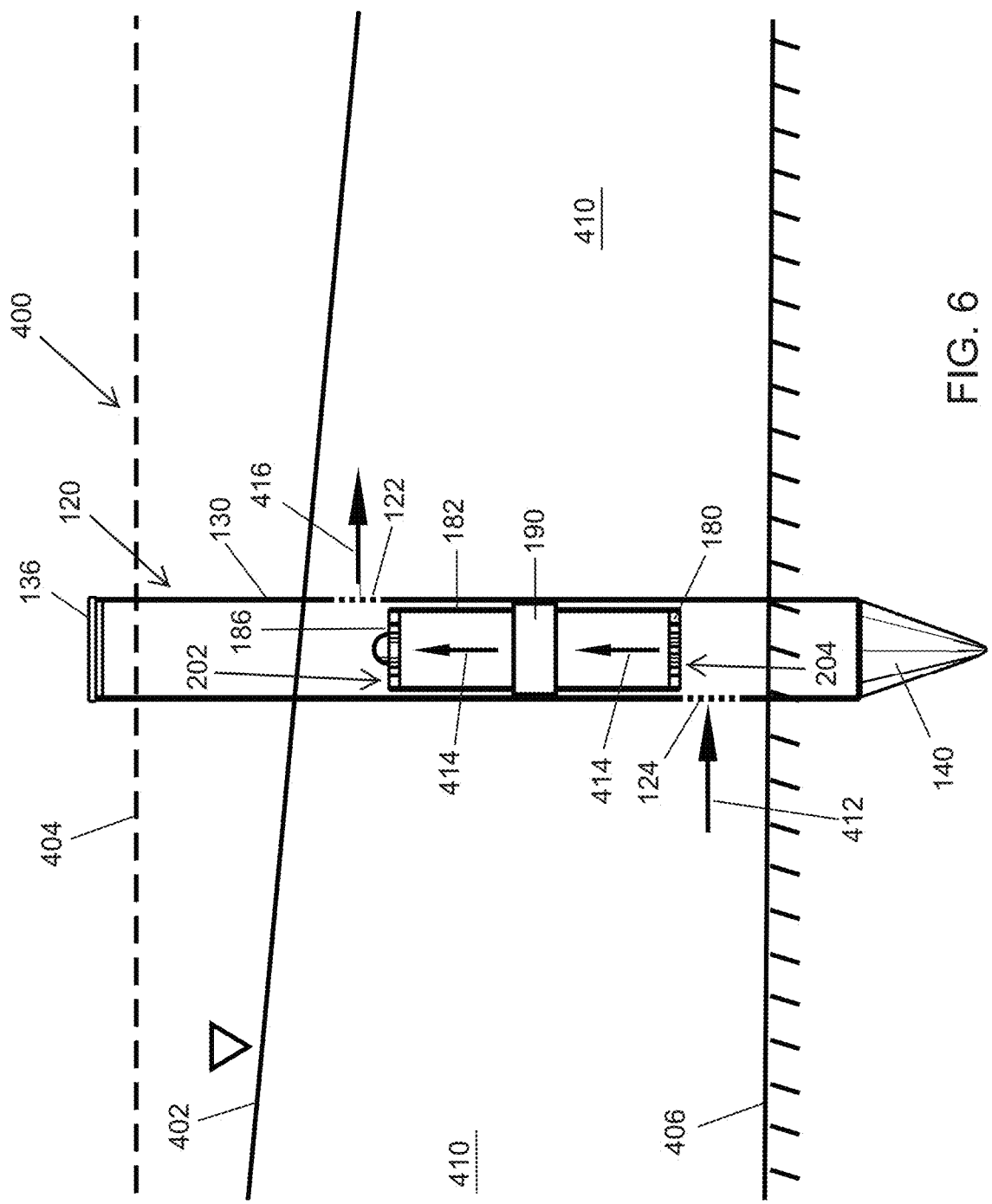
FIG. 6 is a side elevational view showing the filter casing of FIG. 1 in another installation ground area.

FIG. 6 is a side elevational view showing the filter casing 120 of FIG. 1 in an installation ground area 400. As in FIG. 5, a water table line 402 is shown in FIG. 6 below a ground surface 404, an aquifer 410 is defined below the water table line 402 and above a lower-permeability earth layer 406, and groundwater migration in the installation ground area 400 is generally directed to the right of the drawing by natural conditions or is caused by human intervention.

In FIG. 6, however, the lower screen 124 of the filter casing 120 faces the upgradient direction and the upper screen 122 faces the downgradient direction. Thus in FIG. 6, groundwater flow 412 from the upgradient direction enters the filter casing 120 through the lower screen 124, which serves as an inlet for upward flow 414 along the interior of the filter casing 120. The lower openings 204 permit the upward flow 414 along the interior of the treatment cartridge 180 as the upper openings 202 permit the upward flow 414 to exit the treatment cartridge 180 toward the upper screen 122, which serves as an outlet from the filter casing 120 for the treated groundwater flow 416 in the downgradient direction.

The flow in the two examples of FIGS. 5 and 6 are oppositely vertically directed within the filter casing 120, representing different remediation examples. Respective PRMs may be advantageously selected for placement in the treatment cartridge 180 in the respective examples of FIGS. 5 and 6. In either example, flow will progress in the rightward direction because of the higher hydraulic head on the upgradient side of a subsurface barrier wall installed with the filter casing 120.

In FIG. 5, the upper screen 122 serves as the inlet of the filter casing 120 by facing the upgradient direction, with reference to the water table line 302, whereas the lower screen 124 serves as the outlet of the filter casing 120. Thus, relatively shallow untreated groundwater flow 312 that enters the filter casing 120 is sampled relatively high in the aquifer 310, and the treated groundwater flow 316 is released at a greater depth. This may be advantageous for treating a ground area where contaminants tend to reside, drift, or float high in an aquifer, for example as do certain petroleum hydrocarbons and other light non-aqueous phase liquids (LNAPL). In such an example, a PRM particularly reactive to higher residing contaminants may be advantageously placed in the treatment cartridge 180.

In FIG. 6, the lower screen 124 serves as the inlet of the filter casing 120, whereas the upper screen 122 serves as the outlet of the filter casing 120. Thus, relatively deep untreated groundwater flow 412 that enters the filter casing 120 is sampled relatively deep in the aquifer 410, and the treated groundwater flow 416 is released at a lesser depth. This may be advantageous for treating a ground area where contaminants tend to reside, drift or sink low in an aquifer, for example non-aqueous phase liquids (DNAPL) such as trichloroethylene and other dense contaminants may be near the base of the aquifer. In FIG. 6, a PRM particularly reactive to lower residing contaminants may be advantageously placed in the treatment cartridge 180.

Figure 7:
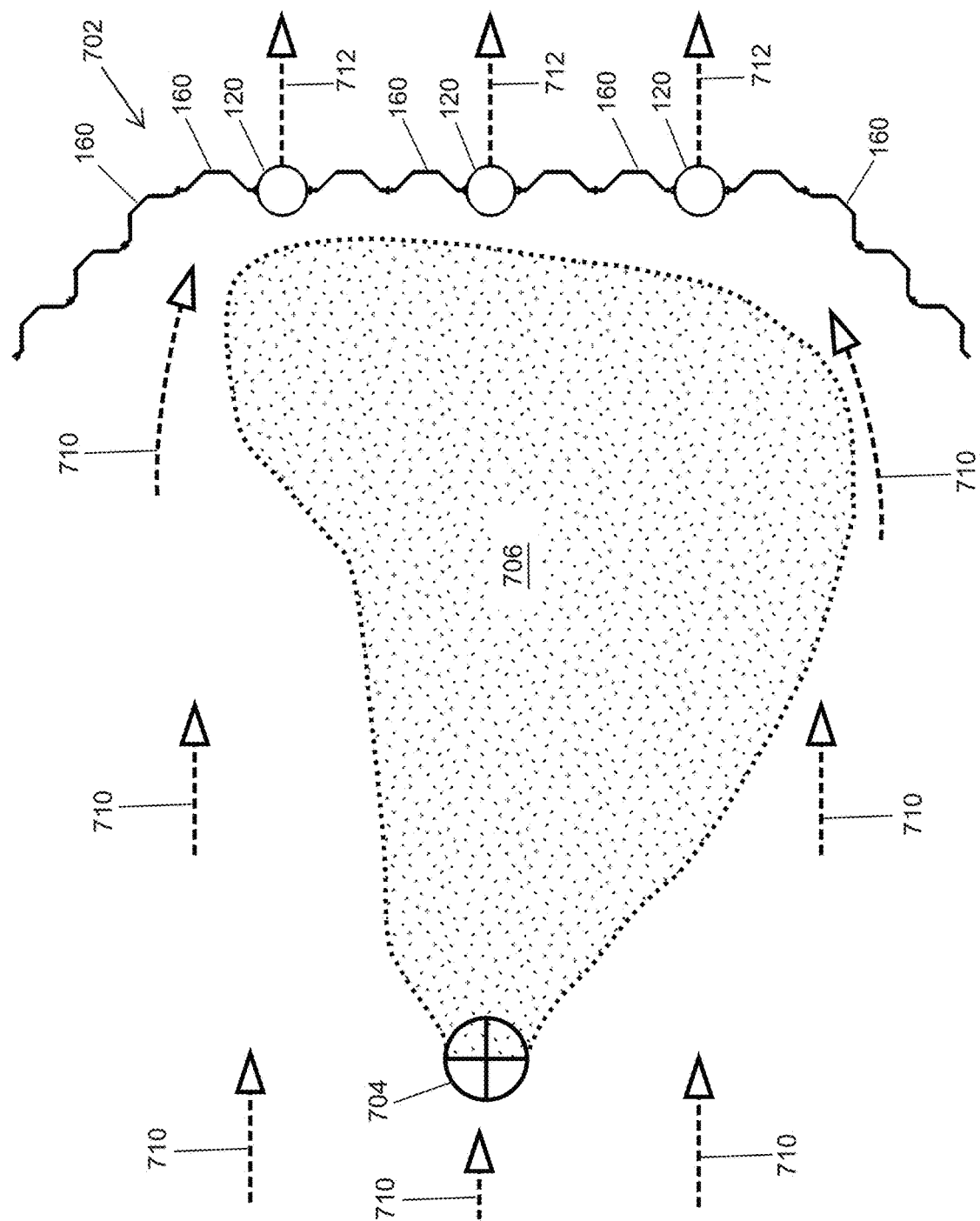
FIG. 7 is an overhead view of an area under remediation treatment according to at least one embodiment.

FIG. 7 is an overhead view of an area under remediation treatment according to at least one embodiment. Either or both examples of FIGS. 5 and 6 may be represented in FIG. 7, and other examples as well. In FIG. 7, a sectioned barrier wall 702 is shown as constructed of multiple interlocking wall sections 160 and several spaced filter casings 120. The barrier wall 702 is constructed to curve toward and partially surround a contamination source or location 704. A contamination plume 706 widens and drifts from the contamination source or location 704 with groundwater flow 710, which is generally directed to the right of the drawing by natural conditions or is caused by human intervention. The barrier wall 102 is formed to collect and funnel the drifting groundwater flow 710 and contamination plume 706 through the filter casings 120 along the wall. Treated groundwater flows 712 are shown as directed away from the barrier wall 702 in continued migration. Three filter casings 120 are expressly shown along the barrier wall 702 in FIG. 7, however, any number of filter casings 120 and wall sections 160 in any relative arrangement can be included in a barrier according to various embodiments. A barrier wall can be constructed with filter casings 120 in a center section and wall sections 160 along the edges. A barrier wall can be constructed with only filter casings 120, such as immediately near a contamination source or location 704.

Figure 8:
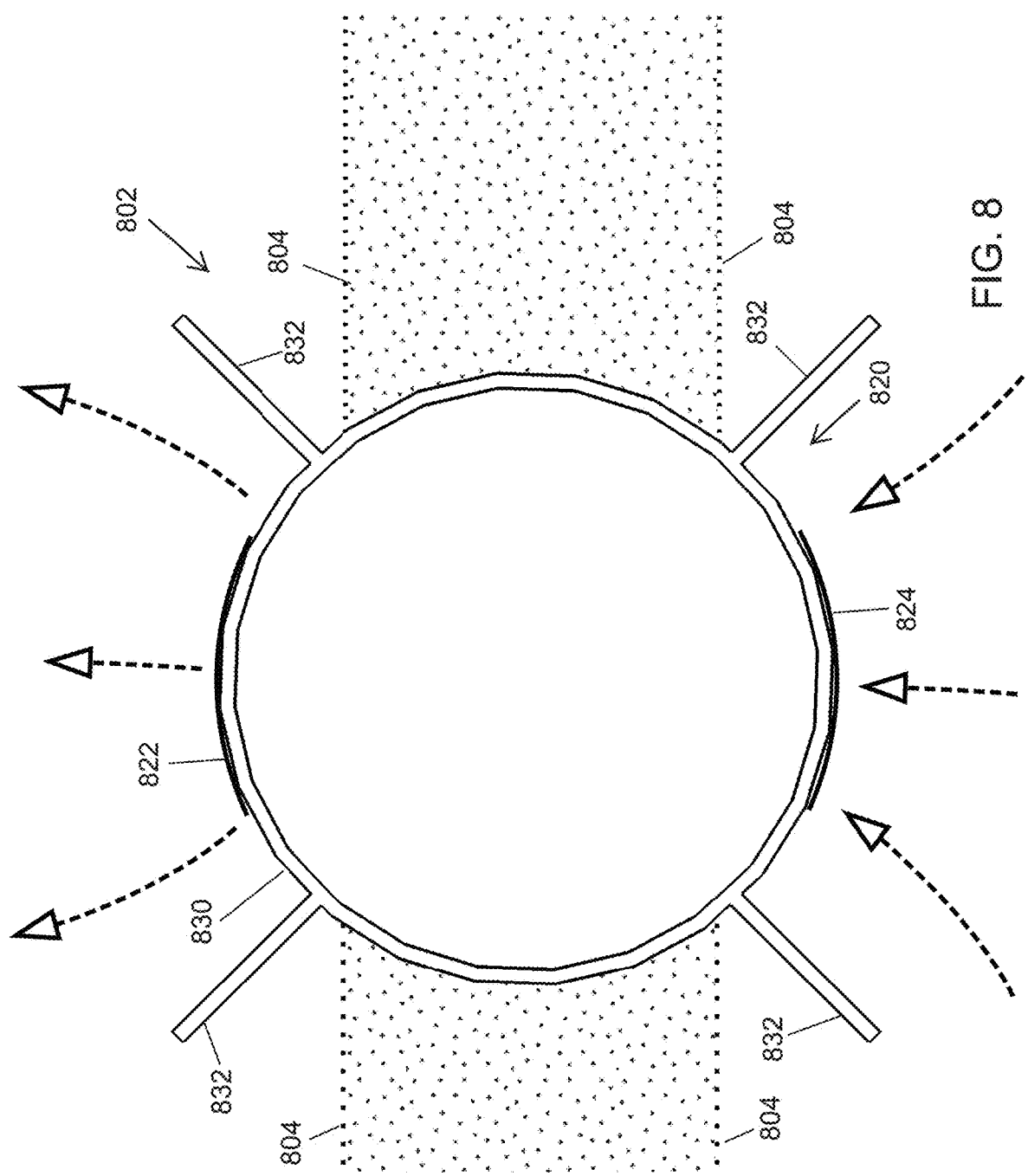
FIG. 8 is an overhead view of a filter casing, according to at least one other embodiment, installed in a wall of another example.

FIG. 8 is an overhead view of a filter casing 820, according to at least one other embodiment, installed with an adjacent barrier wall of another example. The filter casing 820 has many features similar to those of the filter casing 120 of FIGS. 1-7. For example, like the filter casing 120, the filter casing 820 has structural wall 830 through which screens 822 and 824 are formed permitting groundwater to pass between the interior and exterior of the filter casing 820 and neighboring ground areas. Either of the screens 822 can represent a lower screen and the other an upper screen. A treatment cartridge 180 as shown in FIG. 4 can be installed in the filter casing 820 of FIG. 8 when in use for treating contaminated groundwater.

Above descriptions relating to FIGS. 1-7 relate as well to FIG. 8 except where differences are described here. For example, fins 832 jut radially outward from the cylindrical structural wall 830, extending along the sides of the exterior of the structural wall 830. The filter casing 820 may be used, for example, as shown in an installation alternative to the barrier wall 102 of FIG. 1. In FIG. 8, the filter casing 820 is installed and subsequently connected to a barrier wall 802 constructed using a cementitious material, such as a slurry cement and clay, emplaced into a trench having boundary lines 804. For example, to construct the barrier wall 802, the filter casing 820 may be driven into the ground and a trench then dug to the filter casing. The fins 832 allow some tolerance for the trench to be dug using a large trenching machine. Other installation methods for constructing the barrier wall 802 can be used as well.

The fins 832 of FIG. 8 and the connectors 132 and 134 of FIG. 3 represent examples of engagement elements by which various embodiments of filter casings engage surrounding earth, constructions materials, or structural elements such as the wall sections 160 in barrier wall installations. Other examples are within the scope of these descriptions.

Figure 9:
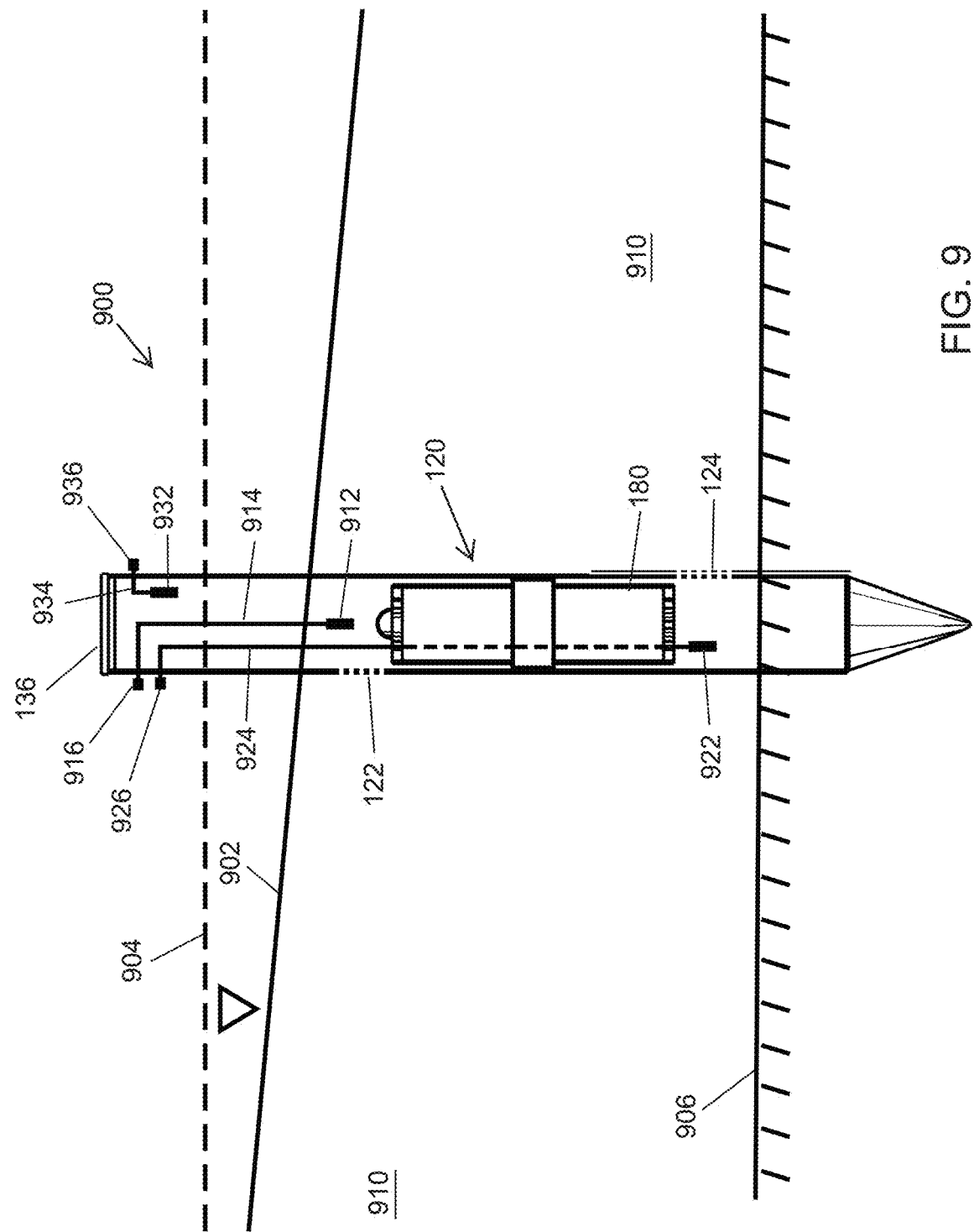
FIG. 9 is a side elevational view showing the filter casing of FIG. 1 in an installation ground area similar to that of FIG. 5 and with several installed sampling accesses according to at least one embodiment.

FIG. 9 is a side elevational view showing the filter casing 120 of FIG. 1 in an installation ground area 900 similar to that of FIG. 5. A water table line 902 is shown in FIG. 6 below a ground surface 904, an aquifer 910 is defined below the water table line 902 and above a lower-permeability earth layer 906, and groundwater migration in the installation ground area 900 is generally directed to the right of the drawing by natural conditions or is caused by human intervention. As in FIG. 5, untreated groundwater flows from the upgradient direction and enters the filter casing 120 through the upper screen 122, which serves as an inlet for downward flow along the interior of the filter casing 120. Within the filter casing 120, the groundwater passes through the treatment cartridge 180 toward the lower screen 124, which serves as an outlet from the filter casing 120 for the treated groundwater flow in the downgradient direction.

The filter casing 120 in FIG. 9 includes several sampling accesses. Above the treatment cartridge 180, a first sampling access 912 connected to a vertically extending first pipe or tube 914 can be accessed through a first port 916 near or above ground level to permit sampling and analysis of untreated groundwater. Below the treatment cartridge 180, a second sampling access 922 connected to a vertically extending second pipe or tube 924 can be accessed through a second port 926 near or above ground level to permit sampling and analysis of treated groundwater. A third sampling access 932 connected to a third pipe or tube 934 can be accessed through a third port 936 near or above ground level to permit sampling and analysis of gas that may accumulate or be present in the filter casing 120, for example above the water level within the filter casing 120 and below the cover 136.

Figure 10A:
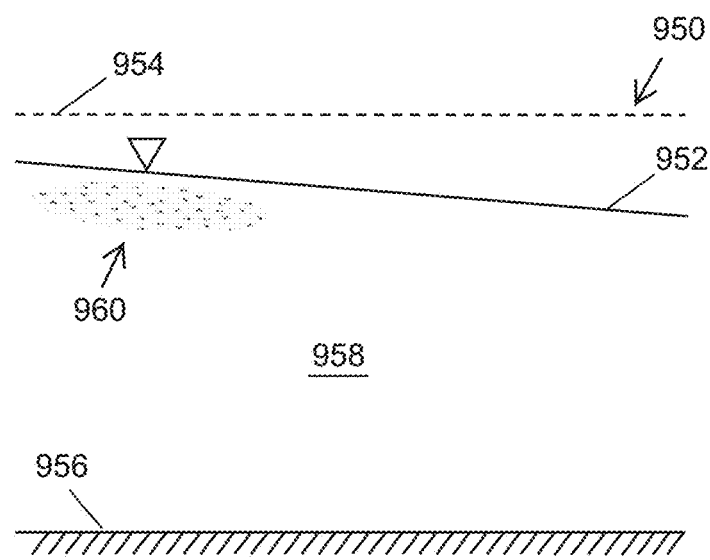
FIG. 10A is a side elevational view of a ground area in which contaminated groundwater is present such that remediation according to at least one embodiment is desired.

FIGS. 10A-10F pictorially represent a time-ordered sequence of events in which systems and methods for remediation of a site with contaminated groundwater are applied according to various embodiments described herein. In each, a ground area 950 has a water table line 952 below a ground surface 954. An aquifer 958 is defined below the water table line 952 and above a lower-permeability earth layer 956. Groundwater migration in the ground area 950 is generally directed in the downgradient direction to right in these drawings. In FIG. 10A, an untreated contamination a source or location is represented as a plume 960 below the water table line 952 in a relatively upstream location of the drawing with respect to the downgradient direction.

Figure 10B:
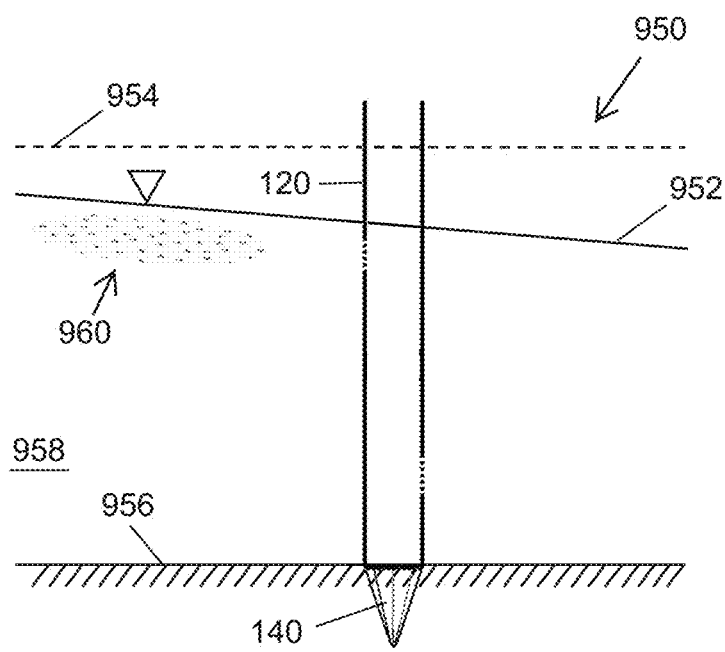
FIG. 10B is a side elevational view of the ground area of FIG. 10A, in which the filter casing of FIG. 1 is installed.
Figure 10C:
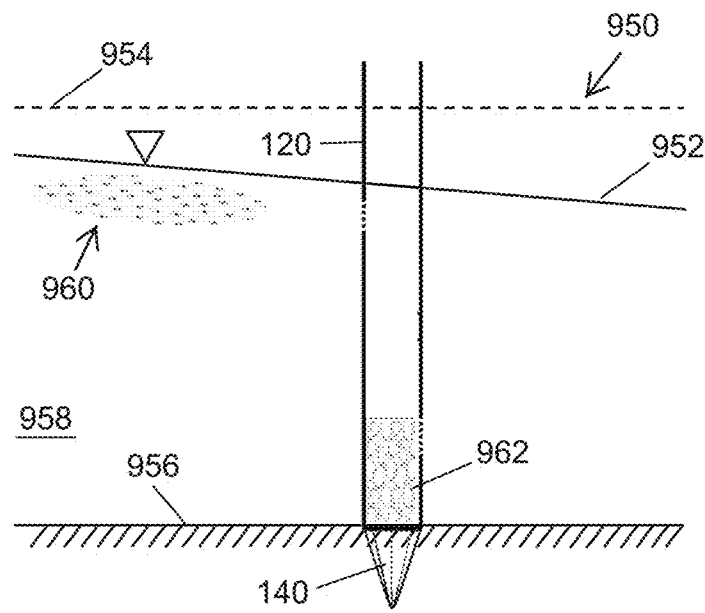
FIG. 10C is a side elevational view of the ground area and filter casing of FIG. 10B, in which a permeable spacer is installed in the bottom portion of the filter casing.

FIG. 10B is a side elevational view of the ground area 950 of FIG. 10A, in which the filter casing 120 of FIG. 1 is installed. It may be assumed in FIG. 10B that the barrier wall 102 of FIG. 1 or similar barrier according to various embodiments is installed with the filter casing 120. FIG. 10C is a side elevational view of the ground area 950 and filter casing 120 of FIG. 10B, in which a permeable spacer 962 is installed in the bottom portion of the filter casing 120 above the bottom assembly 140.

Figure 10D:
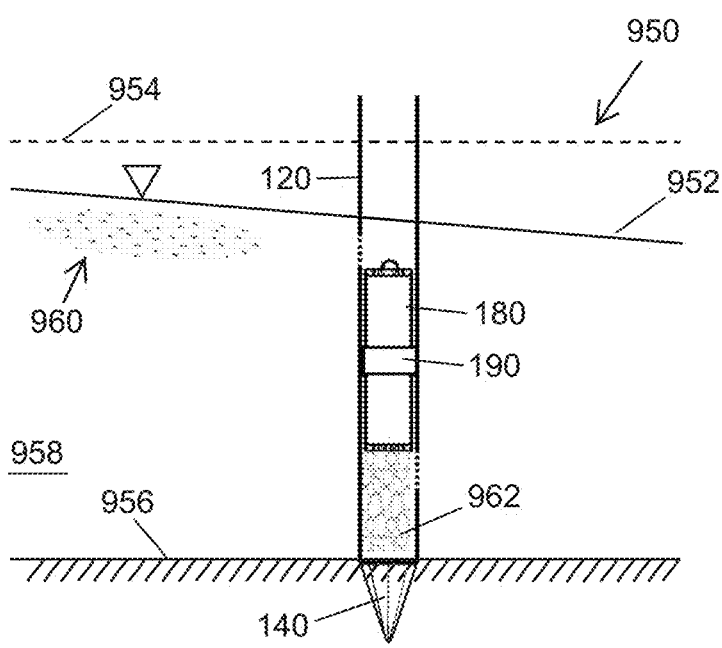
FIG. 10D is a side elevational view of the ground area and filter casing of FIG. 10B, in which a treatment cartridge is installed above the permeable spacer.

FIG. 10D is a side elevational view of the ground area 950 and filter casing 120 of FIG. 10B, in which a treatment cartridge 180 (FIG. 4) is installed above the permeable spacer 962. In placing the treatment cartridge 180, the inflatable seal 190 is in a deflated condition as the treatment cartridge 180 is lowered into the interior of the filter casing 120 onto the permeable spacer 952, which supports the treatment cartridge until the inflatable seal 190 is inflated to engage with the interior of the filter casing 120.

Figure 10E:
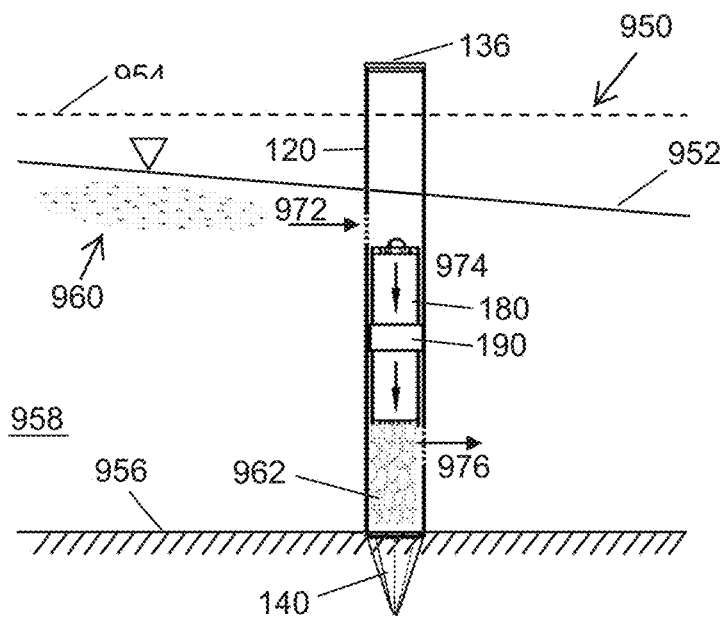
FIG. 10E is a side elevational view of the ground area and filter casing of FIG. 10D, in which the cover is installed upon the upper end of the filter casing, and remediation is underway as untreated groundwater flows into the filter casing and treated groundwater flows out.

FIG. 10E is a side elevational view of the ground area 950 and filter casing 120 of FIG. 10D, in which the cover 136 is installed upon the upper end of the filter casing 120, and remediation is underway. Untreated groundwater 972 enters the filter casing 120 through the upper screen 122, which serves as an inlet for downward flow 974 along the interior of the filter casing 120 and thus through the treatment cartridge 180 for treatment by at least one PRM contained in the treatment cartridge 180. Treated groundwater flow 976 exits the lower screen 124 in the downgradient direction. As remediation in FIG. 10E progresses, PRM contained in the treatment cartridge 180 is being exhausted as to its reactive effect on the flow 974 along the interior of the filter casing 120. During this stage of remediation, sampling and analysis of untreated groundwater, treated groundwater, and gas within the filter casing 120 may be conducted, for example as described with reference to FIG. 9.

Figure 10F:
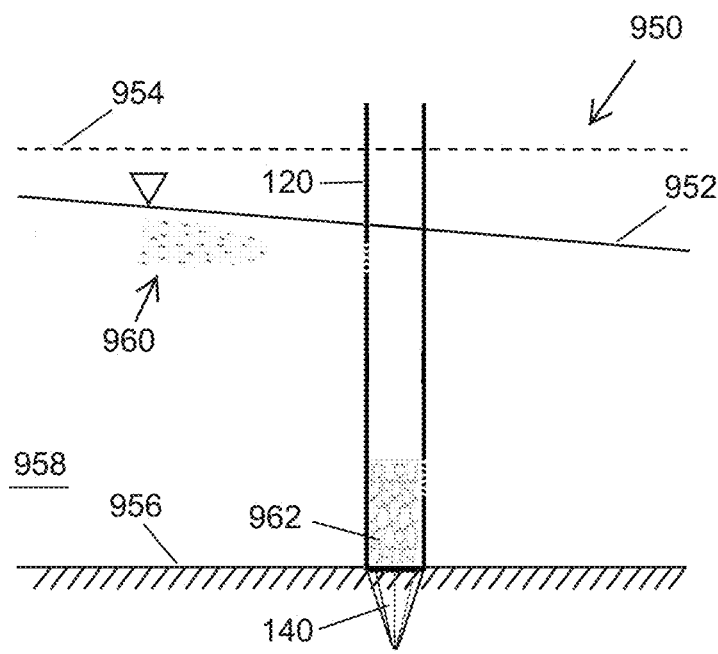
FIG. 10F is a side elevational view of the ground area and filter casing of FIG. 10E, in which the treatment cartridge is removed for replacement or replenishment of the treatment PRM contained.

FIG. 10F is a side elevational view of the ground area 950 and filter casing 120 of FIG. 10E, in which the treatment cartridge 180 is removed for replacement or replenishment of the treatment PRM contained. Depending on the example, the treatment cartridge 180 may need to be disposed of or handled as hazardous waste. In removing the treatment cartridge 180, the inflatable seal 190 is in a deflated condition as the treatment cartridge 180 is raised from the interior of the filter casing 120. The plume 960 representing contamination in the ground area 950 is shown as lessened in FIG. 10F relative to FIG. 10A to represent the beneficial effect of the remediation process. Further progress can continue with any number of cycles of the process from FIG. 10D to FIG. 10F.

Figure 11:
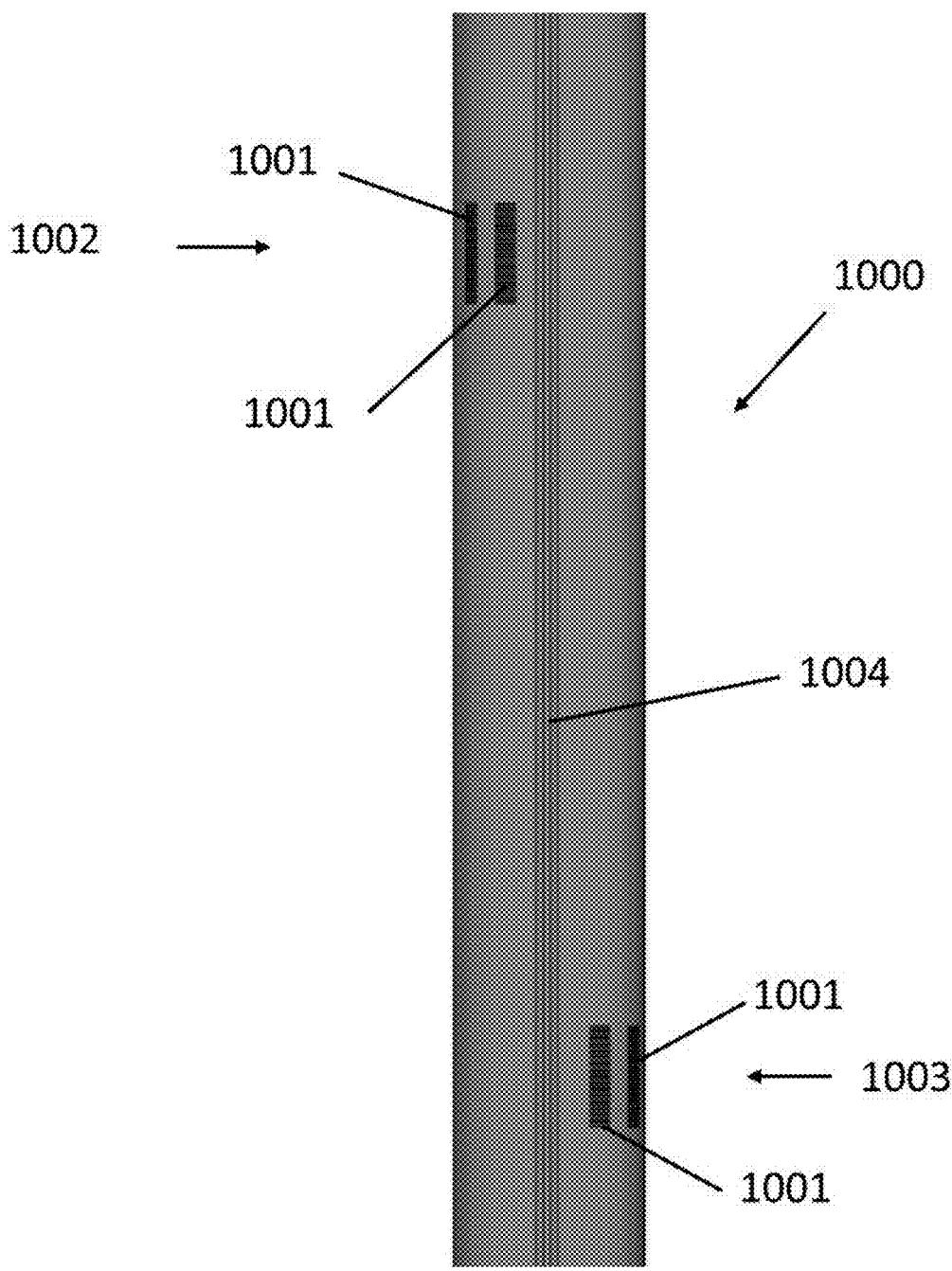
FIG. 11 is a side elevation view of a filter casing (filter casing) with well screen inserts on opposite sides and at different elevations, according to at least one embodiment.

FIG. 11 is a side elevation view of a filter casing 1000 with well screen inserts 1001 on opposite sides of the filter casing 1000 and at an upper elevation 1002 and lower elevation 1003, according to at least one embodiment. A vertical interlock 1004 shown on one side of the filter casing 1000 is used to connect the filter casing 1000 to other filter casings or conventional sheet piling (not shown).

Figure 12:
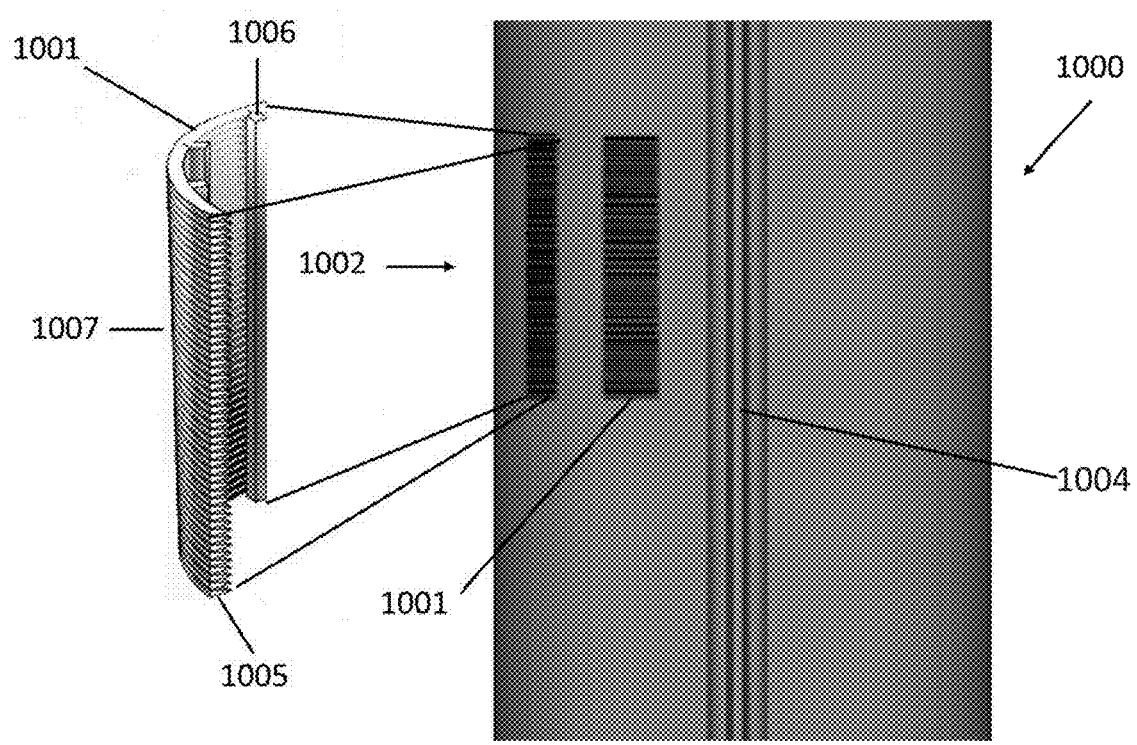
FIG. 12 is a side elevation view of FIG. 11 showing the details of a well screen insert, according to at least one embodiment.

FIG. 12 is a side elevation view of FIG. 11 showing the details of a well screen insert 1001 at the upper elevation 1002, according to at least one embodiment. The well screen inserts 1001 consist of wedge wire 1005 supported by vertical rods 1006 and used to create thin open areas or slots 1007, according to at least one embodiment. The open areas 1007, or slot size, can be varied to match the grain size of particles within the geologic formation in which the filter casing 1000 is installed, to prevent a significant quantity of particles from entering the filter casing 1000.

Figure 13:
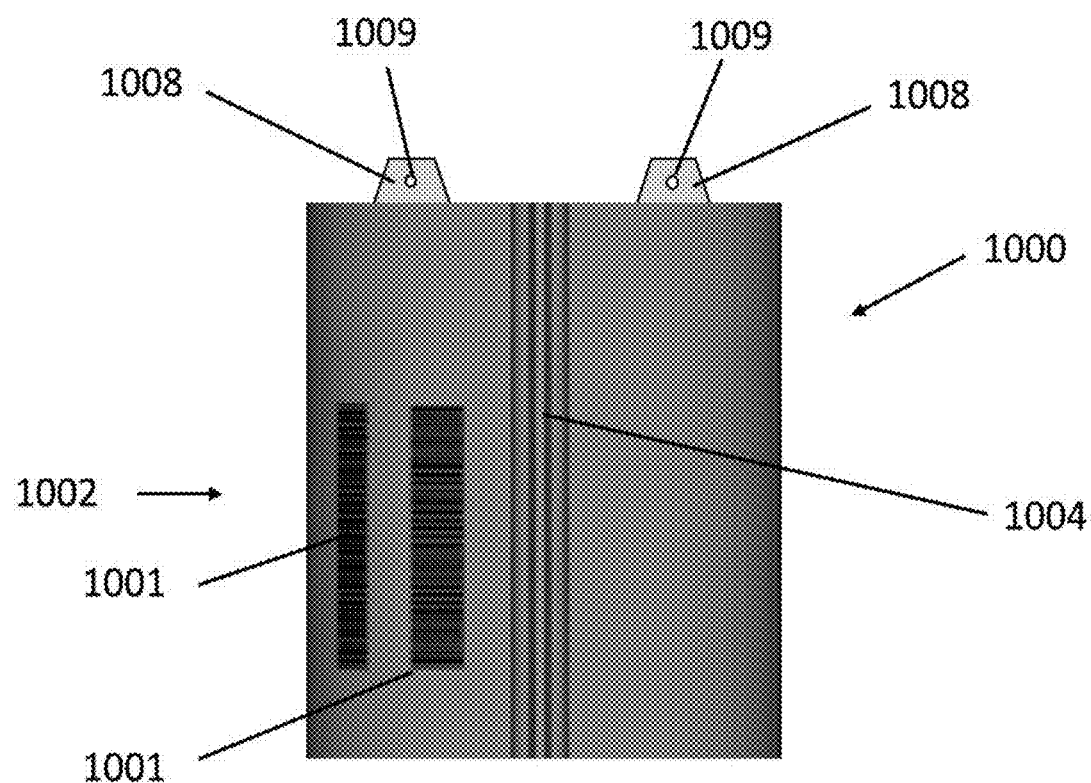
FIG. 13 is a side elevation view of FIG. 11 with the addition of alignment tabs on the top of the filter casing, according to at least one embodiment.

FIG. 13 is a side elevation view of the upper screen elevation 1002 of the filter casing 1000 shown in FIG. 11 with the addition of alignment tabs 1008 on the top of the filter casing 1000, according to at least one embodiment. The alignment tabs 1008 have threaded holes 1009, according to at least one embodiment.

Figure 14:
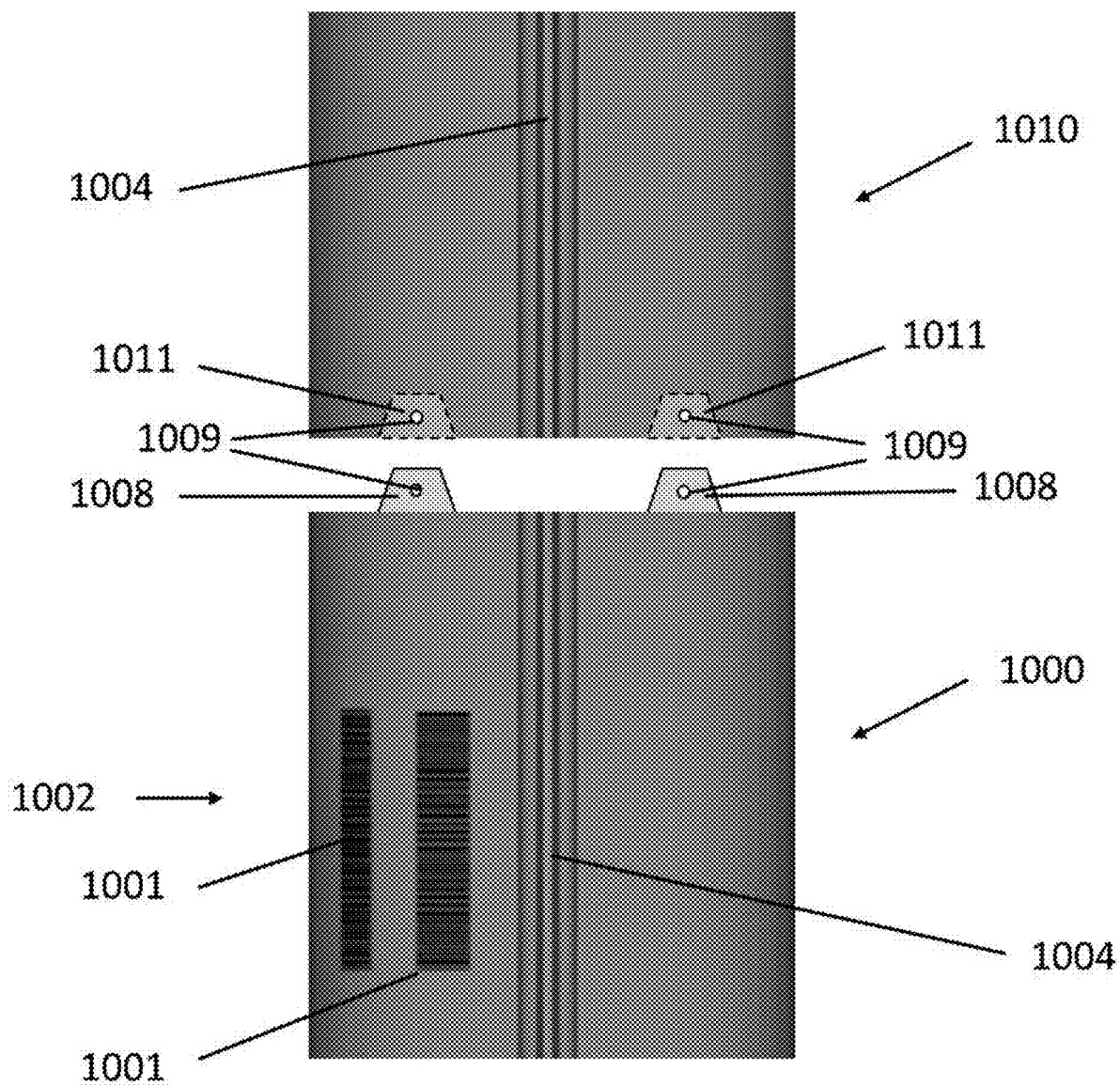
FIG. 14 is a side elevation view of FIG. 13 with the addition of a riser casing with alignment recesses on the bottom of the riser casing, according to at least one embodiment.

FIG. 14 is a side elevation view of FIG. 13 with the addition of a riser casing 1010 positioned over the filter casing 1000. The riser casing 1010 is similar to the filter casing 1000 but has no screen insets 1001 in either the upper elevation 1002 or lower elevation 1003. The bottom of the riser pile 1010 has alignment recesses 1011 with threaded holes 1009 in the alignment recesses 1011, according to at least one embodiment.

Figures 15A, 15B:
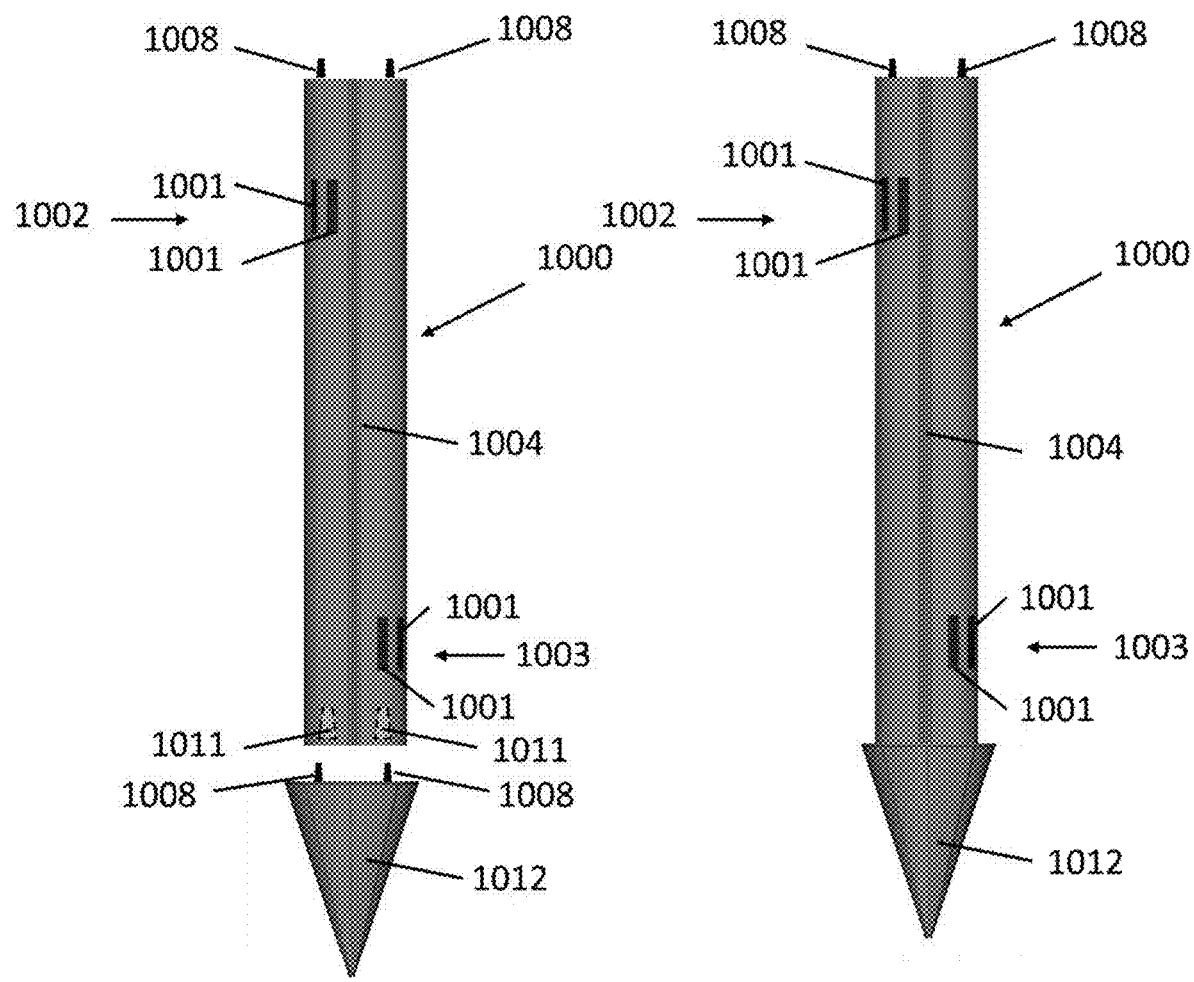
FIG. 15A is a side elevation view of FIG. 11 showing alignment tabs and recesses, with the addition of a drive shoe at the bottom of the filter casing, according to at least one embodiment.
FIG. 15B shows the securement of the drive shoe to the bottom of the Filter casing by the connection of alignment tabs and recesses, according to at least one embodiment.

FIG. 15A is a side elevation view of FIG. 11 showing alignment tabs 1008 and recesses 1009 in the filter casing, with the addition of a drive shoe 1012 at the bottom of the filter casing 1000, according to at least one embodiment. FIG. 15B shows the attachment of the drive shoe 1012 to the bottom of the filter casing 1000 by the connection of alignment tabs 1008 and recesses 1011 and secured by screws or similar devices (not shown), according to at least one embodiment.

Figure 16:
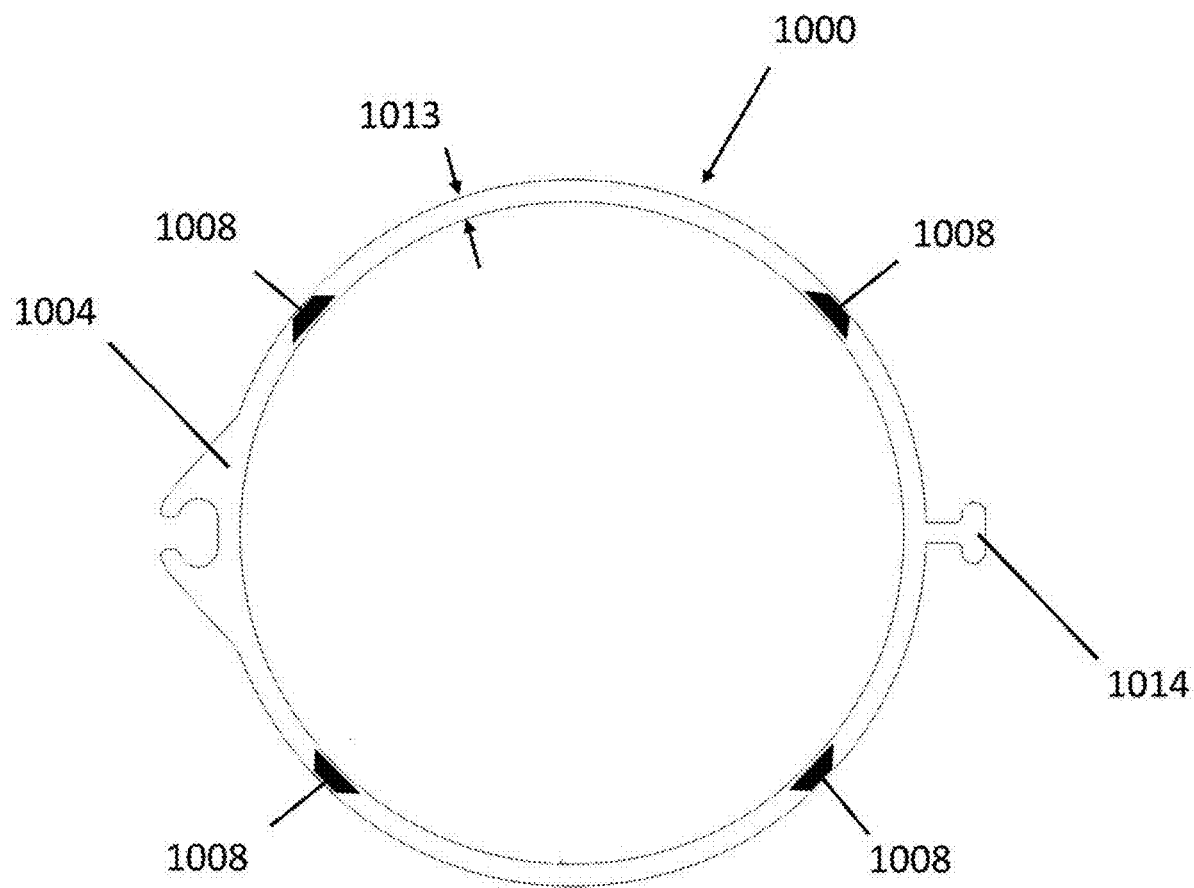
FIG. 16 is overhead view of FIG. 11 showing the position of the alignment tabs on the top of the filter casing, according to at least one embodiment.

FIG. 16 is overhead view of FIG. 11 showing the position of the alignment tabs 1008 inside the wall thickness 1013 and on the top of the filter casing 1000, according to at least one embodiment. A vertical interlock 1004 on one side of the filter casing 1000 is a channel connector compared to the vertical interlock 1014 which is a ridge on the opposite side of the filter casing 1000 to connect with other filter casings or sheet piles which are not shown.

Figure 17:
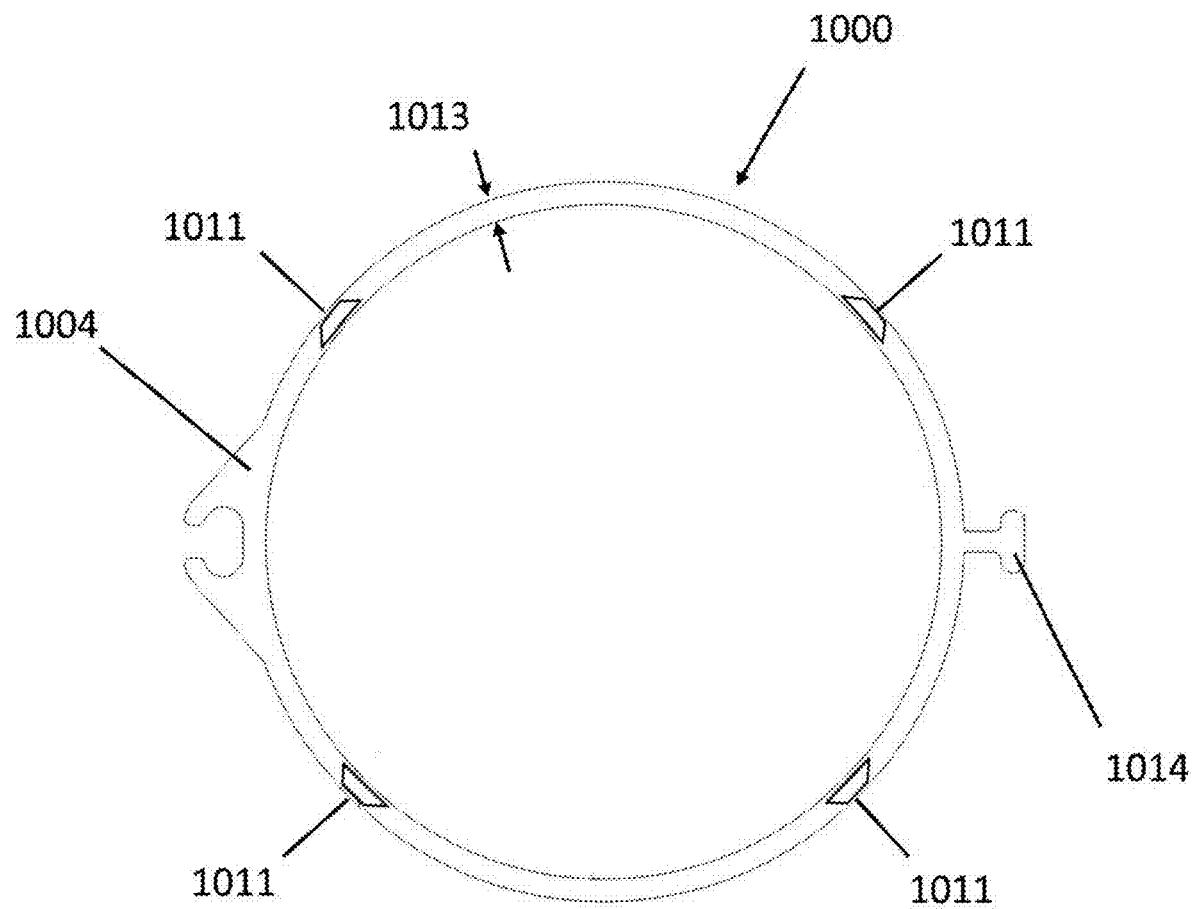
FIG. 17 is an overhead view of FIG. 11 showing the position of the alignment recesses on the bottom of the filter casing, according to at least one embodiment.

FIG. 17 is a view as seen below FIG. 16 showing the position of the alignment recesses 1011 inside the wall thickness 1013 on the bottom of the filter casing 1000, according to at least one embodiment.

Figure 18A:
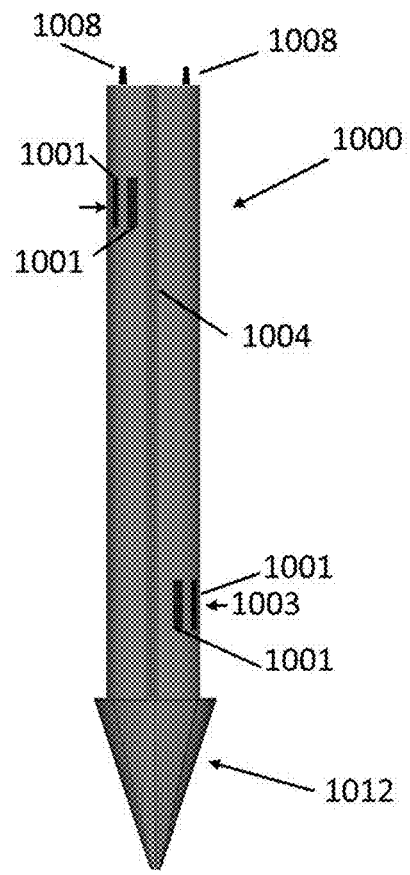
FIG. 18A is a side elevation view FIG. 15B showing the securement of the drive shoe to the bottom of the filter casing by the connection of alignment tabs and recesses.
Figure 18B:
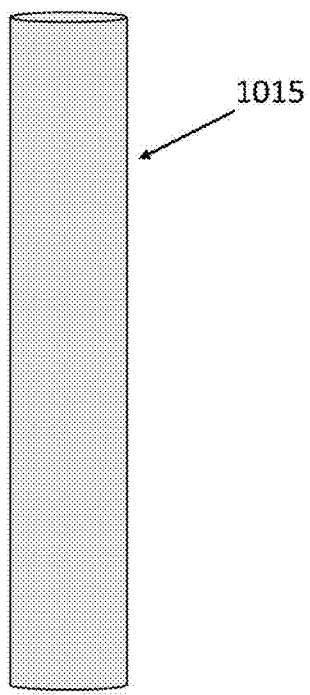
FIG. 18B is a side elevation view of a drive device for the filter casing, according to at least one embodiment.
Figure 18C:
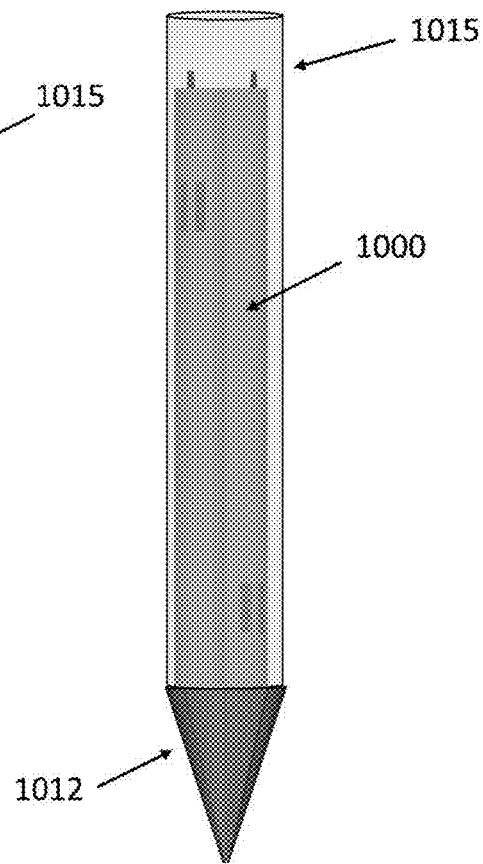
FIG. 18C is a side elevation view of FIG. 18A and FIG. 18B showing the installation of the drive device over the filter casing and seated on the outer edge of the drive shoe, according to at least one embodiment.

FIG. 18A is a side elevation view FIG. 15B showing the securement of the drive shoe 1012 to the bottom of the filter casing 1000 by the connection of alignment tabs 1008 and recesses 1011. FIG. 18B is a side elevation view of a drive device 1015 or mandrel for the filter casing 1000, according to at least one embodiment. FIG. 18C is a side elevation view of FIG. 18A and FIG. 18B combined to show the installation of the drive device 1015 over the Filter casing 1000 and seated on the outer edge of the drive shoe 1012, according to at least one embodiment. As shown in the comparison of FIGS. 18A, 8B, and 8C, the outer edge of the drive shoe 1012 extends beyond the edges of the filter casing 1000 to support the drive device 1015, as shown in at least one embodiment.

Figure 19:
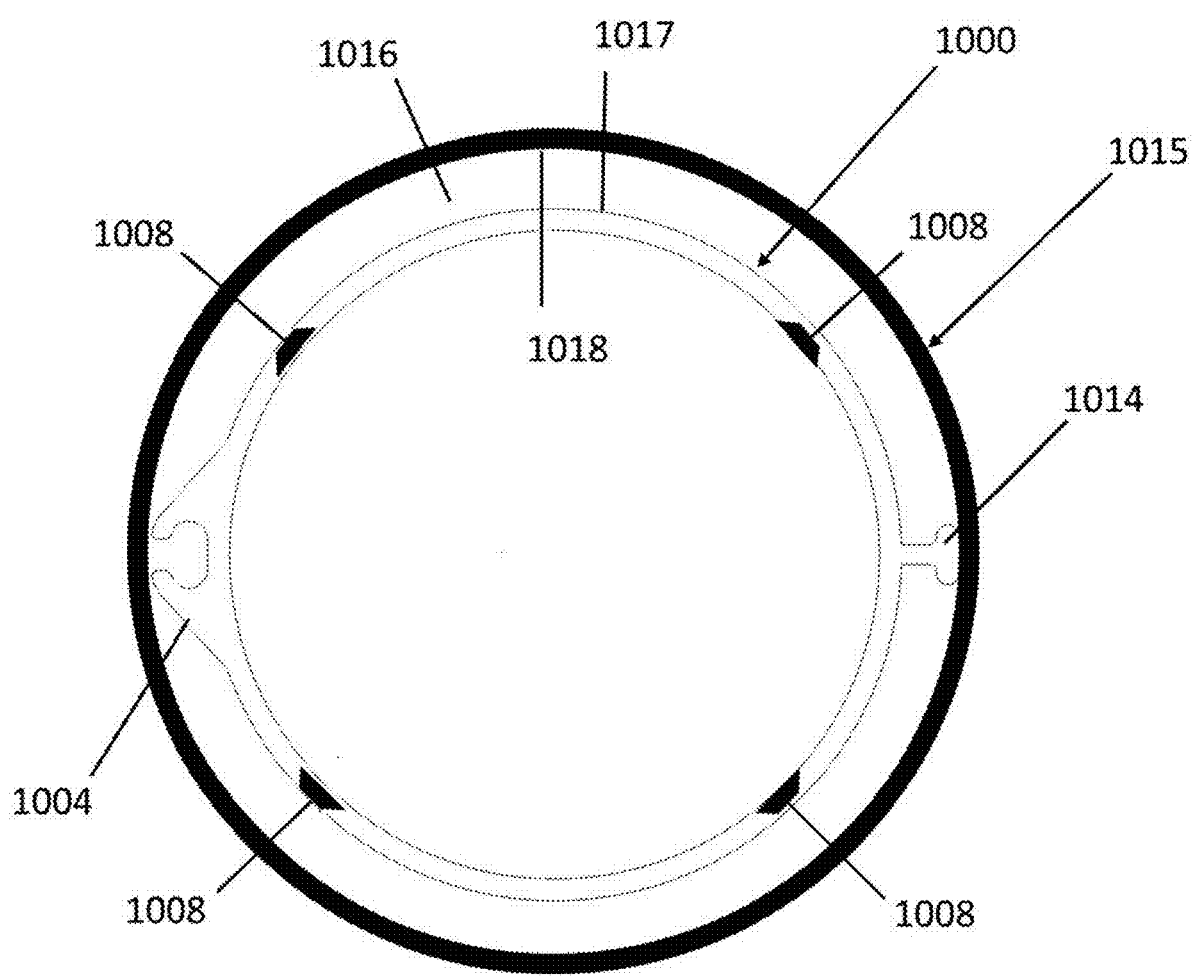
FIG. 19 is an overhead view of FIG. 18C showing the annular space created by the position of the drive device over the filter casing, according to at least one embodiment.

FIG. 19 is an overhead view of FIG. 18C showing the annular space 1016 formed between the outer wall 1017 of the filter casing 1000 and the inner wall 1018 of the drive device 1015, according to at least one embodiment.

Figure 20:
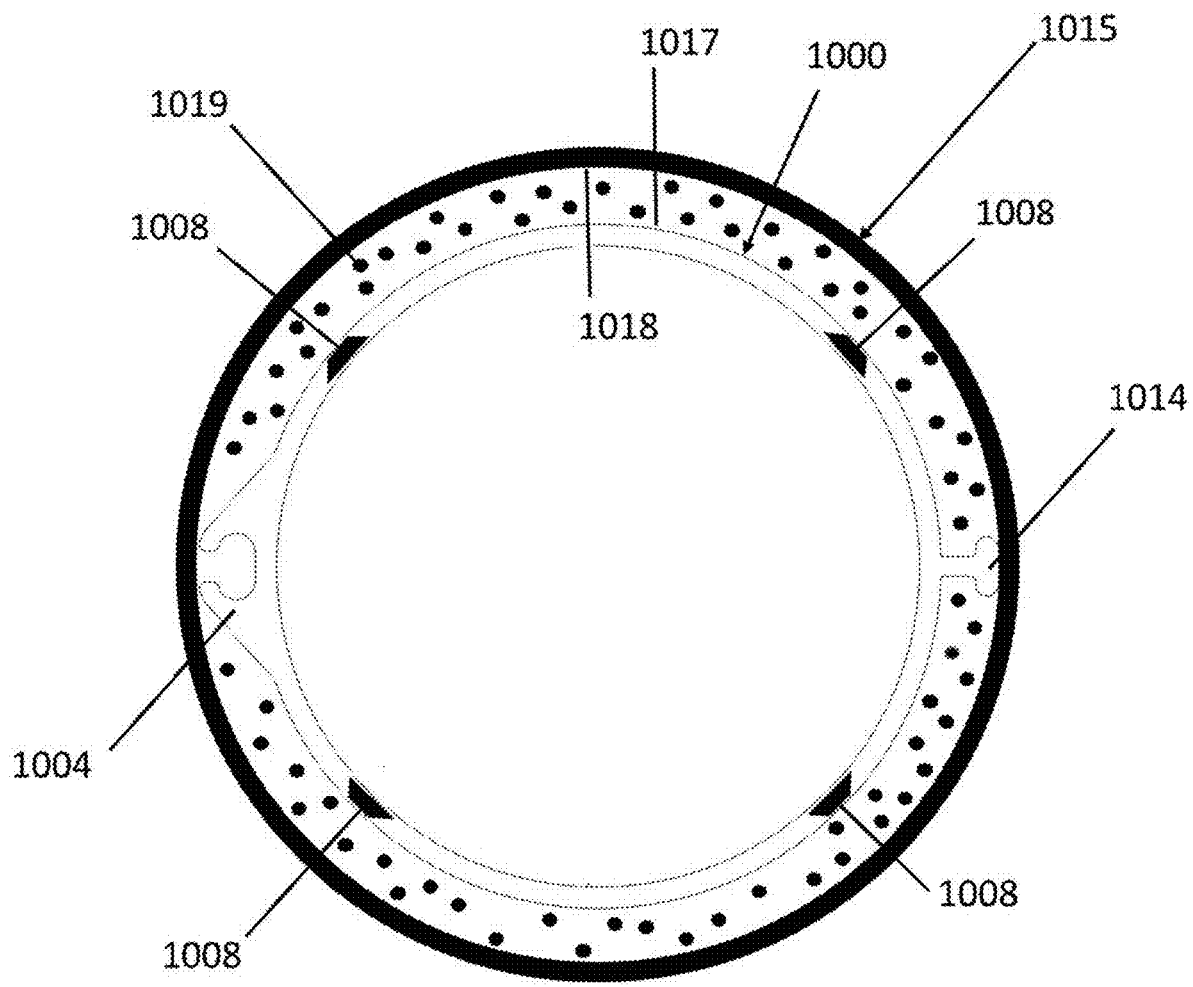
FIG. 20 is an overhead view of FIG. 19 showing the emplacement of an artificial gravel pack in the annular space before the drive device is removed from the subsurface, according to at least one embodiment.

FIG. 20 is an overhead view of FIG. 19 showing the emplacement of an artificial gravel pack 1019 in the annular space 1016 before the drive device 1015 is removed from the subsurface, according to at least one embodiment.

Figure 21:
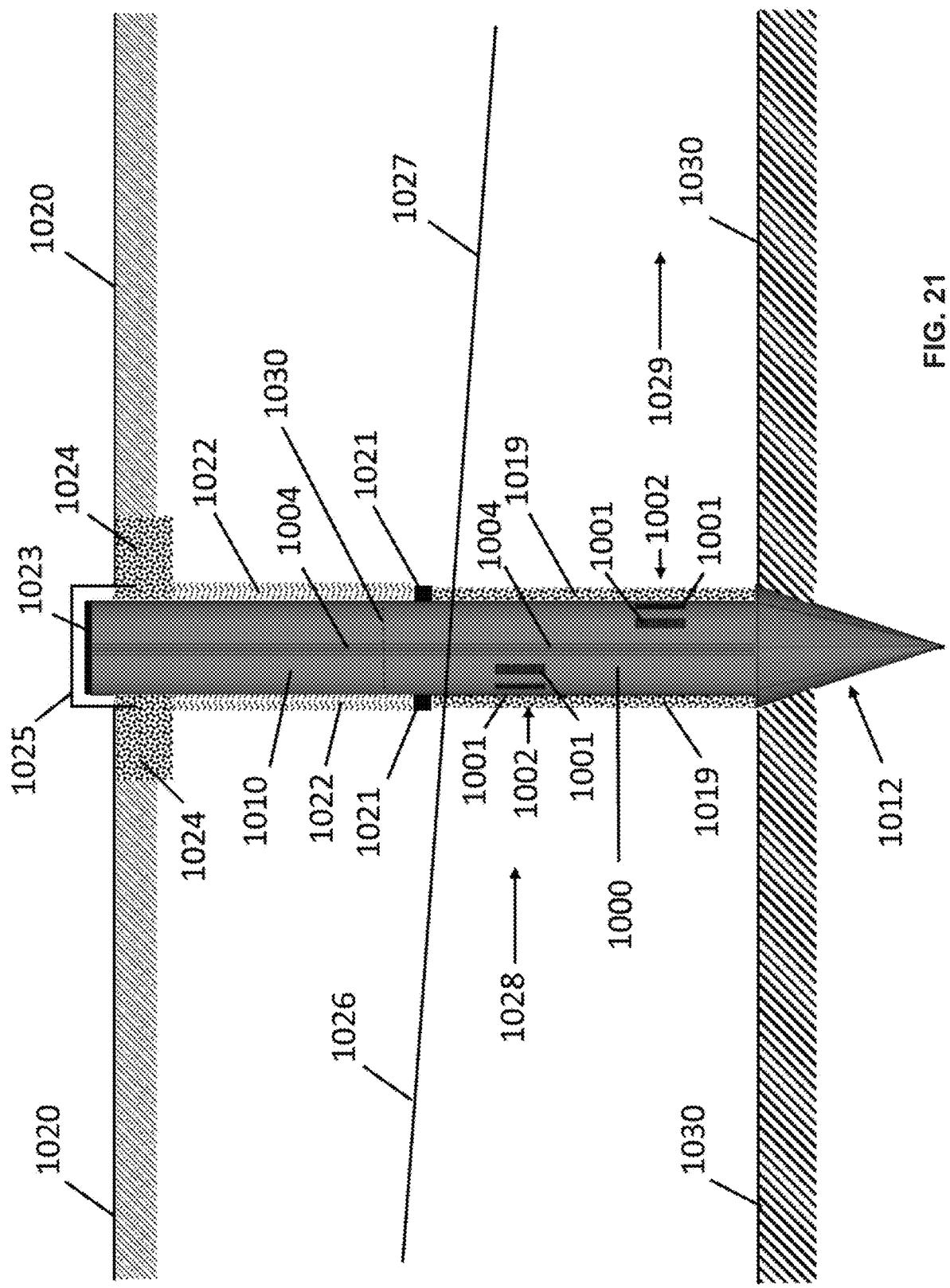
FIG. 21 is a side elevation view of FIG. 18C with the drive device removed showing the complete installation of the filter casing and artificial gravel packing surrounding the screen segments in the subsurface, according to at least embodiment.

FIG. 21 is a side elevation view of FIG. 18C showing an installation of the filter casing 1000 below the ground surface 1020 with the artificial gravel pack 1019 emplaced in the annular space 1016 extending above the screen inserts 1001 at the upper elevation 1002 after the drive device 1015 (not shown) is removed from the subsurface. An expansive seal 1021 such as bentonite is shown in the annular space 1016 between the gravel packing 1019 and an upper grout 1022 encasement of the riser casing 1010 that extends above the ground surface 1020 and is capped 1023. A concrete pad 1024 is shown at the ground surface 1020 with a structure 1025 to further protect the installation, according to at least one embodiment.

The upper elevation screen inserts 1002 and lower elevation screen inserts 1003 screen are positioned below the water table, shown upgradient 1026 and downgradient 1027 of the filter casing 1000. In the configuration shown, groundwater would flow from the upgradient side 1028 of the filter casing 1000 to the downgradient side 1029 of the filter casing, above the base of the aquifer 1030, in which the drive shoe 1012 is seated, according to at least one embodiment. A horizontal joint 1031 between the connection of the filter casing 1000 and the riser casing 1010 results as shown in FIG. 14 when using alignment tabs and alignment recesses.

Figure 22:
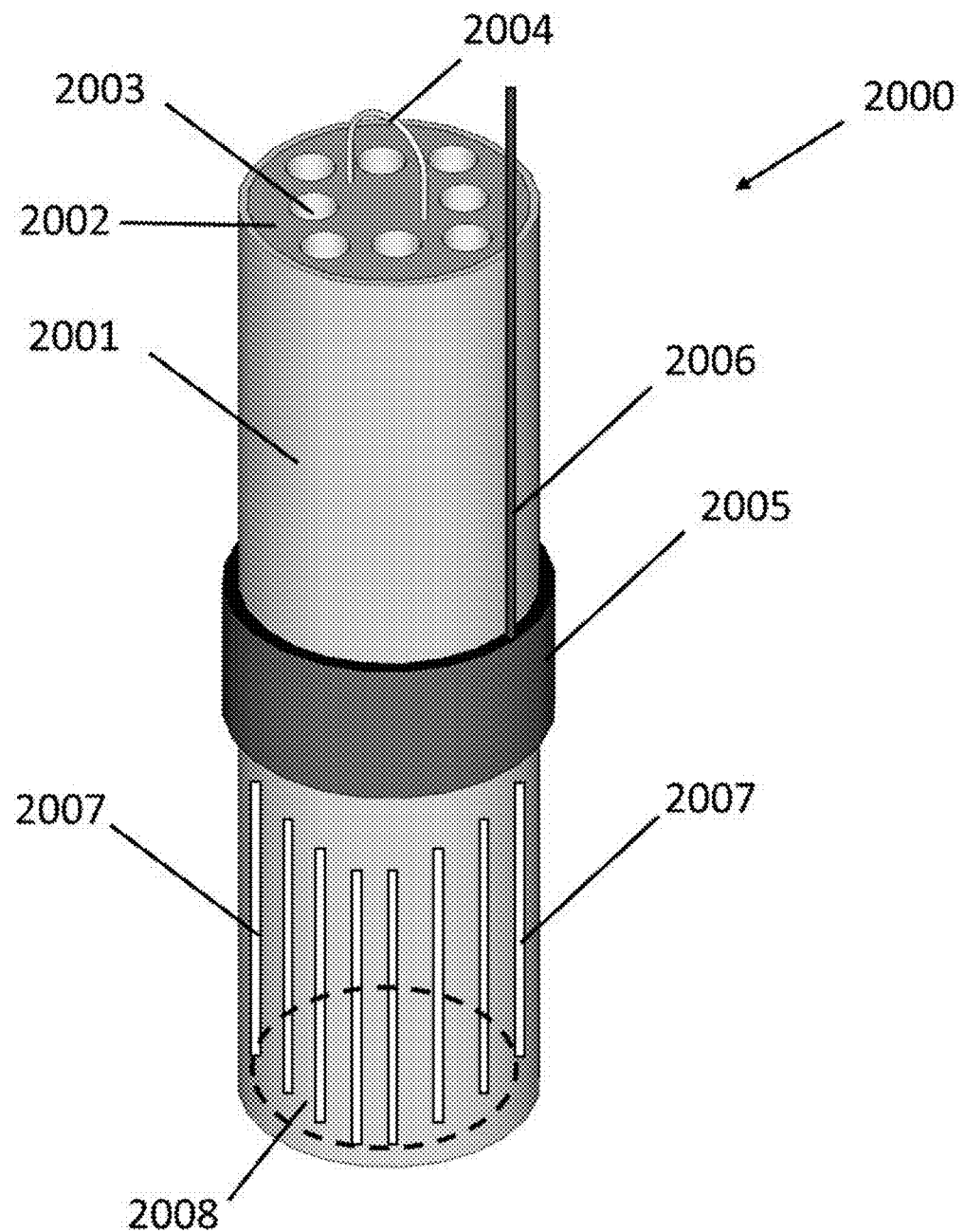
FIG. 22 is an isometric view of a skimmer cartridge with vertical slots at the bottom of the casing for the capture of DNAPLs, according to at least one embodiment.

FIG. 22 is an isometric view of a skimmer cartridge 2000 for capturing DNAPLs with a casing 2001, top cap 2002, perforations 2003 in the top cap 2002, lifting loop 2004, inflatable seal 2005 and filler tube 2006, and vertical slots 2007 in the lower portion and circumference of the casing 2001 for the capture of DNAPLs, according to at least one embodiment. A solid bottom cap 2008 is flush with the bottom of the casing 2001.

Figure 23:
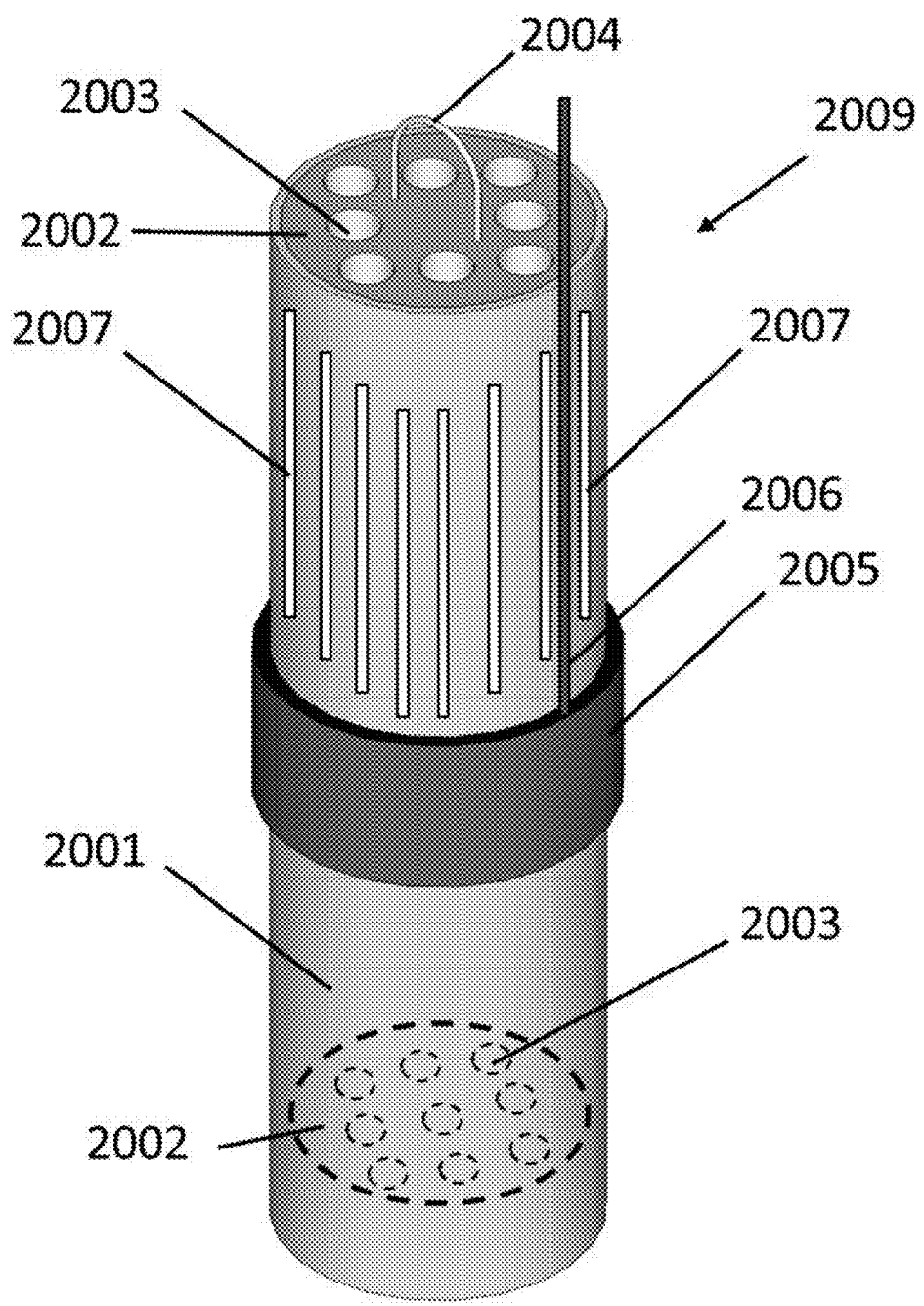
FIG. 23 is an isometric view of a skimmer cartridge with vertical slots at the top of the casing for the capture of LNAPLs, according to at least one embodiment.

FIG. 23 is an isometric view of skimmer cartridge 2009 for capturing LNAPLs with a casing 2001, top cap 2002, perforations 2003 in the top cap 2002, lifting loop 2004, inflatable seal 2005 and filler tube 2006, and vertical slots 2007 in the upper portion and circumference of the casing 2001 for the capture of LNAPLs, according to at least one embodiment. A perforated 2003 bottom cap 2002 is recessed in casing 2001 to allow for a lifting loop 2004 of a separate cartridge (not shown) to be seated directly below the LNAPL skimmer cartridge 2009.

Figure 24:
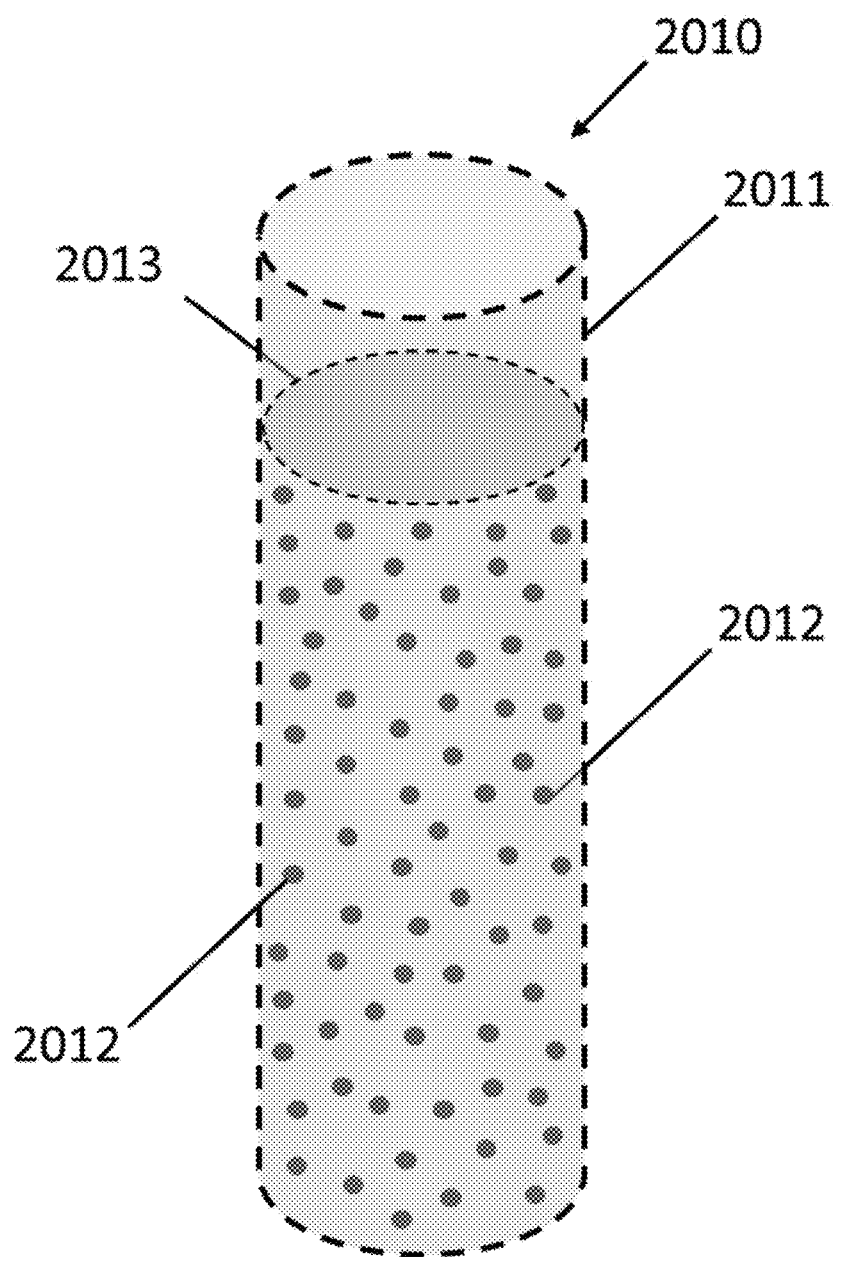
FIG. 24 is an isometric view of a permeable container to hold super absorbent polymers or equivalents, according to at least one embodiment.

FIG. 24 is an is an isometric view of a permeable container 2010, made of a flexible fabric liner 2011, that holds super absorbent polymers or equivalent 2012 on the inside. A void near the top 2013 of the permeable container 2010 allows for expansion of the super absorbent polymers 2012 upon contact with LNAPLs, according to at least one embodiment.

Figure 25A:
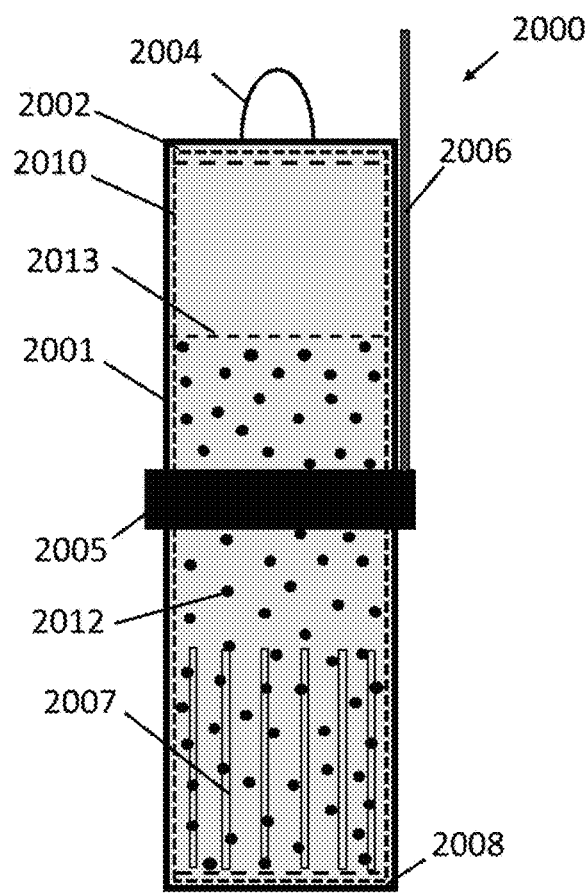
FIG. 25A is a side elevation view of FIG. 22, a DNAPL skimmer cartridge, with the addition of the super absorbent polymer container, according to at least one embodiment.
Figure 25B:
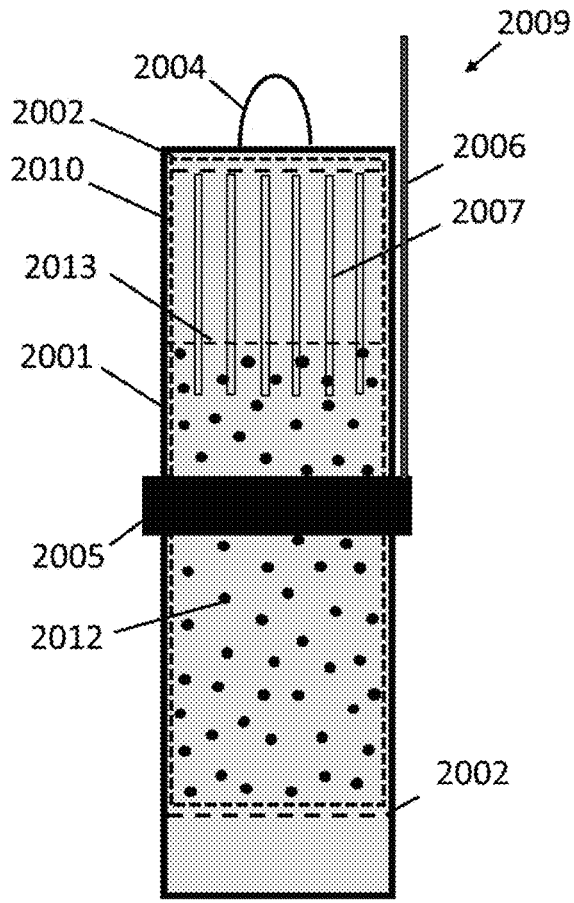
FIG. 25B is a side elevation view of FIG. 23, an LNAPL skimmer cartridge, with the addition of the super absorbent polymer container, according to at least one embodiment.

FIG. 25A is a side elevation view of FIG. 22, the DNAPL skimmer cartridge 2000, with the addition of the super absorbent polymer container 2010, according to at least one embodiment. FIG. 25B is a side elevation view of FIG. 23, the LNAPL skimmer cartridge 2009, with the addition of the super absorbent polymer container 2010, according to at least one embodiment.

Figures 26A, 26B:
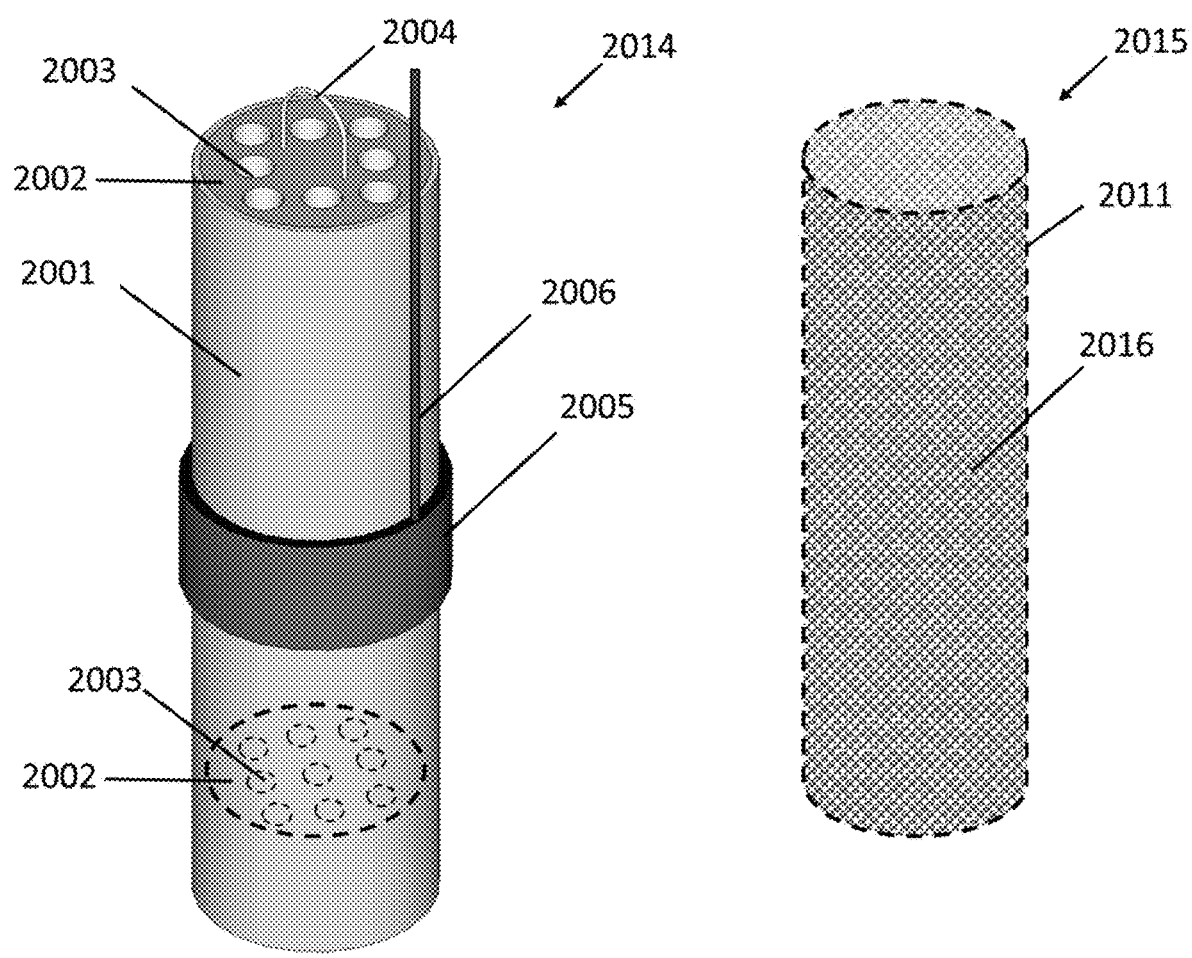
FIG. 26A is an isometric view of a cartridge for the capture and treatment of dissolved phase NAPLs in groundwater, according to at least one embodiment.
FIG. 26B is an isometric view of a permeable container to hold permeable reactive materials for the capture and treatment of dissolved phase NAPLs in groundwater, according to at least one embodiment.

FIG. 26A is an isometric view of a dissolved phase NAPL treatment cartridge 2014, according to at least one embodiment. FIG. 26B is an isometric view of a permeable container 2015 with permeable reactive materials 2016 for the capture and treatment of dissolved phase NAPLs in groundwater, according to at least one embodiment.

Figure 27:
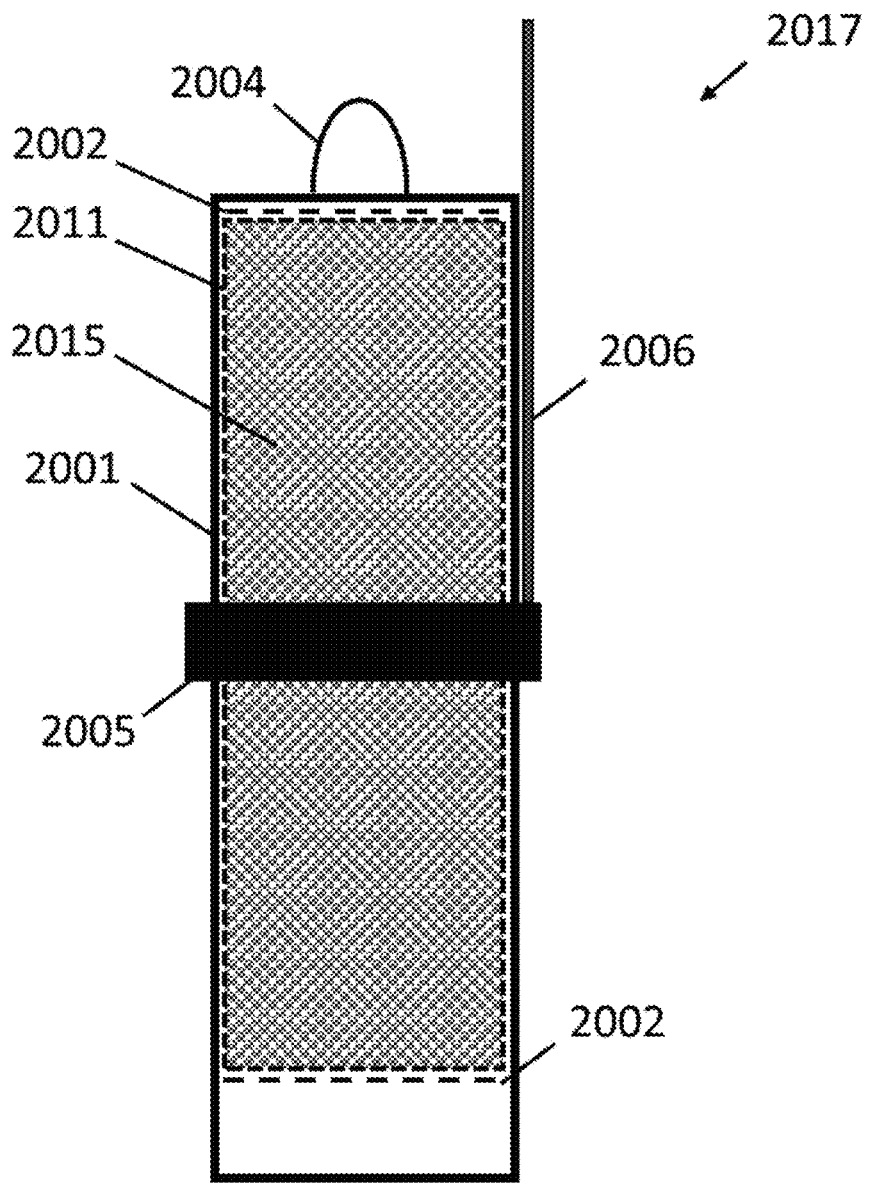
FIG. 27 is a side elevation view of FIG. 26A with the addition of the permeable reactive materials container of FIG. 26B, according to at least one embodiment.

FIG. 27 is a side elevation view of FIG. 26A with the addition of the permeable reactive materials container 2015. A perforated bottom cap 2002 is recessed in casing 2001, to allow for a lifting loop 2004 of a separate cartridge (not shown) to be seated directly below the dissolved phase NAPL treatment cartridge 2017, according to at least one embodiment.

Figure 28:
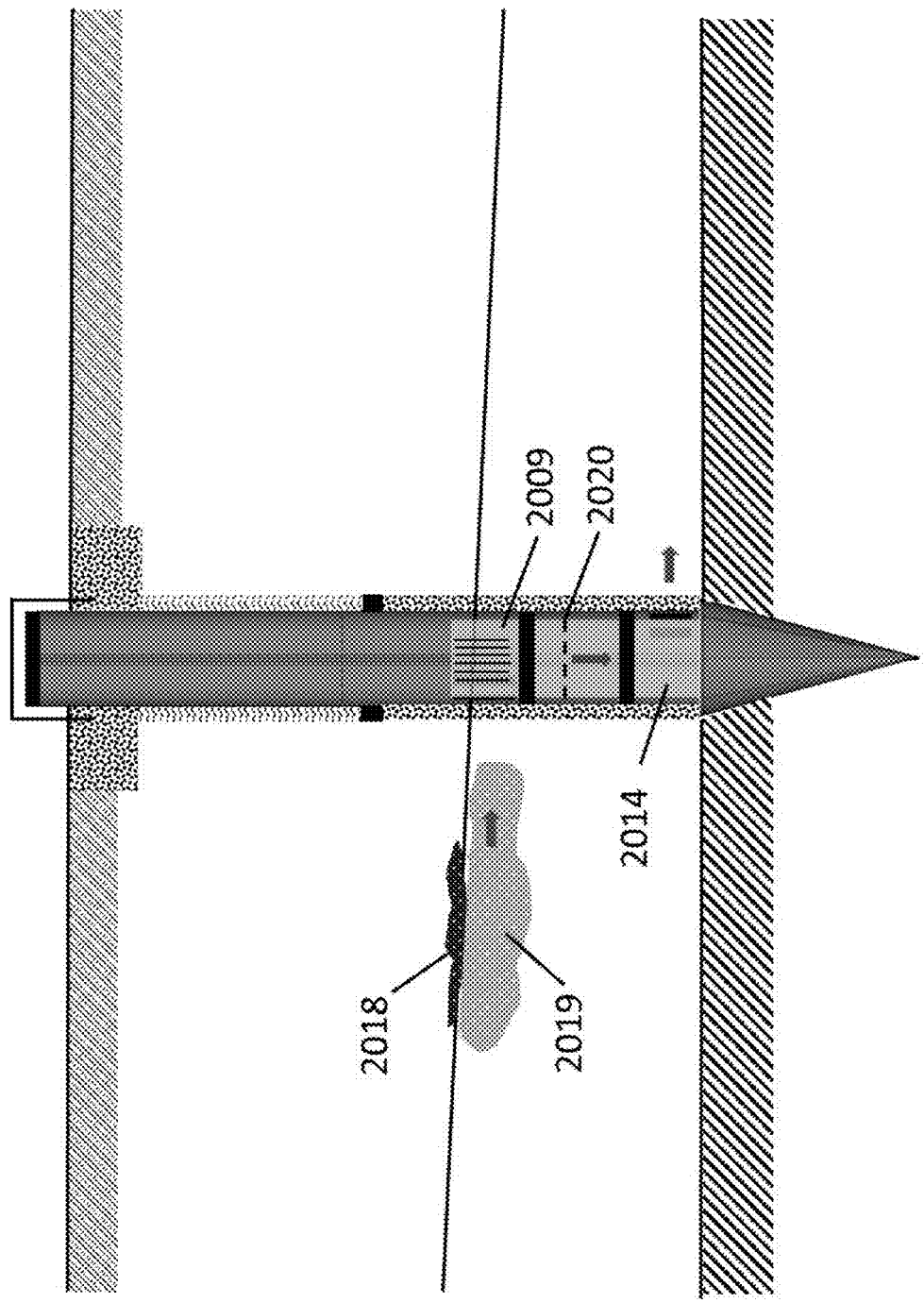
FIG. 28 is a side elevation view showing an LNAPL plume on the water table, an associated dissolved aqueous phase plume, and an LNAPL skimmer cartridge installed in the filter casing with inlet slots transecting the water table and on top of a dissolved phase NAPL treatment cartridge, according to at least one embodiment.

FIG. 28 is a side elevation view showing an LNAPL plume 2018 on the water table, an associated dissolved aqueous phase plume 2019, and an LNAPL skimmer cartridge 2009 installed in the filter casing with inlet slots transecting the expected vertical fluctuations of water table in order to capture the LNAP plume 2018. A dissolved phase NAPL treatment cartridge 2014 is set 2020 directly below cartridge 2009, for the capture and treatment of dissolved phase NAPL groundwater contaminants, according to at least one embodiment.

Figure 29:
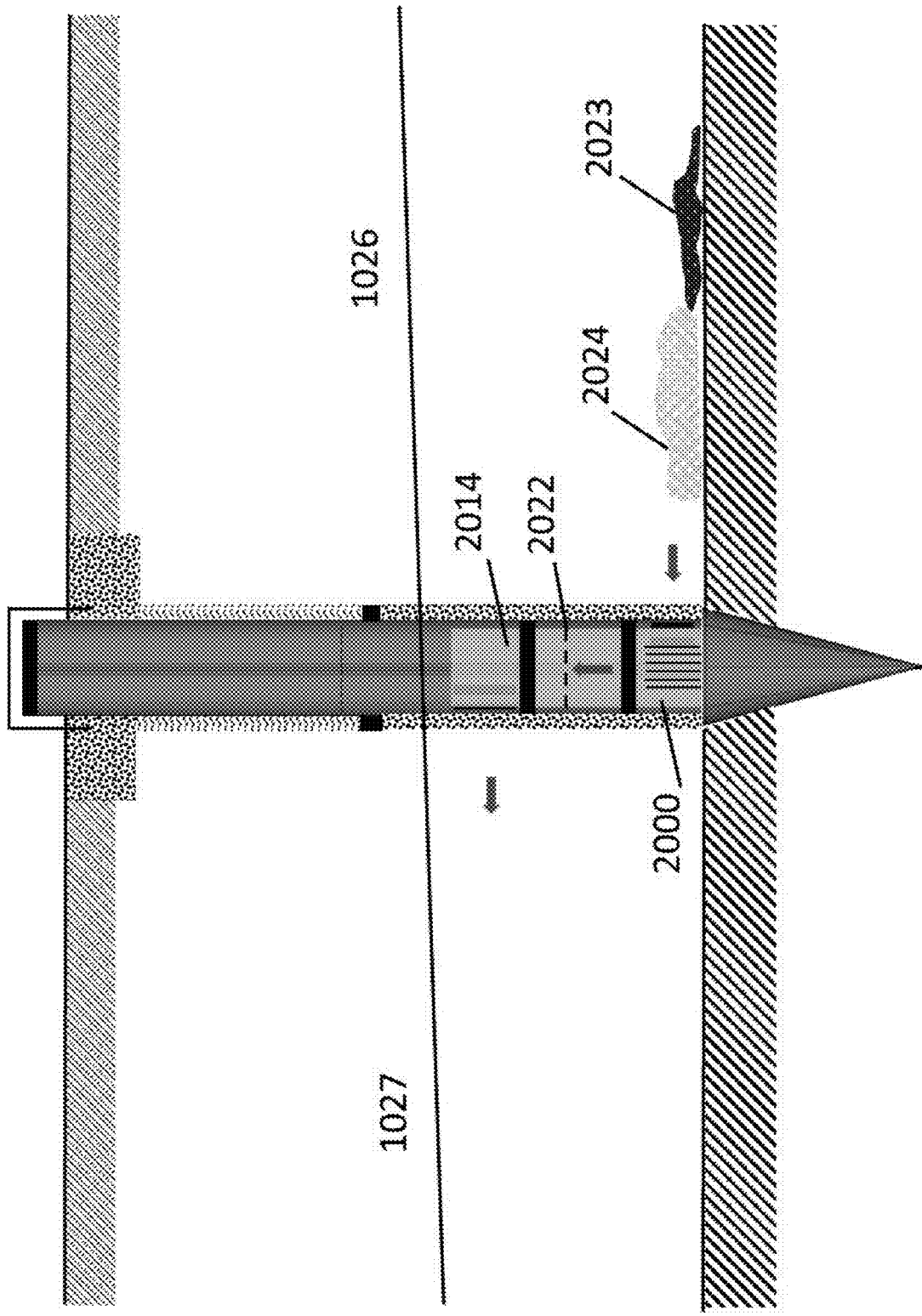
FIG. 29 is a side elevation view showing a DNAPL plume on the base of the aquifer, an associated dissolved aqueous phase plume, and a DNAPL skimmer cartridge installed in the bottom of the filter casing with inlet slots extending above the base of the aquifer, and a dissolved phase NAPL treatment cartridge on top of the DNAPL skimmer cartridge, according to at least one embodiment.

FIG. 29 is a side elevation view showing a DNAPL plume 2023 on the base of the aquifer, an associated dissolved aqueous phase plume 2024, and a DNAPL skimmer cartridge 2000 installed in the bottom of the filter casing with inlet slots extending above the base of the aquifer, and a dissolved phase NAPL treatment cartridge 2014 is set directly on top 2022 of the DNAPL skimmer cartridge, according to at least one embodiment.

Figure 30:
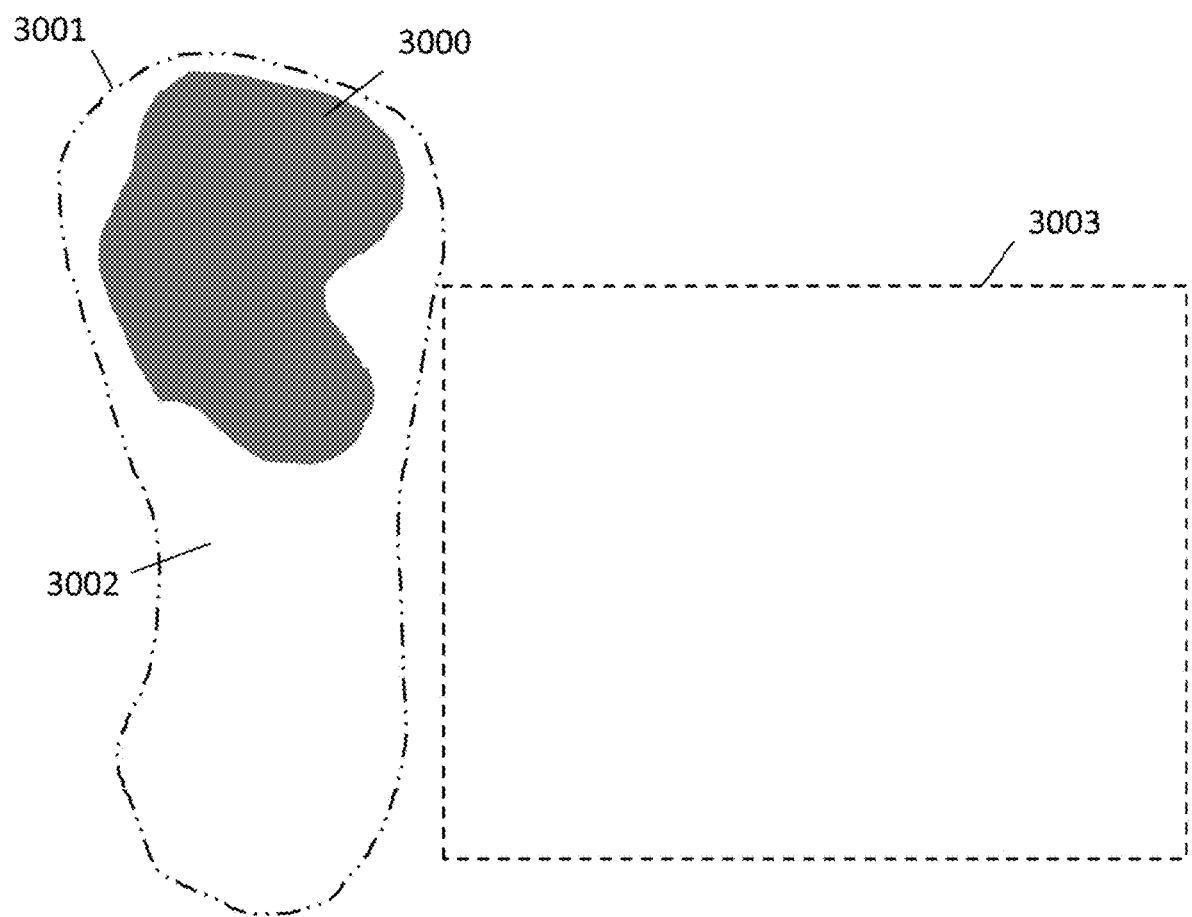
FIG. 30 is an overhead view of a surface water body with contaminated sediment and an adjacent area selected for the above ground sediment containment area for use with the filter casing disclosed herein.

FIG. 30 is an overhead view of a surface water body 3002 with contaminated sediment 3000 near one edge 3001 of the water body 3002. The contaminated sediment 3000 could represent contaminated sediment from industrial runoff, spills, coal ash, mine tailings, or any number of related sources of contamination. The surface water body 3002 could represent a river, harbor, bay, pond, wetland, sedimentation pond, or similar body of water on the earth's surface. An adjacent area 3003 is selected for the above ground sediment containment area.

Figure 31:
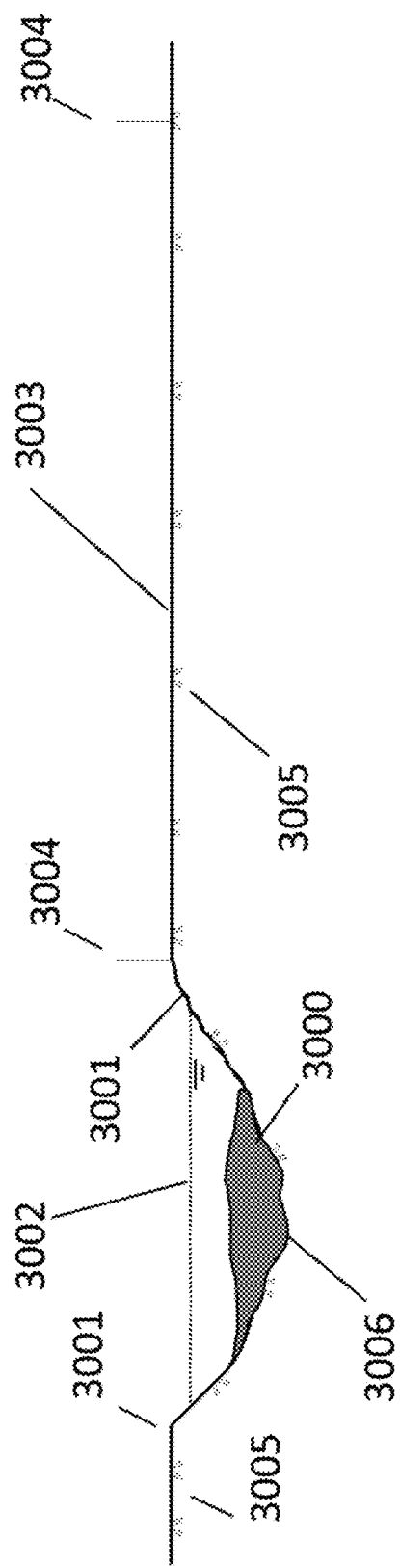
FIG. 31 is a side elevation view of FIG. 30, showing the addition of silt fencing to delineate the above ground sediment containment area.

FIG. 31 is a side elevation view of FIG. 30, showing the addition of silt fencing 3004 to delineate the above ground 3005 sediment containment area 3003. The contaminated sediment 3000 is shown resting on the bottom 3006 of the surface water body 3002 between the edges 3001 of the water body 3002.

Figure 32A:
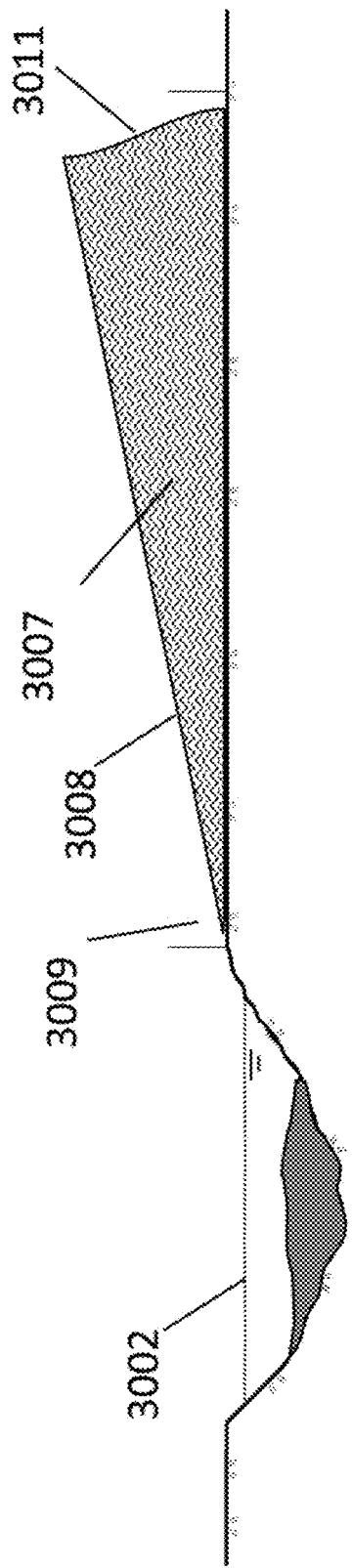
FIG. 32A is a side elevation view of FIG. 30, showing the addition of a compacted base fill for the sediment containment area with a tapered toe slope toward the adjacent water body and ungraded backslope, according to at least one embodiment.

FIG. 32A is a side elevation view of FIG. 30, showing the addition of a compacted base fill 3007 for the sediment containment area with a foreslope 3008 and tapered toe slope 3009 toward the adjacent water body 3002, and a temporary backslope 3011, according to at least one embodiment.

Figure 32B:
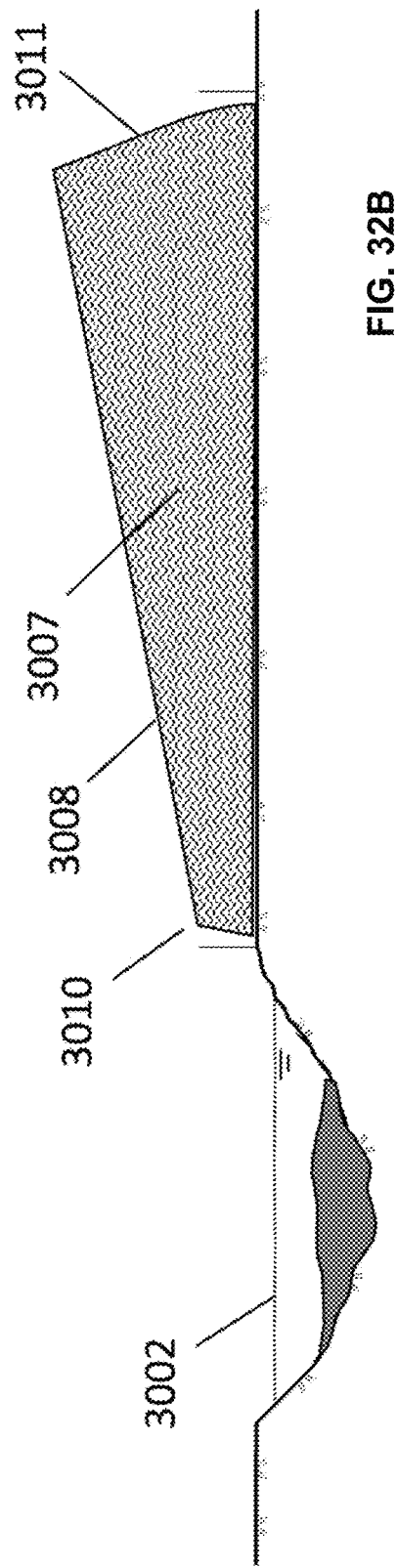
FIG. 32B is a side elevation view of FIG. 30, showing the addition of a compacted base fill for the sediment containment area with an elevated toe slope toward the adjacent water body and ungraded backslope, according to at least one embodiment.

FIG. 32B is a side elevation view of FIG. 30, showing the addition of a compacted base fill 3007 for the sediment containment area with a foreslope 2008 an elevated toe slope 3010 toward the adjacent water body 3002, and a temporary ungraded backslope 3011, according to at least one embodiment.

Figure 33:
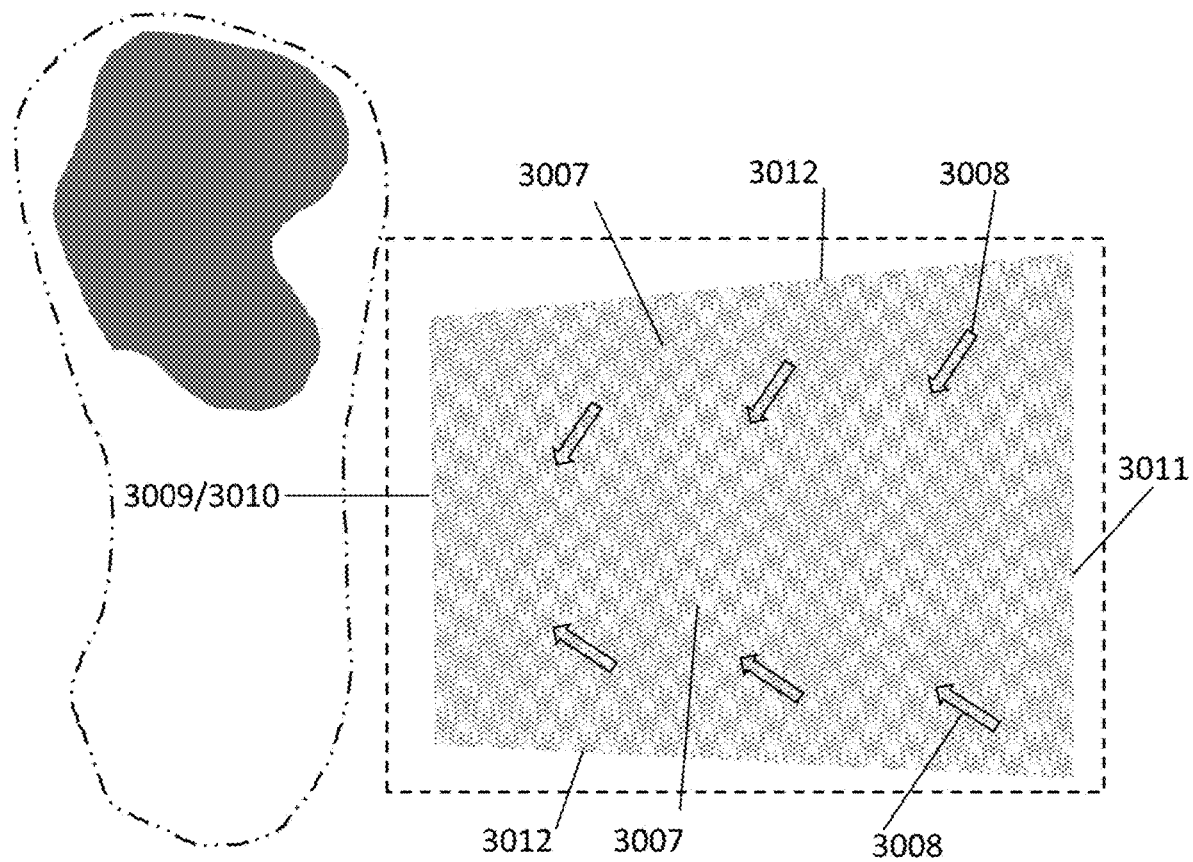
FIG. 33 is an overhead view showing a graded foreslope and an ungraded backslope and sideslopes.

FIG. 33 is an overhead view of FIG. 32, showing a graded foreslope 3008, graded toward the center of the sediment container area, with temporary ungraded sideslopes 3012 and a temporary ungraded backslope 3011. Depending on the remedial design, the toe slope is either tapered 3009 (FIG. 32A) or elevated 3010 (FIG. 32B) and is not as wide as the backslope 3011.

Figure 34:
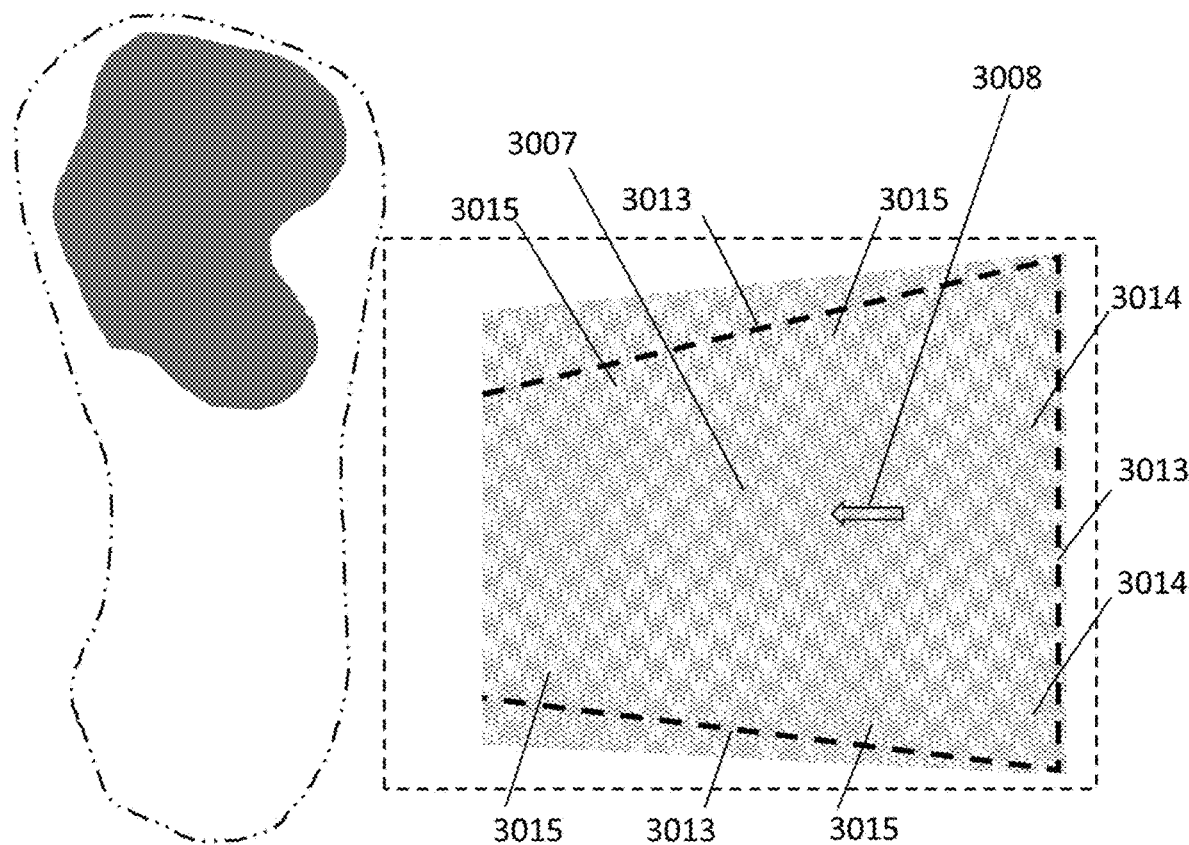
FIG. 34 is an overhead view of FIG. 33, with the addition of an above ground structural wall with sealed engagement elements to prevent water from seeping out of the containment area, a narrow treatment gate area on the side of the water body and a filled backslope and sideslopes, according to at least one embodiment.

FIG. 34 is an overhead view of FIG. 33, with the addition of a structural wall 3013, such as sheet piling, with sealed engagement elements to prevent water from seeping out of the containment area, and a narrow open treatment gate area on the side of the water body, according to at least one embodiment. The backslope 3014 and sideslopes 3015 have been backfilled to the structural wall and graded consistent with the grade of the foreslope 3008.

Figure 35:
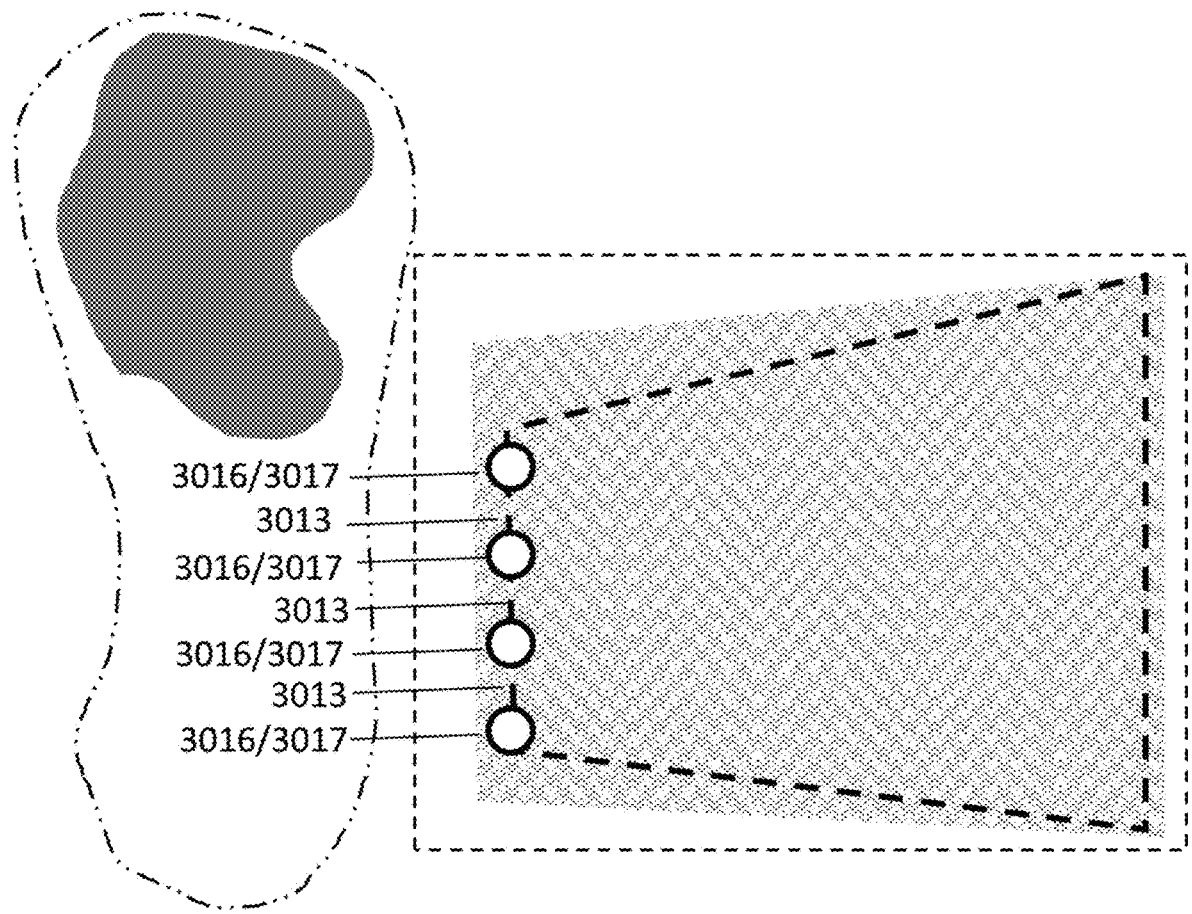
FIG. 35 is an overhead view of FIG. 34, with the addition of filter casings installed within the narrow treatment gate area, and with alternating structural wall segments with sealed engagement elements to prevent water from seeping out of the containment area, according to at least one embodiment.

FIG. 35 is an overhead view of FIG. 34, with the addition of filter casings 3016 or 3017 for either a mostly below ground or above ground installation, respectively, and installed within the relatively narrow treatment gate area, and with alternating structural wall sections 3013 with sealed engagement elements of the to prevent water from seeping out of the containment area, according to at least one embodiment.

FIG. 36A is a side elevation view of FIG. 35, showing a structural wall above 3013 and below ground 3018 for vertical support, and showing the inlet screens 3019 of the filter casing 3016 at the tapered toe slope of the compacted base fill and the outlet screens 3020 set below the ground surface, according to at least one embodiment. The backslope 3014 has been backfilled along with the side slopes (not shown).

FIG. 36B is a side elevation view of FIG. 35, showing a structural wall above 3013 and below ground 3018 for vertical support, and showing the inlet screens 3019 of the filter casing 3017 at the elevated toe slope of the compacted base fill and the outlet screens 3020 set above the ground surface, according to at least one embodiment. The backslope 3014 has been backfilled along with the side slopes (not shown).

Figure 37:
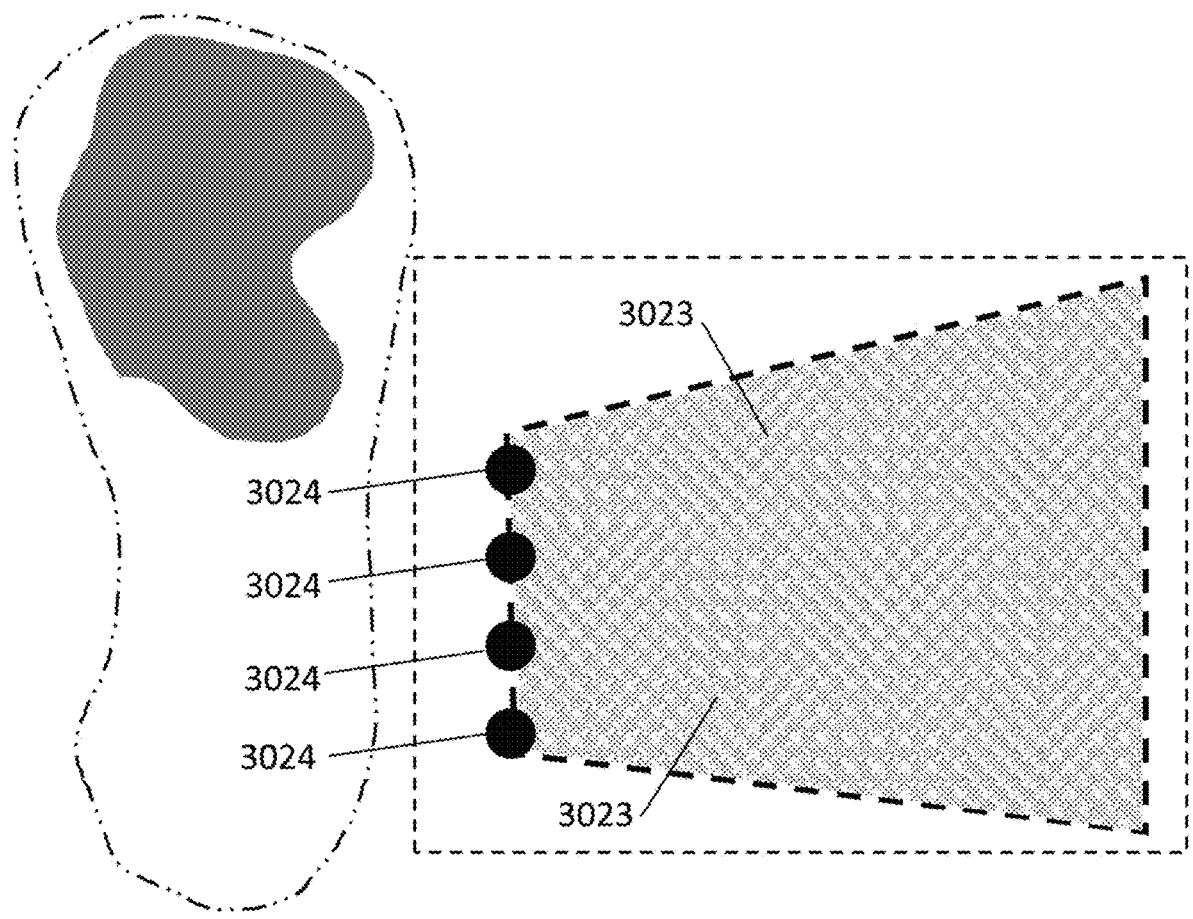
FIG. 37 is an overhead view of FIG. 35, showing the addition of an impermeable liner on top of the compacted and sloped base fill with top covers on the filter casings, according to at least one embodiment.

FIG. 37 is an overhead view of FIG. 35, showing the addition of an impermeable liner 3023 on top of the compacted and sloped base fill, extended laterally to the structural walls and filter casings, and covers 3024 installed on the tops of the filter casings, according to at least one embodiment.

FIG. 38A is a side elevation view of FIG. 37, showing the impermeable liner 3023 on the top of the compacted base fill 3007 sloped toward the upper elevation inlet screens 3019 of the filter casing at the tapered toe slope, according to at least one embodiment.

FIG. 38B is a side elevation view of FIG. 37, showing the impermeable liner 3023 on the top of the compacted base fill 3007 sloped toward the upper elevation inlet screen insets 3019 of the filter casing at the elevated toe slope, according to at least one embodiment.

FIG. 39A is a side elevation view of FIG. 38A, with the addition of gravel 3025 on top of the impermeable liner 3023 on the top of the compacted base fill 3007 sloped toward the inlet screens 3019 of the filter casing at the tapered toe slope, according to at least one embodiment.

FIG. 39B is a side elevation view of FIG. 38B, with the addition of gravel 3025 on top of the impermeable liner 3023 on the top of the compacted base fill 3007 sloped toward the inlet screens 3019 of the filter casing at the elevated toe slope, according to at least one embodiment.

Figure 40:
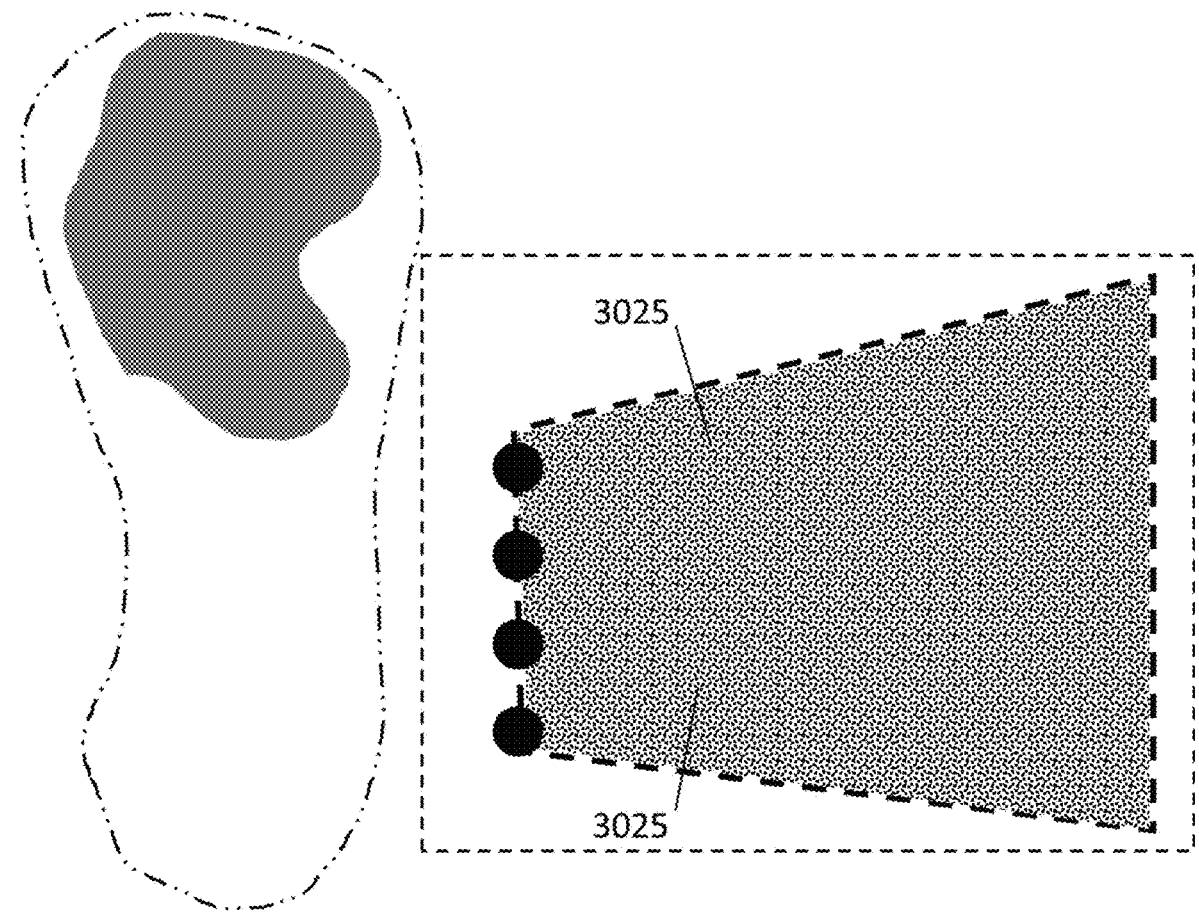
FIG. 40 is an overhead view of FIG. 37, showing the addition of gravel on top of the impermeable liner, according to at least one embodiment.

FIG. 40 is an overhead view of FIG. 37, showing the addition of gravel 3025 on top of the impermeable liner (not shown) to promote drainage from the sediment, according to at least one embodiment.

FIG. 41A is a side elevation view of FIG. 39A, showing contaminated sediment 3000 removed from the water body 3002 and emplaced 3000 in the containment area for dewatering, with lateral drainage 3026 occurring along the sloped gravel/liner interface, flowing into the filter casing 3027 installed mostly below the ground surface for treatment by contaminant-specific cartridges filled with permeable reactive materials or absorbent polymers (not shown), and discharge of treated water 3028 into the subsurface, according to at least one embodiment.

FIG. 41B is a side elevation view of FIG. 39B, showing contaminated sediment 3000 removed from the water body 3002 and emplaced 3000 in the containment area for dewatering, with lateral drainage 3026 occurring along the sloped gravel/liner interface, flowing into the above ground filter casing 3027 for treatment by contaminant-specific cartridges contaminant-specific cartridges filled with permeable reactive materials or absorbent polymers (not shown), and discharge of treated water 3028 by overland flow into the water body, according to at least one embodiment.

Figure 42:
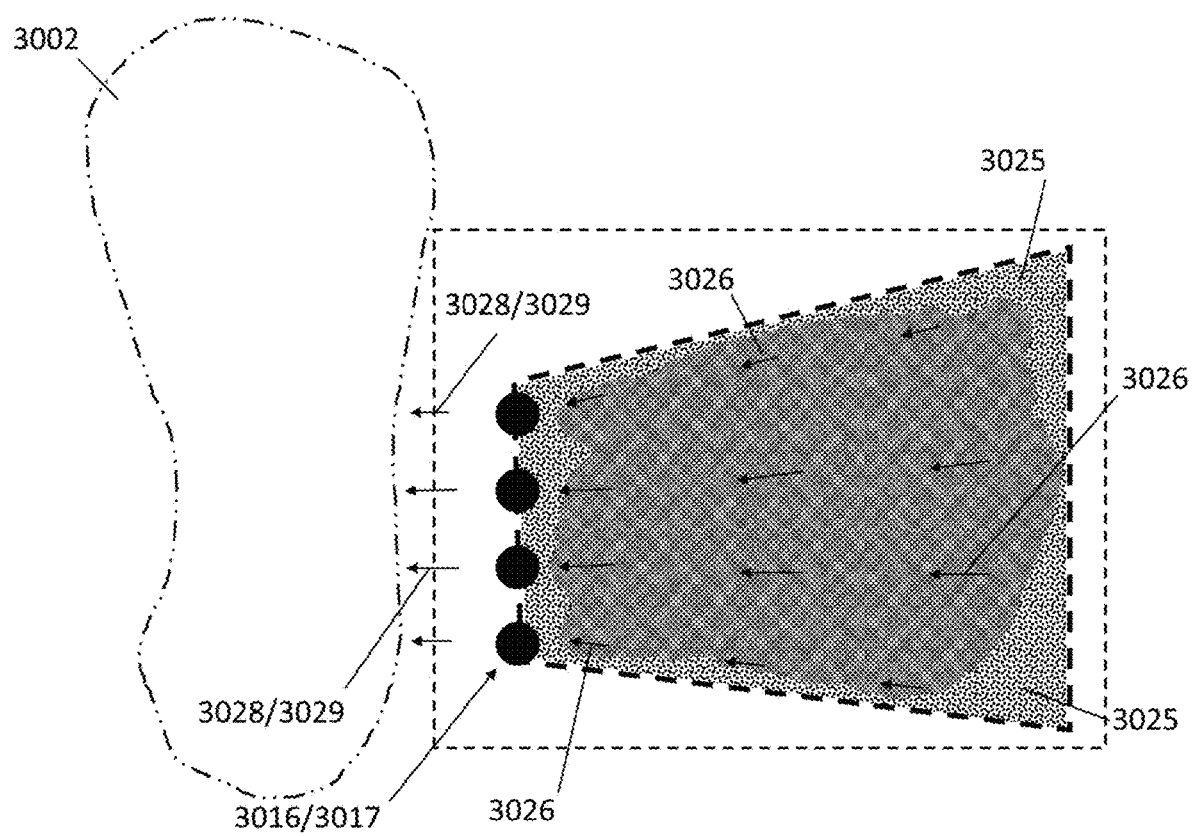
FIG. 42 is an overhead view of FIG. 41A and FIG. 41B, showing contaminated sediment in the containment area and drainage of contaminated water toward the filter casings for treatment, according to at least one embodiment.

FIG. 42 is an overhead view of FIG. 41, showing contaminated sediment 3000 emplaced in the containment area on top of the gravel 3025 and lateral drainage of sediment dewatering 3026 moving along the gravel 3025 and liner (not shown) interface into the filter casings 3016 or 3017 for treatment and discharging either in the subsurface 3028 or by overland flow 3029 into the water body, according to at least one embodiment.

Figure 43:
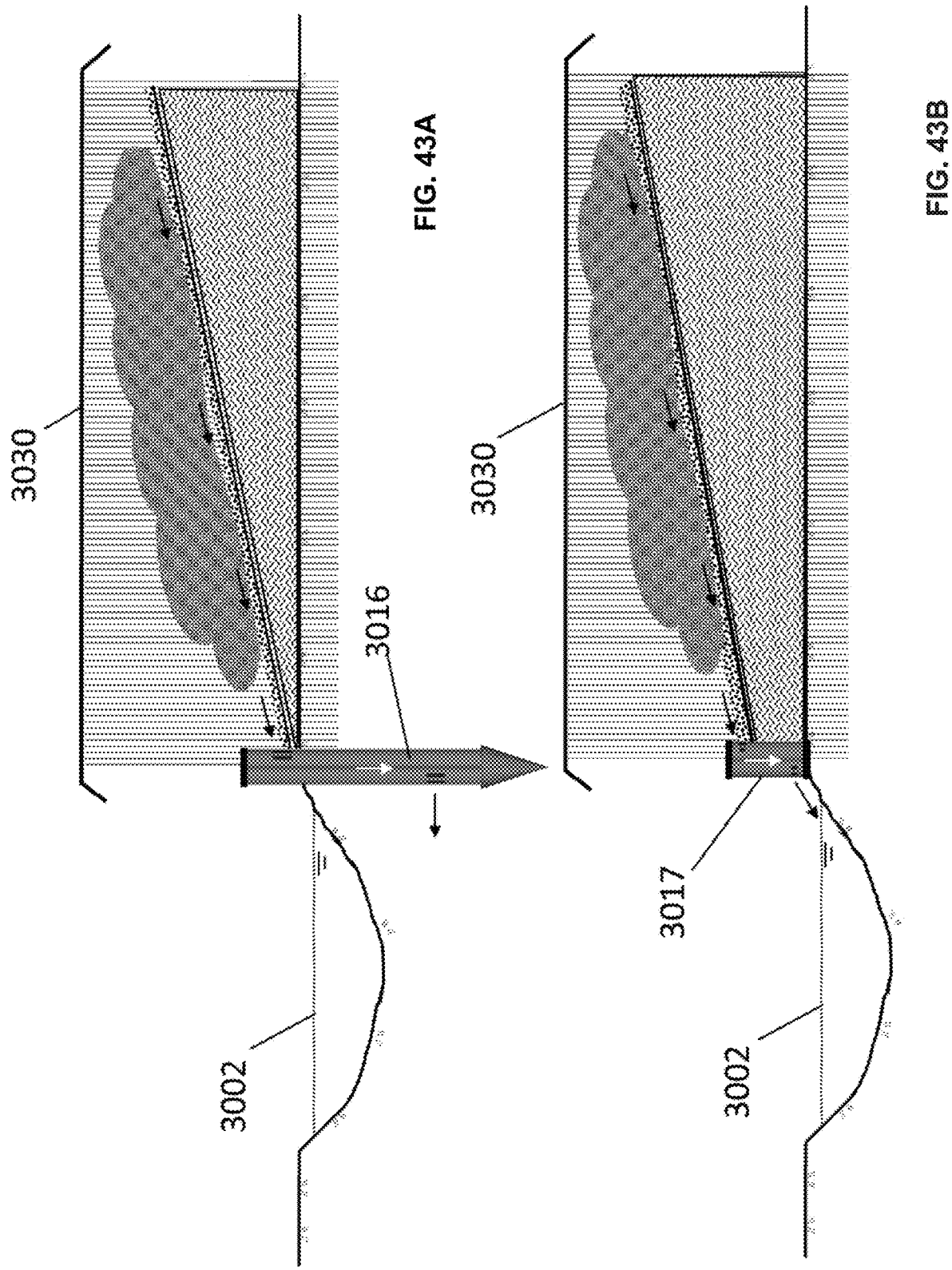
FIG. 43A is a side elevation view of FIG. 41A, showing a cover over a sediment containment area with a mostly below ground treatment system, according to at least one embodiment.
FIG. 43B is a side elevation view of FIG. 41B, showing a cover over a sediment containment area with an above ground treatment system, according to at least one embodiment.

FIG. 43A is a side elevation view of FIG. 41A, showing a cover 3030 over the containment area for a mostly below ground filter casing 3016 installation. The cover 3030 can be used to minimize rain water from entering the sediment containment area or to promote additional dewatering of the sediment by solar heating and evaporation, according to at least one embodiment.

FIG. 43B is a side elevation view of FIG. 41B, showing a cover 3030 over the containment area for an above ground filter casing 3017 installation. The cover 3030 can be used to minimize rain water from entering the sediment containment area or to promote additional dewatering of the sediment by solar heating and evaporation, according to at least one embodiment.

Figure 44:
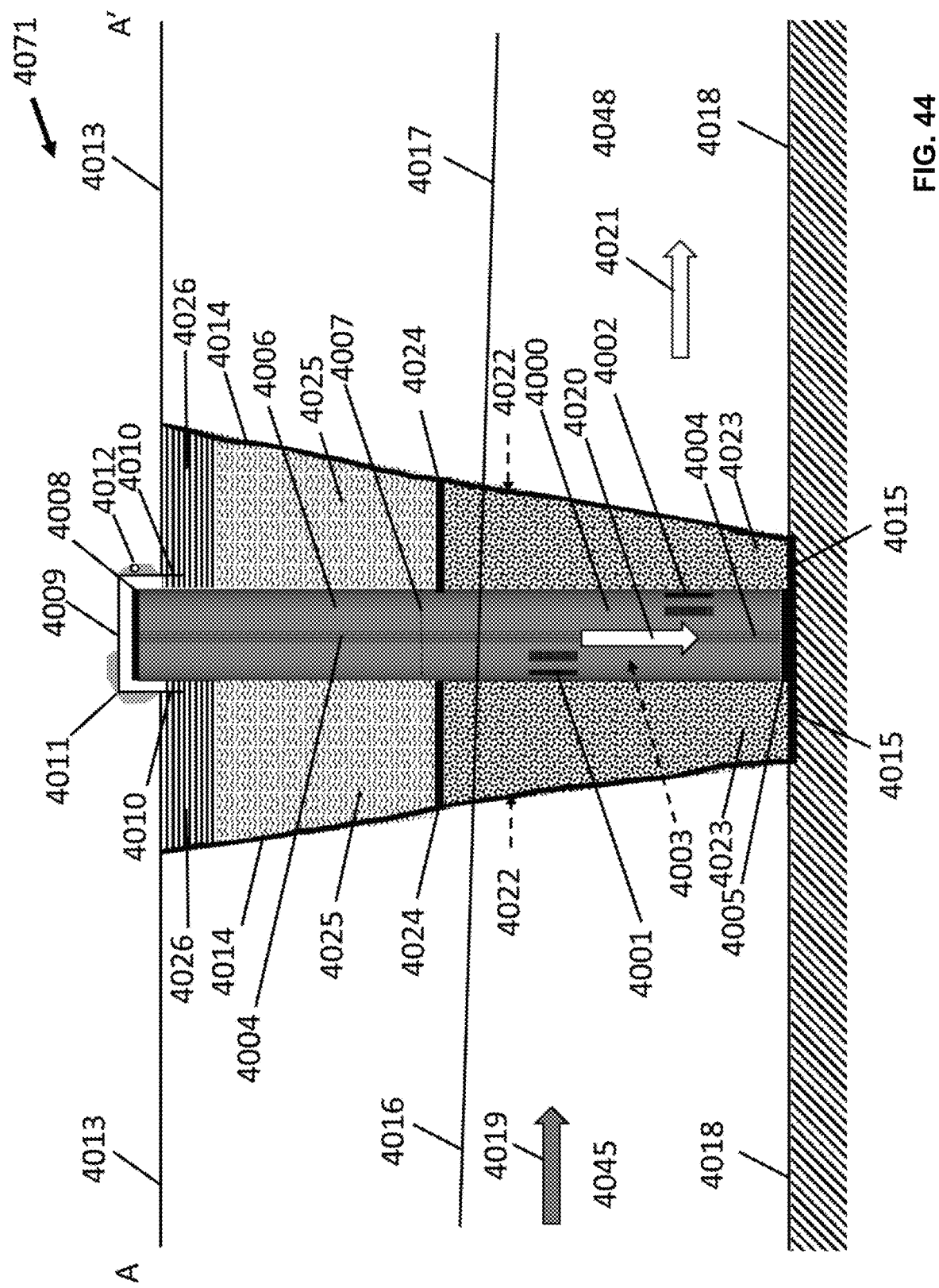
FIG. 44 is a side elevational view of an example of a trench-based groundwater-treatment system, according to at least one embodiment.
Figure 48:
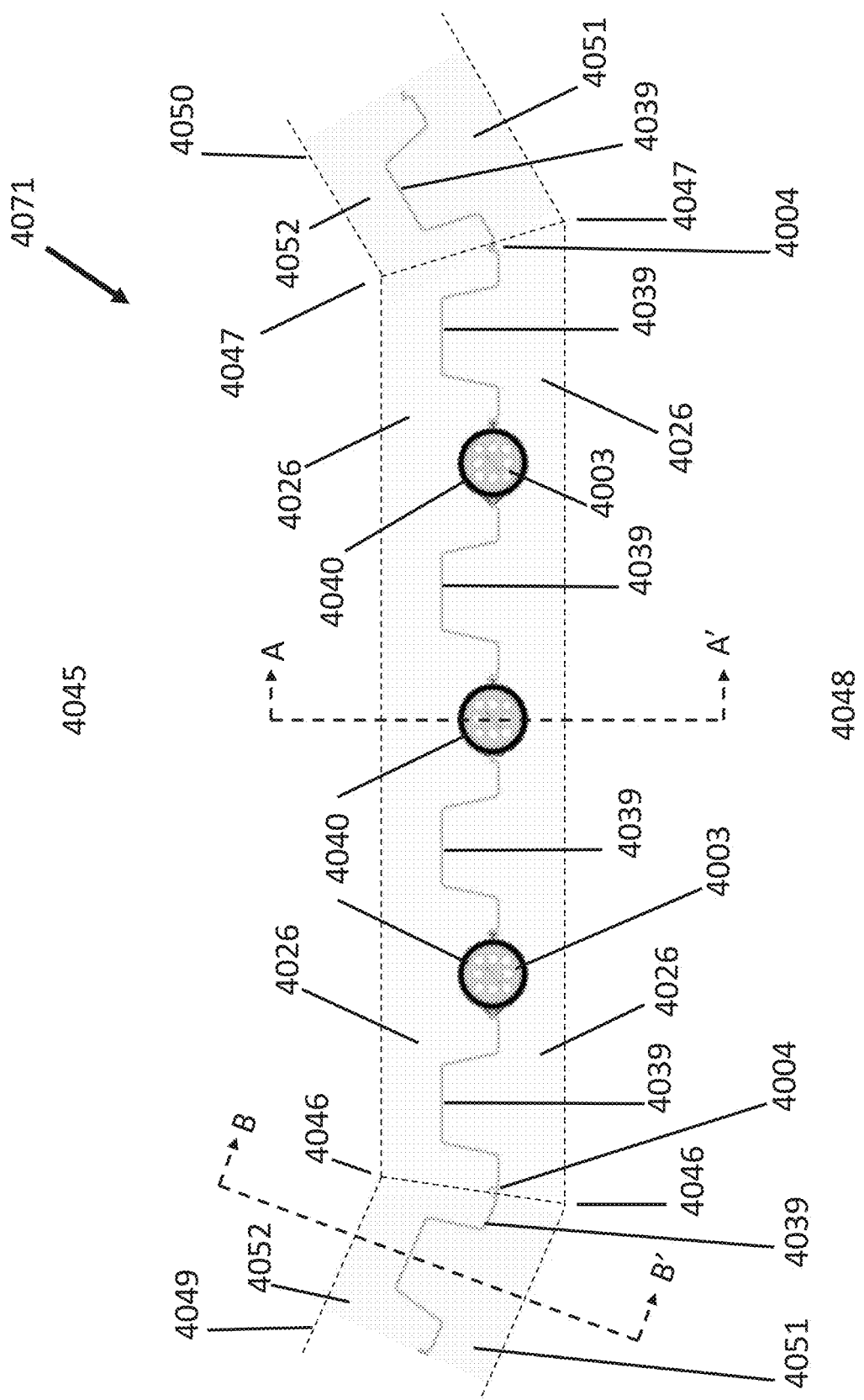
FIG. 48 is an overhead view of FIG. 44 showing an expanded alternating configuration of the treatment gate in FIG. 47 and the start of two diversion wings of an angled barrier wall made of sheet piling.

FIG. 44 is a side elevational view of an example trench-based remedial system specifically for groundwater treatment 4071, according to at least one embodiment. Refer to FIG. 48 for the location of the section line A-A' on the ground surface and the orientation of the system 4071. It may be assumed that the barrier wall 102 of FIG. 1, or similar barrier according to various embodiments, is installed with the filter casing/riser pipe pile 4000/4006.

A trench is defined as narrower in width than it is in depth. A trench represents an optimal geometry for the remedial system when excavation below the ground surface 4013 is required; however, other excavation types or geometries can be envisioned and the embodiment is therefore not limited to a trench. Other methods are also available for installing the remedial system, such as driving the components or installation in a borehole.

The ground surface 4013 shown in FIG. 44 has been excavated to form a trench with side walls 4014 and a base 4015. The trench side walls 4014 may be inclined (as shown in FIG. 44) or vertical, depending on the hydrogeologic conditions in the subsurface and the regulatory requirements for trenching (for example, depth, slopes, and/or shoring requirements) set forth by the Occupational Safety and Health Administration (OSHA) and/or related state or local safety programs.

The trench base 4015 in this example coincides with the base of the aquifer 4018. The example trench base is below a water table with a higher elevation 4016 on the upgradient side 4045 of the trench than on the downgradient side 4048 of the trench where the water table is at a lower elevation 4017.

A filter casing 4000 has both upper elevation inlet screen 4001 and lower elevation outlet screen 4002 (FIG. 44). Upper elevation inlet screen 4001 and lower elevation outlet screen 4002 are defined herein as the primary screens since secondary screens can be added to a filter casing 4000 as described in the discussion pertaining to FIG. 61 and FIG. 64 (A-I).

A liquid treatment cartridge 4003 is not shown in FIG. 44 but inside 4000 and between 4001 and 4002. A cover 4005 is secured to the bottom of the filter casing 4000. A joint 4007 is shown between the filter casing 4000 and riser pipe pile 4006; the riser pipe pile extends above the ground surface 4013. The riser pipe pile 4006 is identical to the filter casing 4000 except that riser pipe pile 4006 does not have any screens. The riser pipe pile 4006 is physically connected to the filter casing 4000 A vertical interlock connector 4004 aligns the filter casing 4000 and the riser pipe pile 4006 for connection with a sectioned barrier wall that includes multiple interlocking wall sections (not shown).

A top cover 4008 is added to the riser pipe pile 4006 in FIG. 44. A protective housing consisting of vertical walls 4010 is embedded in a concrete pad 4026. The protective housing has a lid 4009 which is hinged 4011 to the vertical walls 4010. A hasp 4012 connected to the lid 4009 and walls 4010 of the protective housing, with a hole for a lock, is used to secure the remedial system from unauthorized access.

An optional permeable liner 4022 (not shown in FIG. 44) can be placed along the trench walls (4014) before a clean, well-sorted aggregate 4023 or equivalent is filled on both sides of the trench to an elevation above the upper elevation inlet screen 4001 on both sides of the filter casing 4000. An aggregate 4023 and optional liner 4022 is extended to an elevation consistent with the expected seasonal fluctuations of the water table 4016/4017 on either the upgradient side 4045 (left side) or downgradient side 4048 (right side) of the trench.

Once an aggregate 4023 is filled to the design elevation, bentonite or a similar sealing material 4024 is added on both sides of the trench to form an expansive seal to minimize air and other fluids from entering the aggregate. A grout or similar low-permeability material 4025 is added on both sides of the trench to minimize air and other fluids from entering the aggregate. A concrete pad 4026 is added at the top of installation to support the protective housing 4010. A concrete pad 4026 can also be used in the gate area (FIG. 48) to minimize air and other fluids from infiltrating the treatment gate area.

In operation, contaminated groundwater 4019 in the aquifer flows from the upgradient side 4045 through upper elevation inlet screen 4001 and is treated during downward flow 4020 in a liquid treatment cartridge 4003 (not shown in FIG. 44) before discharging through the lower elevation outlet screen 4002 and into the aquifer 4021 on the downgradient side 4048 of the trench.

Figure 45:
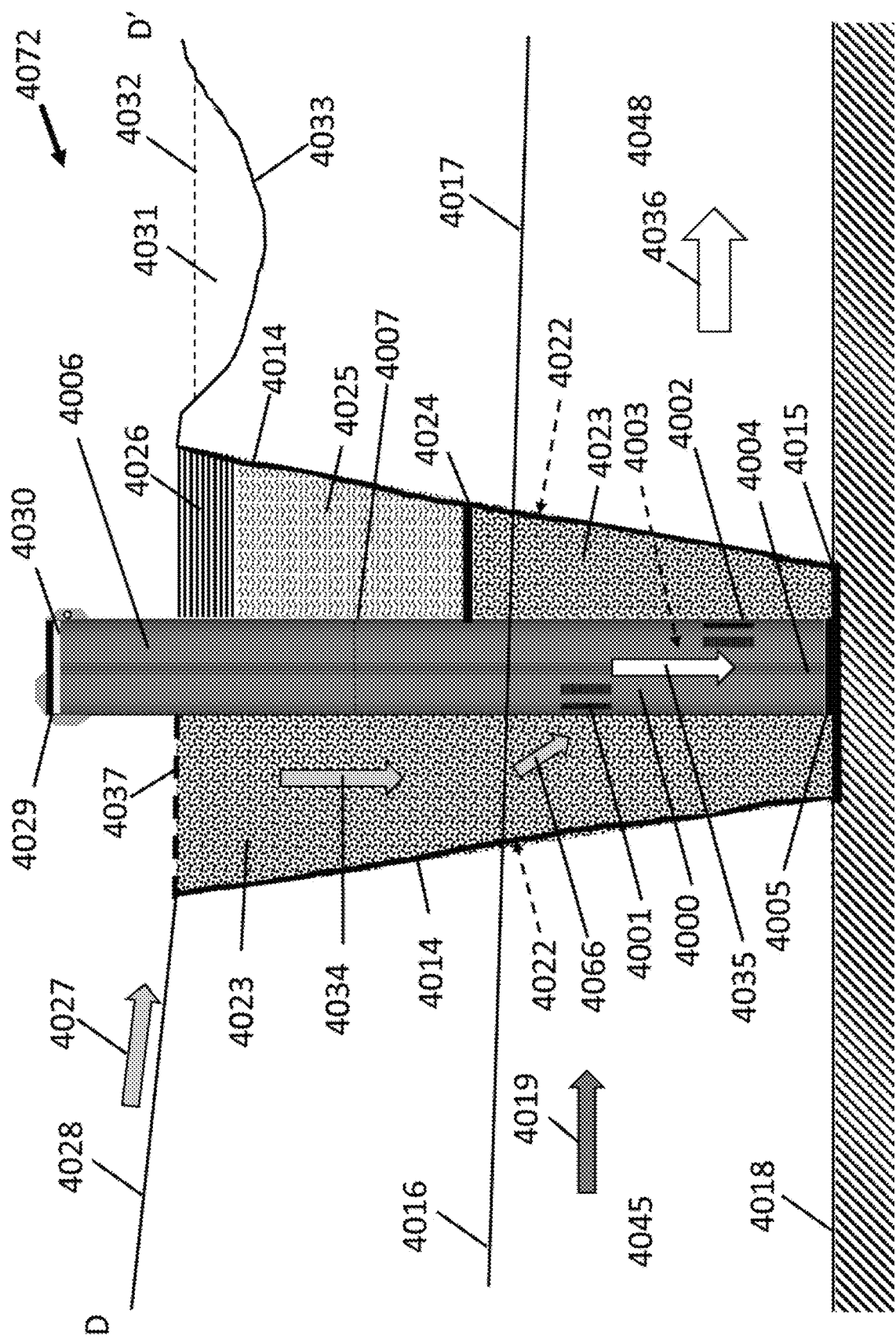
FIG. 45 is a side elevational view of an example of a combined surface water and groundwater treatment system in a trench, according to at least one embodiment.
Figure 54:
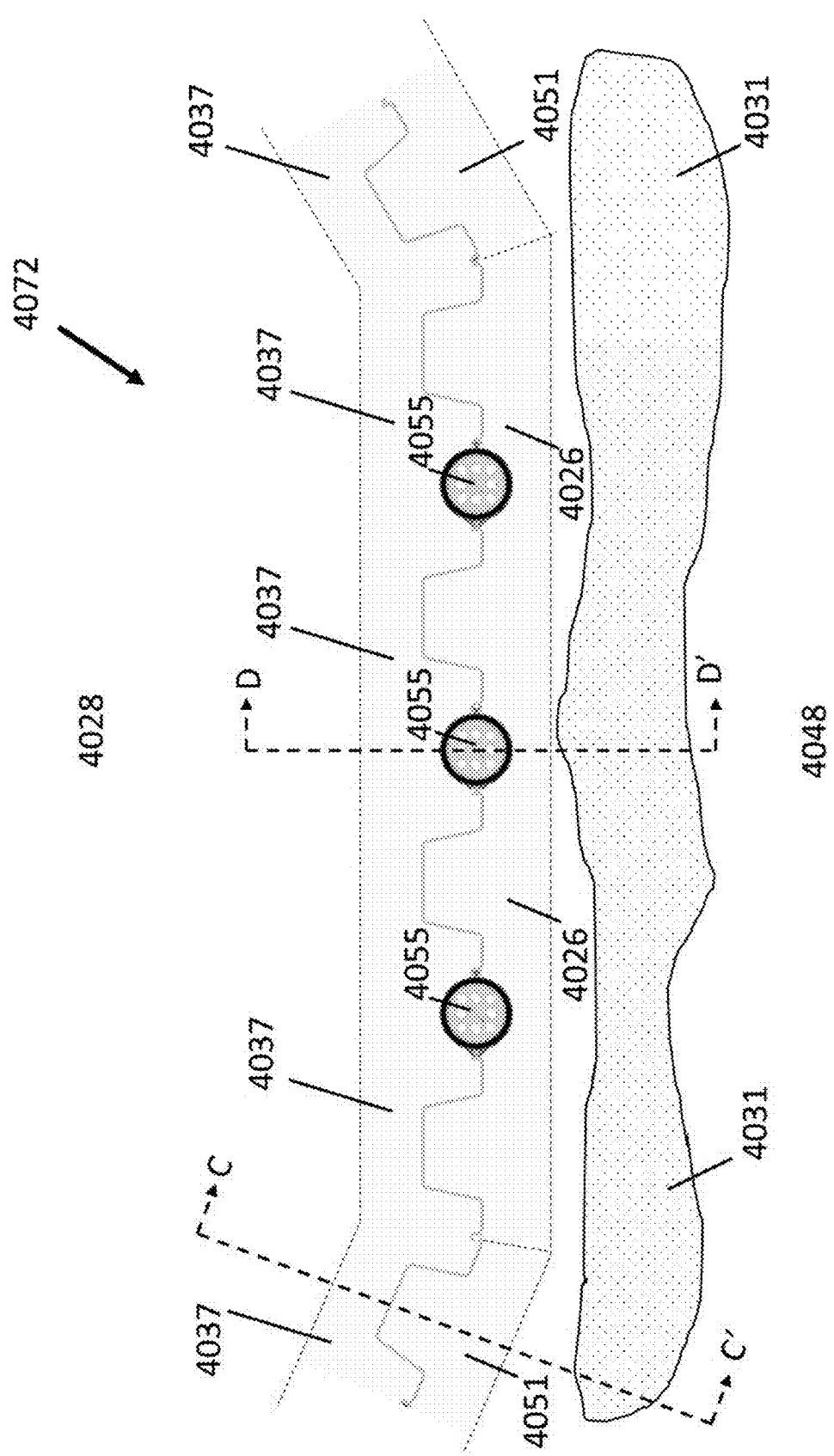
FIG. 54 is an overhead view of FIG. 45 showing all filter casings open for the combined containment and treatment of contaminated surface water and groundwater in the treatment gate.

FIG. 45 is a side elevational view of a combined surface water and groundwater treatment system in an example trench 4072, according to at least one embodiment. Refer to FIG. 54 for the location of the section line D-D' on the ground surface and the orientation of system 4072. It may be assumed that the barrier wall 102 of FIG. 1, or similar barrier according to various embodiments, is installed with the filter casing/riser pipe pile 4000/4006. In addition to significant landform differences, other important differences are apparent when comparing the example trench components of FIG. 45 with FIG. 44.

The landform in FIG. 45 includes an inclined land surface 4028 with contaminated surface water 4027 on the left of the partially in-ground treatment system 4072. A water body 4031 with a water level 4032 and bottom 4033 are present on the right side of system 4072. The trench-based remedial system 4072 has, in this example, remedial components as described in detail herein. The ground surface 4028 shown in FIG. 45 has been excavated to form a trench with side walls 4014 and a base 4015. The trench is narrower in width than it is in depth.

The trench base 4015 in this example coincides with the base of the aquifer 4018 in FIG. 45. The aquifer is formed in a saturated zone below the sloping water table 4016 to 4017 and the base 4018 of the aquifer.

A filter casing 4000 has both upper elevation inlet screen 4001 and lower elevation outlet screen 4002. A liquid treatment cartridge 4003 is not shown in FIG. 45 but inside 4000 and between 4001 and 4002. A cover 4005 is secured to the bottom of the filter casing 4000. A joint 4007 is shown in FIG. 45 between the filter casing 4000 and riser pipe pile 4006 which extends substantially above the ground surface 4028. A vertical interlock connector 4004 aligns the filter casing 4000 and the riser pipe pile 4006 for connection with a sectioned barrier wall that includes multiple interlocking wall sections (not shown in FIG. 45).

Unlike FIG. 44, the riser pipe pile 4006 shown in FIG. 45, and the barrier wall (not shown) connected to interlock 4004, extend substantially above the ground surface 4028 and the water level 4032 in the water body 4031. The purpose of the elevated riser pipe pile 4006 and barrier wall (not shown) is to minimize the potential for contaminated surface water 4027 from discharging directly into the water body 4031 and instead to divert the contaminated surface water 4027 into the in-ground treatment system 4072.

A top cover 4029 is modified to include a hinge 4011 directly attached to the riser pipe pile 4006 since there is no protective housing (as in FIG. 44). A hasp 4012 with a hole for a lock connects the top cover 4029 directly to the riser pipe pile 4006 to secure the remedial system from unauthorized access as shown in FIG. 44. Rubber or equivalent material 4030 is used to form a circular gasket between the riser pipe pile 4006 and the hinged top cover 4029 to minimize water from the adjacent water body 4031 from entering the treatment system and potentially overloading its capacity during a flood event.

An optional permeable liner 4022 (not shown in FIG. 45) can be placed along the trench walls 4014 before addition of a clean, well-sorted aggregate 4023 or equivalent is filled on both sides of the trench to an elevation above the upper elevation inlet screen 4001 of the filter casing 4000. An aggregate 4023 and optional liner 4022 on the upgradient 4045 (left side) of the combined treatment system 4072 is extended to the ground surface 4028. A permeable filter fabric or equivalent 4037 is added to the top of an aggregate on the left side. An aggregate 4023 and optional liner on the downgradient side 4048 (right side) of the trench is extended to an elevation consistent with the expected seasonal fluctuations of the water table 4017.

Once an aggregate 4023 is filled to the design elevations, bentonite or similar material 4024 is added on the right side to form an expansive seal to minimize air and other fluids from entering an aggregate. A grout or similar low-permeability material 4025 is added to the right side to minimize air and other fluids from entering an aggregate. A concrete pad 4026 is added at the top of installation on the right.

In operation, contaminated surface water 4027 flows on the inclined surface 4028 through a permeable filter or equivalent 4037, into the aggregate 4023 at the toe of the slope and vertically downward 4034 in the aggregate on the left side of the barrier wall. The surface water is diverted 4066 when it combines at the water table 4016 with contaminated groundwater 4019 on the upgradient 4045 (left side). Combined surface water and groundwater enter the upper screen 4001 and flow downward 4035 for treatment in a liquid treatment cartridge 4003 (not shown in FIG. 45) before combined discharge through the lower elevation outlet screen 4002 and into the aquifer on the downgradient side 4048 of the trench. An increase in groundwater flow 4036 results from the combined treated discharge of surface water and groundwater flow on the downgradient 4048 (right side) of the partially in-ground treatment system 4072.

Figure 46A:
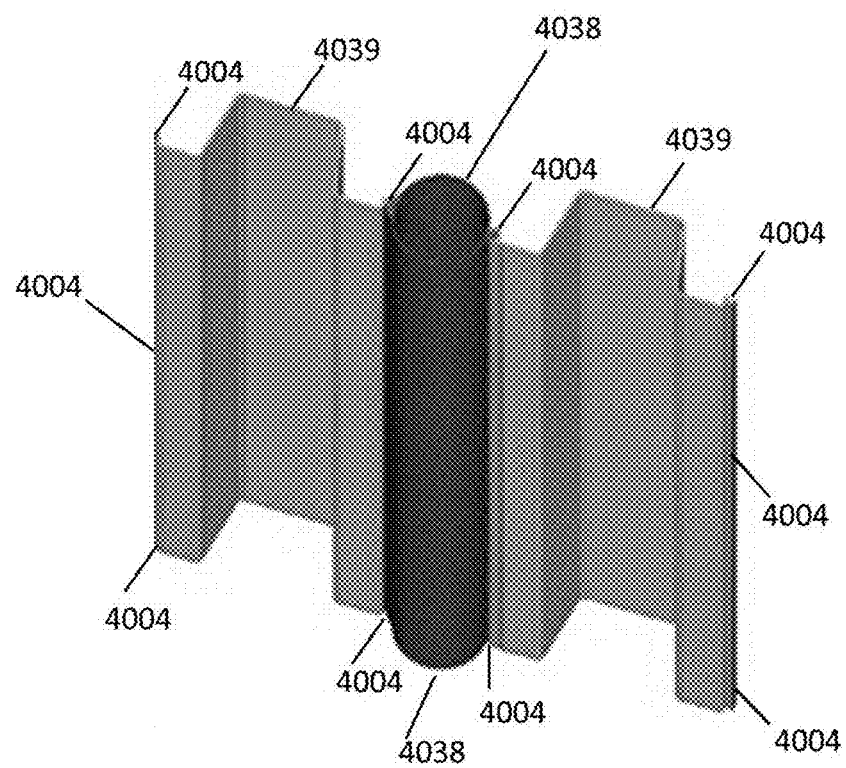
FIG. 46A is an isometric view of a filter casing among two interlocking wall sections used to form one segment of an alternating treatment gate design, according to at least one embodiment.

FIG. 46A is an isometric view of a casing 4038 (either filter casing 4000 or riser pipe pile casing 4006) among two interlocking wall sections (for example, sheet piling 4039) used with vertical interlocks 4004 to form one or more segments of an alternating treatment gate design, according to at least one embodiment.

Figure 46B:
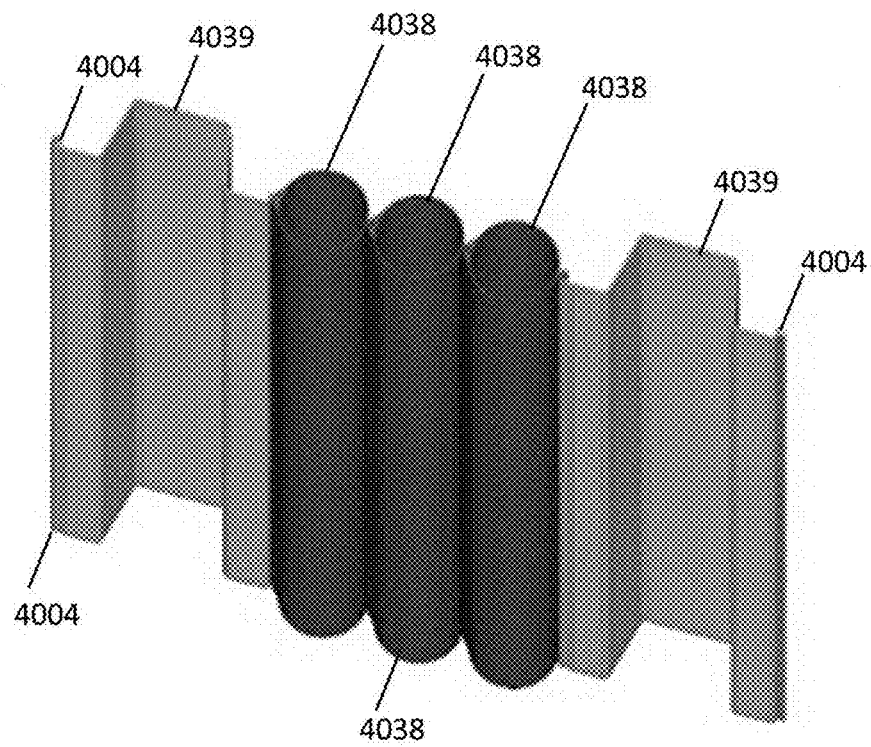
FIG. 46B is an isometric view of three interconnected filter casings among two interlocking wall sections used to form an interconnected gate design, according to at least one embodiment.

FIG. 46B is an isometric view of three interconnected casings 4038 (either filter casing 4000 or riser pipe pile casing 4006) among two interlocking wall sections (for example, sheet piling 4039) used with vertical interlocks 4004 to form one or more segments of an interconnected gate design, according to at least one embodiment.

Figure 47:
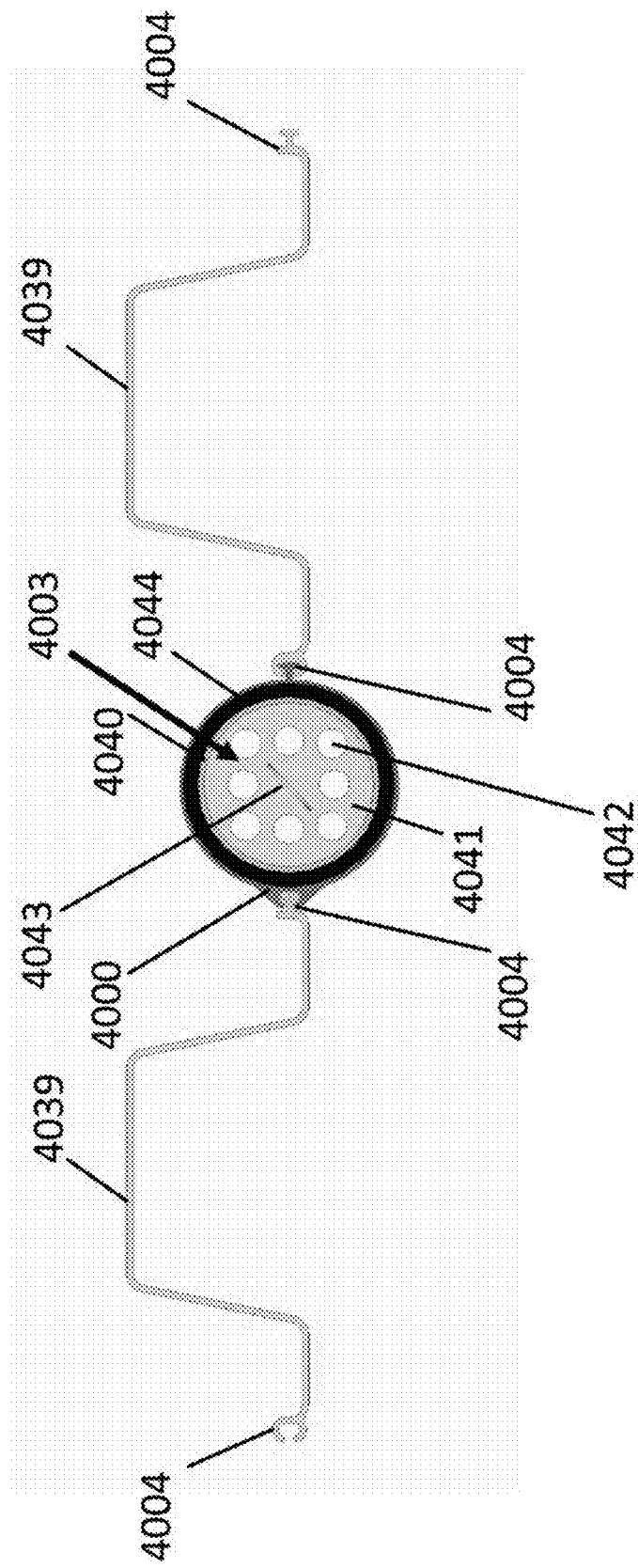
FIG. 47 is an overhead view of FIG. 46A, showing the top of a liquid treatment cartridge in the example treatment gate segment.
Figure 51:
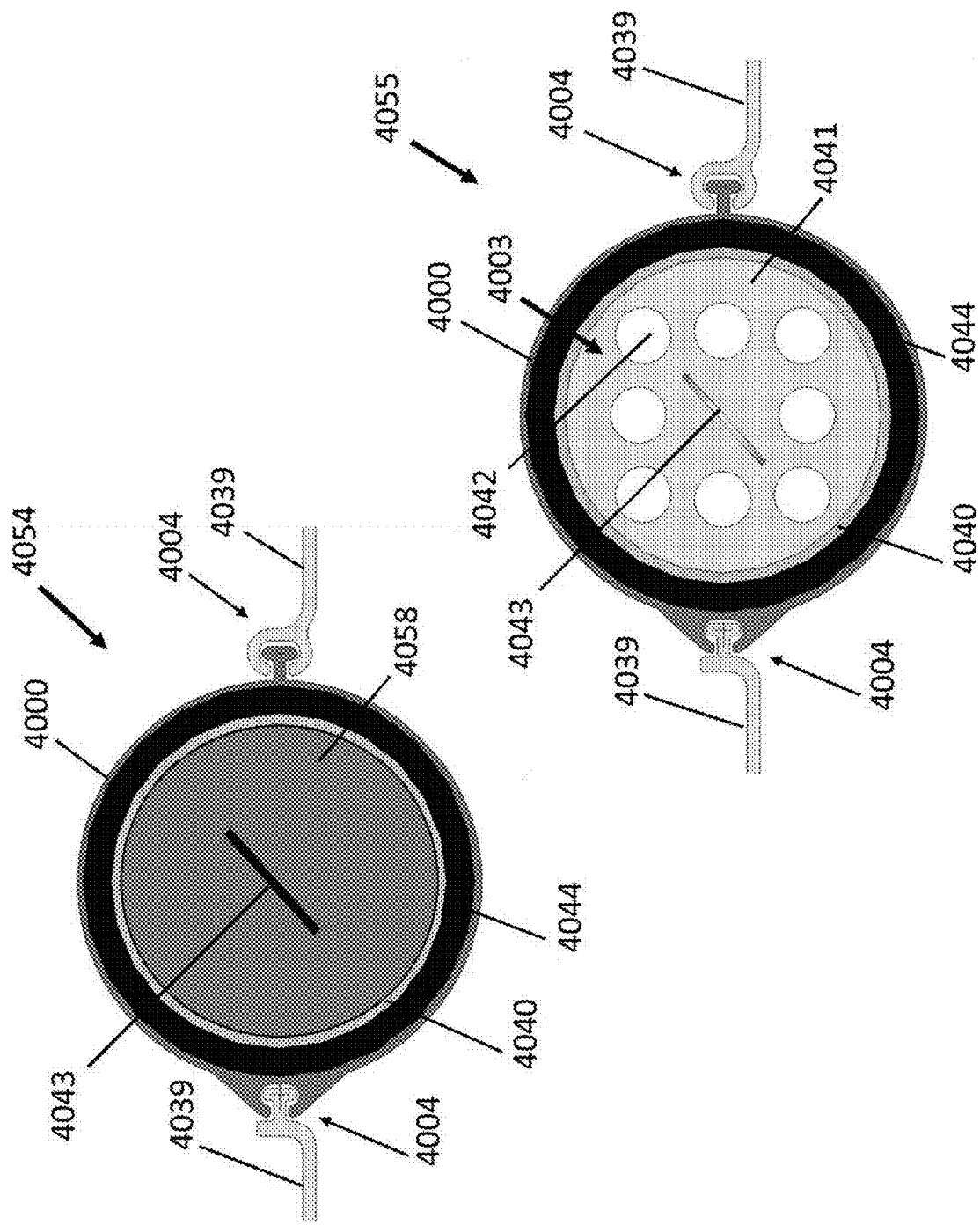
FIG. 51A is an overhead close-up view of the filter casing of FIG. 50 showing the details of a closed filter casing by use of a blank cartridge.
FIG. 51B is an overhead close-up view of the filter casing of FIG. 50 showing the details of an open filter casing by use of a liquid treatment cartridge.

FIG. 47 is an overhead view of FIG. 46A, showing the top of a liquid treatment cartridge 4003 in the alternating gate design. The cartridge casing 4040 (with a top cap 4041, perforations 4042, and lifting loop 4043) has been inserted into the filter casing 4000. The seal 4044 has filled the annular space between the inner wall of the filter casing 4000 and the outer wall of the cartridge casing 4040 to minimize contaminated liquids from bypassing treatment on the inside of the cartridge which contains PRMs or equivalent 4062 on the inside (not shown) of the liquid treatment cartridge. The filter casing 4000 is connected on both sides by vertical interlocks 4004 to two interlocking wall sections (for example, sheet piling 4039) used to form at least one segment of an alternating treatment gate design, according to at least one embodiment. Refer to FIG. 51B for a detailed view of the top of a liquid treatment cartridge.

FIG. 48 is an overhead view of FIG. 44 showing an example trench-based remedial system specifically for groundwater treatment 4071, according to at least one embodiment. The location and orientation of Section A-A' through the treatment gate that is used as the basis for FIG. 44 is shown in FIG. 48. The overhead view is at the ground surface elevation.

Although the trench shown in FIG. 48 and the following figures represents an optimal geometry for installing the remedial system in an excavation below a ground surface, including the treatment gate and the diversion wings, other geometries can be envisioned and the invention is therefore not limited to the geometry of a trench. For example, a trench could be used just for installation of the treatment gate and other methods could be used to install the diversion wings, such as driving sheet piling or the use of slurry walls.

The alternating gate design of FIG. 47 is used with two other filter casings 4040 to form a treatment gate between location 4046 and 4047 in FIG. 48. The three filter casings 4040 each contain liquid treatment cartridges 4003.

Two angled diversion wings have been initiated in the excavated trench, for example with sheet piling 4039, one on the left side of the gate starting at location 4046 and one on the right side of the gate starting at location 4047. The angles are formed by rotation of the sheet piling 4039 at the vertical interlocks 4004.

A concrete pad 4026 is shown in FIG. 48 at the land surface elevation on both upgradient 4045 and downgradient 4048 sides of the treatment gate between locations 4046 and 4047 and used to support the protective housing 4010 shown in FIG. 44 and to minimize air and other fluids from infiltrating the treatment gate area.

Figure 49:
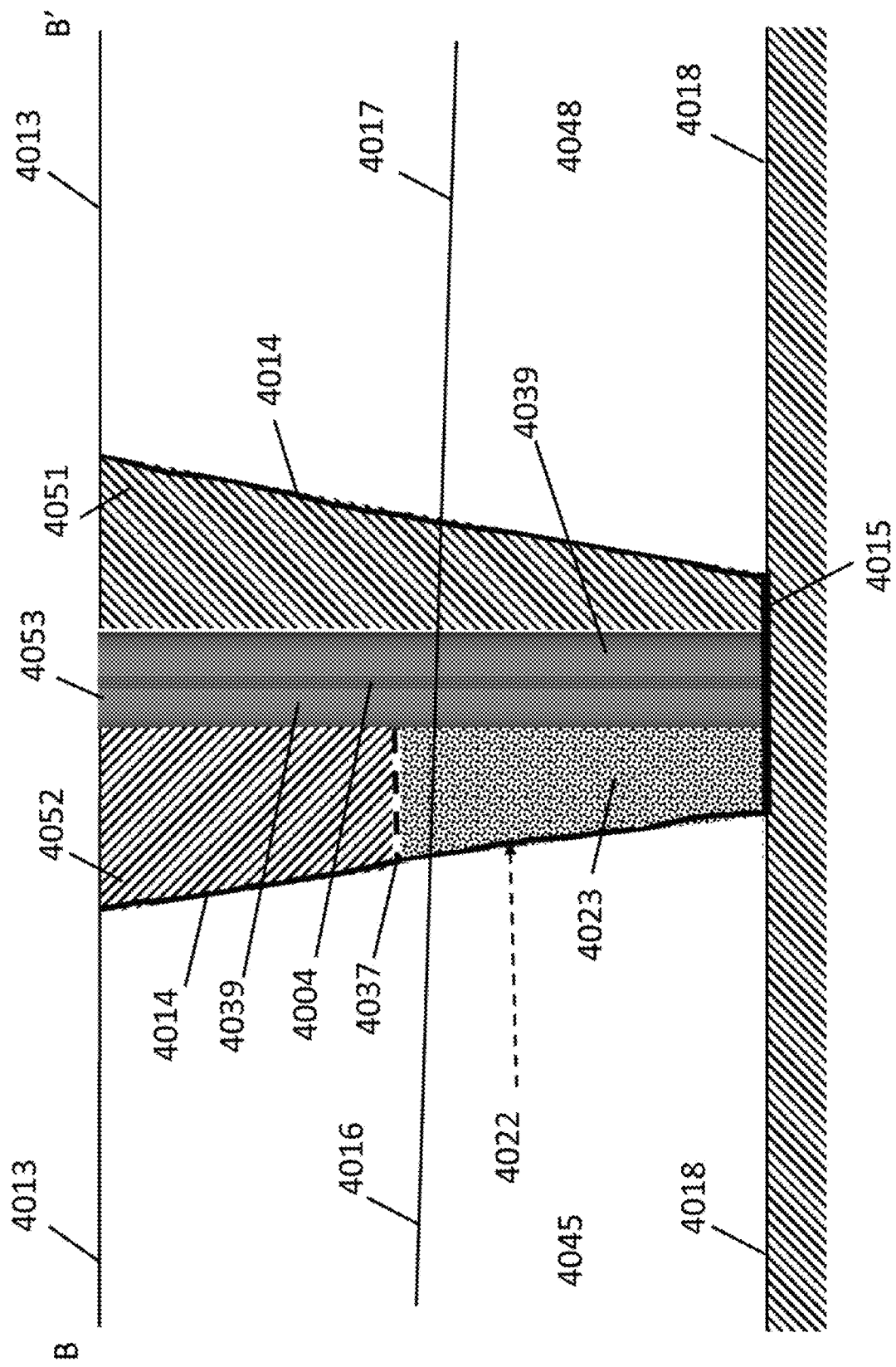
FIG. 49 is a side elevational view of FIG. 48 showing the backfill components of the upgradient and downgradient sides of the diversion wings at different elevations.

A low-permeability backfill (for example, clayey soil) 4051 is added on the downgradient side 4048 of the left wing starting at location 4046. A low-permeability backfill 4051 is also added on the downgradient side 4048 of the right wing starting at location 4047. The location and orientation of a cross section through the left wing (Section B-B' as shown in FIG. 49) is also shown in FIG. 48. As indicated in FIG. 49, the low permeability backfill 4051 on the downgradient sides of the wings extends from the bottom of the trench 4015 to the ground surface 4013.

A low-permeability backfill (for example, clayey soil) 4052 is also added on the upgradient sides 4045 of the wings, starting at location 4046 for the left wing and at location 4047 for the right wing. As described in the explanation for FIG. 49, the low-permeability backfill on the upgradient side 4045 of the wings does not extend from the land surface 4013 to the bottom of the trench 4015.

FIG. 49 is a side elevational view of FIG. 48 at section location B-B' showing the backfill components on the upgradient and downgradient sides of the left diversion wing at various elevations. In this example the diversion wing is based on sheet piling 4039 placed in a trench; however, other methods such as directly driving sheet piles without a trench or slurry walls without sheet piling may be used to construct diversion wings.

The ground surface 4013 of FIG. 49 has been excavated to form a trench with side walls 4014 and a base 4015 for installation of a diversion wing. The trench side walls 4014 may be inclined (as shown in FIG. 49) or vertical, depending on the hydrogeologic conditions in the subsurface and the regulatory requirements for trench slopes.

The trench base 4015 in this example of a diversion wing installation coincides with the base of the aquifer 4018. The example trench base is below a water table with a higher elevation 4016 on the upgradient side 4045 of the trench than on the downgradient side 4048 of the trench where the water table is at a lower elevation 4017.

Sheet piling 4039 is used in this example and is connected to the treatment gate (not shown) by the vertical interlock 4004. The sheet piling 4039 is extended from the base of the trench 4015 to the land surface 4013 and is flush with the land surface 4013 in this example.

An optional permeable liner 4022 (not shown in FIG. 49) can be placed along the upgradient 4045 trench wall 4014 before a clean, well-sorted aggregate or equivalent 4023 is filled on the upgradient side 4045. An aggregate 4023 is extended to an elevation consistent with the expected seasonal fluctuations of the water table 4016. The purpose of an aggregate 4023 on the upgradient side 4045 of the wing is to divert the contaminated groundwater in a parallel direction of the wing wall toward the treatment gate, as shown in FIG. 50.

Once an aggregate 4023 is filled to the design elevation, a filter fabric or equivalent material 4037 is added on the upgradient side of the trench. A low-permeability backfill (for example, clayey soil) 4052 is added from the top of the filter fabric 4037 to the ground surface to minimize air and other fluids from infiltrating the diversion wing area shown in FIG. 49. The low permeability backfill 4051 on the downgradient sides of the wings extends from the bottom of the trench 4015 to the ground surface 4013.

Figure 50:
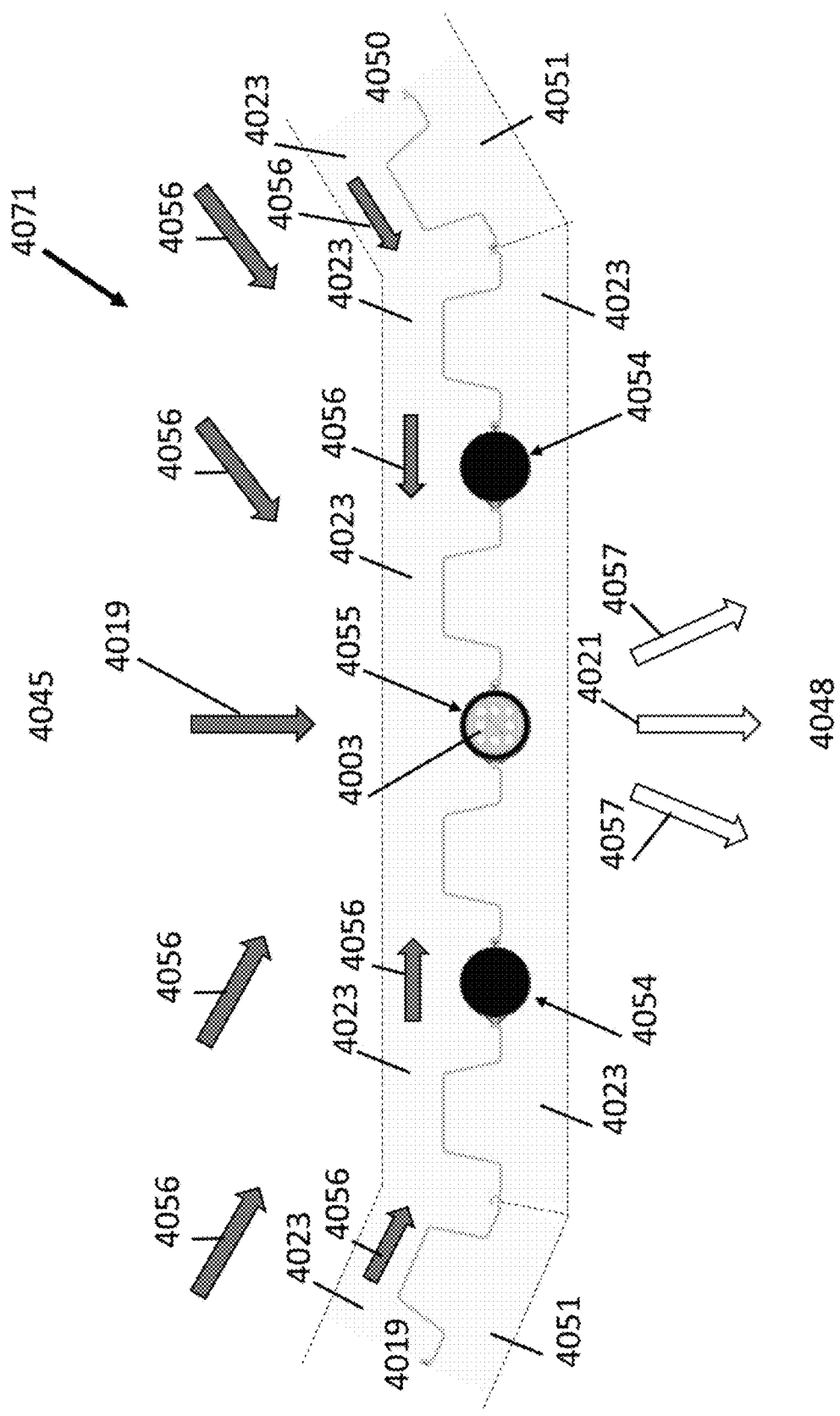
FIG. 50 is an overhead view of FIG. 48 showing two of the three filter casings in a closed position to temporarily divert groundwater flow toward the center filter casing of the treatment gate.

FIG. 50 is an overhead view of FIG. 48, an example trench-based remedial system specifically for groundwater treatment 4071 with the view elevation at the water table 4016 and 4017 shown in FIG. 44. In this example, two of the three filter casings 4000 in the gate area are closed 4054 to temporarily divert contaminated groundwater flow 4056 on the upgradient side 4045 toward the center filter casing 4055 which has a liquid treatment cartridge 4003 (i.e., representing an open position).

One purpose for temporarily diverting contaminated groundwater flow 4056 through a partially closed treatment gate would be for conducting groundwater flow measurements at the beginning of the remedial program and before opening the other two other closed filter casings 4054 (similar to the use of a weir for measuring surface water flow). Another purpose for a temporarily closed section of a treatment gate would be to collect a composite groundwater sample from the contaminated upgradient side 4045 of the aquifer. The results of a composite sample could be used to refine the design of the PRMs or equivalents in the treatment cartridges.

The diverted contaminated groundwater flow 4056 is in an aggregate 4023 on the upgradient side 4045 of both wings. Groundwater flow paths that are not diverted include 4019 on the upgradient side 4045 of the treatment gate and 4021 on the downgradient side 4048 of the treatment gate. In addition to treated and undiverted groundwater flow path 4021, treated and diverted groundwater flow paths include 4057 on the downgradient 4048 side of the treatment gate.

An aggregate 4023 is included on the downgradient side 4048 of the treatment gate as shown in FIG. 50 (view elevation at the water table 4017 of FIG. 44) and extends from the base of the trench 4015 to the seasonal high position of the water table 4017 (FIG. 44). A low-permeability backfill (for example, clayey soil) 4051 is added on the downgradient side 4048 of the wings.

FIG. 51A is an overhead view showing the details of a closed filter casing 4054 previously shown in FIG. 50 with a blank cartridge in position in the filter casing 4000. A solid top cover 4058 distinguishes the closed filter casing from the perforated top cover 4041 of the liquid treatment cartridge (FIG. 51B). Additional details include the filter casing 4000 showing the interlock connectors 4004 engaged with sheet piling 4039, the inflatable seal 4044 in an expanded position in the annular space between the inside wall of the filter casing 4000 and the outside wall of the blank cartridge casing 4040. A lifting loop 4043 is connected to the solid top cover 4058 for installing or removing the blank cartridge 4059 (shown in FIG. 52A) from the filter casing 4000.

FIG. 51B is an overhead view showing the details of an open filter casing 4055 previously shown in FIG. 50 with a liquid treatment cartridge 4003 in position in the filter casing 4000. The perforated top cover 4041 of the liquid treatment cartridge 4003 with perforations 4042 distinguishes it from the solid top cover 4058 of the closed filter casing 4054 (FIG. 51A). Additional details include the filter casing 4000 showing the interlock connectors 4004 engaged with sheet piling 4039, the inflatable seal 4044 in an expanded position in the annular space between the inside wall of the filter casing 4000 and the outside wall of the liquid treatment cartridge 4003 casing 4040. A lifting loop 4043 is connected to the perforated top cover 4041 for installing or removing the liquid treatment cartridge 4003 (shown in FIG. 52B) from the filter casing 4000.

Figure 52:
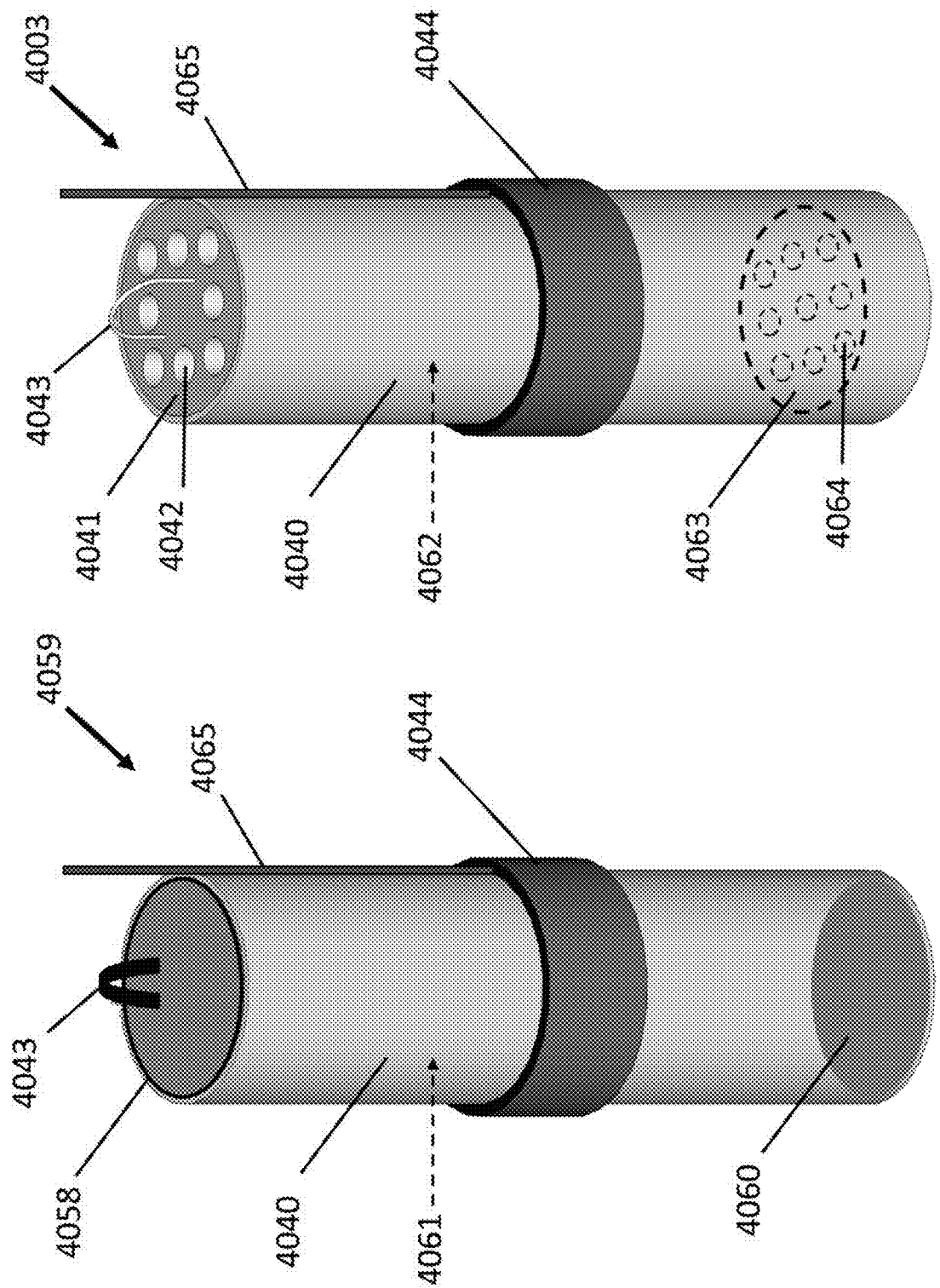
FIG. 52A is an isometric view of FIG. 51A showing a blank cartridge for closing a filter casing.
FIG. 52B is an isometric view of FIG. 51B showing a liquid treatment cartridge for an open filter casing.

FIG. 52A is an isometric view of FIG. 51A showing a blank cartridge 4059 outside of a filter casing 4000 (not shown). Details include the cartridge casing 4040 with a solid top cover 4058 and solid bottom cover 4060. The inflatable seal 4044 is in an unexpanded position and is connected to a filler tube 4065 that extends to the top of the filter casing 4000 (not shown). The inside of the blank cartridge is filled with an aggregate or equivalent 4061 (not shown) and used for weight and to avoid a buoyancy effect when entering the water table. A lifting loop 4043 is connected to the solid top cover 4058 for installing or removing the blank cartridge 4059 from the filter casing 4000 (not shown).

FIG. 52B is an isometric view of FIG. 51B showing a liquid treatment cartridge 4003 outside of a filter casing 4000 (not shown). Details include the cartridge casing 4040 with a perforated top cover 4041 with perforations 4042, and a perforated bottom cover 4063 with perforations 4064. The inflatable seal 4044 is in an unexpanded position and is connected to a filler tube 4065 that extends to the top of the filter casing 4000 (not shown). The inside of the cartridge is filled with multiple bags of different (or the same) PRMs or equivalent 4062 (not shown) compacted on the inside of the casing 4040 and used to treat contaminated groundwater, surface water or combinations of contaminated groundwater and surface water flowing vertically through the cartridge from either top to bottom or bottom to top depending on the installation. A lifting loop 4043 is connected to the perforated top cover 4041 for installing or removing the liquid treatment cartridge 4003 from the filter casing 4000 (not shown).

Figure 53:
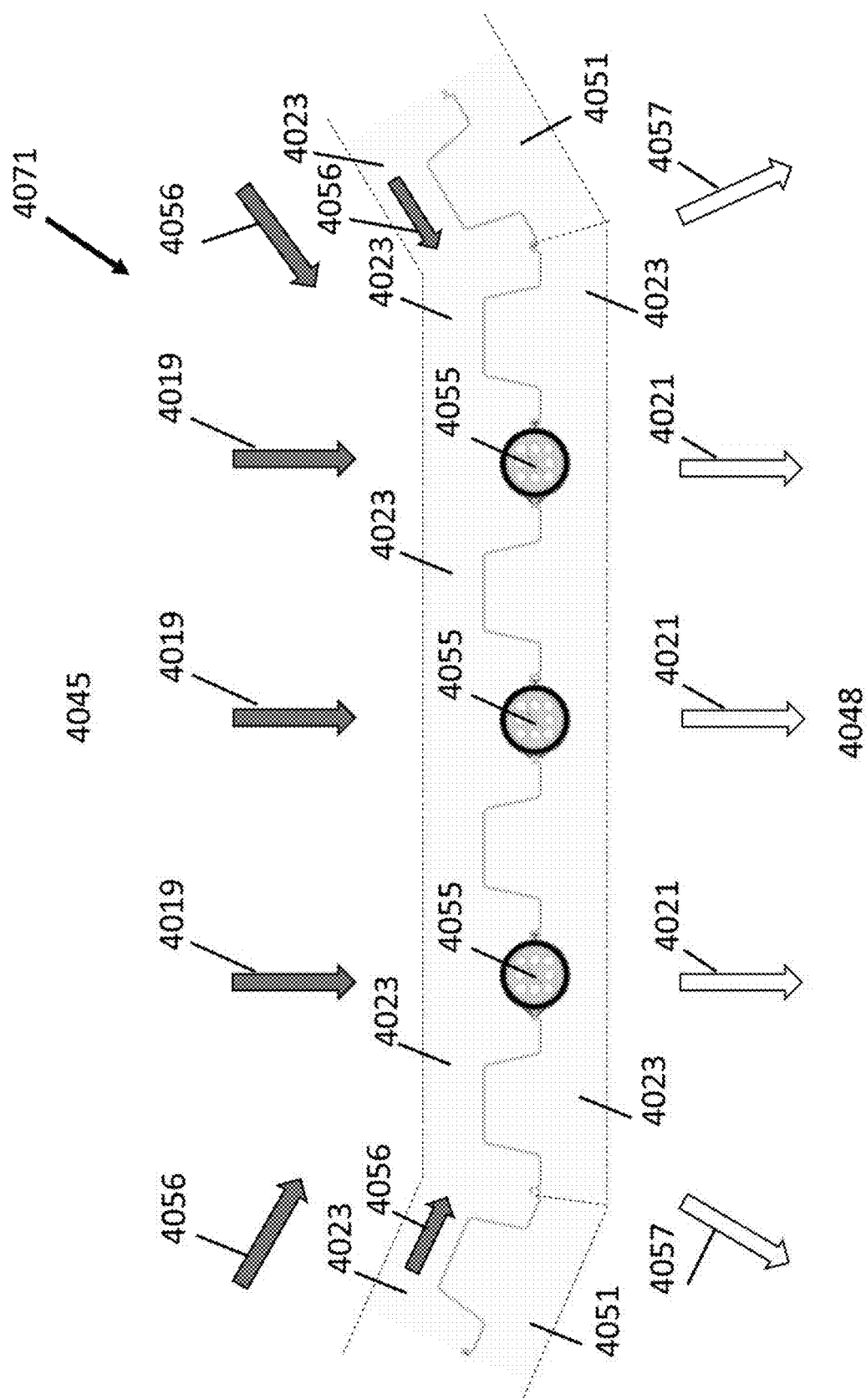
FIG. 53 is an overhead view of FIG. 50 showing all three filter casings open for the containment and treatment of contaminated groundwater in the treatment gate.

FIG. 53 is an overhead view of FIG. 50; a trench-based groundwater-treatment system 4071. The view elevation of FIG. 53 is at the water table 4016 and 4017, as shown in FIG. 44. In this example, all three filter casings 4000 in the treatment gate area are open 4055 and contaminated groundwater flows from the upgradient side 4045 through the three liquid treatment cartridges 4003 and discharges out the downgradient 4048 side of the treatment system 4071 as treated groundwater.

Direct groundwater flow paths 4019/4021 are on the upgradient and downgradient sides 4045/4048 of the treatment gate, respectively, unaffected by the diversion wings. Groundwater flow paths are diverted 4056 on the upgradient side 4045 of both wings due to the angle of the wings with respect to the treatment gate. Diverted groundwater 4056 flows within an aggregate 4023 immediately adjacent to the wings on the upgradient side 4045. Some diversion of groundwater flow is also expected on the downgradient side 4048 of the treatment gate, as shown by flow paths 4057.

An aggregate 4023 is included on the downgradient side 4048 of the treatment gate and extends from the base of the trench 4015 to the seasonal high position of the water table 4017 (FIG. 44). As shown in the elevation view of FIG. 53 at the water table 4016/4017, a low-permeability backfill (for example, clayey soil) 4051 is added on the downgradient side 4048 of the wings (extending from the base of the trench 4015 to the ground surface 4013) to minimize air and other fluids from infiltrating the trench-based remedial system specifically for groundwater treatment 4071 shown in FIG. 53.

FIG. 54 is an overhead view of FIG. 45 showing an example of a combined surface water and groundwater treatment system in a trench 4072 with the view elevation at the ground surface. The location of section line D-D' (FIG. 45) and section line C-C' (FIG. 55) is shown in FIG. 54 in addition to the orientation of the two section lines, with D' and C' on the downgradient/downhill side 4048 of the treatment gate and wing, respectively (section D-D' is through the treatment gate and section C-C' is through the diversion wing).

The landform in FIG. 54 includes an inclined land surface 4028 with contaminated surface water 4027 (not shown) flowing toward the treatment gate. A water body 4031 is present just downhill of the partially in-ground treatment system 4072. The three filter casings 4000 are in an open position 4055 and contain liquid treatment cartridges 4003. The inside of the cartridge is filled with multiple bags of different (or the same) PRMs or equivalent 4062 (not shown) compacted on the inside of the casing 4040 and used to treat a combination of contaminated surface water and groundwater in this example flowing vertically through the cartridge from top to bottom in the example installation (see FIG. 45).

A permeable filter fabric or equivalent 4037 is on the top the aggregate on the inclined surface side 4028 of the gate and the wings. A concrete pad 4026 is added on the downgradient/downhill side 4048 of the treatment gate. A low-permeability backfill (for example, clayey soil) 4051 is added on the downgradient/downhill side 4048 of the two wings.

Figure 55:
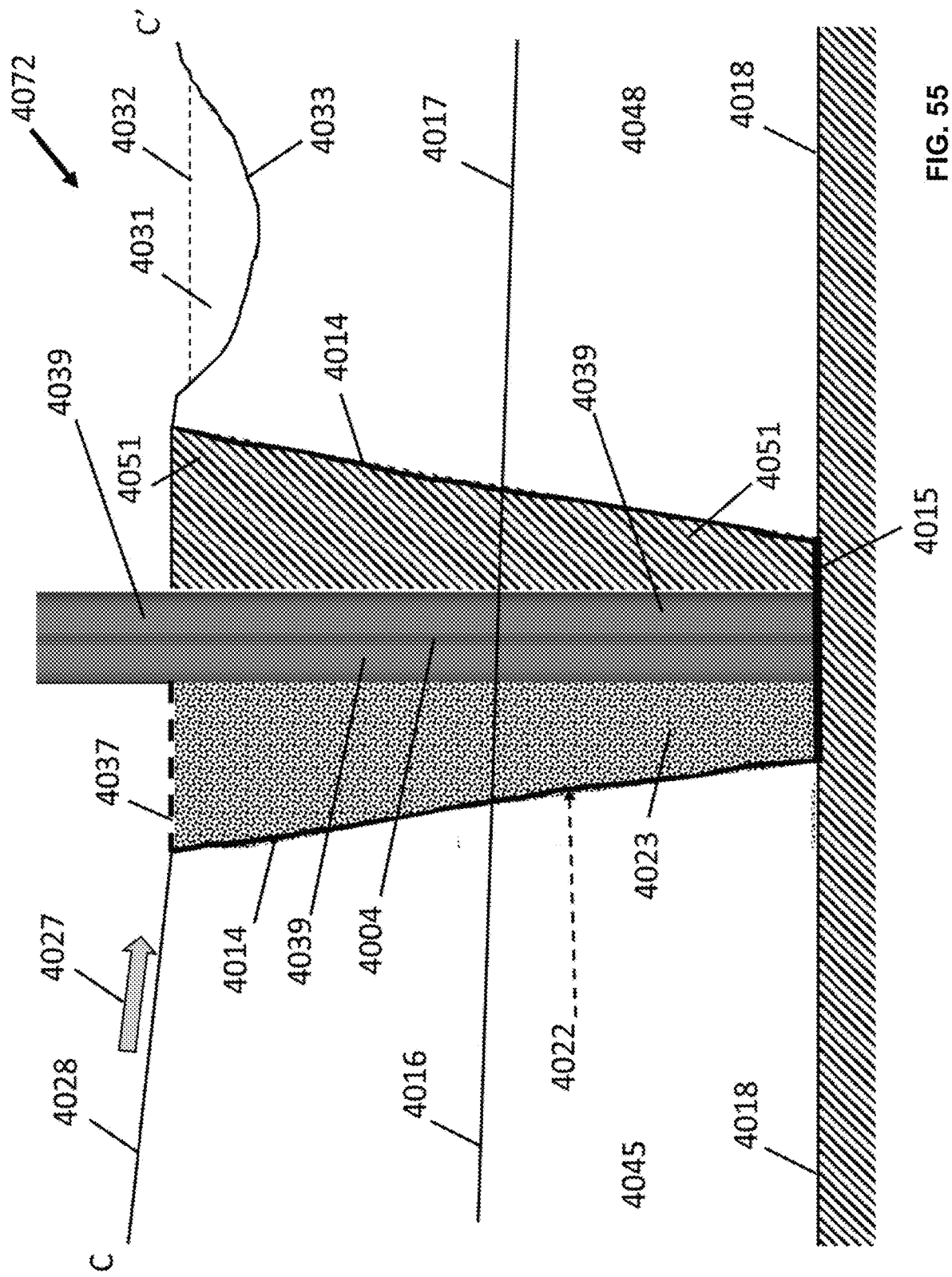
FIG. 55 is a side elevational view of FIG. 54 showing the backfill components of a diversion wing at different elevations.

FIG. 55 is a side elevational view of FIG. 54 at section location C-C' showing the backfill components of the uphill side 4028/upgradient side 4045 and downgradient/downhill side 4048 of a diversion wing at different elevations. The diversion wing in this example is composed of sheet piling 4039, which is extended substantially above ground surface. The purpose of the elevated sheet piling 4039 in the wings (and the elevated riser pipe pile 4006 in the treatment gate which is not shown) is to minimize the potential for contaminated surface water 4027 from discharging directly into the water body 4031 and instead to divert the contaminated surface water 4027 into the partially in-ground treatment system 4072. The same water body 4031 shown in FIG. 45 is shown in FIG. 55. Although this example of a diversion wing is based on sheet piling 4039 in a trench, other methods may be used to install diversion wings, such as slurry walls.

The ground surface 4028 shown in FIG. 55 has been excavated to form a trench with side walls 4014 and a base 4015. The trench side walls 4014 may be inclined (as shown in FIG. 55) or vertical, depending on the hydrogeologic conditions in the subsurface and the regulatory requirements for trench slopes.

The trench base 4015 in this example of a diversion wing installation coincides with the base of the aquifer 4018. The example trench base is below a water table with a higher elevation 4016 on the upgradient side 4045 of the trench than on the downgradient side 4048 of the trench where the water table is at a lower elevation 4017.

In this example, sheet piling 4039 is connected to the treatment gate (not shown) by the vertical interlock 4004. An optional permeable liner 4022 (not shown) can be placed along the upgradient 4045 trench wall 4014 before a clean, well-sorted aggregate or equivalent 4023 is filled on the upgradient side 4045 from the trench base 4015 to the ground surface 4028. The purpose of an aggregate 4023 on the upgradient side 4045 of the wing is to divert the contaminated surface water and groundwater toward the treatment gate.

Once an aggregate 4023 is filled from the base of the trench 4015 to the ground surface 4028, a filter fabric or equivalent material 4037 is added on the upgradient side 4045 of the wing as shown in FIG. 55 and used to minimize silt and sediment from entering the aggregate backfill 4023. A low-permeability backfill (for example, clayey soil) 4051 is added from the base of the trench 4015 to the ground surface on the downgradient/downhill side 4048 of the wing to minimize air and other fluids from infiltrating the diversion wing.

Figure 56:
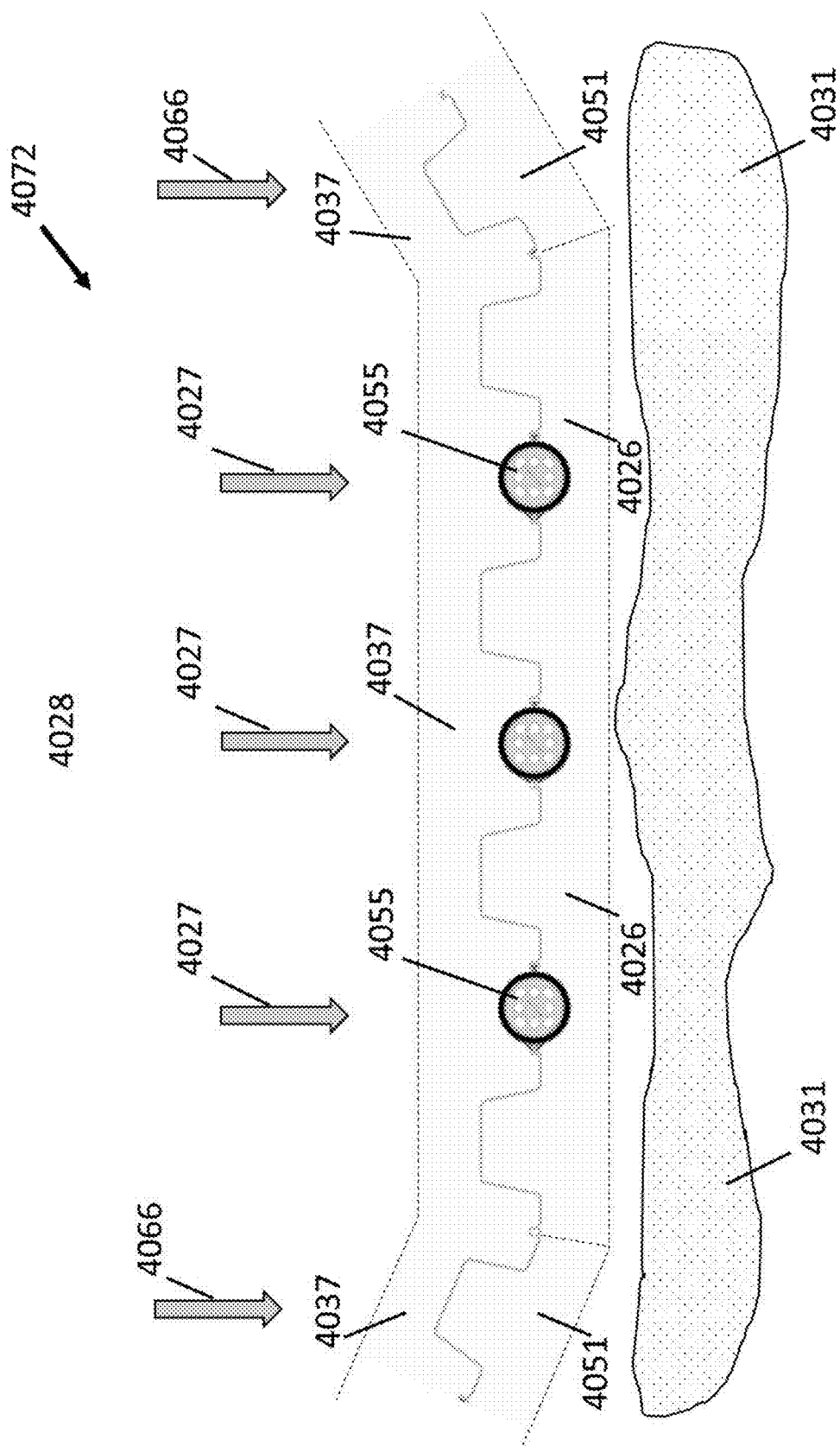
FIG. 56 is an overhead view of FIG. 54 showing contaminated surface water flowing from an upland area toward the treatment gate area.

FIG. 56 is an overhead view of FIG. 54 showing contaminated surface water flow lines in an example of a combined surface water and groundwater treatment system in a trench 4072 with the view elevation at the ground surface.

Contaminated surface water from the inclined surface 4028 flows directly 4027 toward the three open filter casings 4055 of the treatment gate. Contaminated surface water also flows directly 4066 toward the diversion wings. The contaminated surface water 4027/4066 flows through a permeable filter or equivalent 4037 and enters the aggregate 4023 (not shown at this elevation view, but directly below the filter fabric or equivalent material 4037) immediately adjacent to the treatment gate and diversion wings.

Figure 57:
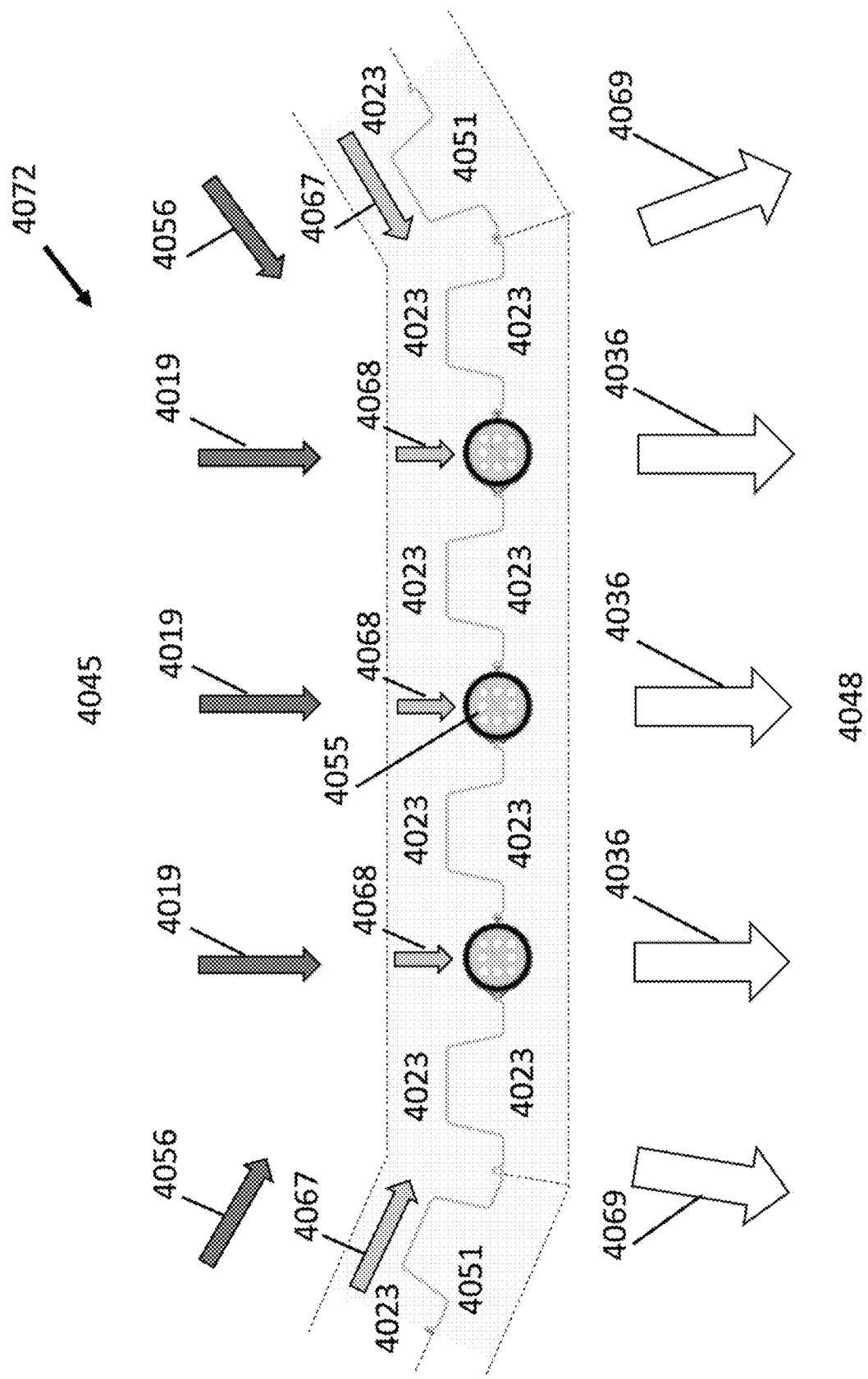
FIG. 57 is an overhead view of FIG. 45 showing all filter casings open for the combined containment and treatment of contaminated surface water and groundwater, resulting in an increased flow of groundwater downgradient of the treatment gate area.

FIG. 57 is an overhead view of FIG. 56 with the view elevation below the water table 4016/4017 of FIG. 45 showing an example of a combined surface water and groundwater treatment system in a trench 4072. Contaminated groundwater 4019 flows directly from the upgradient side 4045 into the three open filter casings 4055 that form the treatment gate. Contaminated groundwater is also diverted 4056 on the upgradient side 4045 due to the orientation of the two angled and impervious diversion wings.

Contaminated surface water that is mixed 4068 with contaminated groundwater 4019 just below the water table 4016 flows directly from the upgradient side 4045 into the three open filter casings 4055 that form the treatment gate. Contaminated surface water is also diverted 4067 once it enters the water table 4016 on the upgradient side 4045 of the diversion wings due to the angled and impervious diversion wings. The diverted surface water 4067 is mixed with diverted groundwater 4056 and flows into the three open filter casings 4055 that form the treatment gate where treatment occurs by liquid treatment cartridges 4003.

The combined containment and treatment of contaminated surface water 4068/4067 and groundwater 4019/4056 shown in FIG. 57 result in an increased flow of groundwater 4036/4069 in the aquifer on the downgradient side 4048 of the treatment gate. Some diversion of groundwater flow is also expected on the downgradient side 4048 of the treatment gate, as shown by flow paths 4069.

Figure 58:
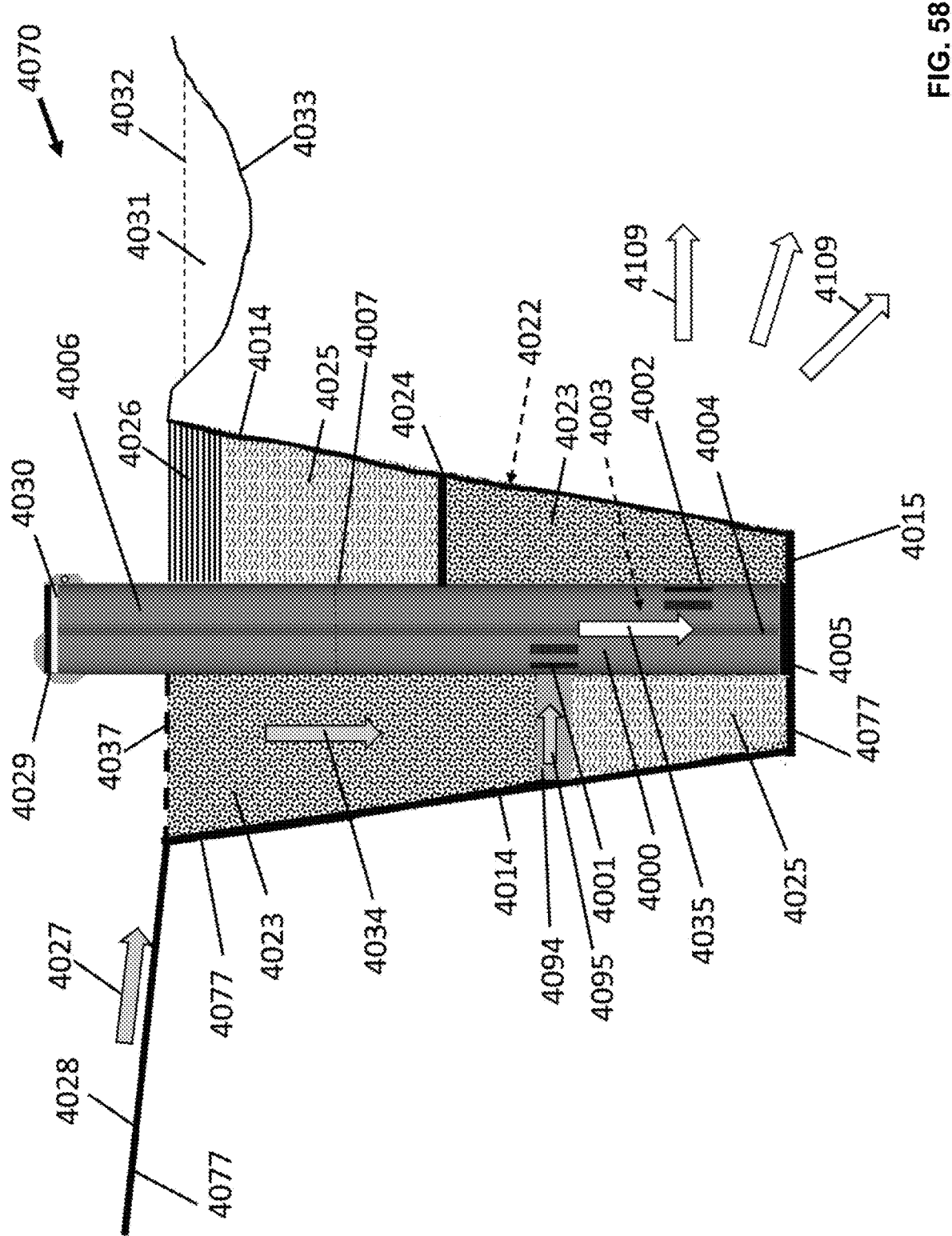
FIG. 58 is a side elevational view of a trench-based surface water-treatment system with an example of an adjacent shallow surface water body and no groundwater present within the excavated depth of the trench, according to one embodiment.

FIG. 58 is a side elevational view of a trench-based, surface water-treatment system 4070, according to at least one embodiment, with the example of an inclined ground surface 4028 and adjacent shallow surface water body 4031 but no groundwater present within the excavated depth of the trench. It may be assumed that the barrier wall 102 of FIG. 1, or similar barrier according to various embodiments, is installed with the filter casing/riser pipe pile 4000/4006.

The landform in FIG. 58 includes an inclined land surface 4028 with contaminated surface water flow 4027 on the left of the partially in-ground treatment system 4070. A water body 4031 with a water level 4032 and bottom 4033 are present on the right side of the partially in-ground treatment system 4070. The ground surface 4028 has been excavated to form a trench with side walls 4014 and a base 4015. The trench is narrower in width than it is in depth.

A filter casing 4000 has both upper elevation inlet screen 4001 and lower elevation outlet screen 4002. A liquid treatment cartridge 4003 is not shown in FIG. 58 but inside filter casing 4000 and between screens 4001 and 4002. A cover 4005 is secured to the bottom of the filter casing 4000. A joint 4007 is shown in FIG. 58 between the filter casing 4000 and riser pipe pile 4006 which extends substantially above the ground surface 4028. A vertical interlock connector 4004 aligns the filter casing 4000 and the riser pipe pile 4006 for connection with a sectioned barrier wall that includes multiple interlocking wall sections (not shown).

The riser pipe pile 4006 shown in FIG. 58, and the barrier wall (not shown) connected to interlock 4004, extend substantially above the ground surface 4028 and the water level 4032 in the water body 4031. The purpose of the elevated riser pipe pile 4006 and barrier wall (not shown) is to minimize the potential for contaminated surface water 4027 from discharging directly into the water body 4031 and instead to divert the contaminated surface water 4027 into the in-ground treatment system 4070.

A top cover 4029 is modified to include a hinge 4011 directly attached to the riser pipe pile 4006. A hasp 4012 with a hole for a lock connects the top cover 4029 directly to the riser pipe pile 4006 to secure the remedial system from unauthorized access. Rubber or equivalent material 4030 is used to form a circular gasket between the riser pipe pile 4006 and the hinged top cover 4029 to minimize water from adjacent water body 4031 from entering the treatment system and potentially overloading its capacity during a flood event.

An impermeable liner 4077 is placed along the trench bottom 4015, trench wall 4014, and extended to cover a portion of the ground surface 4028 on the left side of the treatment system 4070. A grout or equivalent low-permeability material is added on the left side of the treatment system 4070 but below the intake screen 4001. A clean, well-sorted aggregate 4023 or equivalent is filled from the grout to the land surface 4028 on the left side of the treatment system 4070 and an aggregate is covered with a permeable filter fabric 4037 or equivalent to minimize the introduction of silt or sediment into the aggregate.

On the right side of the treatment system an optional permeable liner 4022 can be added on the trench bottom 4015 and portion of the trench wall 4014 to a design elevation (not shown). Once an aggregate 4023 is filled to a design elevation on the right side of the treatment system 4070, bentonite or similar material 4024 is added to form an expansive seal to minimize air and other fluids from entering the aggregate. A grout or similar low-permeability material 4025 is added to the right side to minimize air and other fluids from entering the aggregate. A concrete pad 4026 is added at the top of installation on the right.

In operation, contaminated surface water 4027 flows on the inclined surface 4028 through a permeable filter or equivalent 4037 and into the aggregate 4023 at the toe of the slope and vertically downward 4034 in the aggregate on the left side of the barrier wall. The surface water is diverted 4066 into the upper elevation inlet screen 4001 once the water level rises on the grout 4025 to the inlet screen.

Once contaminated surface water enters the upper inlet screen 4001 it flows downward 4035 for treatment in a liquid treatment cartridge 4003 (not shown in FIG. 58) before discharge through the lower elevation outlet screen 4002. The surface water discharges 4109 into the unsaturated zone below the base 4033 of the water body 4031 in this example.

Figure 59:
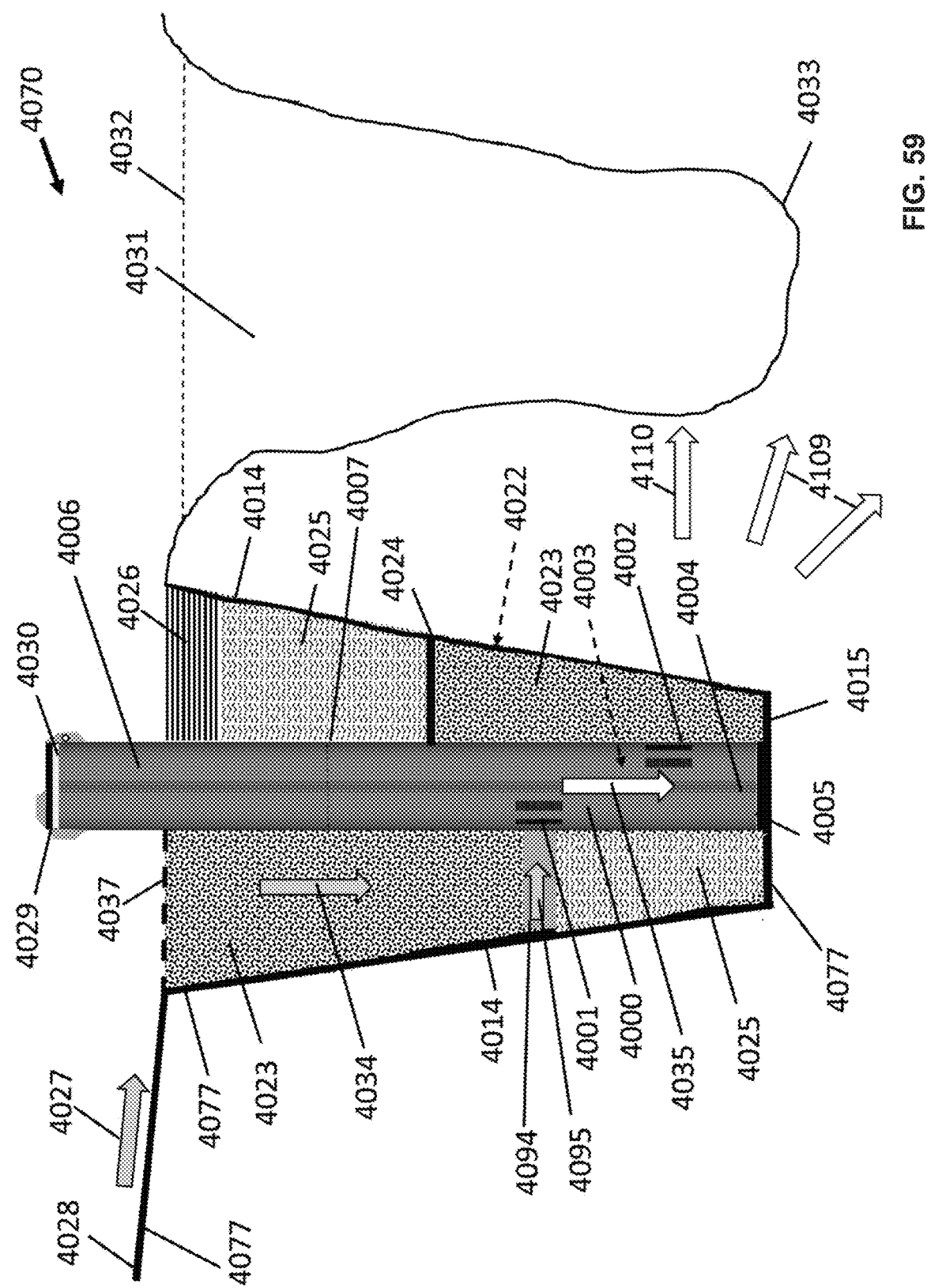
FIG. 59 is a side elevational view of a trench-based surface water-treatment system with an example of an adjacent deep surface water body and no groundwater present within the excavated depth of the trench, according to one embodiment.

FIG. 59 is a side elevational view of a trench-based, surface water-treatment system 4070, according to at least one embodiment, with the example of an inclined ground surface 4028 and adjacent deep surface water body 4031 but no groundwater present within the excavated depth of the trench. It may be assumed that the barrier wall 102 of FIG. 1, or similar barrier according to various embodiments, is installed with the filter casing/riser pipe pile 4000/4006.

The landform in FIG. 59 includes an inclined land surface 4028 with contaminated surface water 4027 on the left of the partially in-ground treatment system 4070. A water body 4031 with a water level 4032 and deep bottom 4033 are present on the right side of the partially in-ground treatment system 4070. The ground surface 4028 has been excavated to form a trench with side walls 4014 and a base 4015. The trench is narrower in width than it is in depth.

A filter casing 4000 has both upper elevation inlet screen 4001 and lower elevation outlet screen 4002. A liquid treatment cartridge 4003 is not shown in FIG. 59 but inside filter casing 4000 and between screens 4001 and 4002. A cover 4005 is secured to the bottom of the filter casing 4000. A joint 4007 is shown in FIG. 59 between the filter casing 4000 and riser pipe pile 4006 which extends substantially above the ground surface 4028. A vertical interlock connector 4004 aligns the filter casing 4000 and the riser pipe pile 4006 for connection with a sectioned barrier wall that includes multiple interlocking wall sections (not shown).

The riser pipe pile 4006 shown in FIG. 59, and the barrier wall (not shown) connected to interlock 4004, extend substantially above the ground surface 4028 and the water level 4032 in the water body 4031. The purpose of the elevated riser pipe pile 4006 and barrier wall (not shown) is to minimize the potential for contaminated surface water 4027 from discharging directly into the water body 4031 and instead to divert the contaminated surface water 4027 into the in-ground treatment system 4070.

A top cover 4029 is modified to include a hinge 4011 directly attached to the riser pipe pile 4006. A hasp 4012 with a hole for a lock connects the top cover 4029 directly to the riser pipe pile 4006 to secure the remedial system from unauthorized access. Rubber or equivalent material 4030 is used to form a circular gasket between the riser pipe pile 4006 and the hinged top cover 4029 to minimize water from adjacent water body 4031 from entering the treatment system and potentially overloading its capacity during a flood event.

An impermeable liner 4077 is placed along the trench bottom 4015, trench wall 4014, and extended to cover a portion of the ground surface 4028 on the left side of the treatment system 4070. A grout or equivalent low-permeability material is added on the left side of the treatment system 4070 but below the intake screen 4001. A clean, well-sorted aggregate 4023 or equivalent is filled from the grout to the land surface 4028 on the left side of the treatment system 4070 and an aggregate is covered with a permeable filter fabric 4037 or equivalent to minimize the introduction of silt or sediment into the aggregate.

On the right side of the treatment system an optional permeable liner 4022 can be added on the trench bottom 4015 and portion of the trench wall 4014 to a design elevation (not shown). Once an aggregate 4023 is filled to a design elevation on the right side of the treatment system 4070, bentonite or similar material 4024 is added to form an expansive seal to minimize air and other fluids from entering the aggregate. A grout or similar low-permeability material 4025 is added to the right side to minimize air and other fluids from entering the aggregate. A concrete pad 4026 is added at the top of installation on the right.

In operation, contaminated surface water 4027 flows on the inclined surface 4028 through a permeable filter or equivalent 4037 and into the aggregate 4023 at the toe of the slope and vertically downward 4034 in the aggregate on the left side of the barrier wall. The surface water is diverted 4066 into the upper elevation inlet screen 4001 once the water level rises on the grout to the inlet screen.

Once contaminated surface water enters the upper inlet screen 4001 it flows downward 4035 for treatment in a liquid treatment cartridge 4003 (not shown in FIG. 59) before discharge through the lower elevation outlet screen 4002. The treated surface water discharges 4109 into the unsaturated zone; some treated surface water may also discharge 4110 into the adjacent water body 4031 in this example.

Figure 60:
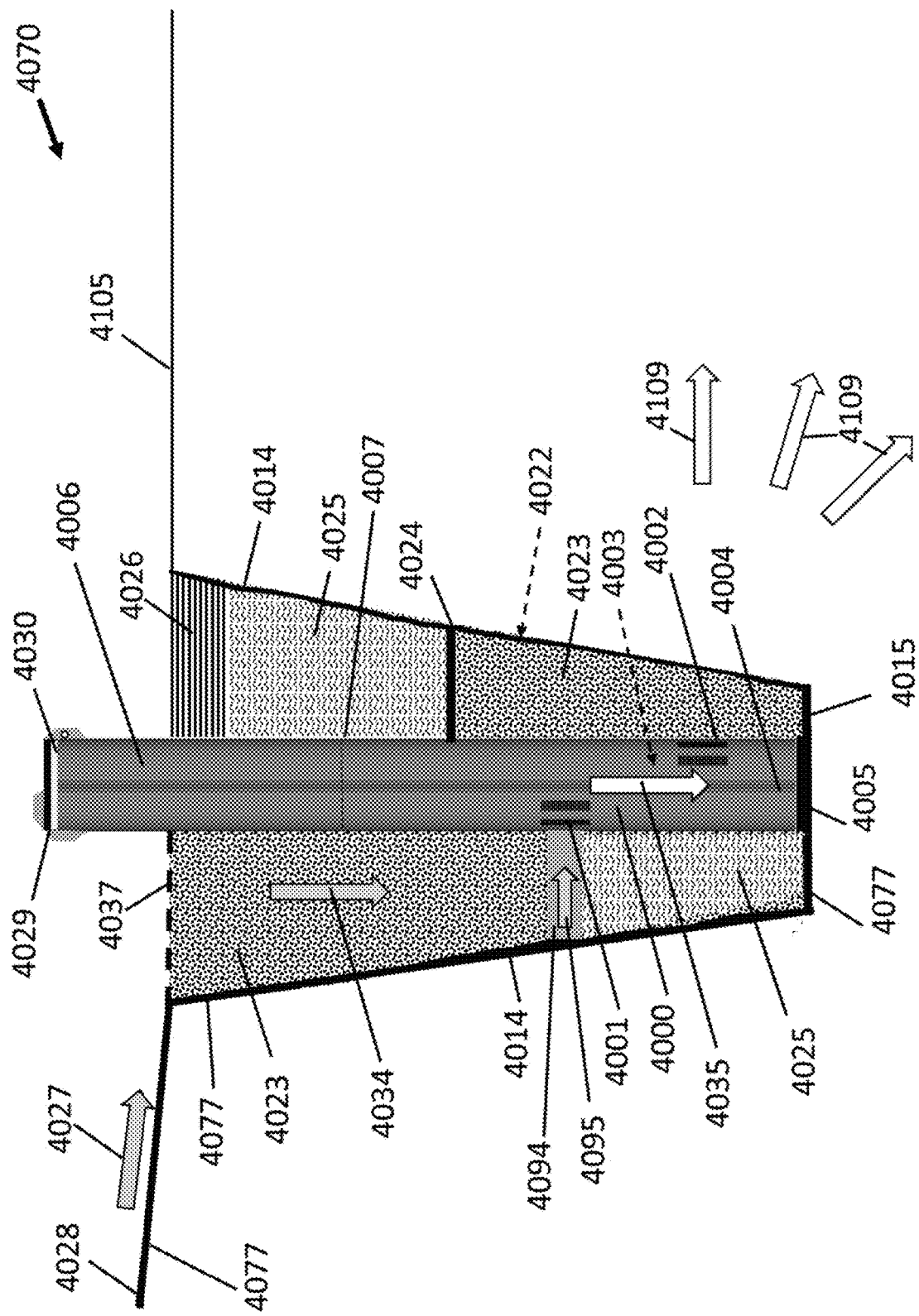
FIG. 60 is a side elevational view of trench-based surface water-treatment system with an example of no adjacent surface water body and no groundwater present within the excavated depth of the trench, according to one embodiment.

FIG. 60 is a side elevational view of trench-based, surface water-treatment system 4070, according to at least one embodiment, showing an example with no adjacent surface water body and no groundwater present within the excavated depth of the trench. It may be assumed that the barrier wall 102 of FIG. 1, or similar barrier according to various embodiments, is installed with the filter casing/riser pipe pile 4000/4006.

The landform in FIG. 60 includes an inclined land surface 4028 with contaminated surface water 4027 on the left of the partially in-ground treatment system 4070. The ground surface is approximately level 4105 on the right side of system 4070. The ground surface has been excavated at a point approximately between the inclined slope 4028 and the level ground surface 4105 to form a trench with side walls 4014 and a base 4015. The trench is narrower in width than it is in depth.

A filter casing 4000 has both upper elevation inlet screen 4001 and lower elevation outlet screen 4002. A liquid treatment cartridge 4003 is not shown in FIG. 60 but inside filter casing 4000 and between screens 4001 and 4002. A cover 4005 is secured to the bottom of the filter casing 4000. A joint 4007 is shown in FIG. 60 between the filter casing 4000 and riser pipe pile 4006 which extends substantially above the ground surface 4028. A vertical interlock connector 4004 aligns the filter casing 4000 and the riser pipe pile 4006 for connection with a sectioned barrier wall that includes multiple interlocking wall sections (not shown).

The riser pipe pile 4006 shown in FIG. 60, and the barrier wall (not shown) connected to interlock 4004, extend substantially above the ground surfaces 4028 and 4105. The purpose of the elevated riser pipe pile 4006 and barrier wall (not shown) is to minimize the potential for contaminated surface water 4027 from discharging on the level surface 4105, which could represent for example, land owned by another property owner. The elevated riser pipe pile 4006 and barrier wall (not shown) divert the contaminated surface water 4027 into the in-ground treatment system 4070.

A top cover 4029 is modified to include a hinge 4011 directly attached to the riser pipe pile 4006. A hasp 4012 with a hole for a lock connects the top cover 4029 directly to the riser pipe pile 4006 to secure the remedial system from unauthorized access. Rubber or equivalent material 4030 is used to form a circular gasket between the riser pipe pile 4006 and the hinged top cover 4029 to minimize water from adjacent water body 4031 from entering the treatment system and potentially overloading its capacity during a flood event.

An impermeable liner 4077 is placed along the trench bottom 4015, trench wall 4014, and extended to cover a portion of the ground surface 4028 on the left side of the treatment system 4070. A grout or equivalent low-permeability material is added on the left side of the treatment system 4070 but below the intake screen 4001. A clean, well-sorted aggregate 4023 or equivalent is filled from the grout to the land surface 4028 on the left side of the treatment system 4070 and an aggregate is covered with a permeable filter fabric 4037 or equivalent to minimize the introduction of silt or sediment into the aggregate.

On the right side of the treatment system an optional permeable liner 4022 can be added on the trench bottom 4015 and portion of the trench wall 4014 to a design elevation (not shown). Once an aggregate 4023 is filled to a design elevation on the right side of the treatment system 4070, bentonite or similar material 4024 is added to form an expansive seal to minimize air and other fluids from entering the aggregate. A grout or similar low-permeability material 4025 is added to the right side to minimize air and other fluids from entering the aggregate. A concrete pad 4026 is added at the top of installation on the right.

In operation, contaminated surface water 4027 flows on the inclined 4028 and lined 4077 ground surface through a permeable filter or equivalent 4037 and into the aggregate 4023 at the toe of the slope and vertically downward 4034 in the aggregate on the left side of the barrier wall. The surface water is diverted 4066 into the upper elevation inlet screen 4001 once the water level rises on grout to the inlet screen.

Once contaminated surface water enters the upper inlet screen 4001 it flows downward 4035 for treatment in a liquid treatment cartridge 4003 (not shown in FIG. 60) before discharge through the lower elevation outlet screen 4002. The treated surface water discharges 4109 into the unsaturated zone, well below level ground surface 4105 (which could represent, for example, land owned by another property owner).

Figure 61:
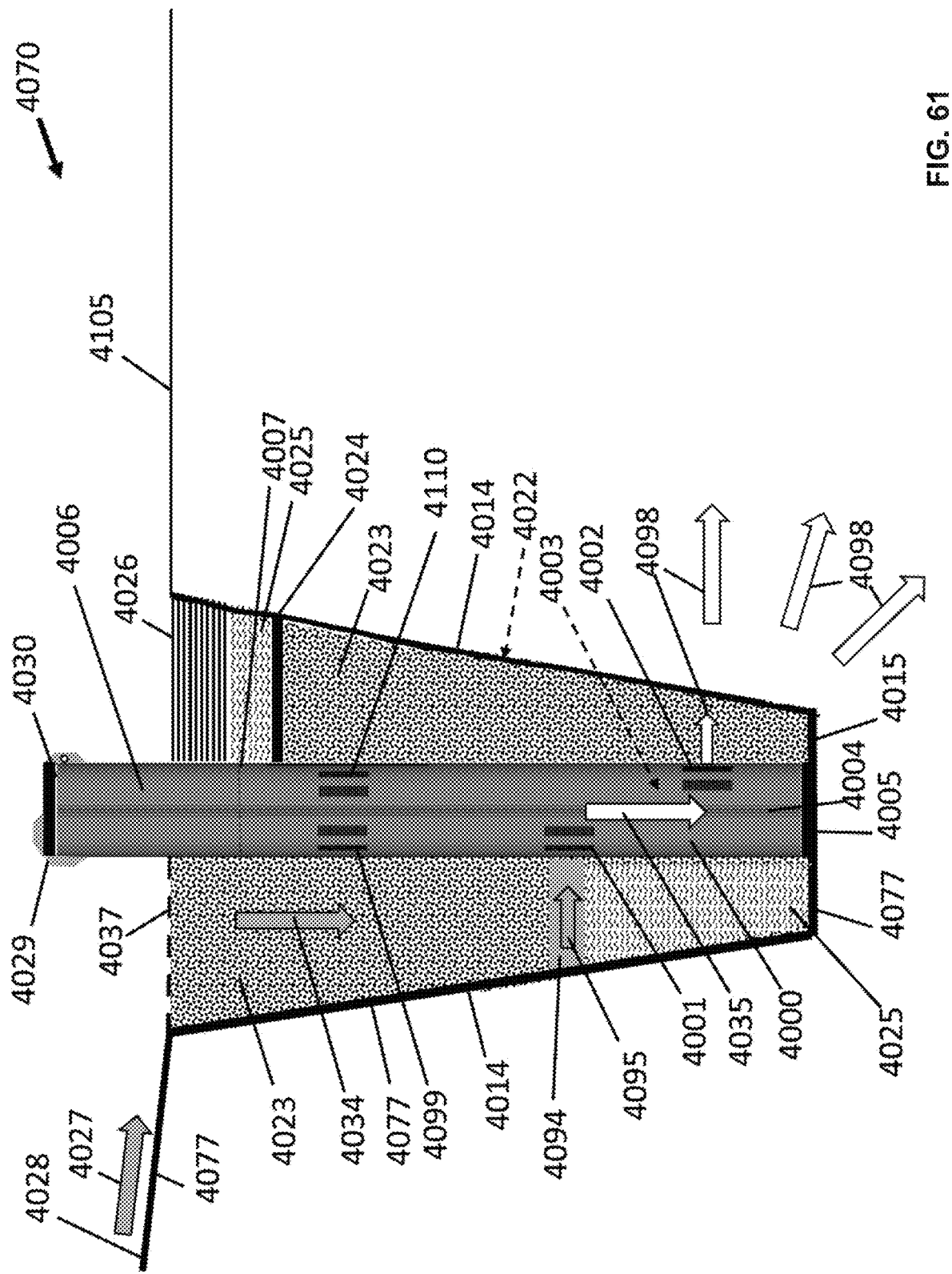
FIG. 61 is a side elevational view of FIG. 60 with an example of secondary screens added to the filter casing, according to one embodiment.

FIG. 61 is a side elevational view of a trench-based, surface water-treatment system 4070, with the addition of a secondary well screen inlet 4099 and secondary screen outlet 4110, both at the same elevation and on opposing sides on the filter casing 4000, but at a higher elevation than the primary screen inlet 4001 or the primary well screen outlet 4002, according to at least one embodiment. The secondary screen inlet 4099 and outlet 4110 could be used for potential overflow conditions in cases where the periodic flow of contaminated surface water 4027 exceeds the flow capacity of the treatment cartridge(s). It may be assumed that the barrier wall 102 of FIG. 1, or similar barrier according to various embodiments, is installed with the filter casing/riser pipe pile 4000/4006.

The landform in FIG. 61 includes an inclined land surface 4028 with contaminated surface water 4027 on the left of the partially in-ground treatment system 4070. The ground surface is approximately level 4105 on the right side of system 4070. In this example, there is no adjacent surface water body and no groundwater present within the excavated depth of the trench. The ground surface has been excavated at a point approximately between the inclined slope 4028 and the level ground surface 4105 to form a trench with side walls 4014 and a base 4015. The trench is narrower in width than it is in depth.

A cover 4005 is secured to the bottom of the filter casing 4000. A joint 4007 is shown in FIG. 61 between the filter casing 4000 and riser pipe pile 4006 which extends substantially above the ground surface 4028. A vertical interlock connector 4004 aligns the filter casing 4000 and the riser pipe pile 4006 for connection with a sectioned barrier wall that includes multiple interlocking wall sections (not shown).

The riser pipe pile 4006 shown in FIG. 61 and the barrier wall (not shown) connected to interlock 4004, extend substantially above the ground surfaces 4028 and 4105. The purpose of the elevated riser pipe pile 4006 and barrier wall (not shown) is to minimize the potential for contaminated surface water 4027 from discharging on the level surface 4105, which could represent for example, land owned by another property owner. The elevated riser pipe pile 4006 and barrier wall (not shown) divert the contaminated surface water 4027 into the in-ground treatment system 4070.

A top cover 4029 is modified to include a hinge 4011 directly attached to the riser pipe pile 4006. A hasp 4012 with a hole for a lock connects the top cover 4029 directly to the riser pipe pile 4006 to secure the remedial system from unauthorized access. Rubber or equivalent material 4030 is used to form a circular gasket between the riser pipe pile 4006 and the hinged top cover 4029 to minimize air and other fluids from infiltrating from entering the right side of the treatment system 4070 and potentially overloading its capacity during a flood event.

An impermeable liner 4077 is placed along the trench bottom 4015, trench wall 4014, and extended to cover a portion of the ground surface 4028 on the left side of the treatment system 4070. A grout or equivalent low-permeability material is added on the left side of the treatment system 4070 but below the intake screen 4001. A clean, well-sorted aggregate 4023 or equivalent is filled from the grout to the land surface 4028 on the left side of the treatment system 4070 and an aggregate is covered with a permeable filter fabric 4037 or equivalent to minimize the introduction of silt or sediment into the aggregate.

On the right side of the treatment system an optional permeable liner 4022 can be added on the trench bottom 4015 and portion of the trench wall 4014 to a design elevation. Once an aggregate 4023 is filled to a design elevation on the right side of the treatment system 4070, which in the case of FIG. 61 is above the top of the secondary well screen outlet 4110, bentonite or similar material 4024 is added to form an expansive seal to minimize air and other fluids from entering the aggregate. A grout or similar low-permeability material 4025 is added to the right side to minimize air and other fluids from entering the aggregate. A concrete pad 4026 is added at the top of installation on the right.

In operation, and as shown in FIG. 61, contaminated surface water 4027 flows on the inclined 4028 and lined 4077 ground surface through a permeable fabric or equivalent 4037 and into the aggregate 4023 at the toe of the slope and vertically downward 4034 in the aggregate on the left side of the barrier wall. Once the contaminated surface water 4034 saturates the aggregate 4111 on top of the grout 4025, the water level 4094 rises to a point where the contaminated surface water 4066 flows horizontally into the primary upper intake screen 4001.

Once contaminated surface water enters the primary upper inlet screen 4001 it flows downward 4035 for treatment in a liquid treatment cartridge 4003 (not shown in FIG. 61) before discharge through the primary lower elevation outlet screen 4002. The treated surface water discharges 4098 into the unsaturated zone, well below level ground surface 4105 (which could represent, for example, land owned by another property owner). Under typical climatic conditions, as represented by FIG. 61, the secondary screen inlet 4099 and secondary screen outlet 4110 may not be required.

FIG. 62 (A-Z) presents an example of a trench-based remedial system and the time-ordered sequence of events in which systems and methods for remediation of a site with contaminated surface water are applied according to various embodiments described herein. The example is a surface water-treatment system 4070 with no adjacent surface water body and no groundwater present within the excavated depth of the trench. The system 4070 in this example relies on primary screens only (inlet screen at upper elevation 4001 and outlet screen at lower elevation 4002) and no secondary screens as shown in FIG. 61. Other examples, steps, positions, and embodiments could be envisioned. The following figures (FIG. 62 A-Z) build upon each other, and as such, only the new features that are numbered on the figures are described in detail.

Figure 62A:
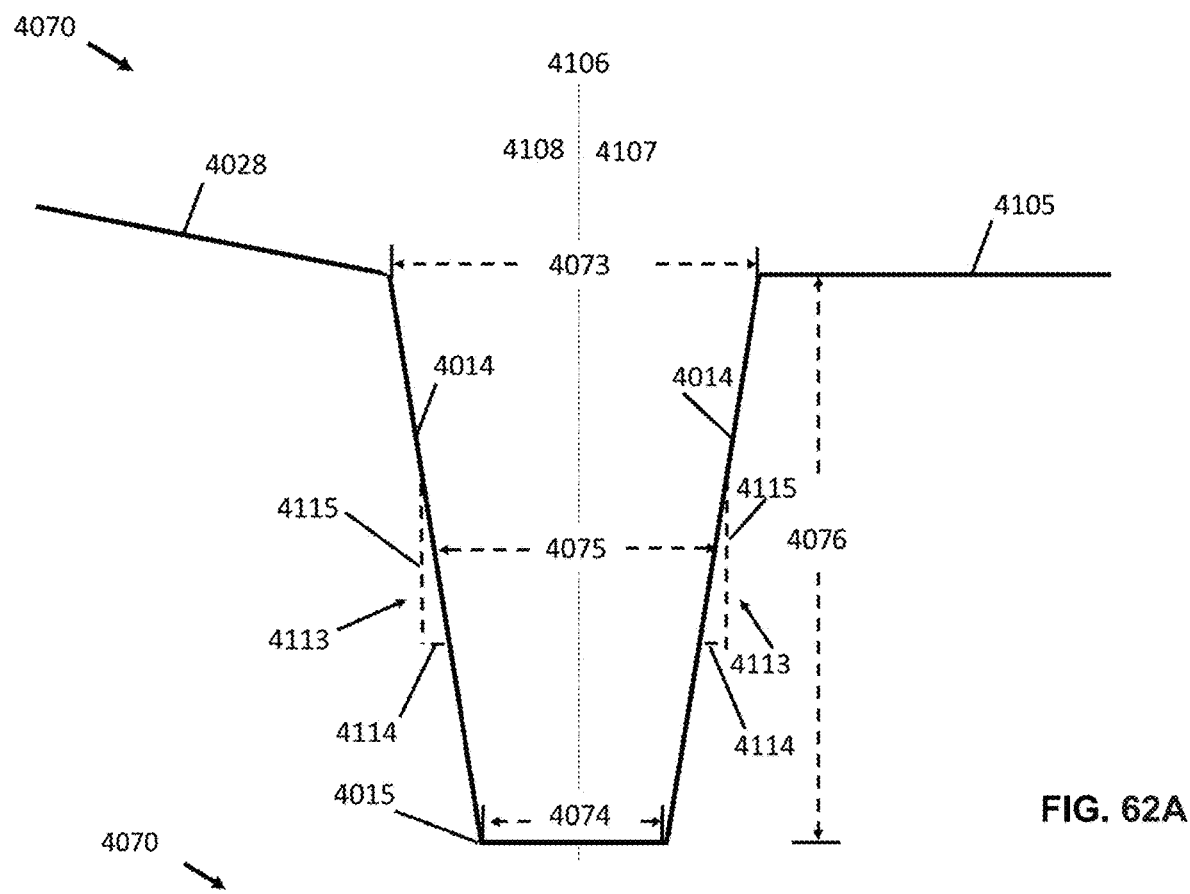
FIG. 62A through FIG. 62Z show the sequential steps that could be followed for the installation of a trench-based surface water-treatment system that has no adjacent surface water body and no groundwater present within the excavated depth of the trench. Other examples, steps, and embodiments could be envisioned. As used specifically in FIG. 62 (A-Z), the right side of trench excavation is defined as the half of the trench between the centerline and the trench wall beneath the level ground surface. As used specifically in FIG. 62 (A-Z), the left side of trench excavation is defined as the half of the trench between the centerline and the trench wall beneath the inclined ground surface.

FIG. 62A is a side elevational view of an excavated trench with a centerline 4106, right side 4107, left side 4108, side walls 4014, and base 4015. The trench is located at the toe of an inclined slope 4028, where 4073 is the width of trench at ground surface, 4074 is the width of trench at the bottom of the excavation, 4075 is the average width of the trench, and 4076 is the average depth of trench below the ground surface. The slope of the trench wall 4113 is defined by a horizontal distance 4114 and vertical rise 4115. There is no adjacent surface water body and no groundwater present within the excavated depth 4076 of the trench. The adjacent land surface on the right of the trench 4107 is level 4105.

The trench-based remedial system 4070 represented by FIG. 62 (A-Z) is partially defined, but not limited geometrically, wherein the average width 4075 of the excavation below ground surface 4105 is less than the average depth 4076 below the ground surface 4105.

Figure 62B:
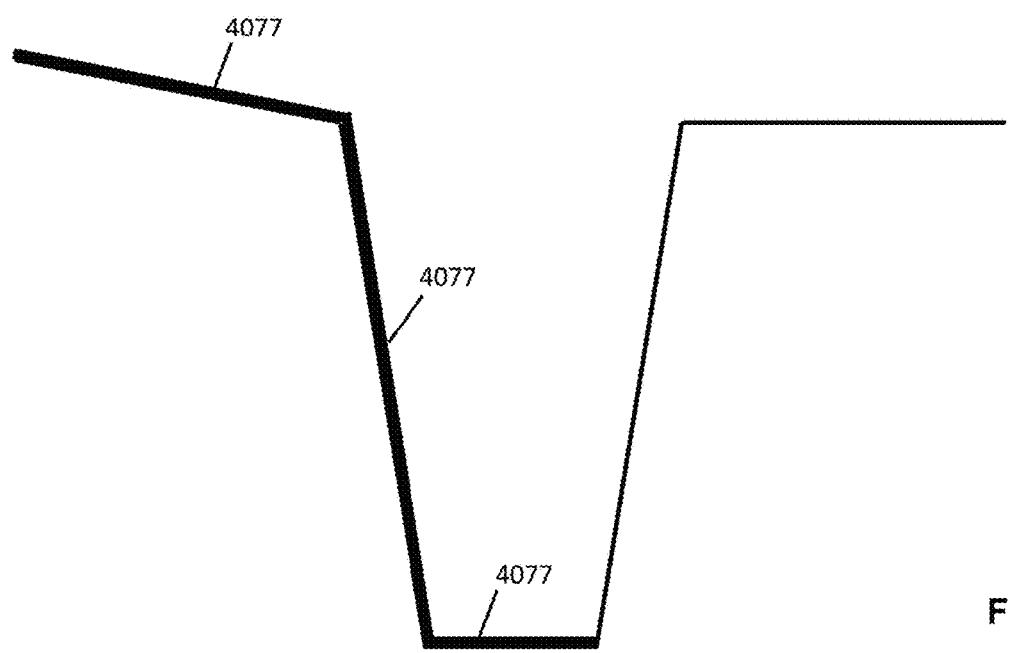
FIG. 62B is a side elevational view of FIG. 62A with the addition of an impermeable liner on a portion of the inclined land surface, the left wall of the trench, and the entire bottom of the trench.

FIG. 62B is a side elevational view of FIG. 62A with the addition of an impermeable liner 4077 on a portion of the inclined land surface 4028, the trench wall 4014 on the left side of the excavation 4108, and lines the entire base 4015 of the trench.

Figure 62C:
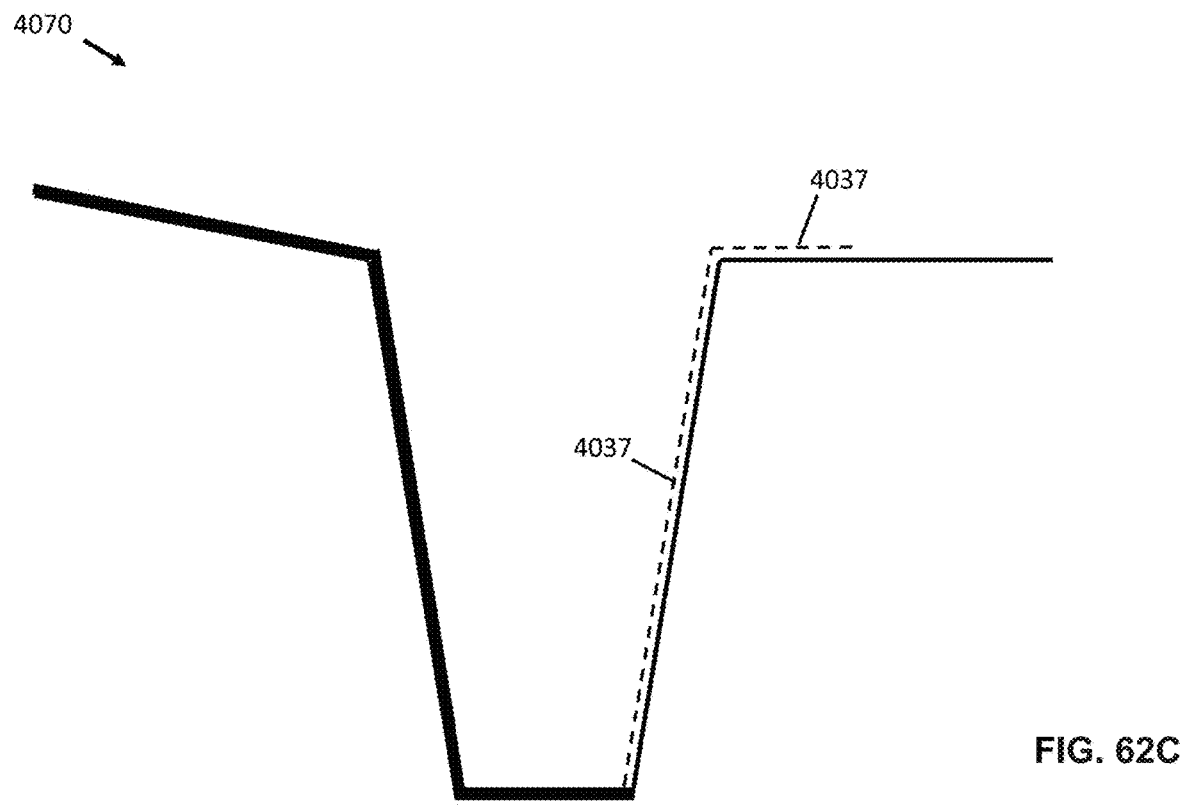
FIG. 62C is a side elevational view of FIG. 62B with the addition of a permeable filter fabric on a portion of the level ground surface and the right wall of the trench.

FIG. 62C is a side elevational view of FIG. 62B with the addition of a permeable filter fabric or equivalent 4037 on the right side 4107 of the excavation, lining the trench wall 4014, and a portion of the level ground surface 4105.

Figure 62D:
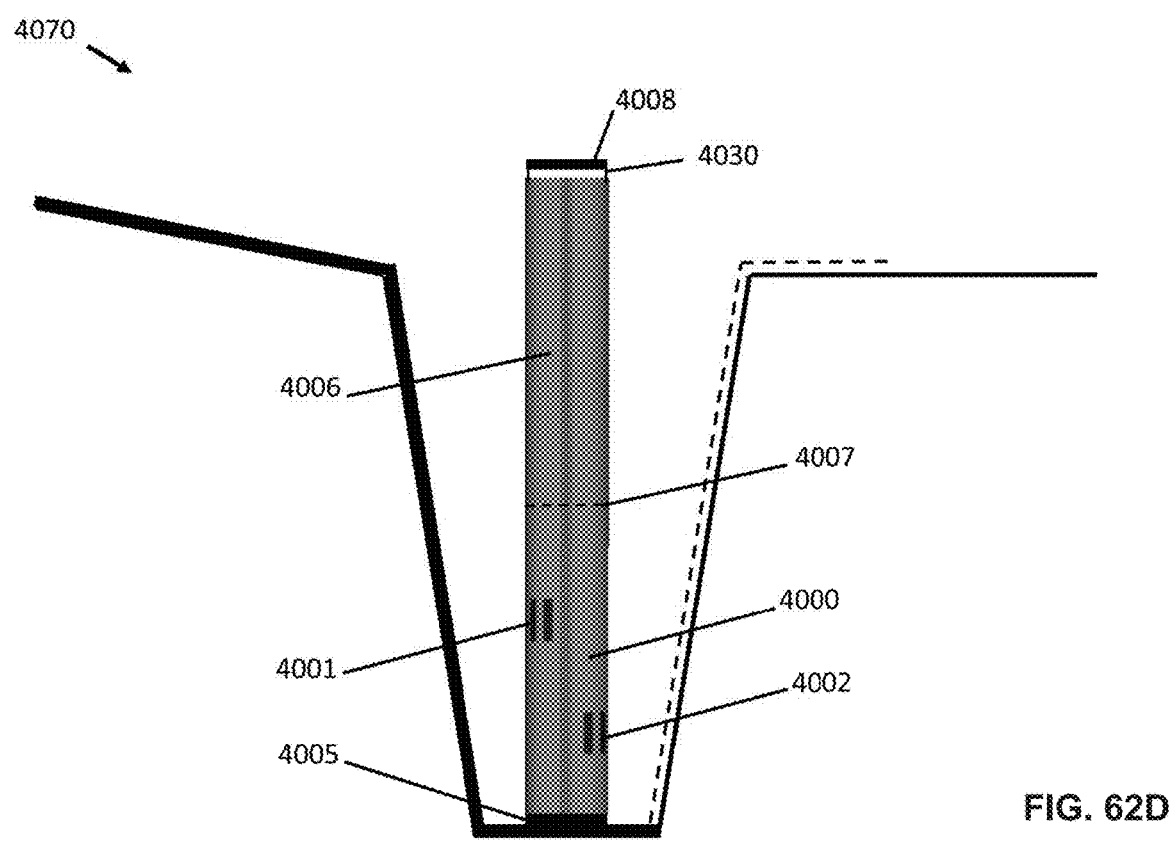
FIG. 62D is a side elevational view of FIG. 62C with the addition of an interconnected treatment assembly that extends above the ground surface to form a vertical wall.

FIG. 62D is a side elevational view of FIG. 62C with the addition of an interconnected treatment assembly including a filter casing 4000 with inlet screen 4001 and outlet screen 4002, and bottom cover 4005 that rests on the impermeable liner 4077. It may be assumed that the barrier wall 102 of FIG. 1, or similar barrier according to various embodiments, is installed with the filter casing/riser pipe pile 4000/4006 in FIG. 62D-Z.

The system 4070 in the example shown in FIG. 62D relies on primary screens only (inlet screen at upper elevation 4001 and outlet screen at lower elevation 4002) and no secondary screens as shown in FIG. 61. The filter casing 4000 is connected at 4007 to a riser pipe pile 4006 that extends substantially above the inclined ground surface 4028 and level ground surface 4105 to form a vertical barrier wall (not shown) to minimize surface water from flowing from the left 4108 to the right 4107 of the system 4070 and bypassing treatment. The assembly includes a top cover 4008 and rubber gasket or equivalent 4030.

Figure 62E:
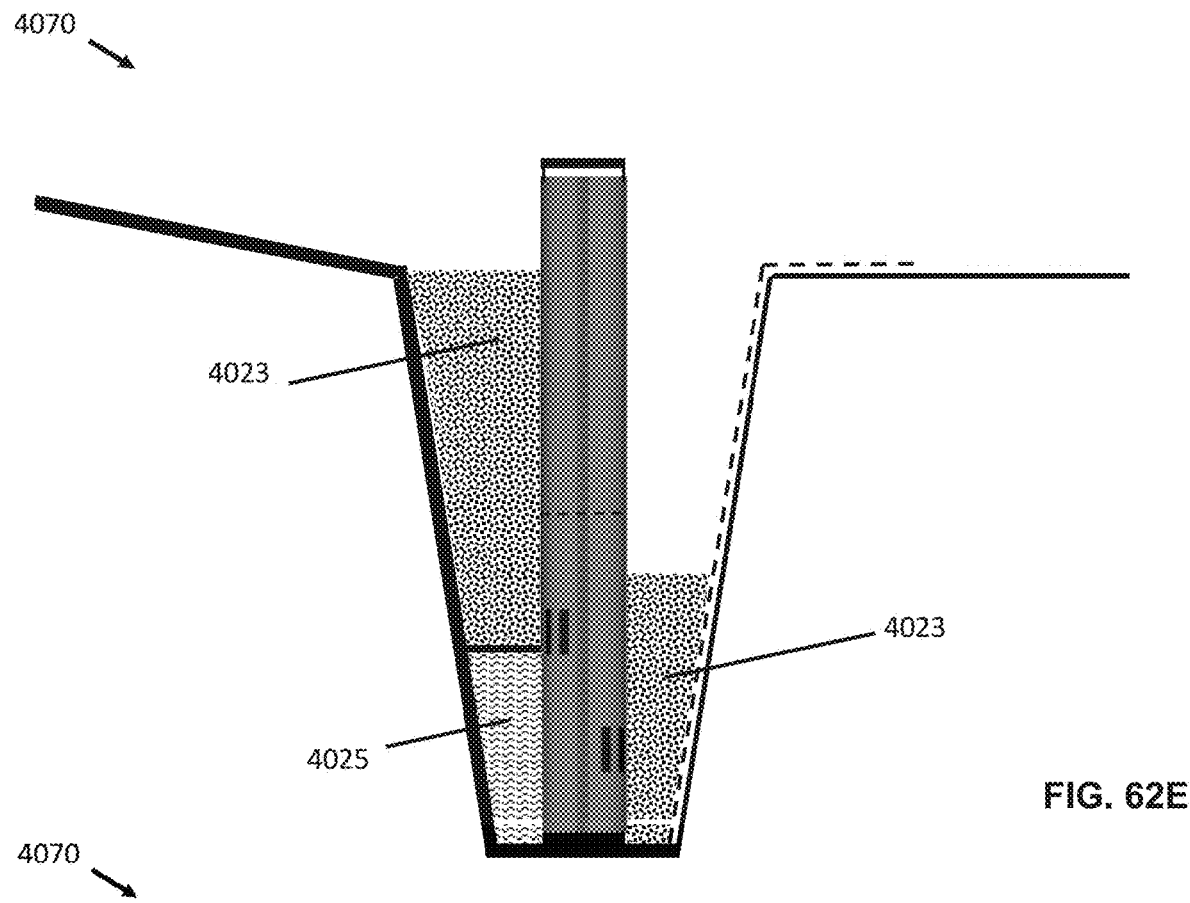
FIG. 62E is a side elevational view of FIG. 62D with the addition of grout or similar to the bottom of the intake screen on the left side, aggregate on top of the grout to the land surface, and gravel in a portion of the right side of the trench.

FIG. 62E is a side elevational view of FIG. 62D with the addition of grout 4025 on the left to the bottom of the inlet screen 4001. A clean, well-sorted aggregate or equivalent 4023 is placed on top of the grout 4025 against the impermeable liner 4077 extended to the toe of the inclined slope 4028 on the left side 4108. An aggregate 4023 is added on the right side 4107 on top of the permeable filter fabric 4037 above the outlet screen 4002, partially up the side wall 4014, and below the level ground surface 4105 to a design elevation.

Figure 62F:
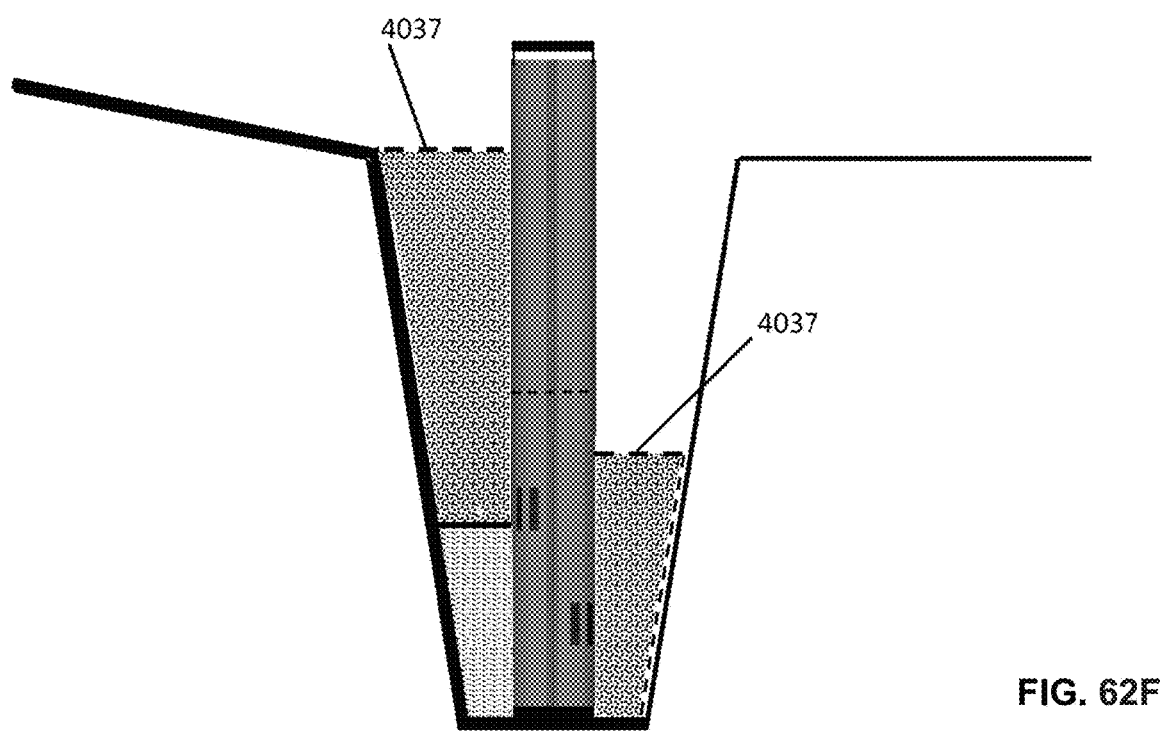
FIG. 62F is a side elevational view of FIG. 62E with the addition of a permeable filter fabric on top of an aggregate.

FIG. 62F is a side elevational view of FIG. 62E with addition of permeable filter fabric or equivalent 4037 on top of the clean, well-sorted aggregate or equivalent 4023 on the left side 4108 at the ground surface to minimize silt or sediment from entering the aggregate. On the right side 4107 of the interconnected treatment assembly, any of the permeable filter fabric 4037 in excess from FIG. 62E is placed on top of the clean, well-sorted aggregate 4023 below the land surface to minimize bentonite 4024 in FIG. 62G from entering the aggregate.

Figure 62G:
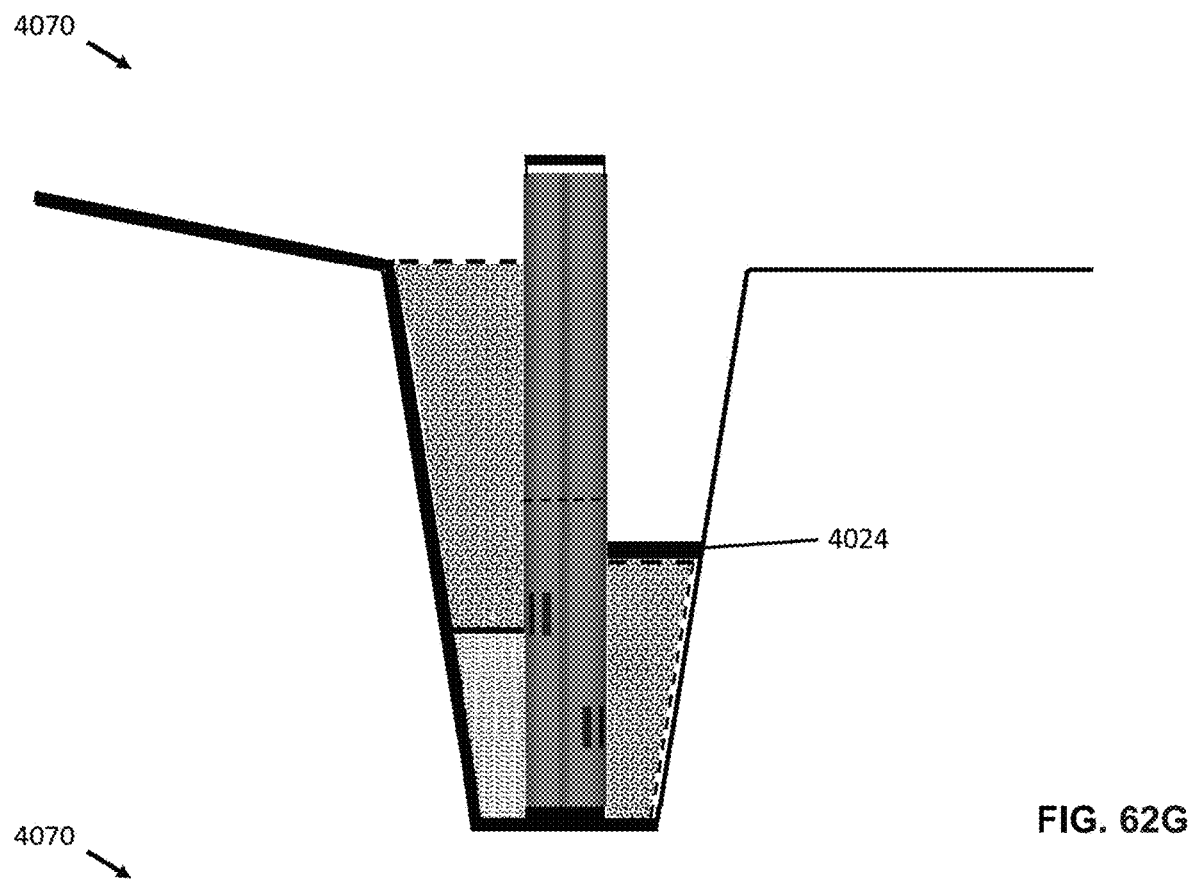
FIG. 62G is a side elevational view of FIG. 62F with the addition of bentonite or similar material on the right side of the trench.
Figure 62H:
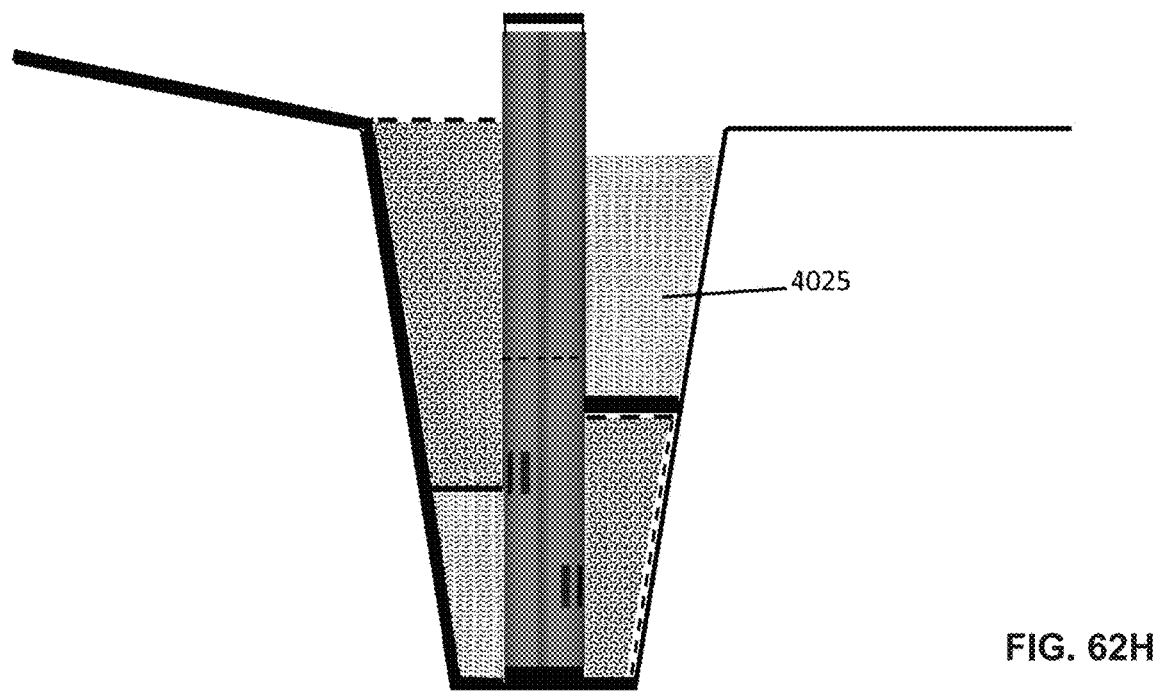
FIG. 62H is a side elevational view of FIG. 62G with the addition of grout or similar low-permeability material on the right side of the trench.

FIG. 62G is a side elevational view of FIG. 62F with the addition of bentonite or similar material 4024, on the right side 4107 to form an expansive seal above the permeable filter fabric 4037 to minimize grout 4025 in FIG. 62H from entering the aggregate on the right side 4107 of the treatment system 4070.

FIG. 62H is a side elevational view of FIG. 62G with the addition of grout or similar low-permeability material 4025 on the right side 4107 to minimize air and other fluids from entering the aggregate on the right side 4107 of the treatment system 4070.

Figure 62I:
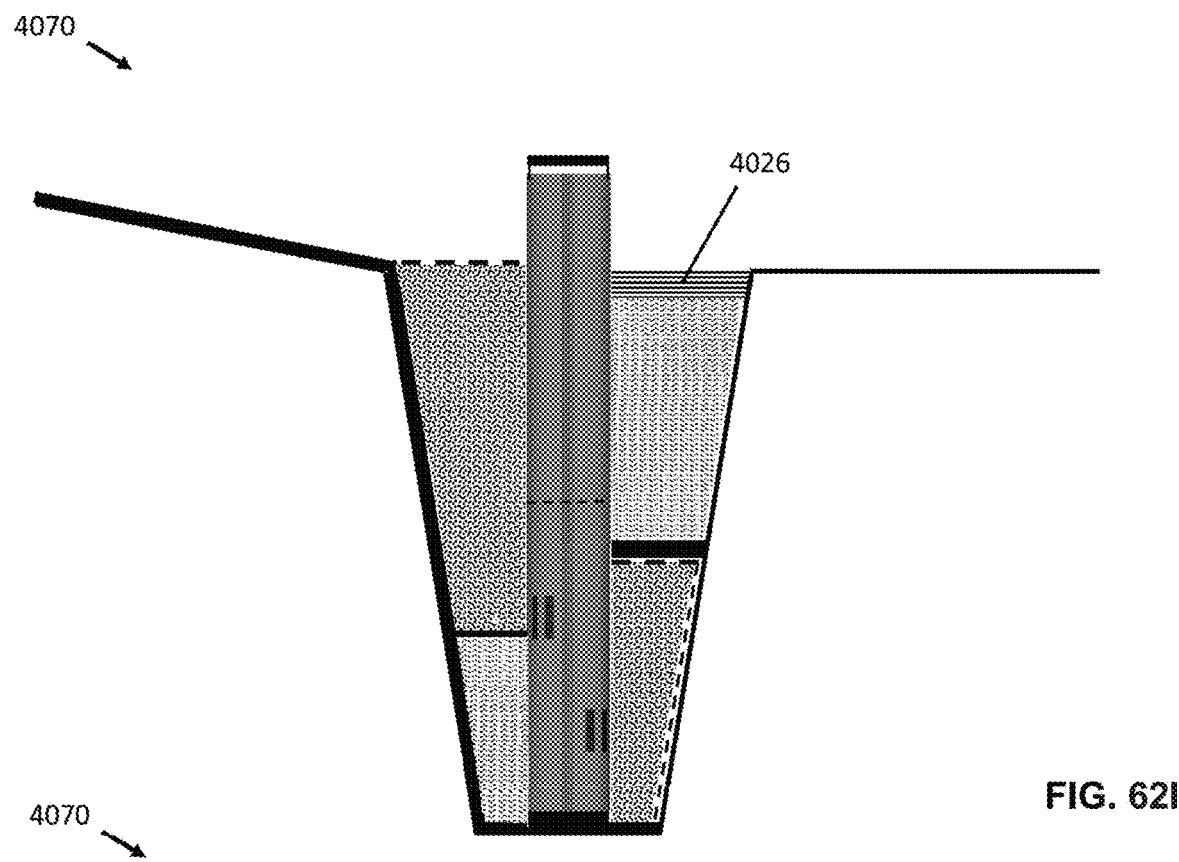
FIG. 62I is a side elevational view of FIG. 62H with the addition of a concrete pad on the right side of the trench.

FIG. 62I is a side elevational view of FIG. 62H with the addition of a concrete pad 4026 on the right side 4107 to structurally support the interconnected treatment assembly and to minimize air and other fluids from infiltrating the aggregate on the right side 4107 of the trench.

Figure 62J:
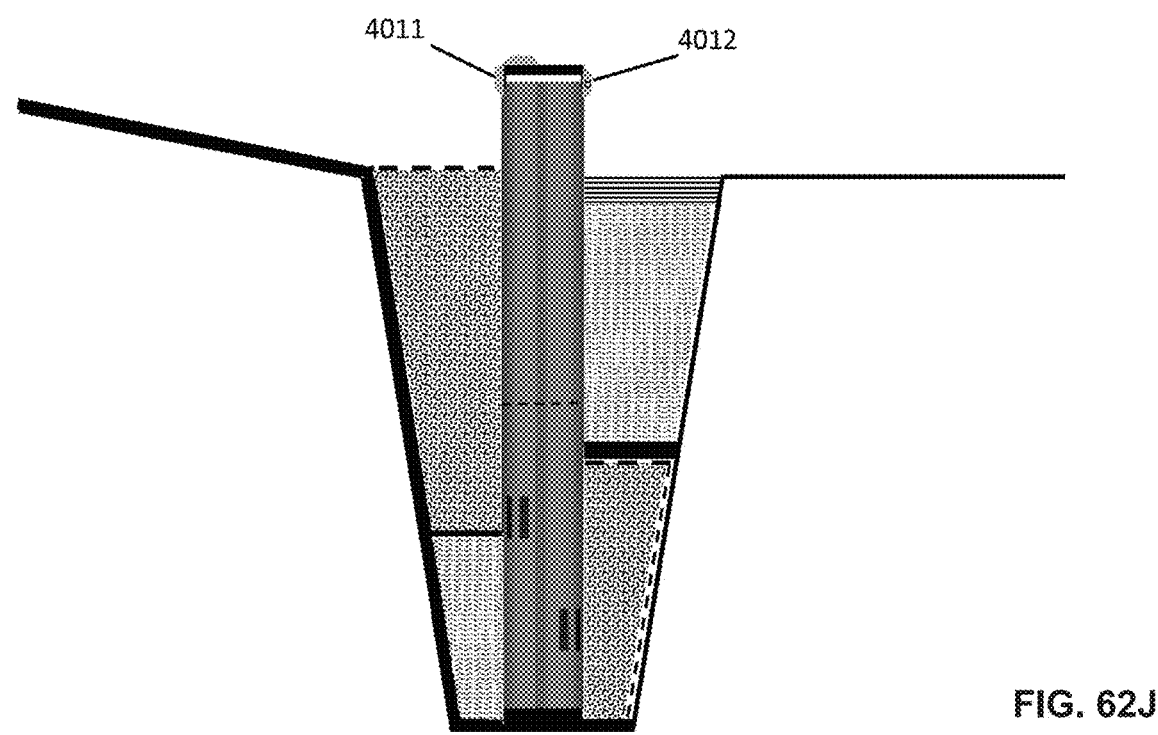
FIG. 62J is a side elevational view of FIG. 62I with the addition of devices at the top of the filter casing to secure the interconnected treatment assembly from unauthorized access.

FIG. 62J is a side elevational view of FIG. 62I with the addition of a hinge 4011 to the extended riser pipe pile 4006 and top cover 4008. A lockable hasp 4012 is connected to the extended riser pipe pile 4006 and top cover 4008 to secure the interconnected treatment assembly from unauthorized access.

Figure 62K:
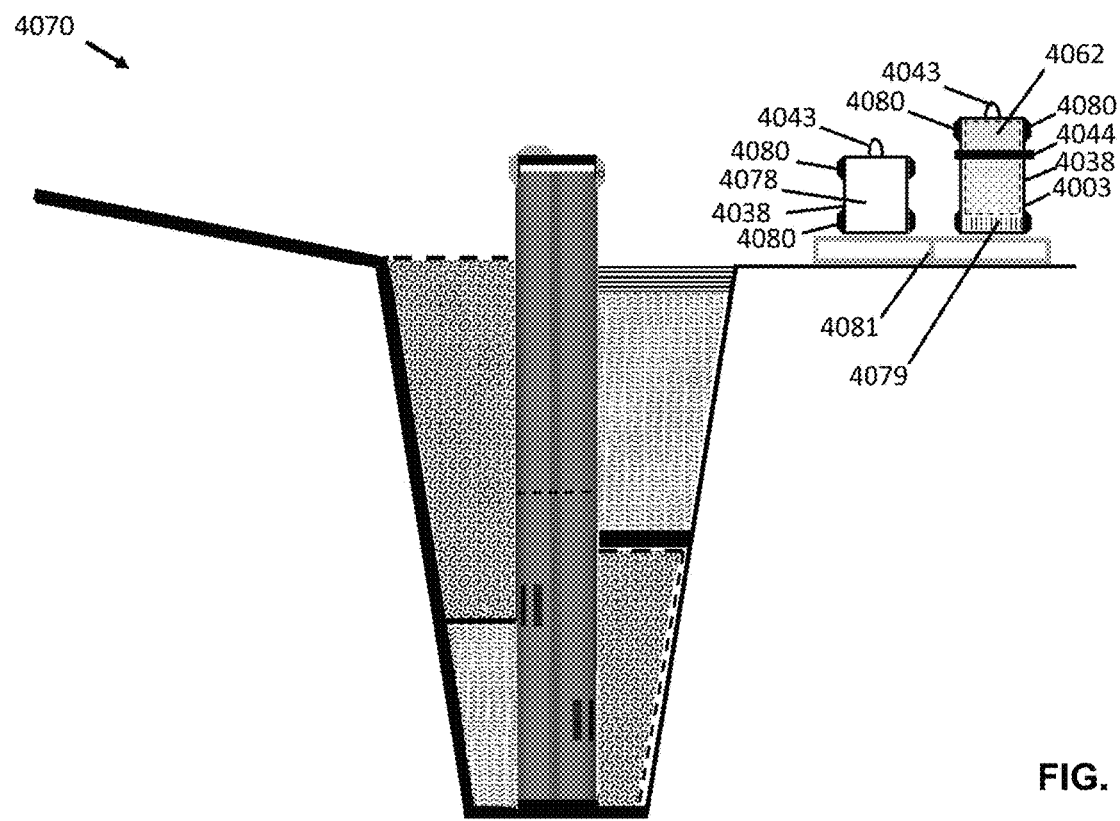
FIG. 62K is a side elevational view of FIG. 62J with a palletized treatment assembly consisting of a bottom spacer and a liquid treatment cartridge.

FIG. 62K is a side elevational view of FIG. 62J with the addition of a palletized 4081 assembly placed on the level ground surface 4105 consisting in this example of a bottom spacer 4078 and treatment cartridge 4003 to be placed in the interconnected treatment assembly using lifting loops 4043.

PRMs or equivalent 4062 are packed in porous bags inside the treatment casing 4038. Vertical slots 4079 are shown in the recessed area in the bottom section of treatment cartridge casing 4038 to allow space for the lifting loop 4043 of the bottom spacer 4078 and to allow treated water to discharge from the cartridge 4003 once it is positioned directly on top of the spacer 4078 in the bottom of the interconnected treatment assembly.

Vertical centralizers 4080 are shown on the casings 4038 for the bottom spacer 4078 and the treatment cartridge 4003 to keep them centered in the riser pipe pile 4006 and filter casing 4000 and to minimize damage to the inflatable seal 4044 of the treatment cartridge 4003 during installation. The pallet 4081 is used for shipping bottom spacers 4078 and/or treatment cartridges 4003 and related materials to the project site. Containers are used to protect the treatment cartridges 4003 during shipment (not shown in FIG. 62K).

Figure 62L:
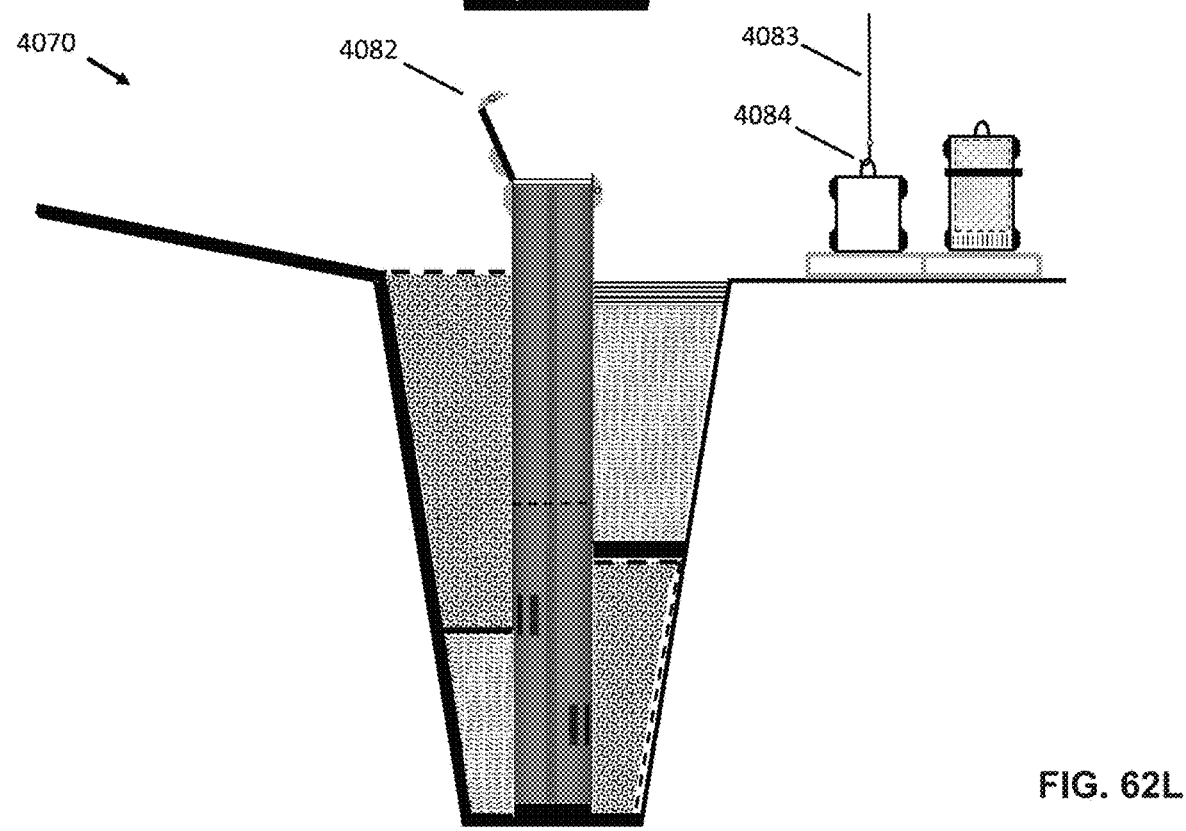
FIG. 62L is a side elevational view of FIG. 62K showing the top cover of the interconnected treatment assembly in an open position and a wire rope and hook used to lift the bottom spacer off the pallet.

FIG. 62L is a side elevational view of FIG. 62K showing the top cover 4008 in an unlocked and in open position 4082 using the hinge 4011. A wire rope 4083 with an attached hook 4084 is used to lift the bottom spacer 4078 off the pallet 4081.

Figure 62M:
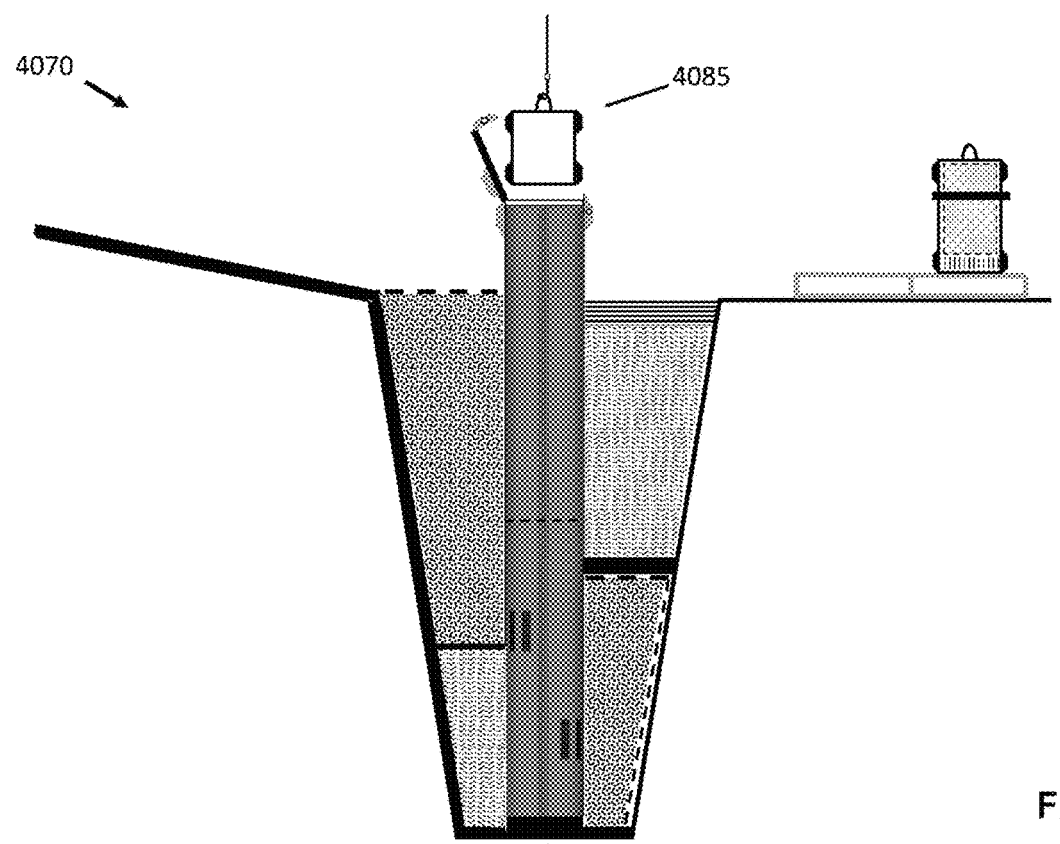
FIG. 62M is a side elevational view of FIG. 62L showing the bottom spacer hoisted in an insert position centered over the riser pipe pile.

FIG. 62M is a side elevational view of FIG. 62L showing the bottom spacer 4078 hoisted in an insert position 4085 centered over the riser pipe pile 4006.

Figure 62N:
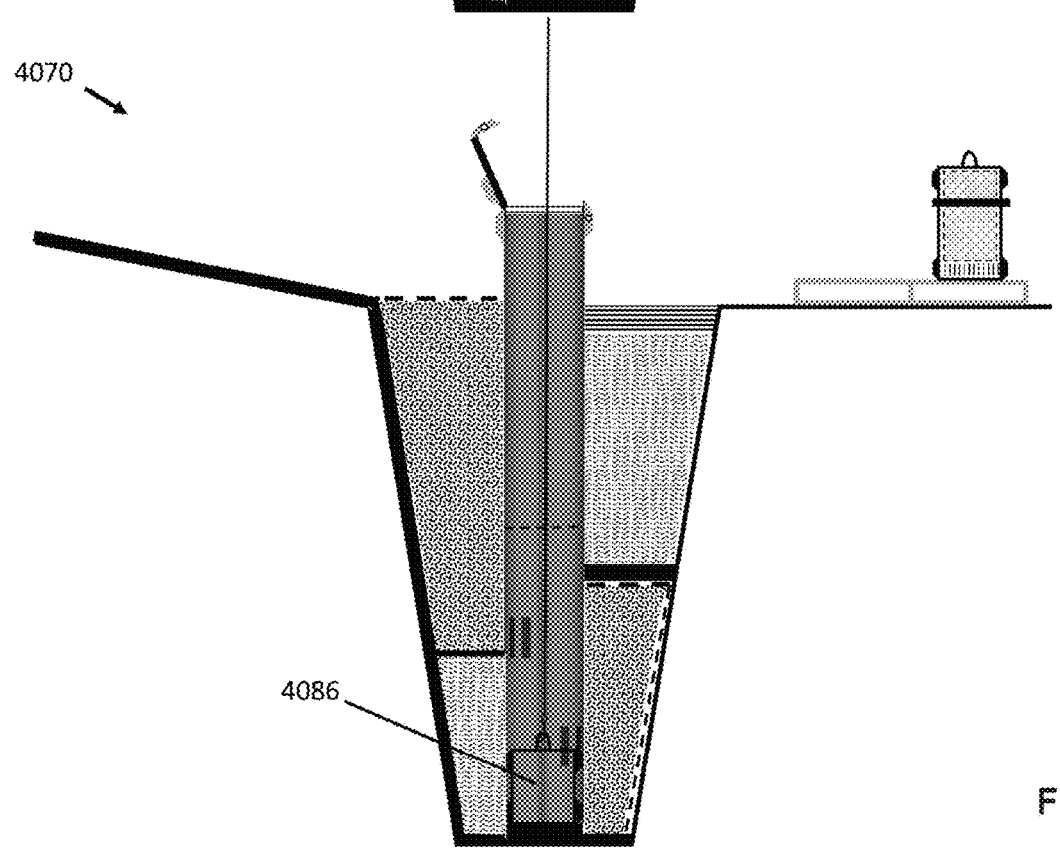
FIG. 62N is a side elevational view of FIG. 62M showing the bottom spacer set in position at the bottom of the filter casing.

FIG. 62N is a side elevational view of FIG. 62M showing the bottom spacer 4078 set at the design elevation 4086 at the bottom of the filter casing 4000.

Figure 62O:
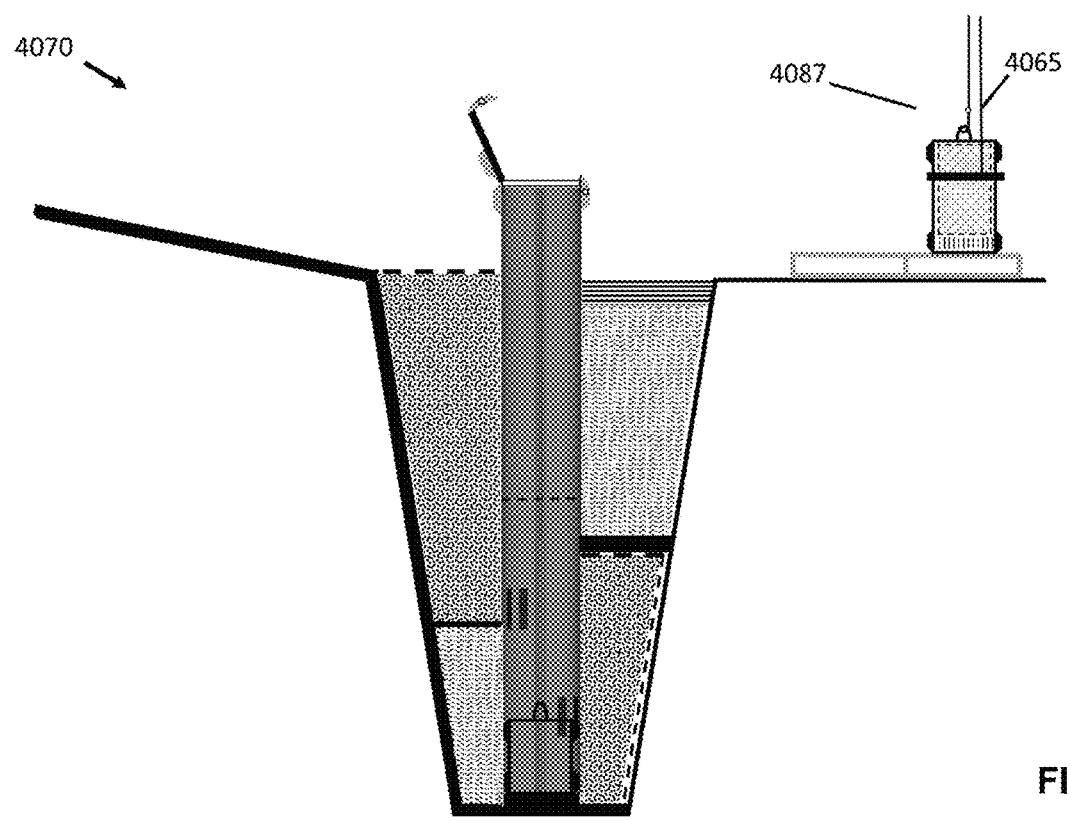
FIG. 62O is a side elevational view of FIG. 62N showing a filler tube connected to the inflatable seal of the liquid treatment cartridge and a wire rope and hook connected to the lifting loop of the liquid treatment cartridge.

FIG. 62O is a side elevational view of FIG. 62N showing an assembly 4087 including the filler tube 4065 connected to inflatable seal 4044 on the liquid treatment cartridge 4003 and hook 4084 connected to lifting loop 4043 of the treatment cartridge 4003 on the pallet 4081.

Figure 62P:
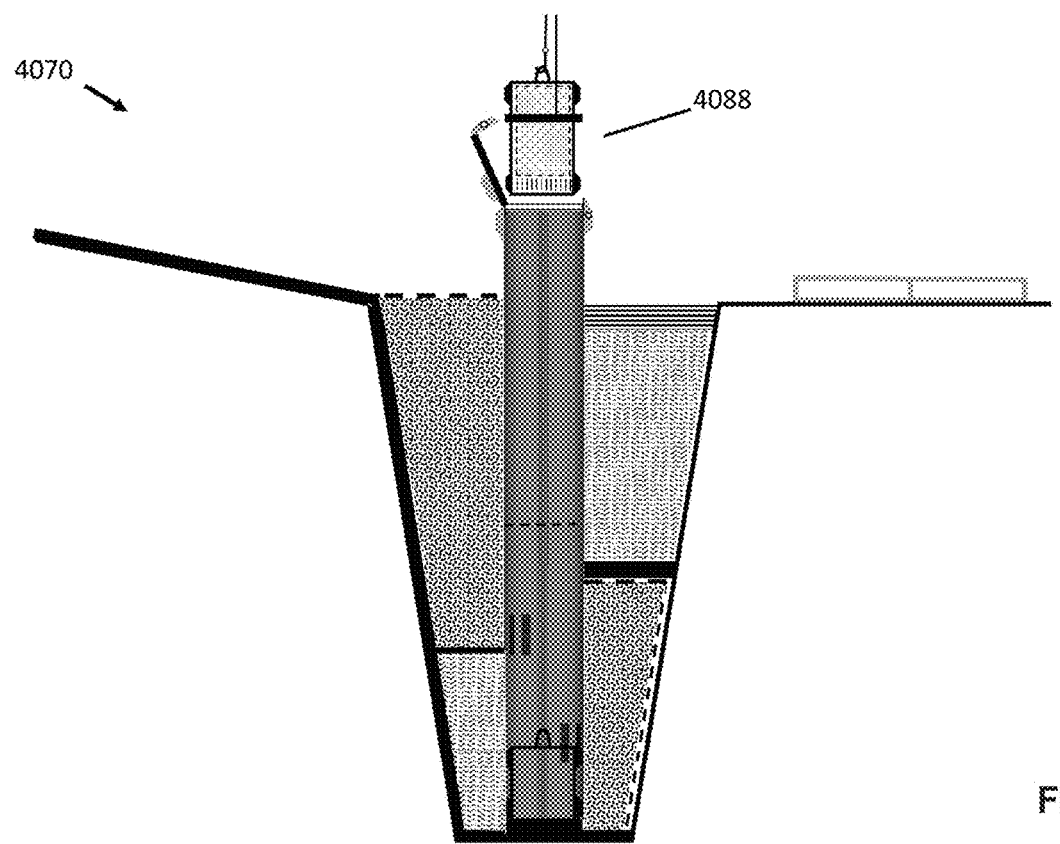
FIG. 62P is a side elevational view of FIG. 62O showing the liquid treatment cartridge hoisted in an insert position centered over the riser pipe pile.

FIG. 62P is a side elevational view of FIG. 62O showing the liquid treatment cartridge 4003 hoisted in an insert position 4088 centered over the riser pipe pile 4006.

Figure 62Q:
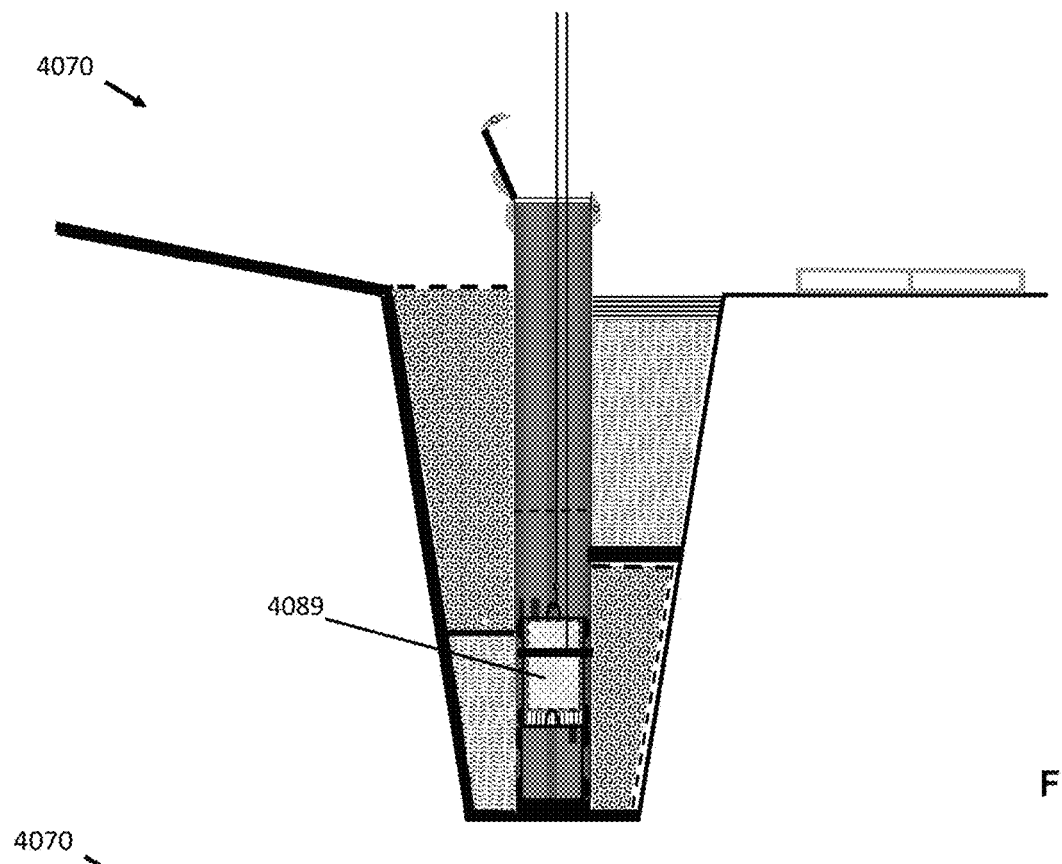
FIG. 62Q is a side elevational view of FIG. 62P showing the liquid treatment cartridge set on top of the bottom spacer and between the upper elevation inlet screen and the lower elevation outlet screen.

FIG. 62Q is a side elevational view of FIG. 62P in which the liquid treatment cartridge 4003 is set between the upper elevation inlet screen 4001 and the lower elevation outlet screen 4002 and resting on the bottom spacer 4078, at the design elevation 4089.

Figure 62R:
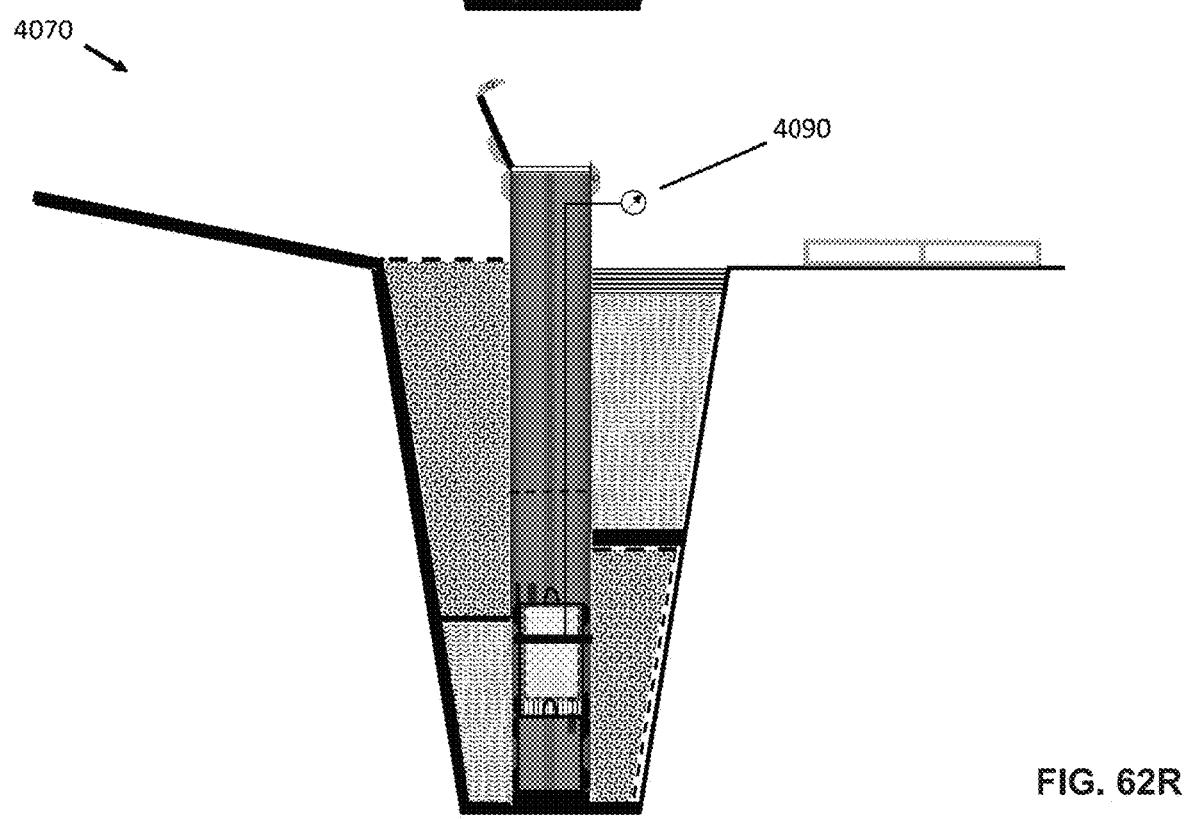
FIG. 62R is a side elevational view of FIG. 62Q showing the inflatable seal of the liquid treatment cartridge inflated to the specified pressure.

FIG. 62R is a side elevational view of FIG. 62Q in which the hook 4084 is disengaged from the lifting loop 4043 of the liquid treatment cartridge 4003 and removed along with the wire rope 4083. The inflatable seal 4044 is inflated to the specified pressure 4090.

Figure 62S:
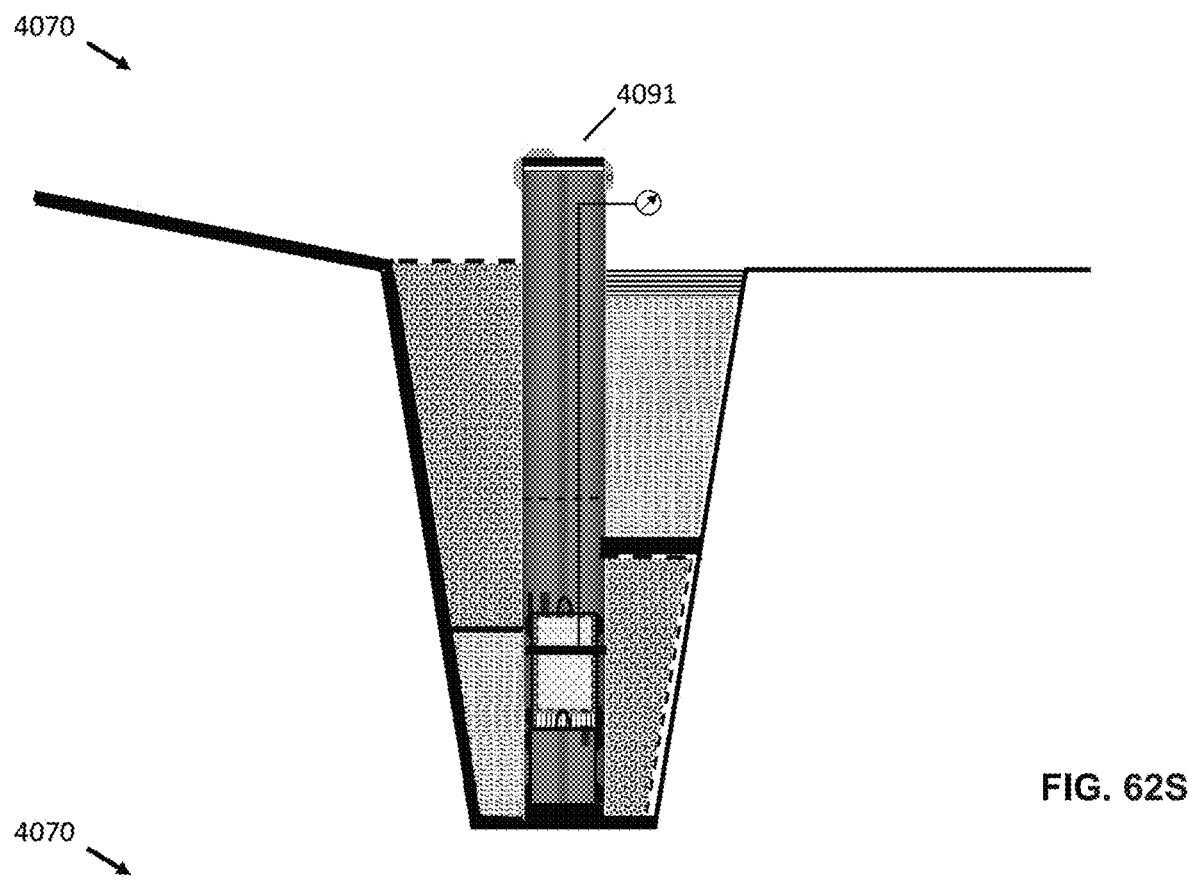
FIG. 62S is a side elevational view of FIG. 62R showing a completed trench-based surface water-treatment system with the top cover closed and ready for monitoring and remediation.

FIG. 62S is a side elevational view of FIG. 62R in which the top cover 4008 is closed using the hinge 4011 and locked by the hasp 4012. Any associated monitoring ports (not shown) are connected. The combined components shown in FIG. 62S, coupled with PRMs or equivalent 4062 on the inside of the liquid treatment cartridge 4003, constitute a completed trench-based surface water-treatment system 4070 that is ready for monitoring and remediation 4091.

Figure 62T:
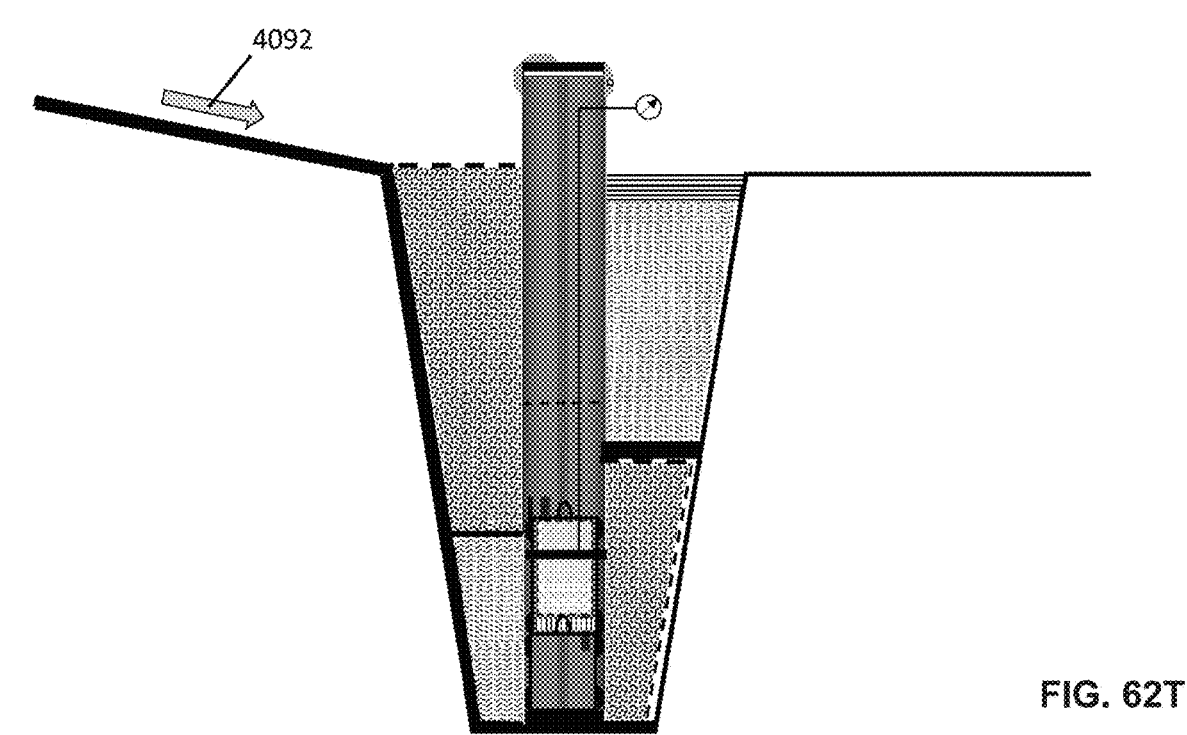
FIG. 62T is a side elevational view of FIG. 62S showing contaminated surface water runoff on the inclined ground surface flowing toward the surface water-treatment system.

FIG. 62T is a side elevational view of FIG. 62S in which, in operation, contaminated surface water runoff 4092 results from a storm event on the impermeable lined 4077 and inclined ground surface 4028 and flows downslope to the completed surface water-treatment system 4070 and flows through a permeable filter or equivalent 4037.

Figure 62U:
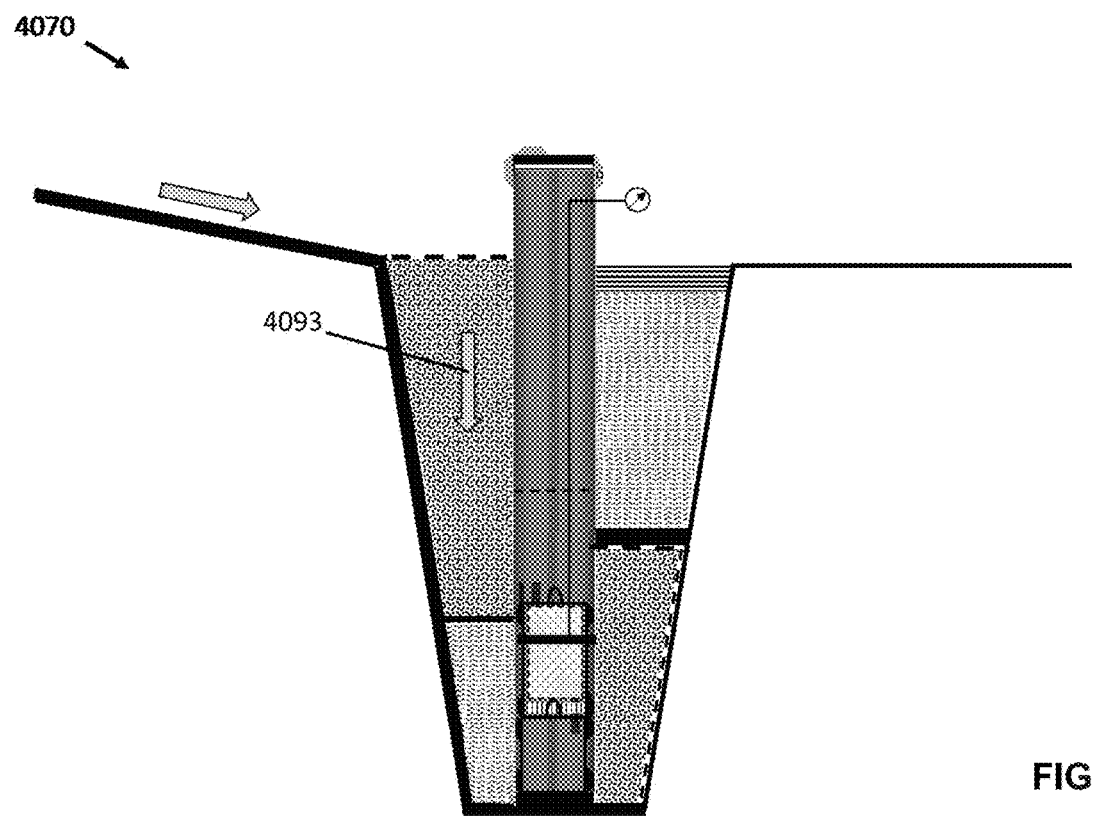
FIG. 62U is a side elevational view of FIG. 62T showing the contaminated surface water infiltrating an aggregate backfill on the left side.

FIG. 62U is a side elevational view of FIG. 62T in which contaminated surface water infiltrates 4093 the aggregate backfill 4023 on the left side 4108 of the treatment assembly.

Figure 62V:
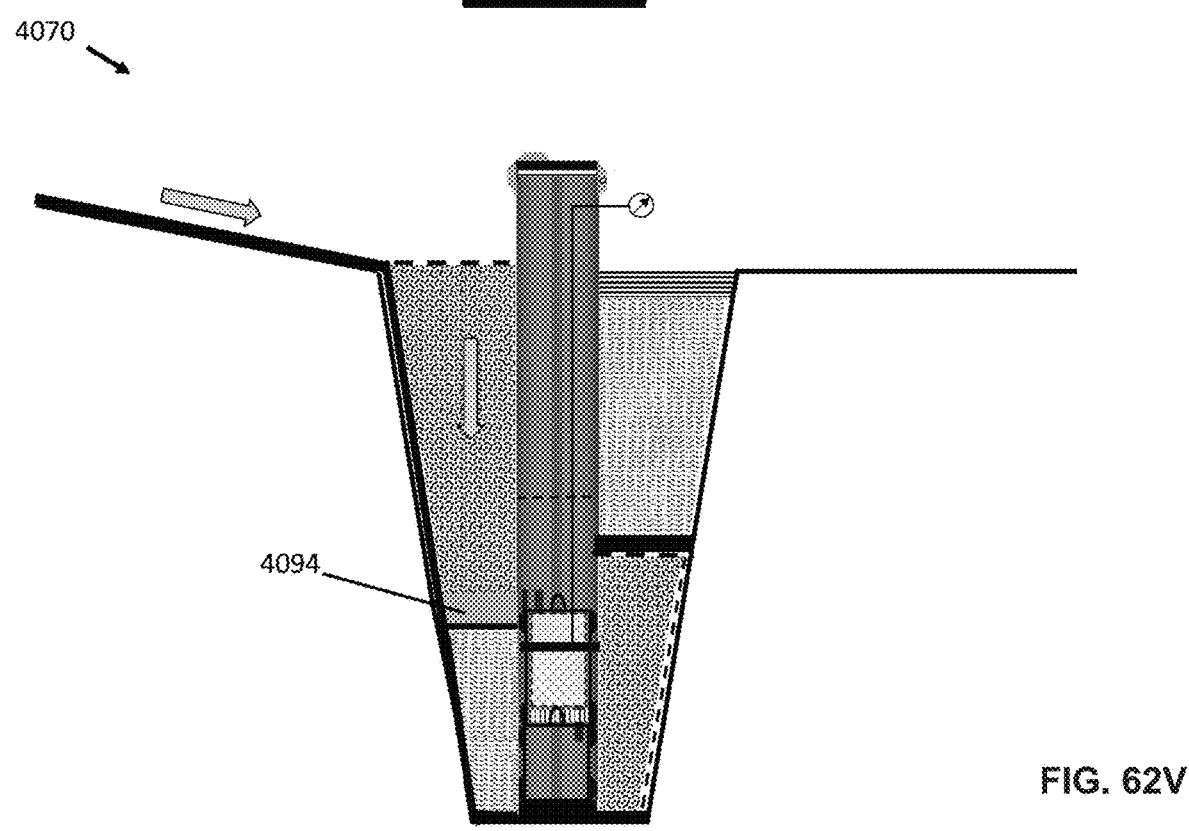
FIG. 62V is a side elevational view of FIG. 62U showing the contaminated surface water filling on top of the grout at the upper elevation inlet screen on the left side.

FIG. 62V is a side elevational view of FIG. 62U in which contaminated surface water fills 4094 on top of the grout on the left side 4108 of the treatment system 4070 and rises to the upper elevation inlet screen 4001.

Figure 62W:
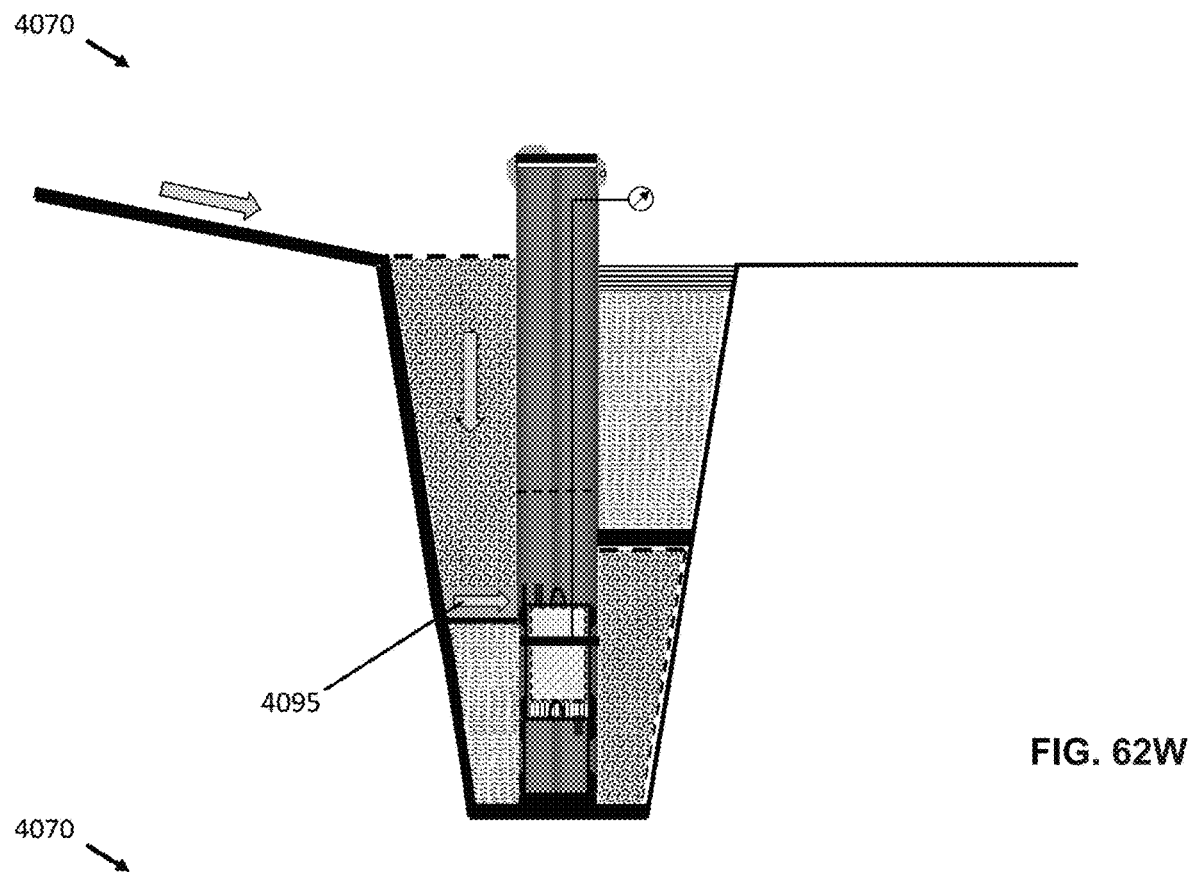
FIG. 62W is a side elevational view of FIG. 62V showing the contaminated surface water flowing into the upper elevation screen of the filter casing.

FIG. 62W is a side elevational view of FIG. 62V in which the contaminated surface water flows horizontally 4095 into the filter casing 4000 through the upper elevation inlet screen 4001.

Figure 62X:
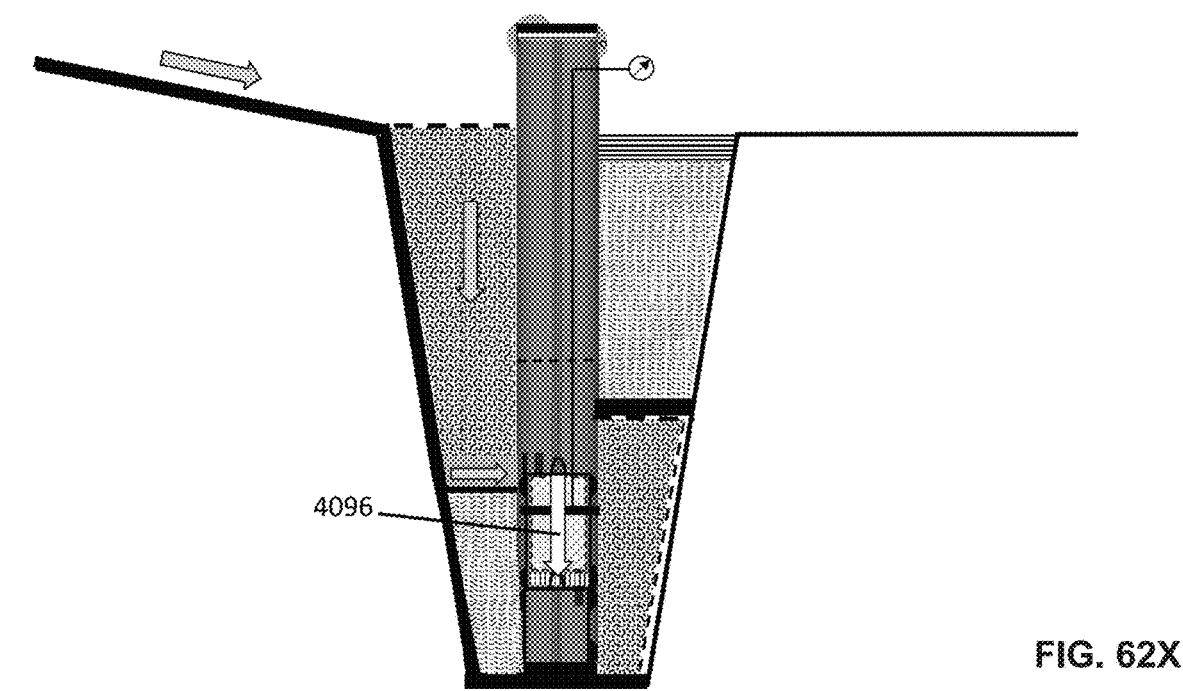
FIG. 62X is a side elevational view of FIG. 62W showing the contaminated surface water undergoing treatment as it moves vertically downward inside the liquid treatment cartridge.

FIG. 62X is a side elevational view of FIG. 62W in which the contaminated surface water undergoes treatment inside 4096 the filter casing 4000 via the liquid treatment cartridge 4003 filled with PRMs or equivalent 4062.

Figure 62Y:
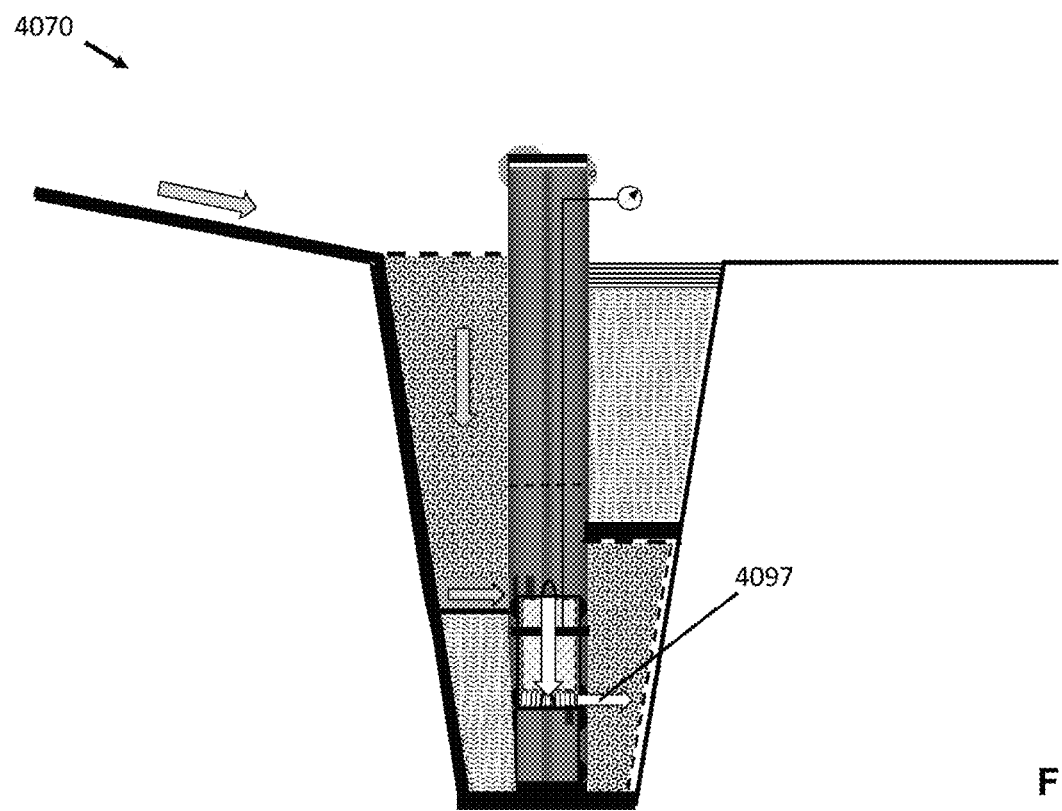
FIG. 62Y is a side elevational view of FIG. 62 showing the treated surface water discharging from the bottom of the liquid treatment cartridge and flow through the lower elevation outlet screen into an aggregate backfill on the right side.

FIG. 62Y is a side elevational view of FIG. 62X showing treated surface water discharging 4097 from the bottom of the liquid treatment cartridge 4003 through the lower elevation outlet screen 4002 into the aggregate backfill 4023 on the right side of the trench 4107.

Figure 62Z:
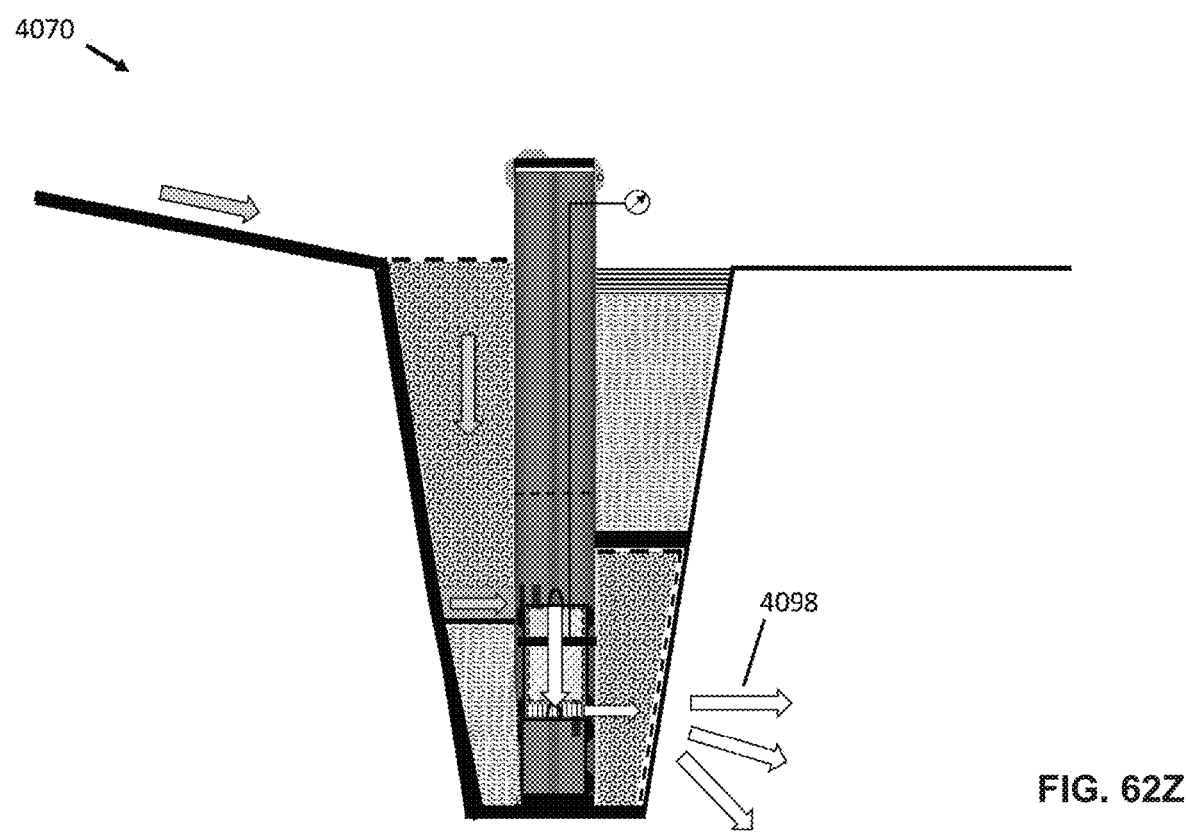

FIG. 62Z is a side elevational view of FIG. 62Y showing treated surface water discharging from the surface water-treatment system 4070 horizontally and downwardly 4098 into the unsaturated subsurface where it may infiltrate downward to an aquifer (not shown).

FIG. 30 is an overhead view of FIG. 62 (A-Z) showing the trench-based remedial system for a surface water-treatment system 4070, with a view elevation at the ground surface. There is no adjacent surface water body and no groundwater present within the excavated depth of the trench.

The treatment gate length 4100 is shown in FIG. 30 along with the initiated but incomplete length of the trench used to create an impermeable wing on the left 4101 and right 4102 of the treatment gate. In this example, three filter casings are open for the containment and treatment of contaminated surface water from the inclined ground surface 4028 in order to minimize contaminated water from discharging on to the level ground surface 4105.

Figure 63:
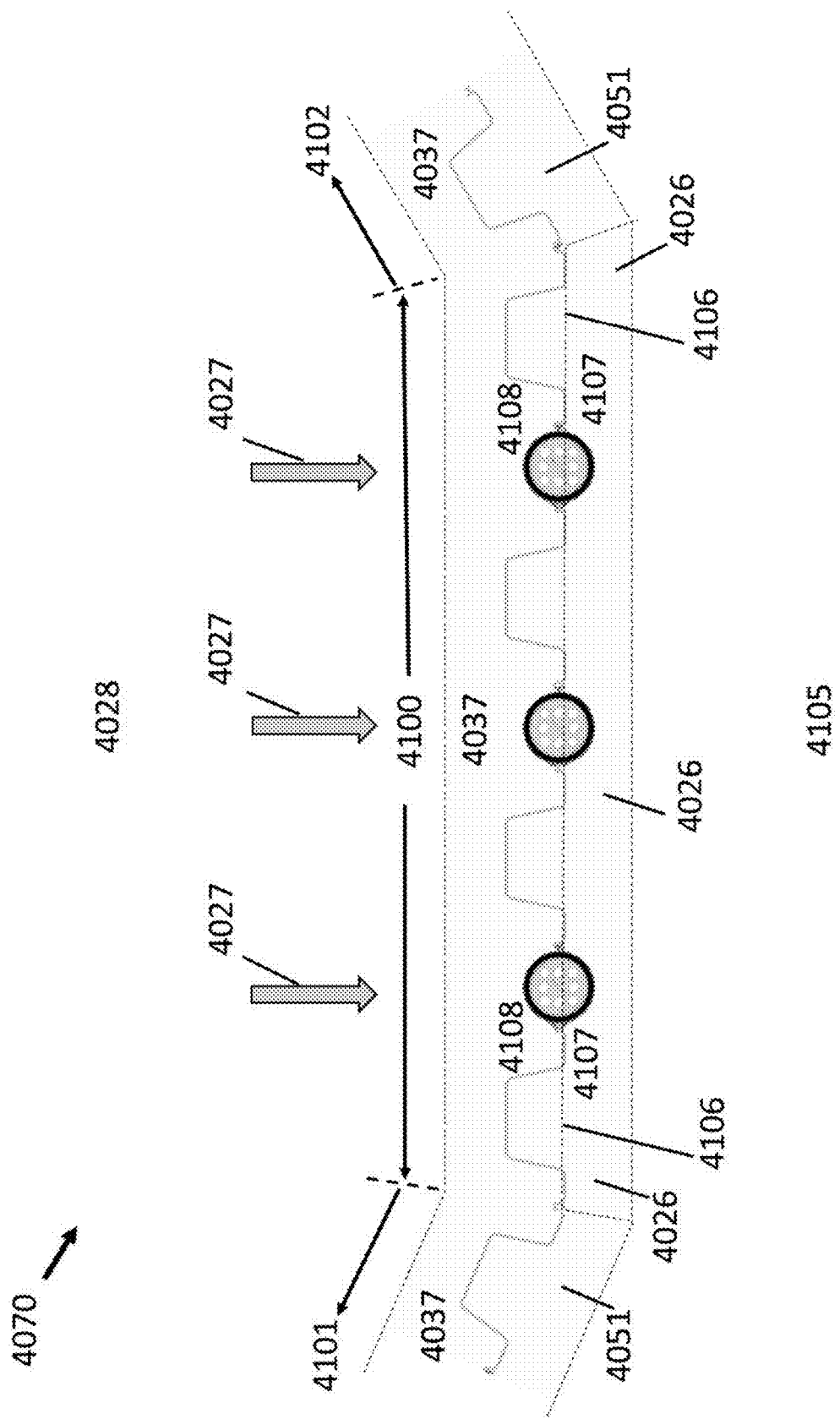
FIG. 63 is an overhead view of FIG. 62 (A-Z) showing an example of the containment and treatment of contaminated surface water by a trench-based surface water-treatment system.

The right side 4107 and left side 4108 of the trench excavation centerline 4106 used for the treatment gate, as shown in the cross-sectional view in FIG. 62 (A-Z), is also provided for orientation in FIG. 63. Contaminated surface water that flows directly 4027 into the treatment gate is shown in FIG. 63 and the flow of contaminated surface water flow that is diverted by the angled wings is not shown at this elevational view of the ground surface.

Filter fabric or equivalent 4037 overlies the aggregate (not shown) on the inclined surface side 4028 of the treatment gate and wings. A low-permeability backfill or equivalent 4051 is on the level side 4105 of the two wings and extends from the ground surface to the base of the trench excavation for the two wings. A concrete pad 4026 is at the ground surface on the level side 4105 of the treatment gate shown in FIG. 63.

FIG. 64 (A-I) are side elevational views of FIG. 44 with the addition of overflow screens 5000 and showing the instrumentation of four high water-level sensors 5001-5004 and two low water-level sensors 5005 and 5006 in the filter casing.

FIG. 64A represents normal operating conditions when none of the sensors are activated.

FIG. 64B shows the activation of the first high water-level sensor 5001, in which the condition may not represent an issue, since this condition could represent seasonally high groundwater level conditions; however, the situation needs to continue to be monitored in this and any adjacent filter casings (not shown in FIG. 64 (A-I).

FIG. 64C shows the activation of the second high water-level sensor 5002, in which the condition may not represent an issue, but the situation needs to continue to be monitored in this and any adjacent filter casings.

FIG. 64D shows the activation of the third high water-level sensor 5003, which is an issue because untreated groundwater 4019 is beginning to discharge through the overflow screens (which could be an indication that the PRMs in the liquid treatment cartridge have too low of a permeability or are starting to clog, potentially from buildup of iron bacteria).

FIG. 64E shows the activation of the fourth high water-level sensor 5004 in which untreated groundwater 4019 is discharged through the entire thickness of the overflow screens 5000. The activation of the fourth high water-level sensor 5004 could be programmed to automatically deflate the seal on the liquid treatment container so that groundwater does not to continue to mound up on the upgradient side 4045 of the treatment gate, as shown in comparison of FIG. 64E with FIG. 64F. However, contaminated groundwater 4019 bypasses the liquid treatment cartridge (FIG. 64F) and discharges into the downgradient 4048 side of the treatment gate until the cartridge is replaced, as represented by FIG. 64G when the treatment system returns to normal operating conditions.

FIG. 64H shows the activation of the first low water-level sensor 5005. This situation could represent a natural decline in groundwater levels, for example, from drought conditions. However, if water levels continue to decline as shown by the activation of the second low water-level sensor 5006 shown in FIG. 64I, this could represent a by-pass of groundwater treatment (for example, a leaking or fully deflated seal) in which contaminated groundwater 4019 bypasses the liquid treatment cartridge and discharges into the downgradient 4048 side of the treatment gate. For the remediation to be effective, the seal may need to be replaced.

Figure 65:
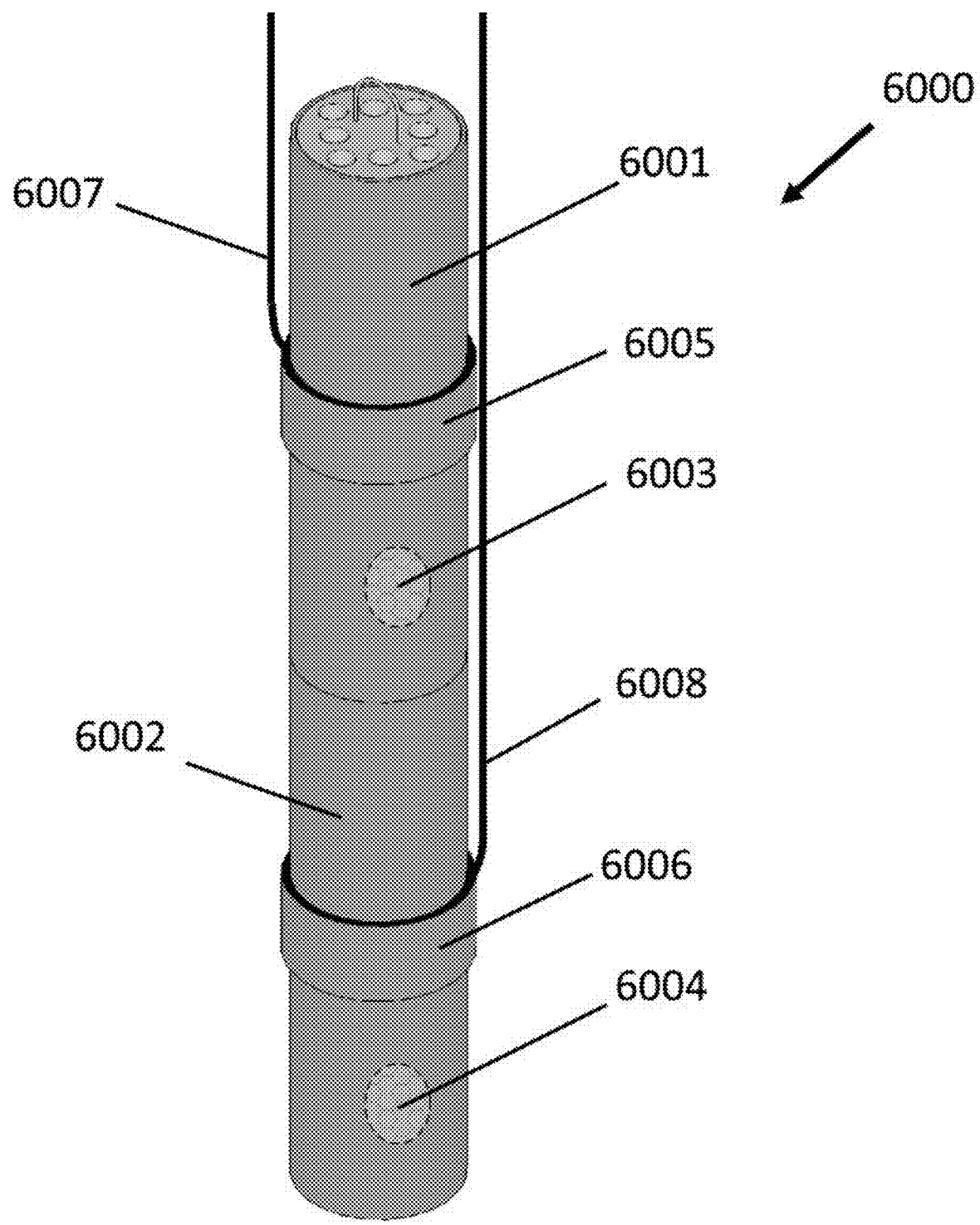
FIG. 65 is a side elevational view of two vertically stacked liquid treatment cartridges each containing different PRMs.

FIG. 65 is a side elevational view of two vertically stacked liquid treatment cartridges 6001 and 6002 each containing different PRMs (6003 and 6004, respectively). Filler tubes 6007 and 6008 are shown for the upper seal 6005 and lower seal 6006, respectively.

Figure 66:
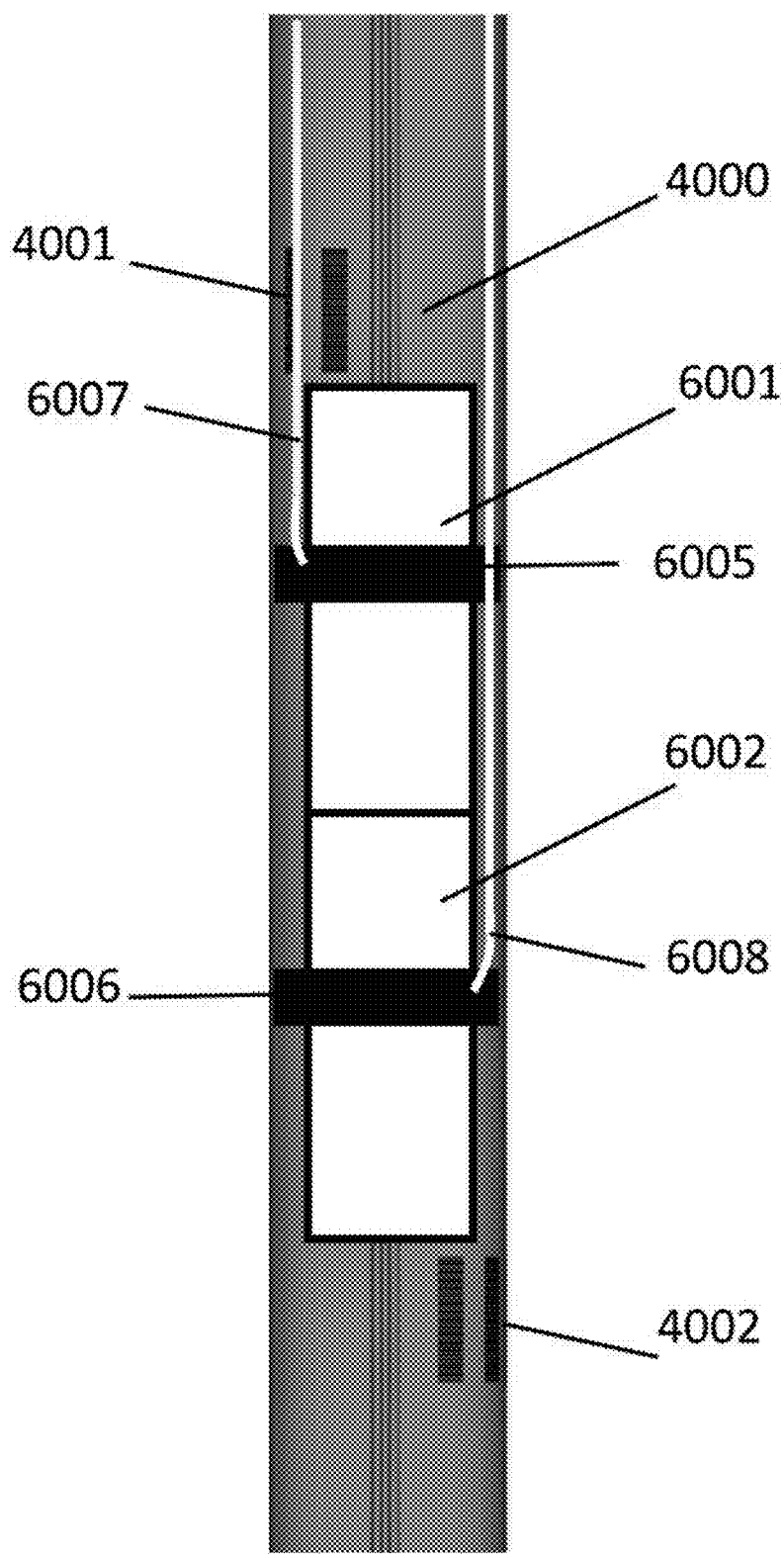
FIG. 66 is a side elevational view of FIG. 65 showing the two vertically stacked liquid treatment cartridges installed in a filter casing with the seals inflated.

FIG. 66 is a side elevational view of FIG. 65 showing the two vertically stacked liquid treatment cartridges 6001 and 6002 installed in a filter casing 4000 with the seals inflated (6005 and 6006, respectively). The two vertically stacked liquid treatment cartridges 6001 and 6002 are located between widely spaced screens 4001 and 4002 (FIG. 66) as appropriate for more than one liquid treatment cartridge in a single filter casing 4000.

Figure 67:
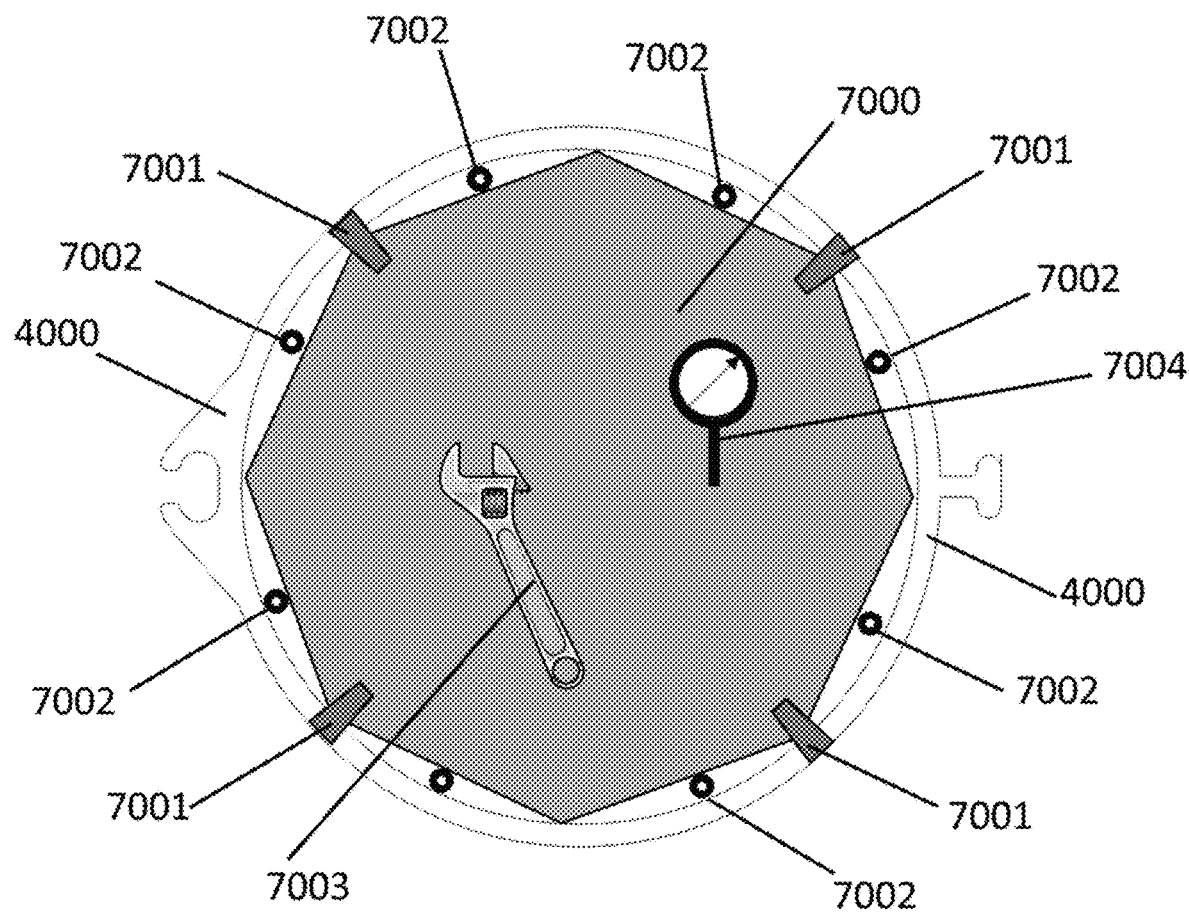
FIG. 67 is an overhead view of a service tray installed in the upper portion of a filter casing for convenient storage of gages, tools, and extra tubing.

FIG. 67 is an overhead view of a service tray 7000 installed in the upper portion of a filter casing 4000 held by supports 7001 for convenient storage of gages 7004, tools 7003, and extra tubing. The service tray shown in FIG. 67 is an example where the small openings between the edges of the tray and the inside of the filter casing accommodate filler tubes for seals and pipes for monitoring ports 7002 to extend above and below the service tray.

Figure 68:
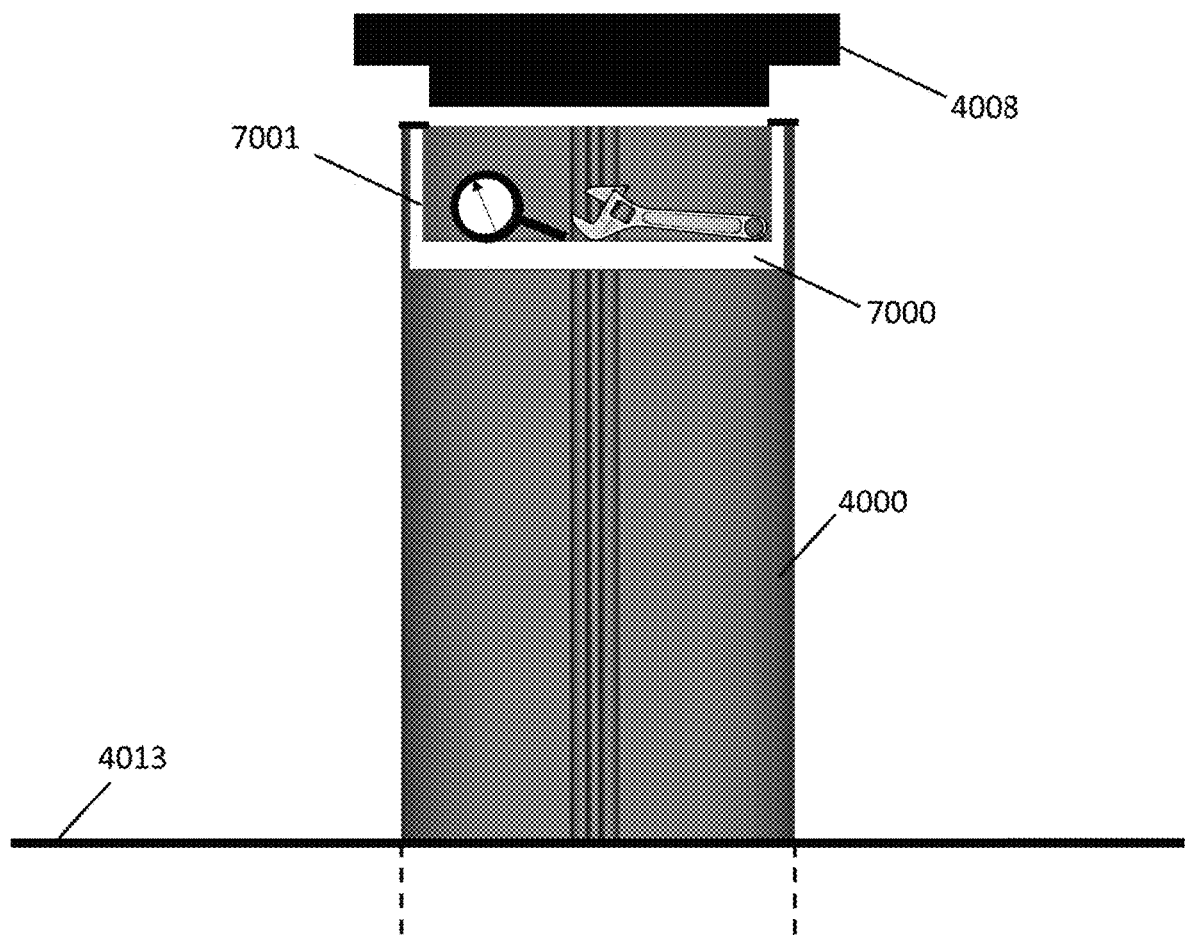
FIG. 68 shows a side elevational view of FIG. 67.

FIG. 68 shows a side elevational view of FIG. 67 above a ground surface 4013 showing the service tray 7000 held by supports 7001. A top cover 4008 is shown in FIG. 68 to have a recessed section that fits inside the supports 7001.

Figure 69B:
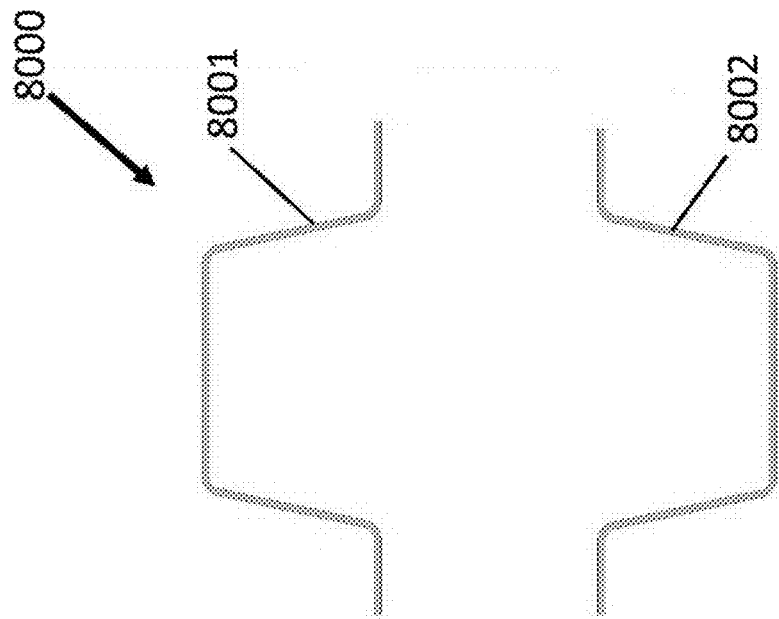
FIG. 69B is a side elevational view of FIG. 69A.
Figure 69A:
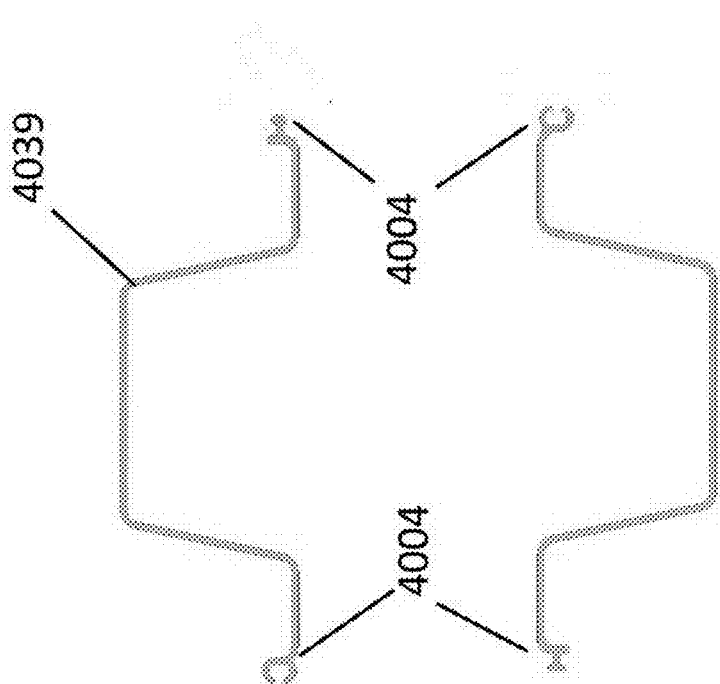
FIG. 69A shows a side elevational view of two opposing segments of sheet pile that are used to construct a sturdy container for shipment of liquid treatment cartridges.

FIG. 69A shows a side elevational view of two opposing segments of sheet pile 4039 that are used to construct a sturdy container 8000 for shipment of liquid treatment cartridges and associated seals, monitoring ports, parts, and gages.

FIG. 69B is a side elevational view of FIG. 69A, which, in this example, the shipping container for liquid treatment cartridges is constructed from lightweight synthetic sheet piling which is easy to cut, and the interlock connectors 4004 shown in FIG. 69A have been cut off.

FIG. 70 (A-D) are various views of an example container 8000 for shipping liquid treatment cartridges 4003.

Figure 70A:
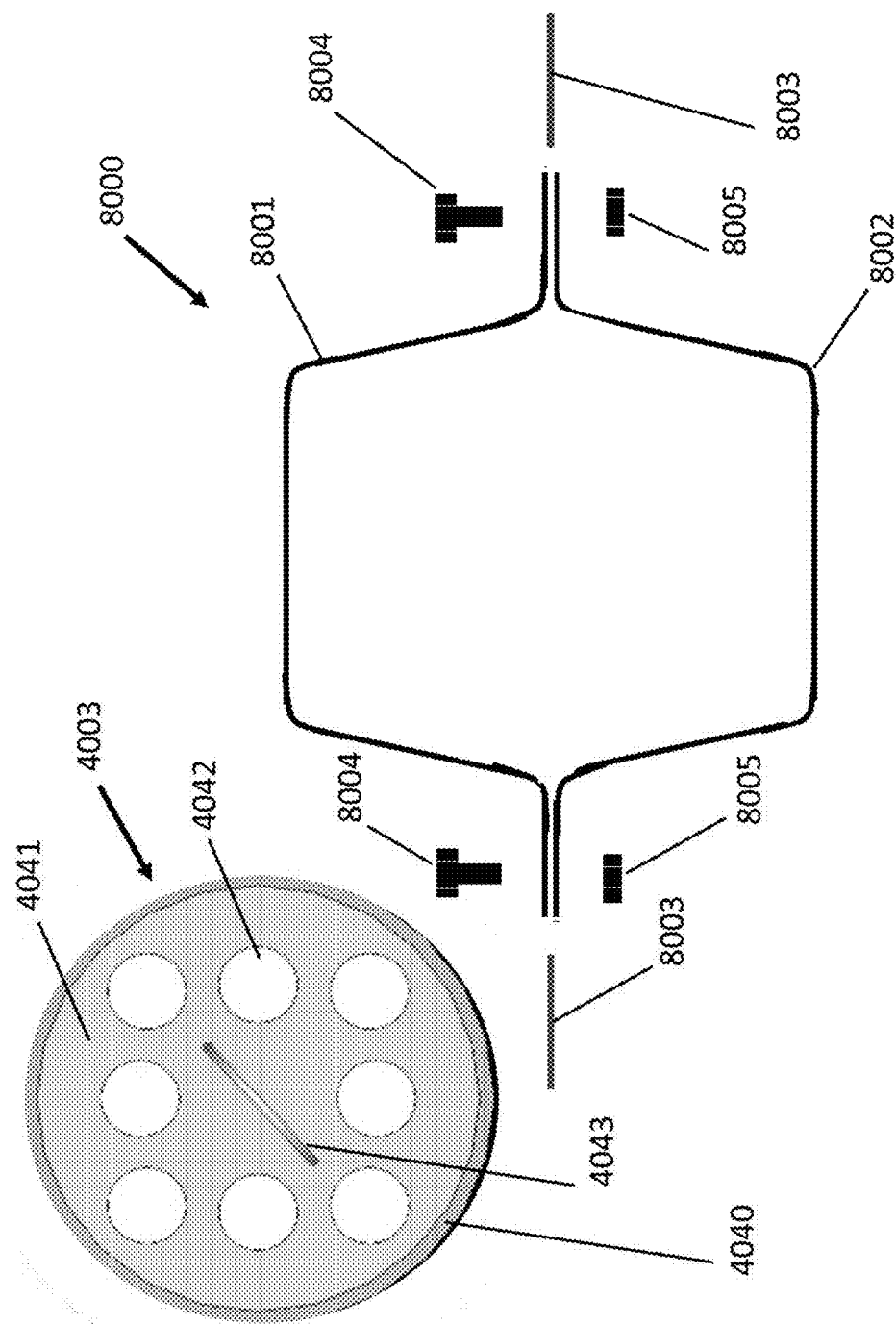
FIG. 70 (A-D) are various views of an example container for shipping liquid treatment cartridges.

FIG. 70A shows an overhead view of a liquid treatment cartridge 4003 with associated components (casing 4040, perforated top 4041, perforation 4042, and lifting loop 4043) adjacent to a side elevational view of a shipping container 8000. The shipping container 8000 in this example includes two segments 8001 and 8002 of sheet piling with the interlock connectors 4004 shown in FIG. 69A removed.

Figure 70B:
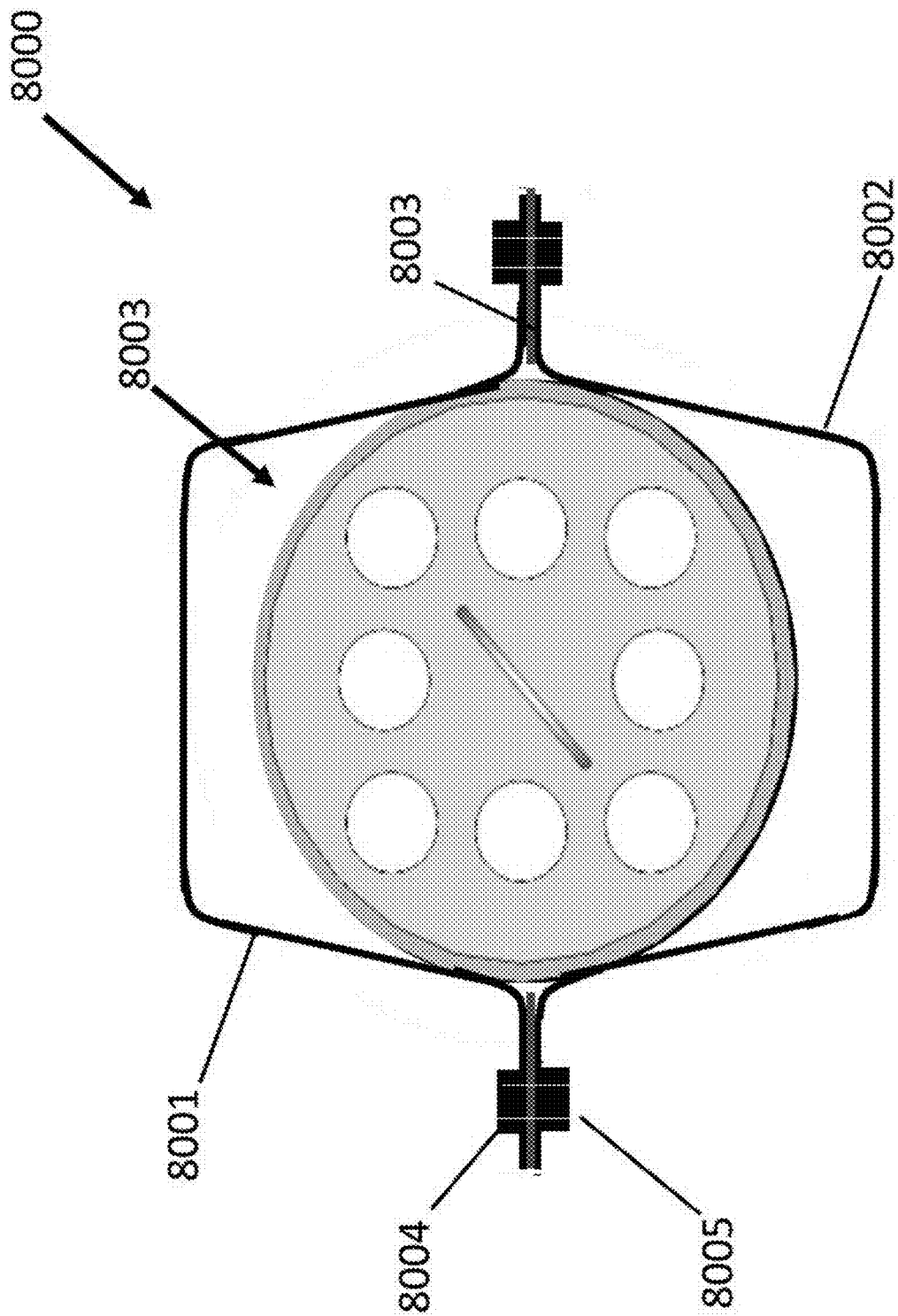
Figure 70C:
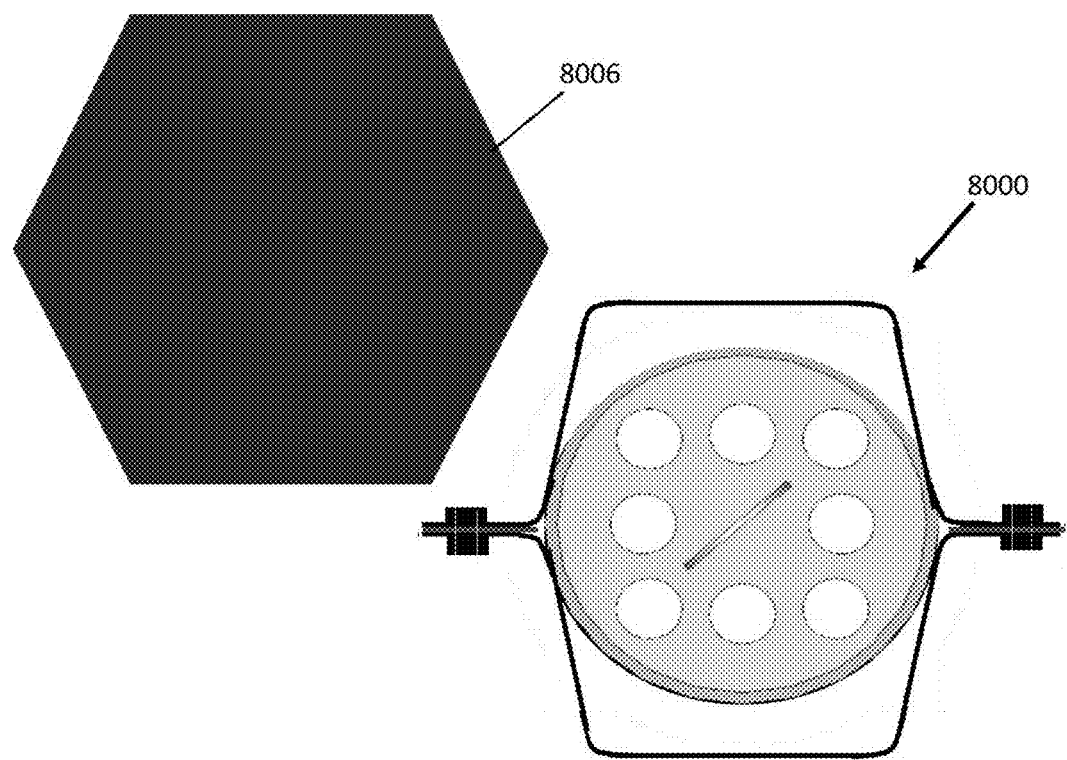
Figure 70D:
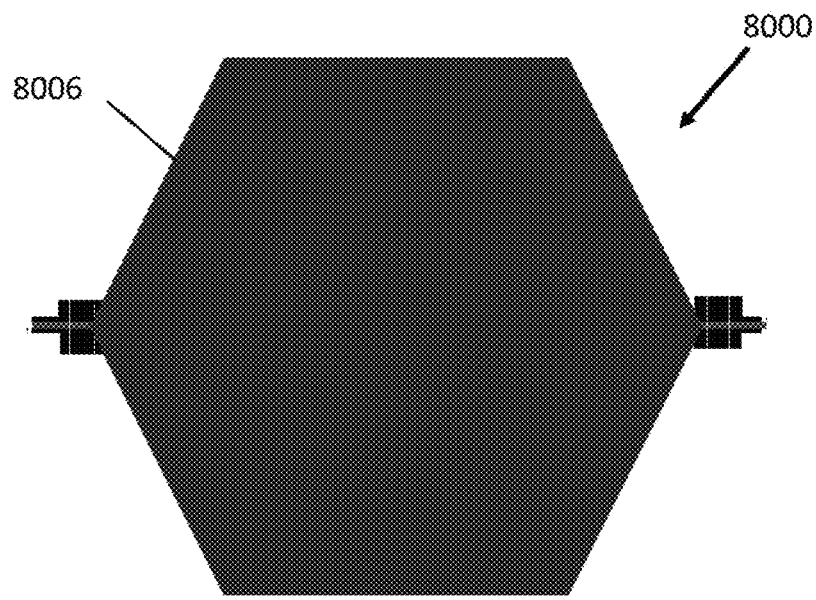

Gaskets 8003 are used between the two segments 8001 and 8002 to minimize leakage of fluids (in the case of spent liquid treatment cartridges) once bolts 8004 that extend through the two segments are connected to nuts 8005 and tightened, as shown in FIG. 70B with the cartridge inserted. A convenient void 8003 is created between the two segments 8001 and 8002 and the cartridge that can accommodate associated seals, monitoring ports, parts, and gages. A lid 8006 can be used to secure the top and bottom of the shipping container 8000 as shown in FIG. 70 C-D.

Remedial systems, devices, and methods described above can be placed close to contamination source areas for aggressive mass reduction using replaceable PRMs or equivalent with shorter effective life, as well as in tandem with downgradient trench-based treatment gates for property-boundary mass flux control. In addition, multiple arrays of PRMs or equivalent can be arranged to treat multiple, site specific, and mixed groundwater contaminants. Although the system can be placed in trenches as described herein, the ability to drive or install filter casings in unconsolidated materials, where practical, can reduce waste volumes and lower hazardous waste disposal costs.

The screens of the flow-through filter casings can be cleaned using conventional well-drilling techniques, extending the system's longevity. Thus, remediation according to embodiments described herein and variants coming to mind in view of these embodiments are rendered less complicated and involve fewer uncertainties and more versatility. Cost-effective monitoring is provided for groundwater quality upgradient, downgradient, and within the filter casings so as to permit assessments at each stage of remediation and of the overall performance of the remedial system.

What is claimed is:

1. A liquid treatment system comprising:
    a filter casing including a structural wall defining a width, a first screen formed though the structural wall, and a second screen formed though the structural wall, the first screen being defined on the filter channel at a different vertical elevation relative to the second screen; and
    a liquid treatment cartridge configured for placement in the structural wall of the filter casing between the first screen and the second screen, the liquid treatment cartridge including a cartridge casing having an upper end and a lower end, and a seal surrounding the cartridge casing at an intermediary position along the cartridge casing between the upper end and lower end,
    engagement elements connected to an exterior of the structural wall, wherein the engagement elements comprise a first connector comprising a channel and a second connector comprising a ridge with a widened end,
    wherein the cartridge casing is positioned below ground and the structural wall extends above ground,
    wherein soil is excavated onto a ground surface proximal the structural wall at an angle and provided with an angled interface formed by a gravel and liner structure, wherein contaminated soil is placed on the angled interface to direct flowthrough of liquids from the contaminated soil along the angled interface.

2. The liquid treatment system of claim 1, wherein when the liquid treatment cartridge is placed in the filter casing, an annular space is defined between an exterior of the cartridge casing and an interior of the structural wall of the filter casing.

3. The liquid treatment system of claim 2, wherein the inflatable seal has an inflated condition in which an annular space is filled by the inflatable seal such that the liquid treatment cartridge is engaged with the interior of the structural wall of the filter casing.

4. The liquid treatment system of claim 3, wherein the inflatable seal has a deflated condition in which the liquid treatment cartridge is disengaged from the interior of the structural wall of the filter casing permitting the liquid treatment cartridge to be placed within and removed from the structural wall of the filter casing.

5. The liquid treatment system of claim 1, further comprising at least a first wall section engaged with the first connector and a second wall section engaged with the second connector such that the filter casing, first wall section, and second wall section define a barrier wall.

6. The liquid treatment system of claim 1, wherein the engagement elements comprise fins jutting radially outward from the structural wall.

7. The liquid treatment system of claim 1, wherein the filter casing is installed in a ground area with the first screen and second screen positioned below a ground level of the ground area.

\* \* \* \* \*

UNITED STATES PATENT AND TRADEMARK OFFICE
CERTIFICATE OF CORRECTION

PATENT NO. : 10,556,260 B2
APPLICATION NO. : 15/950022
DATED : February 11, 2020
INVENTOR(S) : W. Joseph Alexander and Gregory W. Lucier Page 1 of 1

It is certified that error appears in the above-identified patent and that said Letters Patent is hereby corrected as shown below:

On the Title Page

In Line 4 of item (60) of "Related U.S. Application Data", application no. "62/255,528" should be replaced with --62/525,528--.

Signed and Sealed this
Twenty-fourth Day of March, 2020

Andrei Iancu
*Director of the United States Patent and Trademark Office*